US012373603B2

(12) United States Patent
Heart et al.

(10) Patent No.: US 12,373,603 B2
(45) Date of Patent: Jul. 29, 2025

(54) METHODS AND SYSTEMS FOR RECURSIVE DESCENT PARSING

(71) Applicant: Secure Computing, LLC, Forest Park, IL (US)

(72) Inventors: Karen Heart, Forest Park, IL (US); Alexander Rasin, Chicago, IL (US)

(73) Assignee: Secure Computing, LLC, Forest Park, IL (US)

( * ) Notice: Subject to any disclaimer, the term of this patent is extended or adjusted under 35 U.S.C. 154(b) by 0 days.

(21) Appl. No.: 18/516,830

(22) Filed: Nov. 21, 2023

(65) Prior Publication Data
US 2024/0095402 A1 Mar. 21, 2024

Related U.S. Application Data

(63) Continuation of application No. 17/824,860, filed on May 25, 2022, now Pat. No. 11,822,699.

(60) Provisional application No. 63/338,823, filed on May 5, 2022, provisional application No. 63/301,032, filed on Jan. 19, 2022, provisional application No. 63/276,546, filed on Nov. 5, 2021, provisional application No. 63/271,274, filed on Oct. 25, 2021, provisional application No. 63/270,449, filed on Oct. 21, 2021.

(51) Int. Cl.
*G06F 21/00* (2013.01)
*G06F 21/62* (2013.01)

(52) U.S. Cl.
CPC ........ *G06F 21/629* (2013.01); *G06F 21/6227* (2013.01)

(58) Field of Classification Search
None
See application file for complete search history.

(56) References Cited

U.S. PATENT DOCUMENTS 6,336,175 B1 1/2002 Shaath et al.
7,814,554 B1 10/2010 Ragner
(Continued)

OTHER PUBLICATIONS

Kang Wang et al., "File Hiding Based on Capacity Disguise and Double File System", English-translation abstract, Journal of Computer Applications, (Apr. 10, 2016), vol. 36, No. 4, pp. 979-984, CODEN: JYIIDU, ISSN: 1001-9081, 1 pg.
(Continued)

*Primary Examiner* — Maung T Lwin
(74) *Attorney, Agent, or Firm* — SankerIP

(57) ABSTRACT

Methods, systems, and devices for parsing text are described herein. A method of securing executable files is performed at a computing device having one or more processors and memory. The memory stories one or more programs configured for execution by the one or more processors. The computing device obtains source text that comprises a disassembled executable file and identifies, via a general parser module, the syntax of the source text by performing a recursive descent parsing of the source text. The device generates an abstract syntax tree (AST) for the source text based on the identified syntax and generates a transformed AST from the generated AST by replacing one or more system calls with respective protected system functions. The device also generates a secured executable file by assembling the transformed AST.

20 Claims, 55 Drawing Sheets

(56) References Cited

U.S. PATENT DOCUMENTS

| | | | |
|---|---|---|---|
| 7,849,509 B2 * | 12/2010 | Venkatapathy | G06F 21/577 |
| | | | 717/126 |
| 8,387,047 B1 | 2/2013 | Mazin et al. | |
| 8,484,734 B1 | 7/2013 | Tsai et al. | |
| 8,613,045 B1 | 12/2013 | Shigapov | |
| 8,751,493 B2 | 6/2014 | Procopio et al. | |
| 8,863,299 B2 | 10/2014 | Sharma et al. | |
| 9,098,363 B2 | 8/2015 | Schmidt et al. | |
| 9,111,071 B2 * | 8/2015 | Kerschbaum | G06F 21/125 |
| 9,195,840 B2 | 11/2015 | Day-Richter et al. | |
| 9,213,541 B2 * | 12/2015 | Araya | G06F 16/8373 |
| 10,042,637 B1 * | 8/2018 | Foster | G06F 8/48 |
| 10,073,710 B2 | 9/2018 | Tsirkin | |
| 10,127,318 B2 | 11/2018 | Chakra et al. | |
| 10,628,560 B1 | 4/2020 | Siranni et al. | |
| 10,877,748 B2 * | 12/2020 | Bucuvalas | G06F 8/36 |
| 11,657,154 B2 * | 5/2023 | Conikee | G06F 21/566 |
| | | | 726/22 |
| 11,775,866 B2 | 10/2023 | Paterson et al. | |
| 11,822,699 B1 | 11/2023 | Heart et al. | |
| 11,983,288 B1 | 5/2024 | Heart et al. | |
| 2002/0033838 A1 | 3/2002 | Krueger et al. | |
| 2005/0033975 A1 | 2/2005 | Lahti et al. | |
| 2006/0041942 A1 | 2/2006 | Edwards | |
| 2006/0136446 A1 | 6/2006 | Hughes et al. | |
| 2006/0272021 A1 | 11/2006 | Marinescu et al. | |
| 2007/0157287 A1 | 7/2007 | Lim | |
| 2008/0209551 A1 | 8/2008 | Treacy et al. | |
| 2008/0229428 A1 | 9/2008 | Camiel | |
| 2009/0193074 A1 | 7/2009 | Lee | |
| 2010/0154038 A1 | 6/2010 | Natarajan | |
| 2010/0211879 A1 | 8/2010 | Tsao | |
| 2012/0016861 A1 | 1/2012 | Edwards et al. | |
| 2014/0137252 A1 | 5/2014 | Zheng et al. | |
| 2015/0058286 A1 | 2/2015 | Leibovici et al. | |
| 2015/0113655 A1 | 4/2015 | Strahm | |
| 2016/0231941 A1 | 8/2016 | Oh et al. | |
| 2017/0090699 A1 | 3/2017 | Pennington et al. | |
| 2017/0104599 A1 | 4/2017 | Ali et al. | |
| 2017/0206371 A1 | 7/2017 | Kim et al. | |
| 2018/0129821 A1 | 5/2018 | Havewala et al. | |
| 2018/0144124 A1 | 5/2018 | Lahav et al. | |
| 2018/0181723 A1 | 6/2018 | von Muhlen et al. | |
| 2018/0285007 A1 | 10/2018 | Franklin et al. | |
| 2019/0228153 A1 | 7/2019 | Scaife et al. | |
| 2019/0332783 A1 | 10/2019 | Bhardwaj et al. | |
| 2020/0394313 A1 * | 12/2020 | Ionescu | G06F 21/577 |
| 2020/0404007 A1 * | 12/2020 | Singh | G06F 16/24537 |
| 2021/0056211 A1 * | 2/2021 | Olson | G06N 3/08 |
| 2022/0027110 A1 | 1/2022 | Abe et al. | |
| 2022/0358216 A1 | 11/2022 | Qi et al. | |
| 2023/0161824 A1 | 5/2023 | Pandit et al. | |
| 2023/0244389 A1 | 8/2023 | Dai et al. | |

OTHER PUBLICATIONS

Karen Heart, Notice of Allowance, U.S. Appl. No. 17/555,265, Apr. 1, 2024, 15 pgs.

Karen Heart, Notice of Allowance, U.S. Appl. No. 17/824,860, Sep. 29, 2023, 10 pgs.

Song Sanggeun et al., "The Effective Ransomware Prevention Technique Using Process Monitoring on Android Platform", Hindawi Publishing Corporation, Mobile Information Systems, vol. 2016, Article ID 2946735, 9 pgs., Retrieved from the Internet: https://onlinelibrary.wiley.com/doi/10.1155/2016/2946735.

* cited by examiner

Typical File Access

| Time | File | Timestamp | Cluster | |
|---|---|---|---|---|
| ↓ | app_main<br>app_lib1<br>app_lib2 | Jan. 20, 2018 9:35am<br>Jan. 20, 2018 9:35am<br>Jan. 20, 2018 9:35am | } | Version 1 |
| | app_main<br>app_lib2 | Jul. 30, 2018 4:20pm<br>Jul. 30, 2018 4:21pm | } | Version 2 |
| | app_lib1<br>app_lib2 | Feb. 24, 2019 10:05am<br>Feb. 24, 2019 10:06am | } | Version 3 |
| | app_lib2 | May. 1, 2019 3:15pm | ] | Version 4 |

Figure 52

METHODS AND SYSTEMS FOR RECURSIVE DESCENT PARSING

CROSS REFERENCE TO RELATED APPLICATIONS

This application is a continuation of U.S. patent application Ser. No. 17/824,860, filed on May 25, 2022 entitled "Preventing Surreptitious Access to File Data by Malware," which claims priority to each of the following: (1) U.S. Provisional Patent Application No. 63/270,449, filed Oct. 21, 2021, entitled "Protections Against Surreptitious Launching of Computer Programs, Launching of Untrusted Computer Programs, and Electronic File Destruction;" (2) U.S. Provisional Patent Application No. 63/271,274, filed Oct. 25, 2021, entitled "Protections Against Surreptitious Network Activity;" (3) U.S. Provisional Patent Application No. 63/276,546, filed Nov. 5, 2021, entitled "Operating System Enhancements to Prevent Surreptitious Access to User Data Files;" (4) U.S. Provisional Patent Application No. 63/301,032, filed Jan. 19, 2022, entitled "Preventing Surreptitious Access to File Data by Malware;" and (5) U.S. Provisional Patent Application No. 63/338,823, filed May 5, 2022, entitled "Compiler Toolkit Enabling Transformations of Computer Programs in Deployed Executables," each of which is incorporated by reference in its entirety This application is also related to U.S. patent application Ser. No. 17/555,265, filed Dec. 17, 2021, entitled "Operating System Enhancements to Prevent Surreptitious Access to User Data Files," which is incorporated by reference herein in its entirety.

TECHNICAL FIELD

The disclosed implementations relate generally to computer and network security and more specifically to systems, methods, and user interfaces that prevent or limit malicious and unauthorized access to files and data.

BACKGROUND

There are many forms of malware. In some cases, malware modifies data on a user's computer, takes over a user's computer (e.g., to carry out further nefarious activity), or locks a user out of the user's computer entirely (e.g., ransomware). In other cases, the malware just "looks" at user data files (e.g., spreadsheets or text documents). In this way, the malware can steal valuable information (e.g., financial information or proprietary business information), and the user may not even know the information was taken.

SUMMARY

Underlying features of malicious software behavior generally include one or more of the following actions performed without the knowledge and consent of the user: reading and writing files, transmitting and receiving data to and from remote computers connected over a network, and launching programs.

The present disclosure describes implementing features of an operating system (OS) so that the operating system is able to restrain applications (also sometimes called apps, programs, or executables) so as to protect a user's prerogative to control access to data. For example, one feature restricts applications from accessing data that is not associated with them. In this way applications lack the ability to access file data outside of the confines of their limited storage. As another example, another feature establishes user volition before permitting access to user files. Another example feature restricts applications from initiating transmissions to other computers over a network, thus inhibiting their ability to send and receive data over a network autonomously. Another example feature restricts the capability of applications to launch other applications so as to inhibit the surreptitious downloading and execution of malicious code. Another example feature authenticates updates prior to installation and removes the update (restores the data) if authentication fails. These features and others are described in more detail later in this disclosure. The disclosed features diminish or eliminate risks to users from malware.

In accordance with some implementations, a method executes at a computing device with one or more processors and memory. For example, the electronic device can be a smart phone, a tablet, a notebook computer, or a desktop computer. The method includes: (i) installing a first application at the computing device, the first application designated as writing to user files, where installing the first application includes: (a) storing application data files for the first application within a first portion of the memory, wherein files stored in the first portion are designated as read-only for the first application; and (b) allocating a second portion of the memory for user data files to be used by the first application; and (ii) installing a second application at the computing device, the second application designated as writing to application data files, where installing the second application includes: (a) allocating a third portion of the memory for prototype writable application data files; and (b) allocating a fourth portion of the memory for network-based data access.

In accordance with some implementations, a method of preventing unauthorized launching of applications is performed at the computing device. The method includes: (i) receiving a request from an application to call an executable function; (ii) in response to receiving the request, determining whether permission to call the executable function has previously been granted for the application; and (iii) in accordance with a determination that permission to call the executable function has not previously been granted for the application: (a) presenting an option to a user of the computing device to permit the call to the executable function; and (b) receiving, from the user, permission for the application to call the executable function.

In accordance with some implementations, a method of automated version control is performed at the computing device. The method including: (i) creating a repository corresponding to one or more directories of a filesystem of the computing device; (ii) receiving a request from an application to close a file, wherein the file is stored in the one or more directories; and (iii) in response to the request, executing a version commit function to store changes to the file in the repository.

In accordance with some implementations, a method of preventing unauthorized network access is performed at the computing device. The method includes: (i) receiving a request from an application to establish a network connection with a domain; and (ii) in response to receiving the request: (a) determining whether the application is subject to governed network activity; (b) in accordance with a determination that the application is subject to governed network activity: (1) accessing an operating system volition table to determine whether network volition has been asserted, wherein network volition has been asserted when the volition table includes a record for a volition assertion for the domain by the application within a preceding predefined period of time; (2) in accordance with a determination that network volition has been asserted, permitting the application to establish the network connection; and (3) in accordance with a determination that network volition has not been asserted, displaying a user interface box prompting a user of the computing device to decide whether to permit the application to establish the network connection.

In accordance with some implementations, a method of preventing unauthorized network transmissions is performed at the computing device. The method including: (i) receiving a request from an application to establish a network connection with a domain; (ii) in response to receiving the request, determining whether a portion of the memory includes an association between the application and the domain; (iii) in accordance with determining that the portion of the memory does not include the association, presenting an option to a user of the computing device to permit the network connection; and (iv) receiving, from the user, permission for the application to establish the network connection.

In accordance with some implementations, a method of securing installation files is performed at the computing device. The method includes: (i) receiving, from a remote device, a request to download installation files for an application; (ii) in response to the request, obtaining the installation files from a first device and obtaining a digital signature from a second device; (iii) applying the digital signature to the installation files to obtain signed installation files; and (iv) transmitting the signed installation files to the remote device.

In accordance with some implementations, a method of preventing unauthorized access to user data files is performed at the computing device. The method includes: (i) receiving a request from an application to open a data file, the request including a name of the data file and a path to the data file; (ii) in response to receiving the request: (a) determining whether the path corresponds to a designated storage location for user data files; (b) determining whether access to the data file has previously been granted for the application; (c) in accordance with a determination that (i) the path corresponds to a designated storage location for user data files and (ii) access to the data file has not previously been granted for the application: (1) accessing an operating system volition table to determine whether access volition has been asserted, wherein access volition has been asserted when the volition table includes a record for a volition assertion for the data file by the application within a preceding predefined period of time; (2) in accordance with a determination that access volition has been asserted, permitting the application to access the data file; and (3) in accordance with a determination that access volition has not been asserted, displaying a user interface box prompting a user of the computing device to decide whether or not to grant the application access to the data file.

In some implementations, a computing device includes one or more processors, memory, and one or more programs stored in the memory. The programs are configured for execution by the one or more processors. The one or more programs include instructions for performing any of the methods described herein (e.g., the methods 6900, 7100, and 7200).

In some implementations, a non-transitory computer-readable storage medium stores one or more programs configured for execution by a computing device having one or more processors, memory, and a display. The one or more programs include instructions for performing any of the methods described herein (e.g., the methods 6900, 7100, and 7200).

Thus methods, devices, systems, and graphical user interfaces are disclosed that govern data and prevent unauthorized forms of access.

BRIEF DESCRIPTION OF THE DRAWINGS

For a better understanding of the aforementioned systems, methods, and graphical user interfaces, as well as additional systems, methods, and graphical user interfaces that prevent unauthorized access to user data files, reference should be made to the Description of Implementations below, in conjunction with the following drawings in which like reference numerals refer to corresponding parts throughout the figures.

FIG. 52 illustrates example version clustering in accordance with some implementations.

Figure 1:
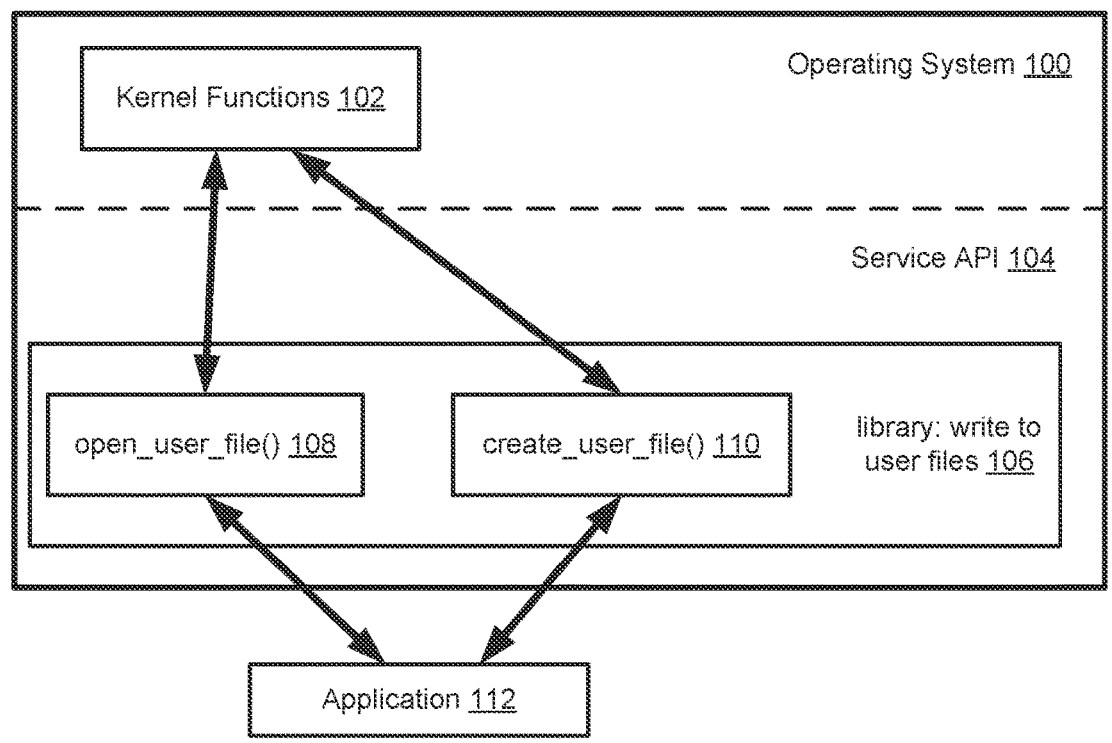
FIGS. 1-5 illustrate an example operating system and example functions for preventing unauthorized file access in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

The present disclosure describes various implementations for governing data and preventing unauthorized forms of access. Some implementations described herein involve revisions to an operating system to prevent programs from exerting control over data absent clear evidence of the user's volition.

Various implementations described below achieve the following: (i) inhibiting surreptitious opening of user files; (ii) constraining surreptitious network transmissions; (iii) inhibiting surreptitious launching of applications; (iv) inhibiting surreptitious installation of executable code; (v) inhibiting surreptitious opening of unrelated application data files; (vi) creating backup files and visibly extending restoration privileges to the user; and (vii) improving user control over non-essential server applications.

Additionally, countermeasures are employed in some implementations to inhibit an attacker, including disabling direct access to storage devices and preventing third-party applications from linking to system library functions that permit direct access to storage devices. For example, applications executing in a user mode are prevented from accessing processor instructions that provide direct access to storage devices. In this way, third-party applications are required to access storage devices only through the file system and file system libraries. An operating system may be provided with the one or more utilities for low-level access to storage devices.

Another countermeasure employed in some implementations is to disable user simulation while evidence of volition is being gathered. For example, disabling functions in a graphical user interface (GUI) framework libraries that permit programmatic simulation of user mouse clicks or key presses while evidence of user volition is being gathered. As detailed below, evidence of volition may be gathered when a user interacts with a file manager or a file chooser dialog box.

Another countermeasure employed in some implementations is to require user approval, e.g., by use of a modal dialog box, whenever a plenary system function is called. For example, the user is provided with a meaningful explanation of the implications of the called function, as well as the identity of the application that called it.

Disclosed implementations improve the protection of files from malicious activity by malware. In accordance with some implementations, several software modules are added to the distribution of an operating system. A user can obtain this protection by a single update to the operating system.

A "user file" or "user data file" is any non-executable data file that a user knowingly and intentionally accesses for the purpose of creating, revising, or viewing data contained within the file. Common examples of user files include word processor files (e.g., files with a .docx extension) and spreadsheet files (e.g., files with a .xlsx extension). On the other hand, application data files are data files that applications access directly to store and retrieve data for use by the application. For example, the dictionary files that a word processor uses to spell check a user document are application data files. In order to protect user files, disclosed implementations prevent the opening and deleting of user files in the absence of explicit user volition. The same general principle does not apply to application data files, however, because applications routinely revise and remove their application data files during operation in order to facilitate their functionality. Instead, guarding of application data files should entail protection from access or deletion by unrelated applications, unless explicit user volition for the action is present.

Weakness in computer security exists in part due to the architecture and coding of systems not being centered around the principle of informed user consent. Consider the following scenario: a person wants to write a document but is physically unable to write because, for example, they injured their hand. In order to complete the task, the person needs the assistance of someone else who will write down what they say (e.g., a scribe). After completing the document with the help of the scribe, the person places it into a filing cabinet inside their house. By storing the document in the filing cabinet, the person prevents the scribe from revising the document outside of their presence and prevents the scribe from creating a copy how someone else. In short, the person exerts sole control over the document because they exert sole control over the document storage. Over time, with the aid of the scribe, the person may create a multitude of documents and store them in the filing cabinet. From time to time, the person may retrieve documents for reading or revision. The person's control over document storage can be described as plenary, e.g., absolute or total.

When using a computer, a software application may perform the role of the scribe. The person doesn't handwrite the document, the application writes to the file and stores it on the computer. Documents are stored as electronic ones and zeros in files, which are organized into a file system (e.g., the equivalent of a file cabinet). In the design of current operating systems, applications can generally access any and every file their user has permission to access. By default, permission access is extensive, if not exhaustive. For example, a permission system may allow any application that a user starts, or launches, to access documents that the user owns. Using the scribe analogy, this type of far-reaching control over the file system can be considered plenary, e.g., any application that the user runs can access all of the user's files.

In order to reduce application control over document storage, the applications can be prevented from directly accessing file storage. This type of restriction requires a modification to the operating system. Following the scribe analogy, the operating system can provide the user with direct control over which files an application can access, rather than using a typical permission system.

System libraries are collections of functions supplied with operating systems. One such library function permits applications to open (access) files for reading and writing. Generally, system libraries limit applications only to the extent that access to the file system is limited, e.g., by user or group permissions. By relying on default file permissions, users typically give applications plenary control over much of the file system. Malware can and often does exploit this plenary control surreptitiously.

In order to transfer power to open files from the applications to the users, the system library can be modified so that only the user is able to communicate directly with the system library to select the file to be opened. Once the file is opened, the system library can then supply a reference to the file, known as a file handle, that the application can then use for reading or writing the user-selected file. Specifically, a file handle is a temporary reference number that an operating system assigns to a file requested by the user to be opened. The system calls, accesses, and interacts with the file via the file handle until the file is closed (or the system session ends). This revision would then mirror the scribe analogy of removing the document from the file cabinet and handing it to the scribe for review and revision. After the user has finished with the file using the application, the application can communicate to the system that the handle is no longer needed and, therefore, the file may be "closed," which is the equivalent of returning the document to the file cabinet. Even if the application does not tell the system to close the file, the system can close the file automatically when the application is terminated, or closed, by the user.

Preventing Unauthorized Access to Data Files

Malicious access to file data can be disrupted by altering the arrangement of file storage. In some implementations, each type of application is restricted to a certain subset of system functions that can access file storage. In some implementations, these protections are buttressed by alterations to the network stack within the kernel in order to guard against malicious file data exfiltration. In some implementations, these changes are enforced by installation and update procedures.

In some implementations, the file system utilized by the operating system is not exposed to any programs, including utilities. In some implementations, only relevant portions of file storage are permitted to programs and the storage provisioned are organized in a manner that precludes vulnerabilities. In some implementations, users are provided with explicit control over network activity, as well as other plenary system functions, that potentially involve data access.

In some implementations, the capabilities available to programs are grouped by purpose of the program and, accordingly, each program conforms to a single purpose. In some implementations, types of programs include ordinary applications, configuration applications, server applications, update applications, and utility applications. For the sake of simplicity, ordinary applications are referred to as applications, while programs of other types are always referenced using the name that describes their purpose, such as configuration applications or server applications.

Disclosed implementations further reduce the need and reach of administration to a small set of tasks. In some implementations, administrative authority over files and network activity is removed. In some scenarios, without administrators in the traditional sense, every user can run any software that is available on the computer. In some implementations, maintaining control over software behavior is achieved by moving some of the privilege and control decisions, making them inherent to the category of each software component. In some implementations, the privilege capability decisions are made at the software development stage, before a user chooses to install the software.

In some scenarios, this revised approach prompts application programmers to make choices as to the tasks that a prospective program can perform. For example, programmers can create applications that perform some form of administrative action, but the operating system limits their reach.

As discussed below, in some implementations, no type of application is permitted by the system to access system functions directly. Instead, in some implementations, various system libraries are used, which then call the pertinent system functions. In some implementations, each type of application is limited to a designated subset of the system libraries.

An ordinary application is a program designed for direct use by end users. Applications read and write to various files. The files can be classified as user files and application data files. A user file is any data file (e.g., non-executable file) that a user knowingly and intentionally accesses for the purpose of creating, revising, or viewing data contained within the file. Examples of user files include word processor files (e.g., files with the .docx extension) and spreadsheet files (e.g., files with the .xlsx extension). An application data file is a file that applications access directly to store and retrieve data for use by the application. For example, the dictionary files that a word processor uses to spellcheck a user document are application data files.

Although an application can read from both application data files and user files, an application may not write to both application data files and user files. Accordingly, the developer chooses, prior to installation of the program, whether the application will write to application data files or user files. Although there are various means for imposing such a restriction, in some implementations, two separate and distinct system libraries are created, one for managing application data files and a different one for reading and writing user files. Thus, an application chooses one set of system functions by declaring which of the two system libraries to link to at the time of installation.

In some implementations, as part of the installation procedure, an area of the filesystem is allocated for storage of files to be used by the application. In some implementations, the area is subdivided into a location for user files and another for application data files. In some implementations, no other ordinary applications are permitted access these areas (e.g., only other types of programs that are sanctioned may access them). In some implementations, the amount of space that an application may utilize by writing files is limited to a default value, which the user may override with a utility that is supplied with the operating system. In some implementations, a system function and utility guards the amount of space utilized by each application.

In some implementations, the area where application data files are stored is further subdivided. In some implementations, one division includes application data files that are read-only for the application. An application is permitted to open files in this read-only location for reading. These files are revisable by a separate configuration application in some implementations. In some implementations, if the developer elects to utilize user files, all application data files are placed in the read-only location. In some implementations, if the developer elects to write to application data files, additional divisions are created. In some implementations, a separate division is made for prototype writable application data files, e.g., a location that stores a copy of each writable application data file at the time of installation or update. In some implementations, another division includes application data files that are accessible only when the application is not connected to another program over the network. This division is known as the offline network status and, in some implementations, it is initialized with a complete set of the prototype writable application data files at the time of installation. In some implementations, the first time the application connects to a server program over the network, the system allocates a new application data storage area using the domain name of the remote computer. In some implementations, the area is initialized with a complete set of prototype writable application data files. Thereafter, whenever the application connects to the same domain again, that location will be used whenever an application data file is opened for reading and writing in accordance with some implementations. In this way, reading from and writing to application data files can remain consistent with the user's choice of network connection or offline status. Thus, data the user provides to the application that is written to a particular application data file is available to the application when the network status differs, thereby preventing one domain from exfiltrating data that the user shared with a different domain or intended to remain offline.

In some implementations, applications are not permitted to transition from an offline network status to a network-connected status or from one network-connected status to another because data that is resident in dynamic memory could be accessed to circumvent the user's volition. In some implementations, the only permissible transition is from a network-connected status to the offline status, e.g., because it is assumed that a user would not object to data that is shared with a remote server also being stored offline. In some implementations, each application starts without a network status. In some implementations, the status is set when the application first attempts to open an application data file for reading and writing. In some implementations, if the application is not connected to a server, e.g., offline, and opens an application data file for reading and writing, then the status is set to offline and only other application data files from the offline location are accessible for reading and writing. In some implementations, if the application connects to a remote server computer and opens an application data file for reading and writing, the status is set to the domain name of the remote server computer and only application data files from that location are accessible for reading and writing. In some implementations, the system displays the current network status of an application (e.g., for the benefit of the user). In some implementations, if the application closes the network connection, then the status changes automatically to offline, which automatically forces the closing of any application data files that were open for reading and writing during that particular network status. In some implementations, at that moment, it is both the prerogative and the responsibility of the application to open offline versions of application data files for reading and writing.

Because a user may terminate any network connection at any time, programmers generally write code that can handle an abrupt transition from a connected status to the offline status. In some implementations, if the user wishes to return to a network status, the user is able to either terminate the application and restart it, or start another instance of the application. In some implementations, this approach to areas of file storage and network status is duplicated for each user of the computer. In this way, in a multi-user environment, each user has a separate storage area for each application that the user has launched.

FIGS. 1-5 illustrate an example operating system and example functions for preventing unauthorized file access in accordance with some implementations. FIG. 1 illustrates an application 112 calling an open_user_file( ) function 108 and a create_user_file( ) function 110 from a library 106 for writing to user files in a service application programming interface (API) 104. The service API 104 is communicatively coupled to kernel functions 102 of the operating system 100. Thus, the application 112 is configured to write to user files. In accordance with some implementations, if a developer elects to write to user files, the following system functions are provided to the developer for handling files:

open_user_file( ). In some implementations, there are no parameters for this function. In some implementations, the function triggers the system to display a file chooser dialog box. In some implementations, the dialog box displays only the user files located in the user file storage area for the application. In this way, only the user is able to select which file is to be opened. In some implementations, the user is able to choose whether to open the file for reading only or for both reading and writing. In some implementations, if the function executes successful, the function returns a file descriptor (e.g., not the name of the user file) to the application.

create_user_file( ). In some implementations, this function triggers a modified interface to open_user_file( ) function where read and write permissions are inherent.

In some implementations, any application (e.g., the application 112) that writes to user files, is permitted to call both open_user_file( ) 108 and create_user_file( ) 110 in the library 106 for writing to user files. In accordance with some implementations, both open_user_file( ) 108 and create_user_file( ) 110 call kernel functions 102 that perform the task of opening the file and return the descriptor to the calling library function.

Figure 2:
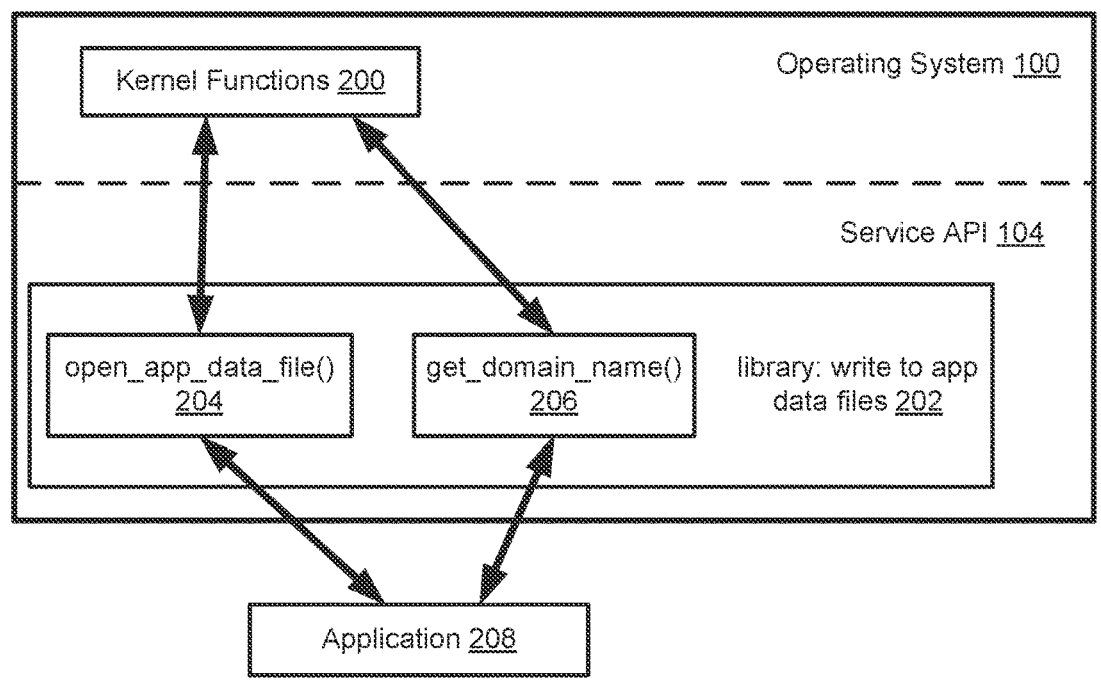

FIG. 2 illustrates an application 208 calling an open_app_data_file( ) function 204 and a get_domain_name( ) function 206 from a library 202 for writing to application data files in the service API 104. The service API 104 is communicatively coupled to kernel functions 200 of the operating system 100. Thus, the application 208 is configured to write to application data files. In accordance with some implementations, if the developer elects to write to application data files, the following system functions are provided to the developer for handling files:

open_app_data_file( ). In some implementations, the application passes in the name of the file, which optionally includes a subdirectory structure within the area of storage for the application. In some implementations, the division of storage that is accessed is based on the network status when the call to this function is made. In some implementations, read and write permissions are granted. In some implementations, the function returns a file descriptor.

get_domain_name( ). In some implementations, this function returns the domain name for the current network connection or an indication of offline status if the application is not connected to a domain.

In some implementations, any application that writes to application data files (e.g., the application 208), is permitted to call both open_app_data_file( ) 204 and get_domain_name( ) 206 in the library 202 for writing to application data files. In some implementations, both open_app_data_file( ) 204 and get_domain_name( ) 206 call kernel functions 200 that perform the tasks involved and return appropriate data.

Figure 3:
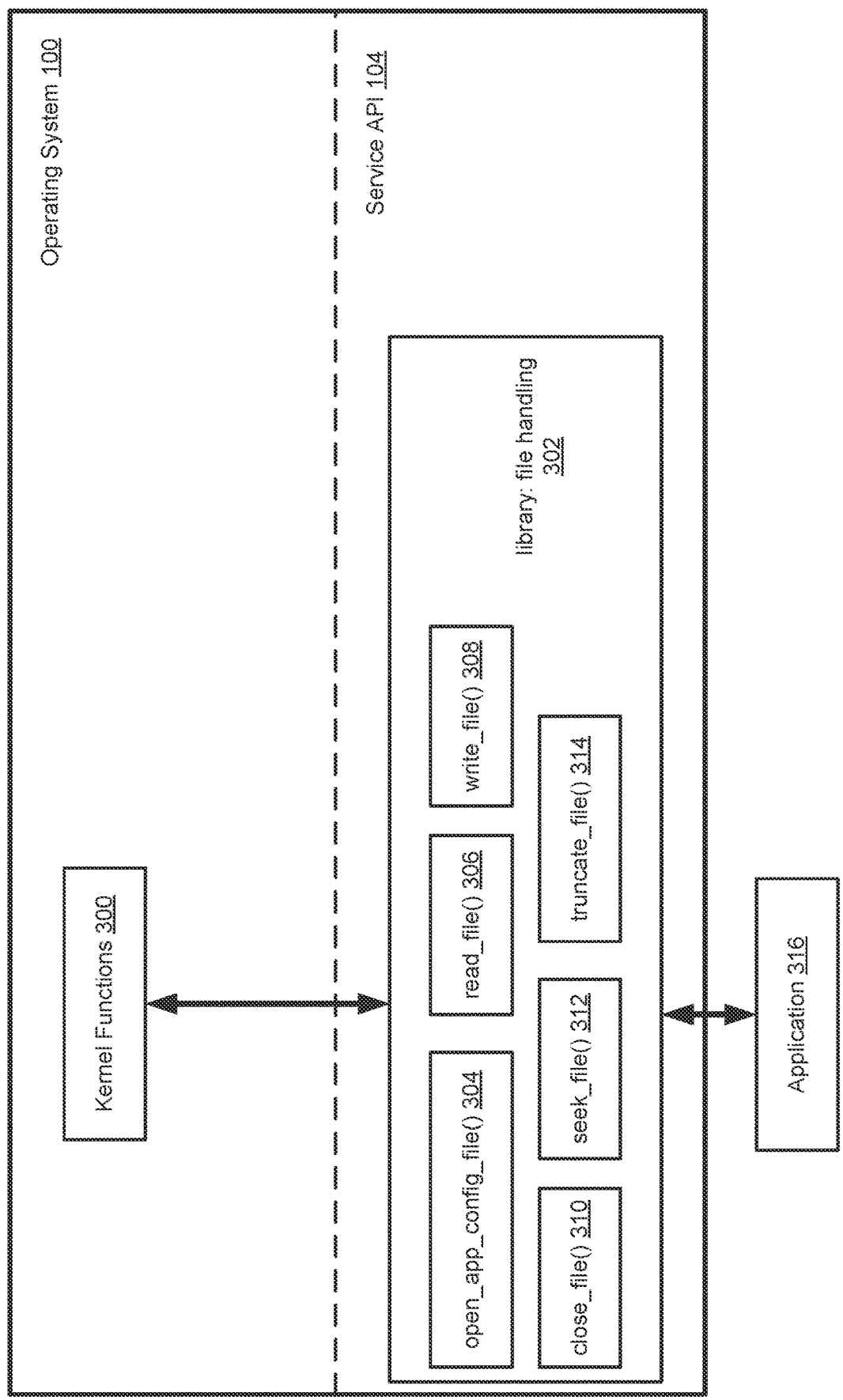

FIG. 3 illustrates an application 316 calling functions from a library 302 for file handling in the service API 104. The service API 104 is communicatively coupled to kernel functions 300 of the operating system 100. The application 316 is optionally configured to write to application data files or user data files.

In some implementations, the library 302 includes the following functions:

open_app_config_file( ) 304. In some implementations, the application passes in the name of the file, which optionally includes subdirectory structure within the area of storage for the application. In some implementations, the file resides in the read-only location and read permission is granted (e.g., write permission is withheld). In some implementations, the function returns a file descriptor read_file( ). In some implementations, this function provides reading functionality.

write_file( ). In some implementations, this function provides writing functionality. In some implementations, the file handle is required to have write permission.

close_file( ). In some implementations, this function closes the file handle.

seek_file( ). In some implementations, this function seeks to a position within the file.

truncate_file( ). In some implementations, this function sets the length of the file to zero bytes. In some implementations, the file handle is required to have write permission.

In some implementations, any application (e.g., the application 316) is permitted to call all of the functions in the file handling library 302, which includes open_app_config_file( ) 304, read_file( ) 306, write_file( ) 308, close_file( ) 310, seek_file( ) 312, and truncate_file( ) 314. In some implementations, these functions call the appropriate kernel function in the set of kernel functions 300 that implement the desired functionality. For simplicity, direct arrows between the application 316 and the individual functions in library 302 have been replaced with a single arrow between application 316 and library 302, indicating that the application 316 is calling a function in the library. Similarly, individual arrows between the library 302 and the kernel functions 300 have been replaced with a single arrow.

In some situations, a user may wish to retrieve data maintained internally by an application so that the user can transmit it to others or process it using a different application. In some implementations, this is achieved by including a system function that exports data from application data files to a new user file. In some implementations, the application is permitted to suggest a name for new user file, and the user is able to accept the suggestion or provide a different name (e.g., in order to represent the content of an exported file). In some implementations, the file is saved in a user file area of the storage area for the application. In some implementations, an additional area is allocated specifically to store exported files (e.g., because the user likely intends to access the exported file with another application). In some implementations, this area (e.g., a transfer area) is not associated with any application. In some implementations, the transfer area is accessible using a file manager utility. In some implementations, the transfer area is divided into two areas, one dedicated to the current user and another that is accessible by other users of the computer.

In some situations, it is expedient for the user to be able to supply data to an application by use of a file, rather than direct interaction. This complementary functionality is known as importing data. In some implementations, data importing is achieved by supplying a system function that permits an application to request that the user select one or more files for import. Such files may include files stored in the user file area and files stored in the transfer area. Thus, in some implementations, one application exports data to the transfer area in a single step and another application imports that data in a single step. In some implementations, a file manager utility allows users to copy files from the transfer area to the user area of applications, e.g., so that the files can be processed directly as user files rather than being imported. In some implementations, the file manager utility allows users to copy files from the user area of applications to the transfer area. This orderly transition of data empowers users to conduct desired processing without potentially sacrificing the integrity of data files. In this way, if a user desires to share data across network servers, the user can export data associated with a particular domain name, or on offline network status, and then import the new data file during a network status associated with a different domain.

Figure 4:
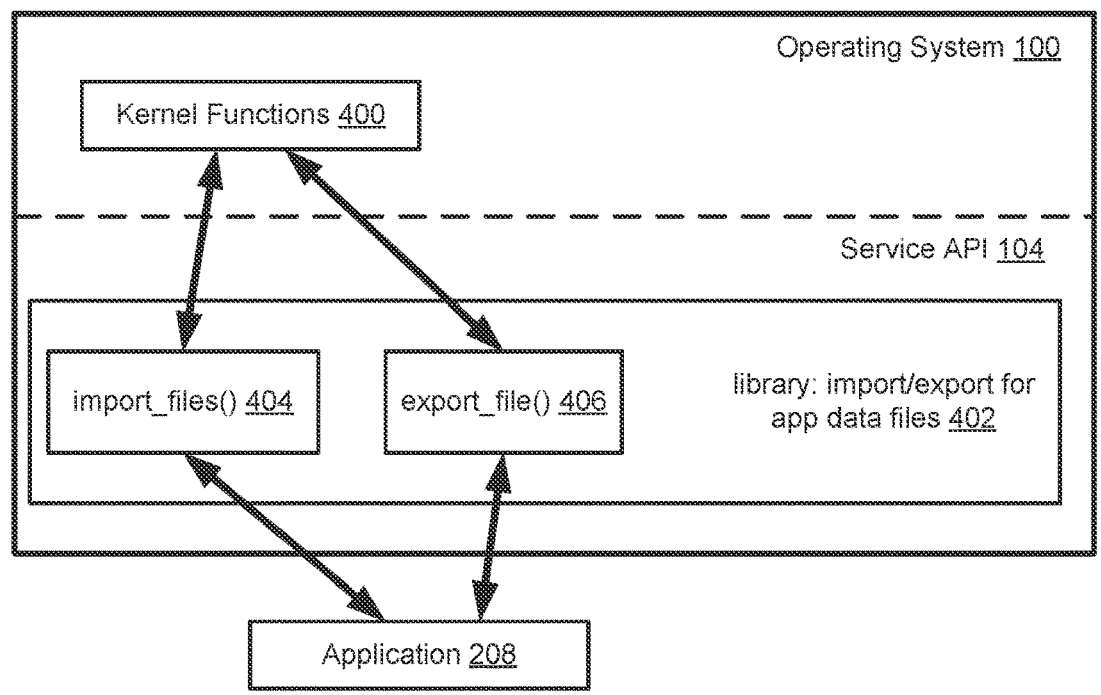

FIG. 4 illustrates the application 208 calling an import_files( ) function 404 and an export_file( ) function 406 from a library 402 for importing and exporting application data files in the service API 104. The service API 104 is communicatively coupled to kernel functions 400 of the operating system 100. In accordance with some implementations, the following system functions are provided for importing from and exporting to the user area of storage.

import_files( ). In some implementations, this function triggers a file open dialog that allows the user to specify which files are to be imported, optionally including the entirety of a directory within the user file area. In some implementations, read permission is granted (e.g., not write permission).

export_file( ). In some implementations, this function has one parameter for a proposed name for the file that is being exported. In some implementations, if an optional file name is passed, it is displayed as the default but it may be overwritten by the user. In some implementations, write permission is granted. In some implementations, multiple files are exportable simultaneously by creating a single archive containing the files and exporting the archive.

In some implementations, any application that writes to application data files (e.g., the application 208) can call all of the functions in the import/export library 402, which includes import_files( ) 404 and export_file( ) 406. In some implementations, these functions call the appropriate kernel function in the set of kernel functions 400 that implement the desired functionality.

Figure 5:
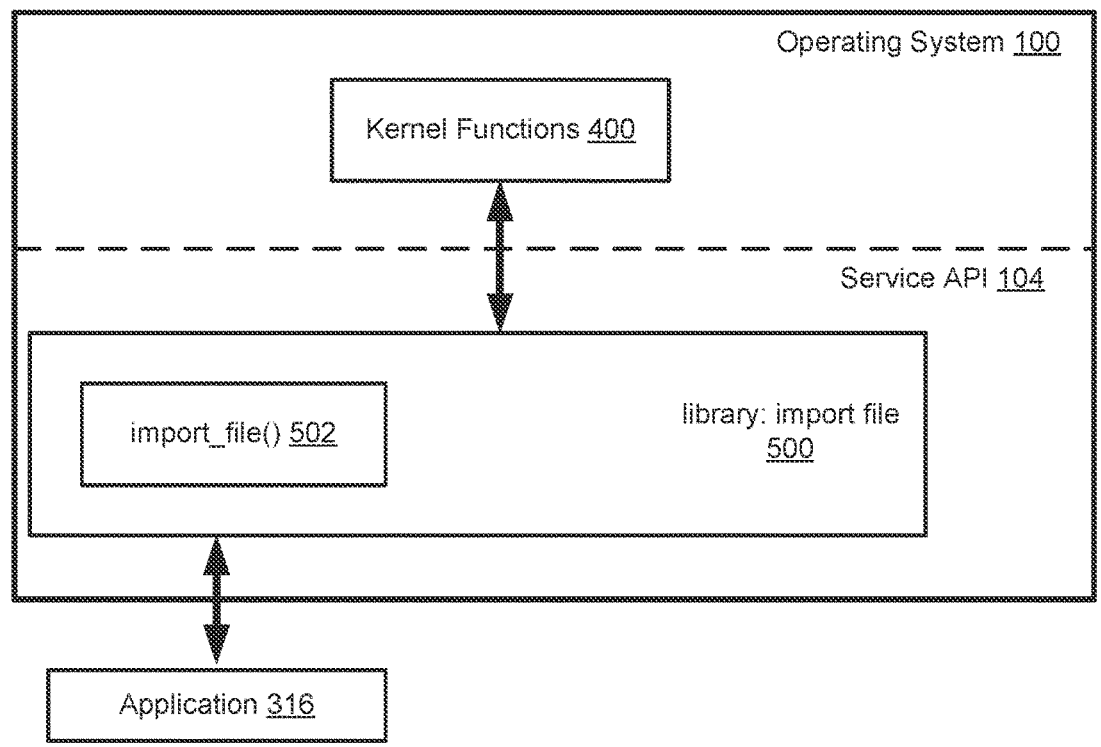

FIG. 5 illustrates the application 316 calling an import_file( ) function 502 from a library 500 for importing files in the service API 104. The service API 104 is communicatively coupled to kernel functions 400 of the operating system 100. In accordance with some implementations, the following system function is provided.

import_file( ). In some implementations, this function triggers a file open dialog that allows the user to specify which file may be imported. In some implementations, read permission is granted. In some implementations, this function provides an application the ability to embed content from the imported file into the currently-edited user document.

In some implementations, any application (e.g., the application 316) can call the function in the import file library 500, which includes import_file( ) 502. In some implementations, this function calls the appropriate kernel function in the set of kernel functions 400 that implement the desired functionality.

In some implementations, in order to reduce confusion to users, the area for user files for an application that writes to application data files are labeled "Imports and Exports," while the area for user files for an application that writes to user files is labeled "User files."

Figure 6:
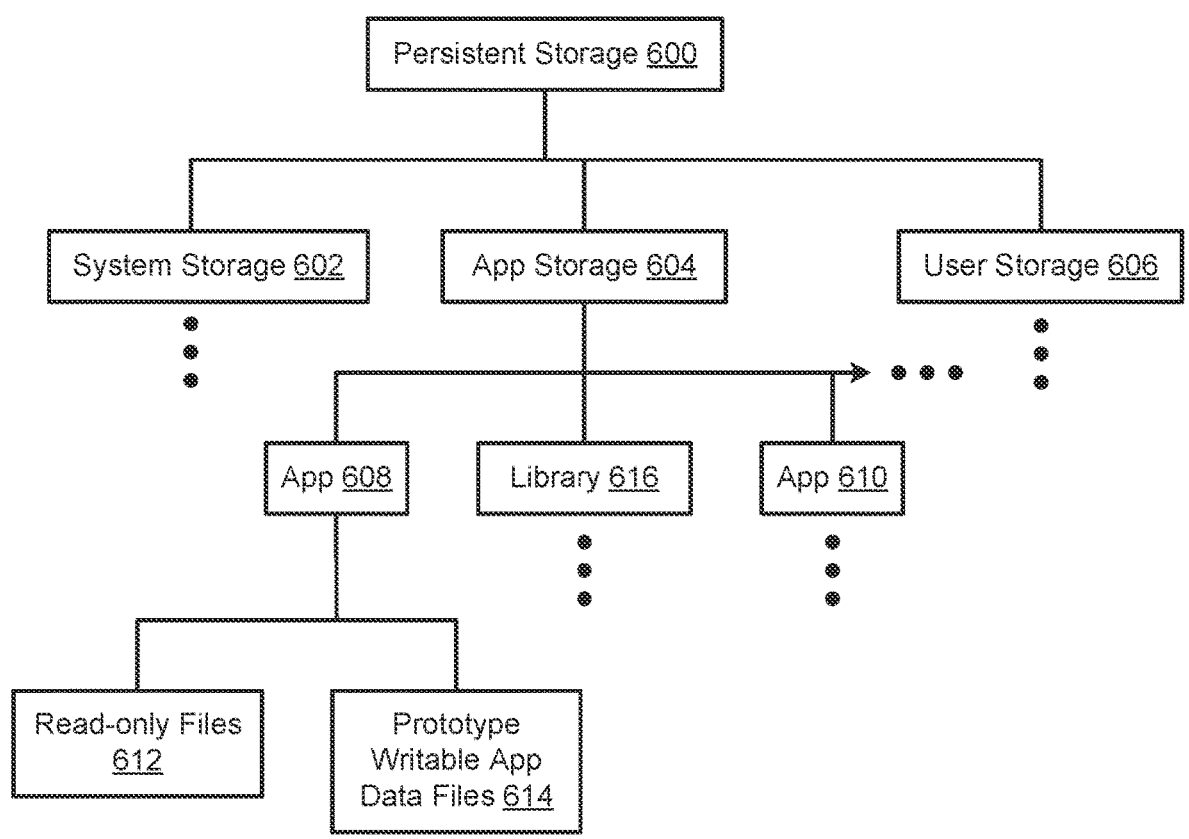
FIGS. 6-8 illustrate an example storage structure in accordance with some implementations.

Given these principles and functions, the layout of storage for files is depicted in several figures in accordance with some implementations. An overarching organization of files is depicted in FIG. 6 in accordance with some implementations. All Persistent storage, designated as 600 in FIG. 6, is divided into three areas: a system storage 602, an app storage 604, and a user storage 606. In some implementations, the app storage 604 is used to store application data files for each application. In some implementations, each application is provided a separate storage area within the app storage 604. For example, one application, designated 608 in FIG. 6, is included within the app storage 604. Another application, designated 610, is also shown for purposes of demonstration, as well as a trailing ellipsis, indicating that other applications have storage space within the app storage 604. In accordance with some implementations, the storage for each application within the app storage 604 is divided into two areas.

As shown in FIG. 6, the storage area for the application 608 is divided into read-only files area 612 and prototype writable application data files area 614. In accordance with some implementations, all such files for each application are stored in these locations, respectively. Likewise, read-only files and writable application data files for shared libraries are stored in similar fashion. For example, library 616 in FIG. 6 represents the application storage location for shared library 616 and the ellipsis indicate potential expansion into the same type of areas as 612 and 614.

Figure 7:
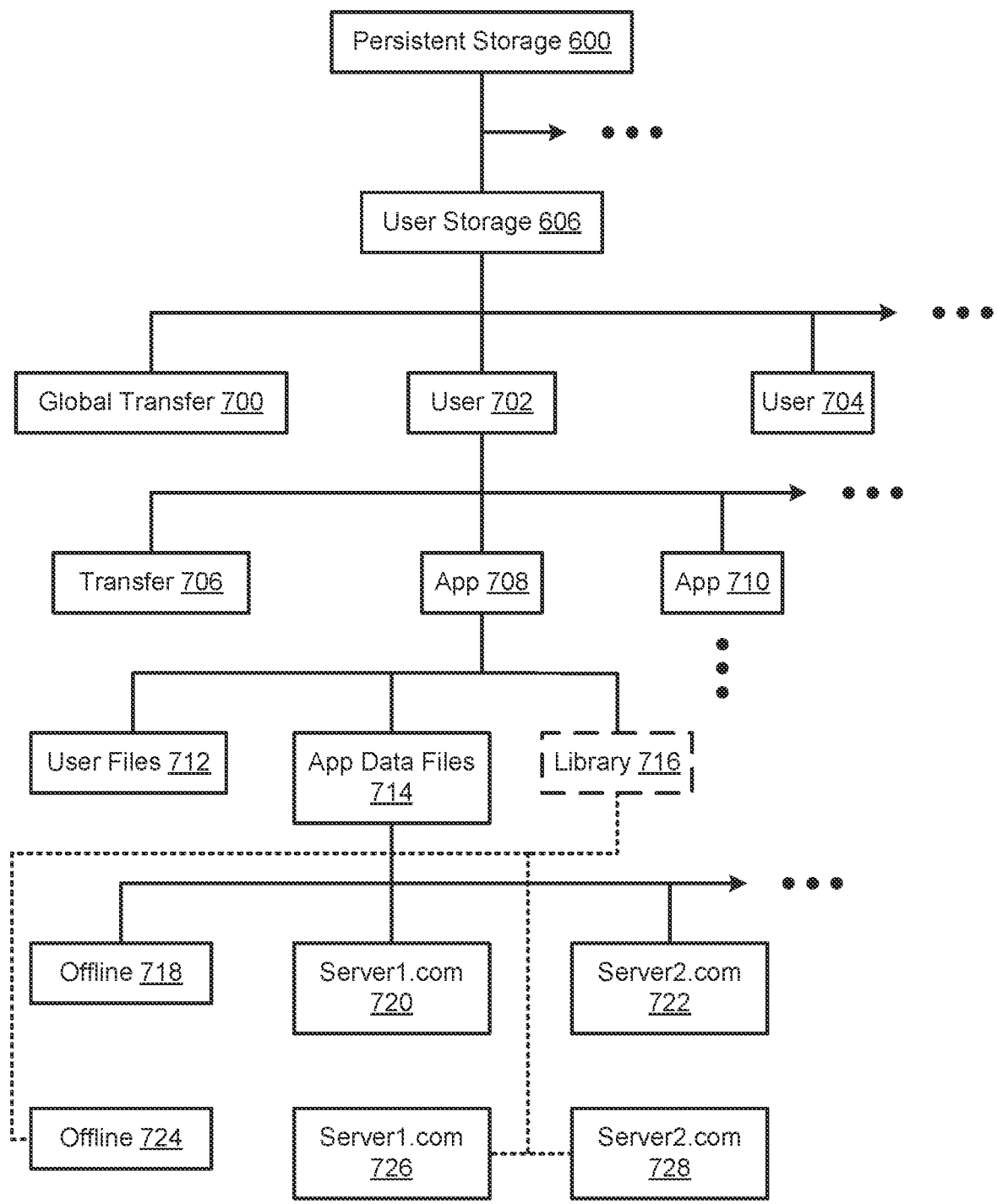

In accordance with some implementations, within the user storage 606, there is a single storage area for all users, known as Global transfer, depicted as 700 in FIG. 7. Additionally, in some implementations, each user is afforded a separate storage area within the user storage 606. For example, FIG. 7 shows the storage area for User 702 and for User 704. The trailing ellipsis indicates the potential for additional user storage areas. Within each user area is a transfer area accessible only by the user, designated 706. In accordance with some implementations, each application used by the user is afforded storage for writable application data files. For example, the applications 708 and 710 are provided respective storage areas. The trailing horizontal ellipsis indicates that all other applications used by the User 702 are also provided storage areas.

As further shown in FIG. 7, the application storage area is divided between application data files, designated as User files 712 and App data files 714 in accordance with some implementations. The application data files area 714 is divided by network status. One area is for offline application data files, designated offline 718. For each server that the application connects to, a storage area is allocated and given the domain name of the server. For example, the application has connected to a server using the domain name, Server1.com; consequently, storage area Server1.com 720 is established to contain a copy of all writable application data files. Additionally, a storage area has been similarly established for Server2.com 722. The trailing horizontal ellipsis indicates the potential for more storage areas associated with server domains. Finally, data written to application data files by a shared library are provided a separate storage area within App data files 714. For example, App 708 used a shared library and, accordingly, the system allocates storage for the writable application data files used by the shared library, in this instance designated 716 in FIG. 7. The application data files for the shared library are stored in locations that mirror the network status of App 708 in accordance with some implementations (these relationships are represented using dashed lines in FIG. 7).

Figure 8:
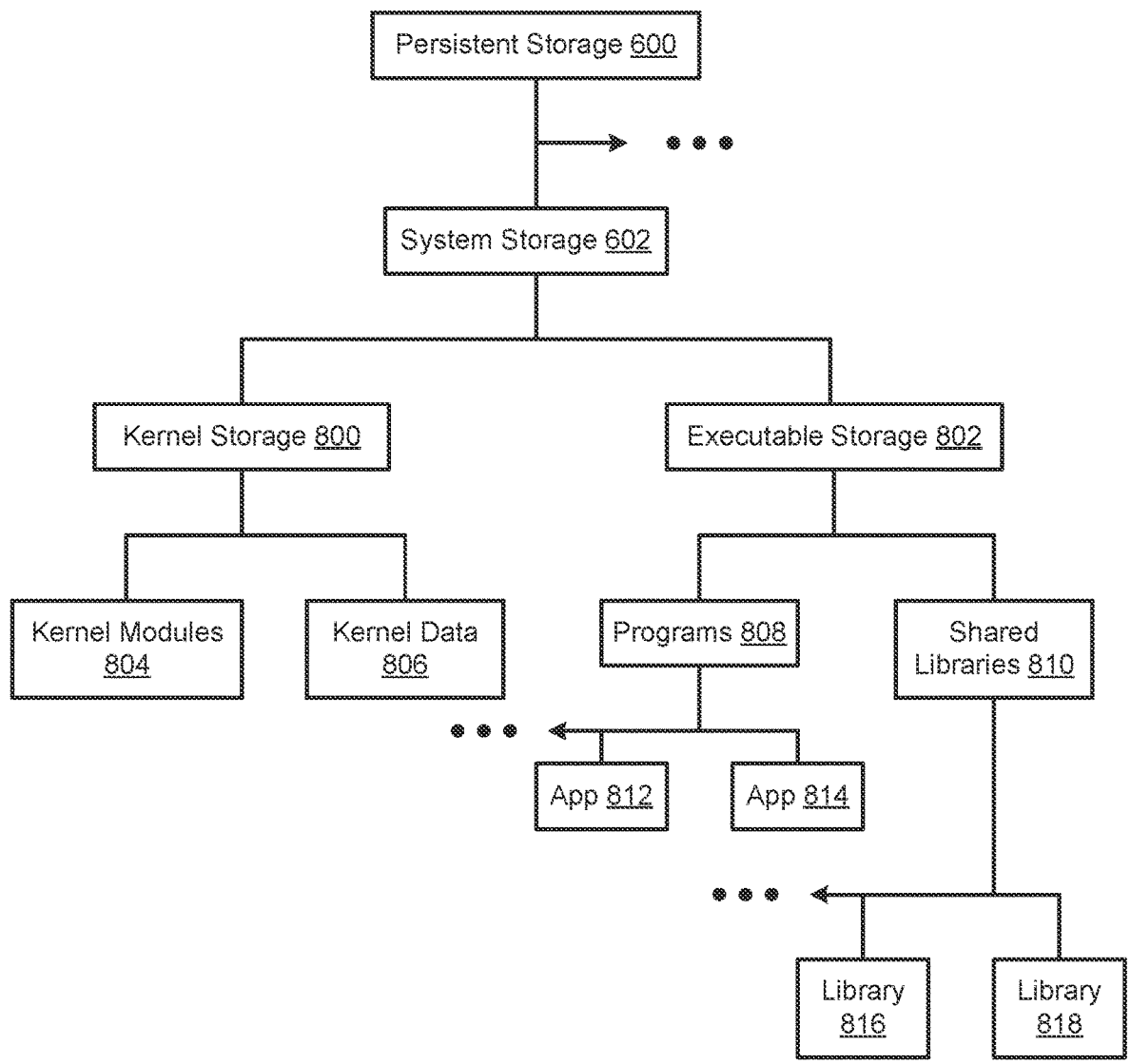

In accordance with some implementations, the system storage 602 is divided into two areas, designated Kernel storage 800 and Executable storage 802 in FIG. 8. The kernel storage 800 is further divided into an area for kernel executable code, known as Kernel modules 804, and the associated data, Kernel data 806, in accordance with some implementations. Executable storage 802 is further divided into an area for programs and their executable modules, designated Programs 808, and an area for shared libraries, designated Shared libraries 810, in accordance with some implementations. Each application is provided separate storage within Programs 808, such as, for example, App 812 and App 814, where all executable files associated with the application are stored. Each shared library is also provided separate storage within Shared libraries 810, such as, for example, library 816 and library 818, where the library file and its associated configuration files and configuration applications are stored.

The primary protection of kernel code is achieved by this scheme for absolute separation of storage space. In some implementations, application programs, regardless of their type, cannot access kernel code files because they lack the capability to read and write to that storage area. Thus, the administrative burden for maintaining appropriate privilege levels and verifying the identity of administrative users, imposed on existing operating systems by their file storage designs, is eliminated. Consequently, vulnerabilities that arise from mistakes in fulfilling these duties also disappears.

Accordingly, updates to the operating system relies on kernel code. In some implementations, the operating system offers two modes of operation, one for general application use and the other for operating system update. At boot time, the general application use mode is selected by default but the user is offered the opportunity to select the operating system update mode instead. The operating system update mode is a single task mode that executes a kernel utility that merely updates the operating system. Although the combination of single task mode and separate kernel storage area provide far better security than the use of privilege levels and user credentialing, restricting the selection of the operating system update to an administrative user account simply add another layer of security.

Preventing Unauthorized Network Activity

In order to assure control over data shared with remote servers, new network connectivity functions are added (e.g., to replace certain current system functions) in some implementations. The following system functions supplant the current socket library functions that initiate network activity:

open_TCP_connection( ). In some implementations this function replaces the connect( ) function and returns a TCP socket.

open_UDP_connection( ). In some implementations, this function replaces the connect( ) function, the sendto( ) function, and the recvfrom( ) function and returns a UDP socket.

In some implementations, both functions include two parameters: a port number and an optional, proposed domain name. In some implementations, each function triggers the display of a dialog box that presents the user with the option to initiate a network connection. If an optional domain name is passed, it is displayed as the default but it may be overwritten by the user. In some implementations, the port number is displayed and may be overwritten by the user (although this behavior would not necessarily be expected). In some implementations, other transport protocols are added to the system in a similar fashion.

In some implementations, the dialog box displays a checkbox that, if checked, permits the application to always connect to the named server in the designated fashion. If the user also selects the checkbox, data regarding this association between the application and the domain name are stored in an area accessible only by the operating system, thereby eliminating the need for future dialog boxes with the exact same message. In some implementations, this approach is implemented by the addition of several functions and data storage areas.

Figure 9:
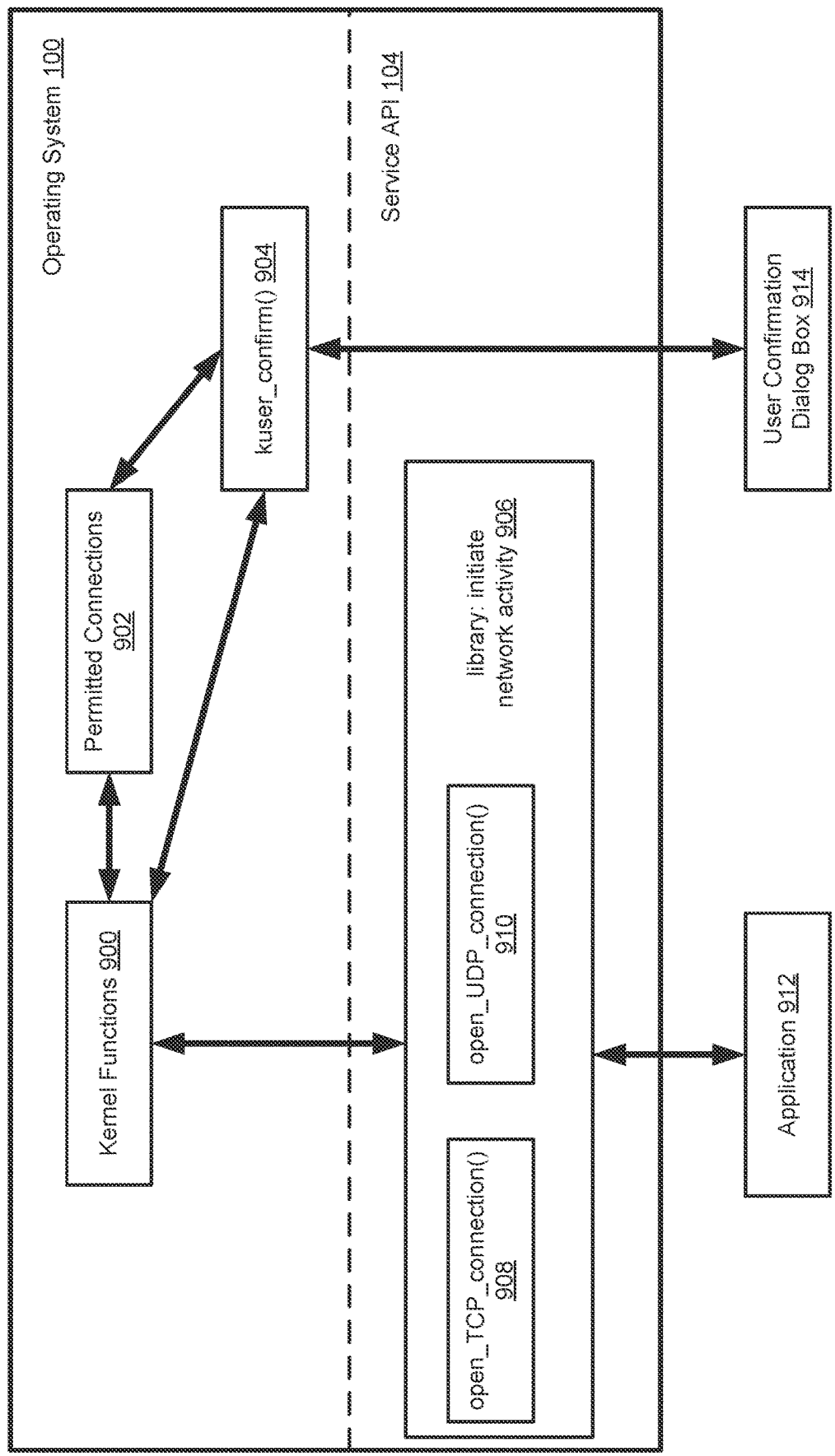
FIGS. 9-16 illustrate an example operating system and example functions for preventing unauthorized network access in accordance with some implementations.

FIG. 9 illustrates an application 912 calling functions from a library 906 for initiating network activity in the service API 104. The service API 104 is communicatively coupled to kernel functions 900 of the operating system 100. In some implementations, the library of kernel functions 900 in FIG. 9 is added to implement the system functions described above. An area of storage, designated Permitted connections 902 in FIG. 9 and accessible only by the kernel, is set up for a table of associations between applications and domain names. In some implementations, each entry in the list consists of an application name and a domain name. In some implementations, the entry represents permission by the user for the named application to connect to the named domain. An additional kernel function, kuser_confirm( ) 904, is added in accordance with some implementations. In some implementations, this function displays the dialog box described above.

Any application that may initiate network activity (e.g., the application 912) may call either the open_TCP_connection( ) function 908 or open_UDP_connection( ) function 910 in the library 906 for initiating network activity. In some implementations, these system functions call appropriate kernel code in the group of kernel functions 900 that perform the desired task.

For example, the appropriate TCP or UDP kernel function called first queries table Permitted connections 902 to determine whether the application already has user permission to connect to the named domain. If so, the kernel function 900 proceeds normally and returns a socket to the calling system function in library 906. Otherwise, the kernel function 900 calls the kuser_confirm( ) function 904, which displays a user confirmation dialog box 914, which asks the user whether the named application is permitted to connect to the named server (e.g., domain). If the user clicks "Yes" or "OK" in the dialog box 914, the kuser_confirm( ) function 904 returns a code indicating user approval to the kernel function 900, which then proceeds normally. Otherwise, the kuser_confirm( ) function 904 returns an error code to the kernel function 900, which immediately returns the error code to the application 912. In some implementations, the dialog box 914 displays a checkbox that, if checked by the user, permits the application to always connect to the named server. If the user also selects the checkbox, the kuser_confirm( ) function 904 creates and adds an entry to the Permitted connections 902 table, thereby eliminating the need for future dialog boxes with the exact same message.

Notably, this approach works with applications that require, at most, a single network connection to function properly. For example, a word processor typically performs all of its work on the local computer, but may try to connect to a server maintained by the developer for additional resources, such as graphics. Additionally, applications are updated more frequently today and need to connect to the developer's server in order to obtain the latest update. The one-time permission suffices to allow these types of activity without further inconveniencing the user or compromising security.

Figure 10:
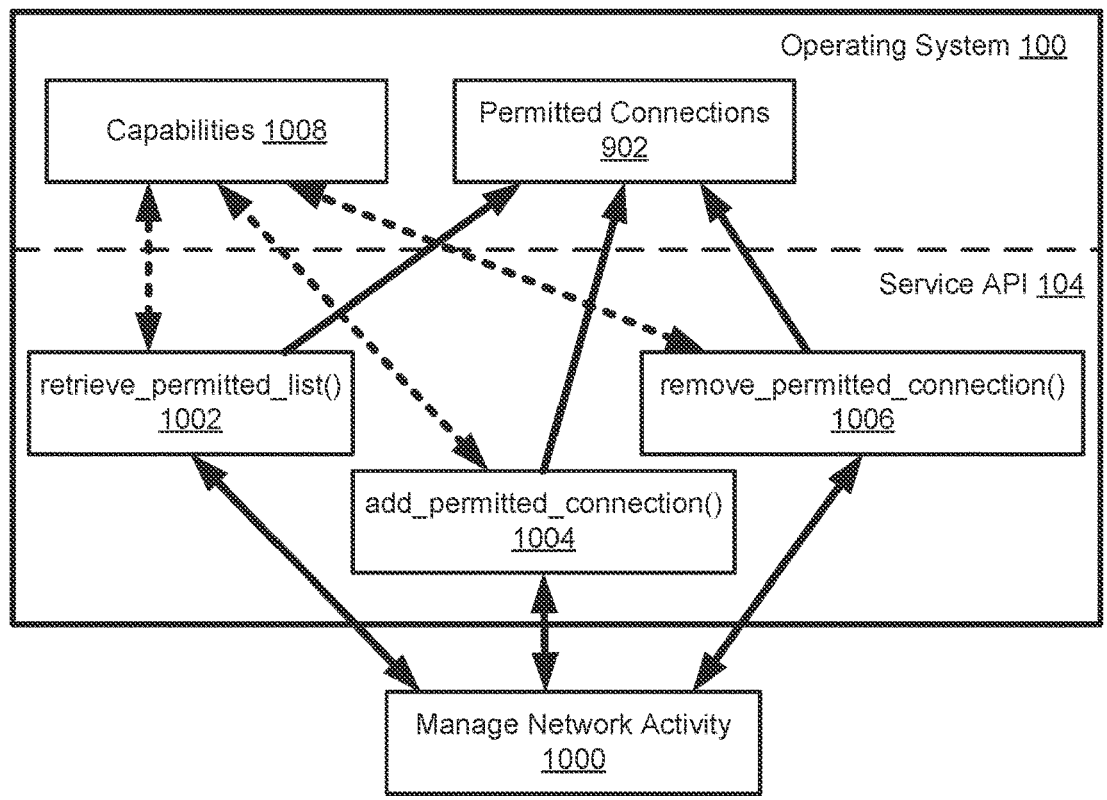

FIG. 10 shows a Manage Network Activity utility 1000, which permits users to directly manage entries in the Permitted connections table 902 in accordance with some implementations. FIG. 10 further shows new system functions retrieve_permitted_list( ) 1002, add_permitted_connection( ) 1004, and remove_permitted_connection( ) 1006 added to the operating system. The utility 1000 calls the retrieve_permitted_list( ) 1002, remove_permitted_connection( ) 1006, and add_permitted_connection( ) 1004, functions to, respectively, allow users to view entries in Permitted connections table 902, remove existing entries that were added because of the checkbox on the dialog box, and add entries to avoid the dialog box.

In some implementations, other programs and modules are not permitted to call the retrieve_permitted_list( ) 1002, add_permitted_connection( ) 1004, and remove_permitted_connection( ) 1006 functions. There are a variety of means to prevent other programs and modules from calling these system functions. In some implementations, a capability is afforded to Manage Network Activity utility 1000 that permits it to call these functions. The capability is stored where the operating system regularly maintains capabilities, designated in FIG. 10 as capabilities table 1008 (also sometimes referred to as a capabilities list). In some implementations, each of these functions confirms the capability before performing their operations (represented in FIG. 10 as dashed arrows). In some implementations, this capability, controlled by the kernel, is not afforded to other programs (thus malware lacks the capability to alter the list of Permitted connections 902).

Some types of applications operate by connecting to various servers at the request of the user. An example of this type of application is a web browser. Asking users just to confirm their clicks or typed domain names is too tiresome for many users. Many users become habituated to instantly clicking the OK button on the predictable approval dialog box. Worse, web pages routinely display advertising material from other servers, with which users have no familiarity or inherent trust. Asking users to permit network activity to these advertising servers is chaotic at best.

In order to avoid the need for user confirmation, GUI elements are added to the GUI toolkit supplied with the operating system in some implementations. For example, the browser address bar can be outsourced to a GUI element that is controlled directly by the system, relieving the user of having to approve of a domain name typed. Specifically, the GUI toolkit includes a URL edit box that returns a socket to the application after the user enters a URL and then presses the Enter key or clicks on an appropriate visual element included with the edit box. In some implementations, the system ensures that no GUI element can be placed over the edit box, thereby obscuring its content (this is a trick practiced by attackers today). In addition to creating the socket, the GUI element also records the user's volition in the Permitted connections table in some implementations.

In some implementations, a graphic element that displays and handles a hypertext link in similar fashion is supplied with the GUI toolkit. In some implementations, the graphic element is not permitted to be obscured. In some implementations, the browser calls a GUI toolkit function to create the element using a particular URL. By handing off the URL to the system's GUI control, which reveals it to the user, and having the user click on the system element, the system is provided with evidence of the user's intent to proceed with network activity involving the designated server. In some implementations, the system sets up a socket for such activity and returns it to the application and records the volition in the permitted connections 902.

Figure 11:
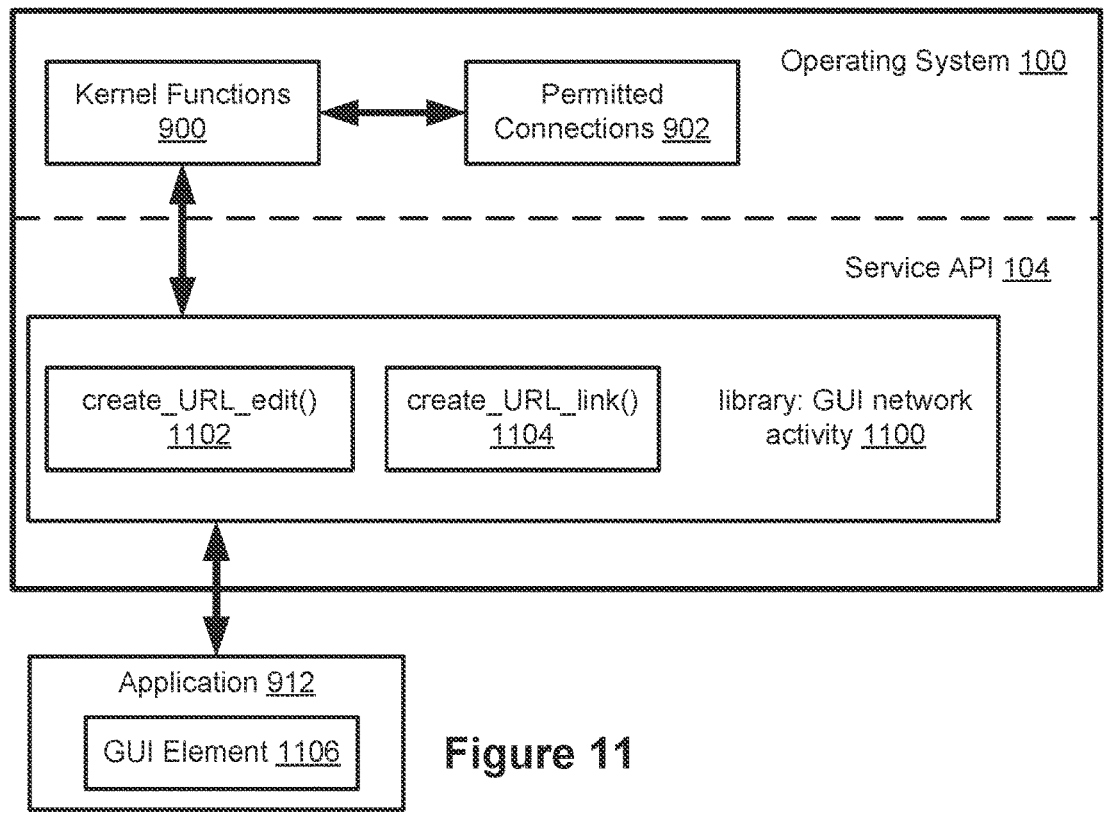

FIG. 11 illustrates the application 912 calling functions from a library 1100 for GUI network activity in the service API 104. The service API 104 is communicatively coupled to kernel functions 900 of the operating system 100. In some implementations, the GUI network activity library 1100 in FIG. 11 is added to the GUI framework libraries supplied with the operating system. In some implementations, the library 1100 permits any application (e.g., the application 912) that may initiate network activity to create a URL edit box by calling create_URL_edit( ) 1102. In some implementations, the library also provides for the creation of a displayable URL link by calling create_URL_link( ) 1104. In some implementations, when created, a GUI element 1106 is included with the application 912. In some implementations, when the GUI element is activated by the user, it calls an appropriate function in kernel function 900 to establish the network connection. In some implementations, the kernel function 900 queries the permitted connections 902 to determine whether the application already has user permission to connect to the named domain. If not, the kernel function 900 creates and adds an entry to the permitted connections 902 before returning the socket to the GUI element.

Figure 12:
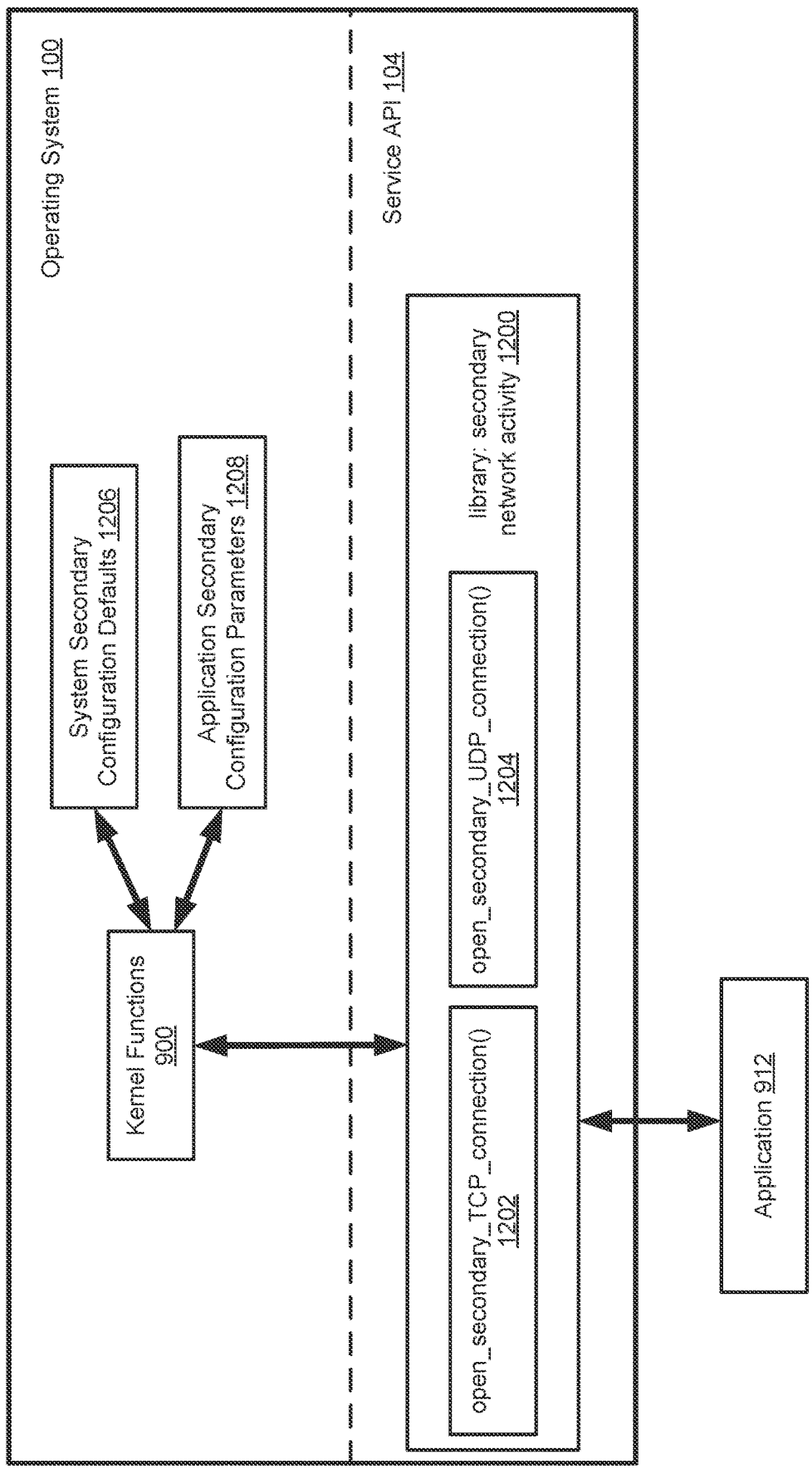

FIG. 12 illustrates the application 912 calling functions from a library 1200 for secondary network activity in the service API 104. The service API 104 is communicatively coupled to kernel functions 900 of the operating system 100. In some implementations, the following library functions for creating and using secondary connections are added to the operating system:

open_secondary_TCP_connection( ). In some implementations, this function requires that an application is already connected to a primary server and returns a TCP socket.

open_secondary_UDP_connection( ). In some implementations, this function requires that an application is already connected to a primary server and returns a UDP socket.

In some implementations, the library 1200 for secondary network activity is created with the functions open_secondary_TCP_connection( ) 1202 and open_secondary_UDP_connection( ) 1204. In some implementations, any application that initiates network activity (e.g., the application 912) is permitted to call either function in the library 1200. In some implementations, these library functions call appropriate kernel functions 900 that establish the connection, when a primary connection already exists for application 912, and return the socket.

These functions allow applications to create additional connections once a primary connection, e.g., to a desired web server, has been established, thereby obviating user confirmation. However, the system may include various constraints that restrict their activity. In some implementations, the total number of secondary connections associated with a particular primary connection is limited. This limit is checked by kernel functions 900 before establishing the connection. Specifically, the constraints are established as a set of system defaults, designated system secondary configuration defaults 1206 in FIG. 12. As explained below, a user may also specify a revised set of such constraints for each application. This revised set is also maintained by the kernel. For example, the set of revised constraints for application 912 is designated application secondary configuration parameters 1208 in FIG. 12. The kernel function 900 first queries application parameters 1208 for relevant constraints. For example, the total number of secondary connections associated with the application's primary connection. In some implementations, if no revised parameters 1208 exists for a particular application 912, then the kernel function queries the secondary defaults 1206 for the relevant value.

In some implementations, other restrictions are imposed by revising the sending and receiving functions. In some implementations, the total amount of data transmitted to secondary servers is limited, thereby permitting the application to supply necessary transactional data, including identifying information, to the secondary server without risking the exfiltration of a significant amount of user data. In some implementations, the application is constrained to a single transaction with a secondary server, meaning that the application can send data to the secondary server only once and then only receive data. Another means to minimize exfiltration is to require that all transmissions of data to secondary servers be completed before the application is allowed to receive any further user input. This restriction limits the data supplied to secondary servers to that supplied by the web page sent from the primary connection. In some implementations, this restriction is enforced using state information. For example, the moment an application elects to receive user input following the establishment of a primary connection is the moment that it forgoes any further opportunity to exchange data with secondary data sources. Thus, this restriction is imposed by closing an established secondary connection socket, if it already exists, and by setting a flag that prevents kernel functions 900 from establishing a secondary connection.

Figure 13:
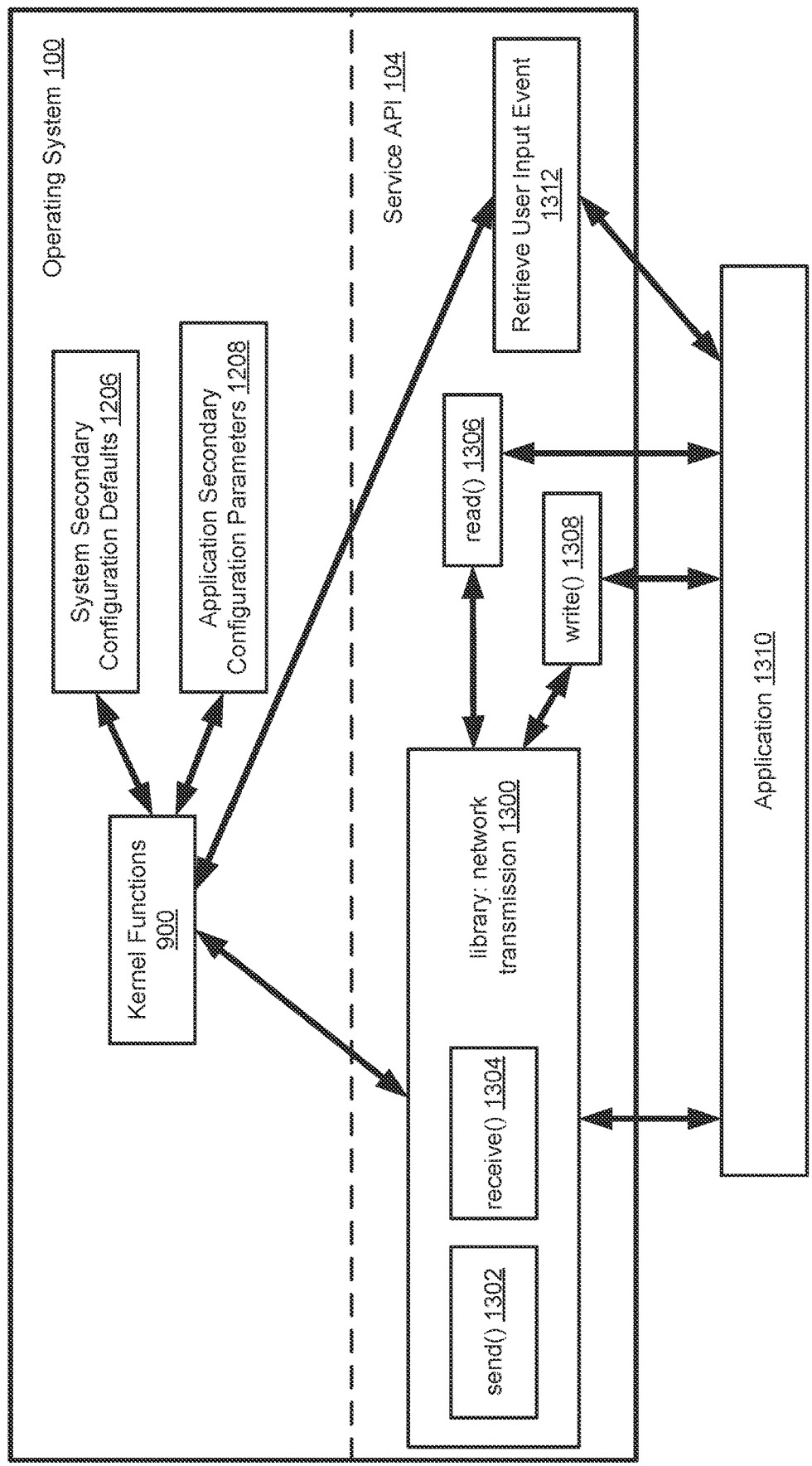

In some implementations, these restrictions are imposed by revising functions in several libraries. FIG. 13 illustrates an application 1310 calling functions from a library 1300 for network transmissions in the service API 104. The service API 104 is communicatively coupled to kernel functions 900 of the operating system 100. In some implementations, the network transmission library 1300 in FIG. 13 supplants existing system libraries for sending and receiving. The library 1300 includes revised versions of send( ) 1302 and recv( ) 1304, which may be called by any application that may initiate network activity or may accept a connection (e.g., the application 1310). Again, the kernel functions 900 provide the actual implementation of the desired functionality in the library 1300. In some implementations, calls to the read( ) function 1306 that use a socket as an argument are routed to the recv( ) function 1304. In some implementations, to write( ) 1308 are routed to send( ) 1302.

In some implementations, the send functionality implemented in the kernel functions 900 check whether the socket involved represents a primary or secondary connection. If the connection is primary, the send function proceeds normally. In some implementations, if the connection is not primary, the kernel functions checks for relevant constraints in either the application secondary parameters 1208 or the system secondary defaults 1206, as described above. In some implementations, the send kernel function limits the amount of bytes sent by comparing the total number sent, which is stored in data internally associated with the socket, and the total data transmitted parameter. In some implementations, the send function may refuse to transmit any bytes (e.g., based on other conditions explained below).

In some implementations, the recv functionality implemented in kernel functions 900 similarly tests whether the connection is secondary. If so, the kernel function gathers the transaction limitation parameter from either parameters 1208 or defaults 1206. In some implementations, if secondary sockets are limited to a single transaction by the parameter, then the kernel function sets a flag in the internal data associated with the socket that any further transmission is prohibited. In some implementations, when the application 1310 calls any system function that retrieves data about user input (e.g., a key press or mouse click) designated 1312 in FIG. 13, the system function called then calls a kernel function in kernel functions 900 indicating that user input is about to be retrieved. In some implementations, the kernel function queries either parameters 1208 or defaults 1206 for the parameter involving user input. In some implementations, if the parameter indicates that secondary activity must stop once the application begins to retrieve user input, then the kernel function iterates through the list of sockets for the application and closes each secondary socket. In some implementations, the kernel function then sets a flag with the primary connection socket, indicating that no more secondary connections may be established.

An approach for constrained, secondary activity may be referred to as Governed Network Activity mode. In some implementations, by default, any network activity by an application requires confirmation, as described above. In some implementations, the user may elect to subject the application to Governed Network Activity mode. Although this mode requires sufficient evidence of user volition for primary network activity, such as by use of the GUI elements discussed above, it permits constrained, secondary activity without explicit user approval. Hence, this mode limits the potential impact of malicious code without burdening the user. In some implementations, in order for a user to manage use of this mode, a graphical utility is supplied with the operating system that affords the user the ability to impose this mode on applications.

Figure 14:
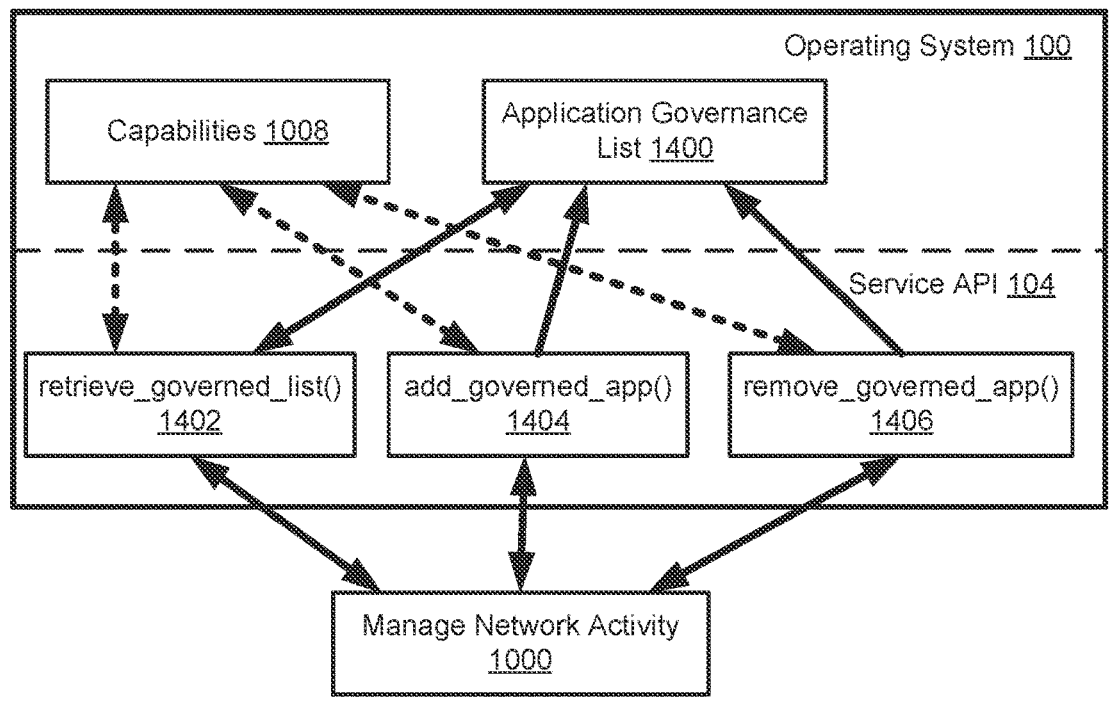

In some implementations, the Manage Network Activity utility 1000 also provides the user interface for managing the mode of operation. FIG. 14 shows how the Manage Network Activity utility 1000 also provides users with the ability to directly manage the entries in the application governance list 1400, which stores data about the mode assigned to specified applications. In accordance with some implementations, system functions retrieve_governed_list( ) 1402, add_governed_app( ) 1404, and remove_governed_app( ) 1406 are added to the operating system. The Manage Network Activity utility 1000 calls the retrieve_governed_list( ) 1402, add_governed_app( ) 1404, and remove_governed_app( ) 1406 functions to, respectively, view the list of entries in the Application governance list 1400, add applications to list 1400, and remove designated applications from the list 1400. In some implementations, if a user removes a designated application from list 1400, the application automatically returns to default control.

In some implementations, other programs and modules are not allowed to call the retrieve_governed_list( ) 1402, add_governed_app( ) 1404, and remove_governed_app( ) 1406 functions. There are a variety of means to prevent other programs and modules from calling these system functions. In some implementations, a capability is afforded to Manage Network Activity utility 1000 that permits it to call these functions. In some implementations, the capability is stored in the capabilities table 1008. In some implementations, each of these functions confirm the capability before performing their operations, as represented in FIG. 14 by the dashed arrows. In some implementations, this capability, controlled by the kernel, is not afforded to other programs (e.g., malware lacks the capability to alter the Application governance list 1400).

Figure 15:
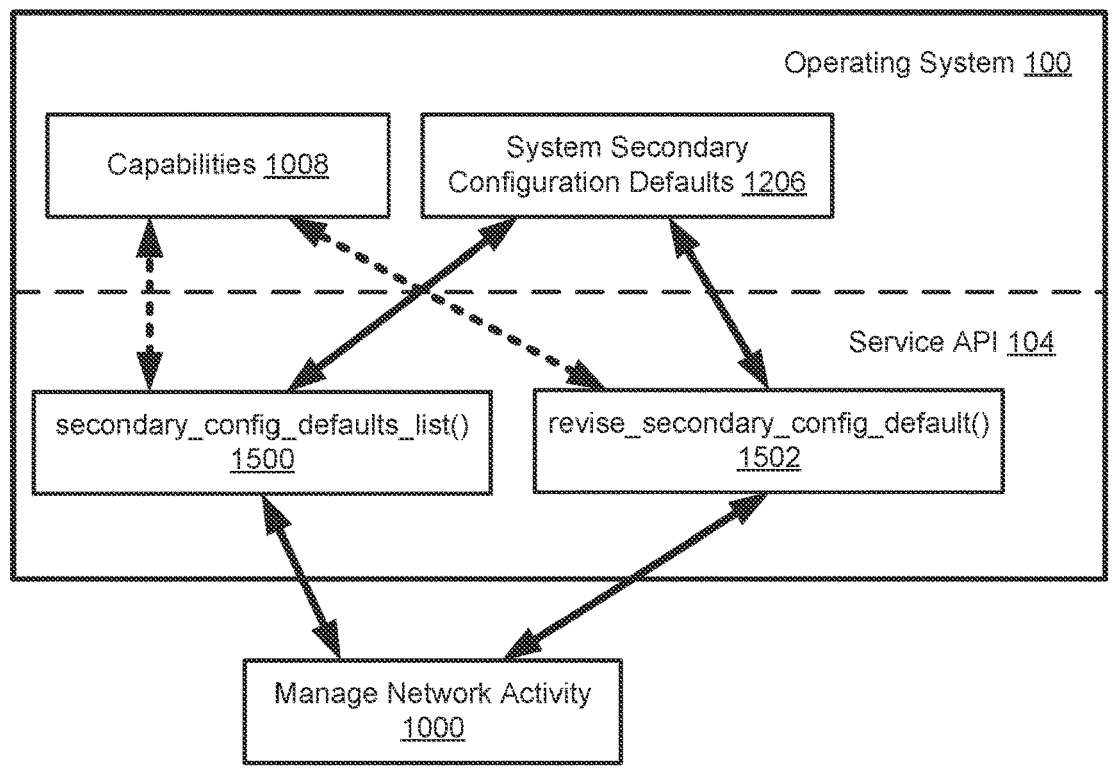

In some implementations, the Manage Network Activity utility 1000 affords the user the ability to view and revise the system secondary configuration default values 1206. In some implementations, the system function secondary_config_defaults_list( ) 1500 is added to the operating system. In some implementations, the Manage Network Activity utility 1000 calls this function to retrieve the list of current default values. In some implementations, the system function revise_secondary_config_default( ) 1502 is added to the operating system. In some implementations, the Manage Network Activity utility 1000 calls this function to revise the value of a specified configuration parameter. In some implementations, access to these functions is guarded by a capability stored in table 1008. In some implementations, each of these functions confirm the capability before performing their operations, as represented in FIG. 15 by the dashed arrows. In some implementations, this capability, controlled by the kernel, is not afforded to other programs (e.g., malware lacks the capability to alter the secondary configuration default values 1206).

Figure 16:
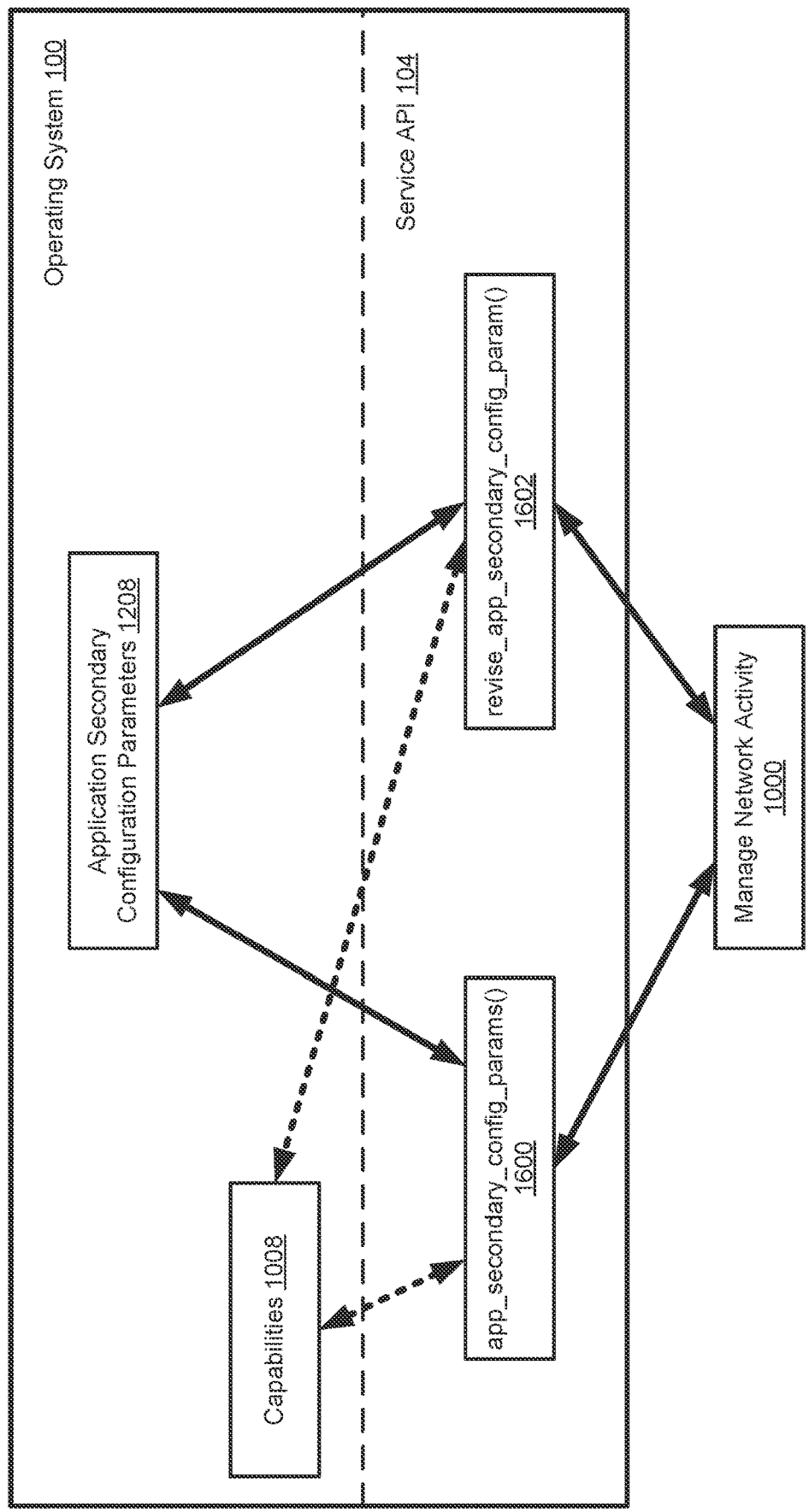

In some implementations, the Manage Network Activity utility 1000 affords the user the ability to view and revise the application secondary configuration parameter values 1208 for each application. In some implementations, the system function app_secondary_config_params( ) 1600 is added to the operating system. In some implementations, the Manage Network Activity utility 1000 calls this function to retrieve the list of current parameter values. In some implementations, the system function revise_app_secondary_config_param( ) 1602 is added to the operating system. In some implementations, the Manage Network Activity utility 1000 calls this function to revise the value of a specified configuration parameter. In some implementations, access to these functions is guarded by a capability stored in table 1008. In some implementations, each of these functions confirm the capability before performing their operations, as in FIG. 16 by the dashed arrows. In some implementations, this capability, controlled by the kernel, is not afforded to other programs; hence (e.g., malware lacks the capability to alter the application secondary configuration parameter values 1208 for any application).

Web browsers routinely accept commands to redirect their URL's because web pages often are moved. However, this functionality is also utilized by attackers to hide their identities. In some implementations, redirect commands are not permitted, e.g., to assure user control over network connectivity. In some implementations, each request to redirect is considered a new network connection request and is handled accordingly.

Configuration Applications

As mentioned previously, in some implementations, application programmers supply a separate configuration application to write data (e.g., user data) to read-only application data files. In some implementations, the configuration application is not permitted to read or write any other files (such as application data or user files) or to send or receive data over a network. In some implementations, the configuration application is associated with the application that it serves so that it is permitted to access the appropriate application data files that are stored in the application's read-only data file storage area. In some implementations, when the configuration application is running, the system displays a written warning that data entered by the user will be written to a configuration file that can be accessed automatically by the main application thereafter (e.g., regardless of whether the application is offline or connected to a server computer).

In some implementations, a special installation procedure is used for configuration applications. In some implementations, configuration applications are only permitted to be installed only in conjunction with the installation of a main application or in conjunction with an update to the main application installation. Thus, configuration applications are supplied by the developer of the main application.

In some implementations, each configuration application is installed in the same location as the main application. In some implementations, the configuration application is provided with a system library that affords it the ability to read and write to application data files that are located in the read-only area of data files for the main application. In some implementations, the functionality is achieved using the open_app_config_file( ) function, described above, with read and write permissions.

Figure 17:
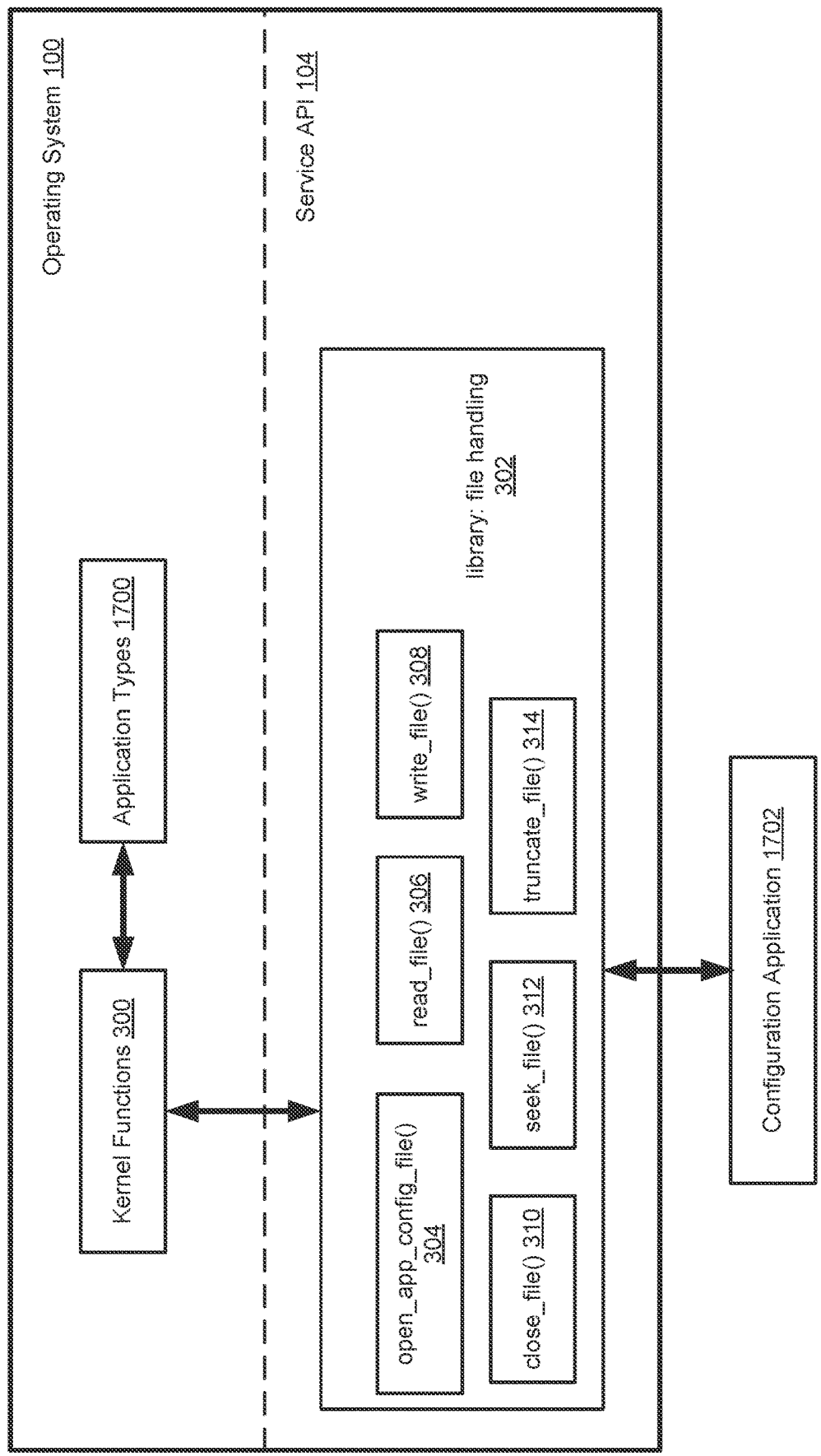
FIG. 17 illustrates an example operating system and example functions for file handling in accordance with some implementations.

In some implementations, a configuration application is identified at the time of installation. In some implementations, the application's type is saved in kernel memory, e.g., the application types 1700 (also sometimes call an application types table or list) in FIG. 17. In some implementations, when a configuration application 1702 calls the open_app_config_file( ) function 304, the kernel function in kernel functions 300 that implements the functionality queries the types table 1700. In some implementations, if the application is determined to be a configuration application, the capabilities of the file handle returned by the call to open_app_config_file( ) 304 are set to read and write, e.g., as opposed to the default value of read only. In some implementations, this change to open_app_config_file( ) 304 causes every call by other types of applications to query the types table 1700, but the response is negative and, consequently, the file handle is set to read only.

Server Applications

A server application manages its data with application data files, e.g., no user files are involved except for importing and exporting. Servers characteristically perform their work through use of network transmissions. Therefore, they are generally entrusted to respond to requests for network connections. As discussed earlier, an ordinary application is not afforded the plenary power to establish network connections in accordance with some implementations. Some implementations include a mechanism in the system library to permit the server application to form network connections when a user isn't present. At the time a request is received by the server application, the identity of the proposed endpoints of the connection are generally known.

How the server application decides whether to accept the connection or to thereafter offer service depends on methods implemented in software to control access to the service. In some implementations, the server application determines whether to accept a connection and what services to offer without any input from a user. In this way, control over access to the data is shifted to programmatic controls. In the case of a database management system (DBMS), for example, user accounts are created and data access permissions are established, thereby enabling software-controlled user authentication and authorization. Moreover, interactions with the DBMS are controlled through a well-defined query language interface, which is not only used for interaction but also to establish how data is stored and retrieved conceptually.

In some situations, a server application may need to connect to another server application in order to retrieve some needed data. In some implementations, partial autonomy for the server application is created via a special read-only configuration data file. In some implementations, a configuration application allows a user to enter a list of approved domain names in a connection request configuration application data file. Once started, the server application reads this file and identifies the needed domain name to a special system function that connects to another server using that domain name entry in the file. In some implementations, there is a different means for identifying the selected domain name, such as an index or key. Using this approach, the server application is still limited to connecting only to remote computers that had been approved previously by a user. In accordance with some implementations, the following system functions are added to achieve this functionality:

open_TCP_conn_config_file( ), open_UDP_conn_config_file( ). In some implementations, these functions have the same two parameters, e.g., one parameter identifies the configuration file that contains permitted domain names and the other designates the index or key of the entry in the configuration file that contains the domain name of the remote server.

Figure 18:
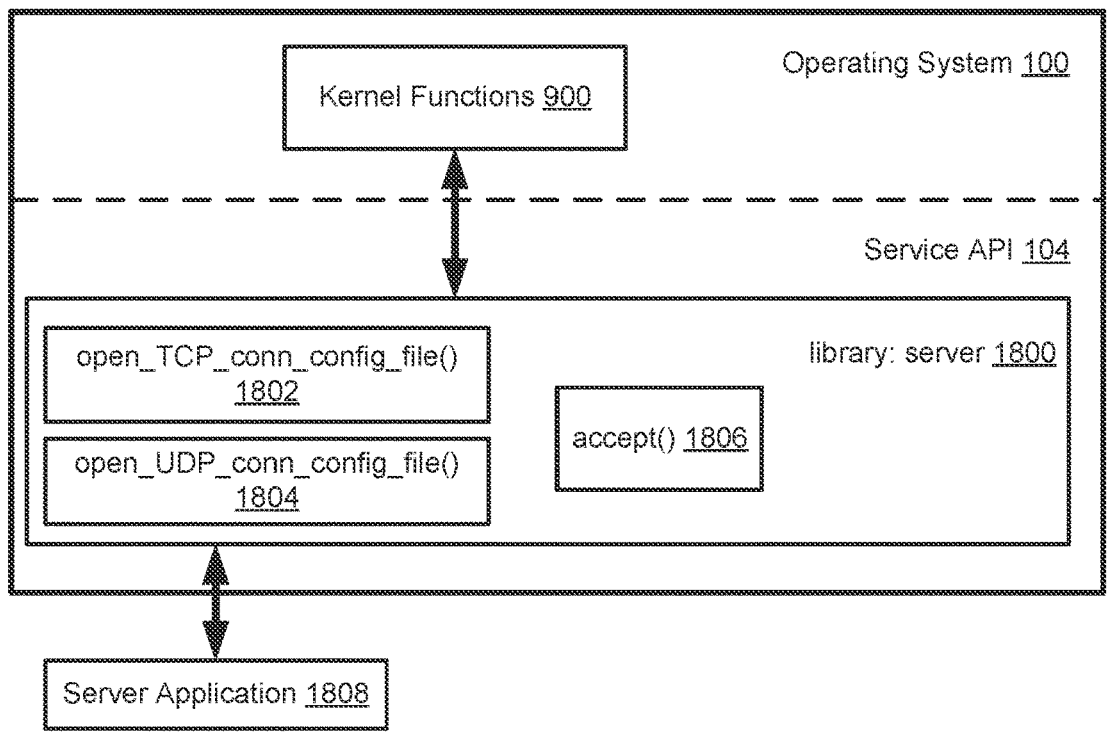
FIG. 18 illustrates an example operating system and example functions for server network management in accordance with some implementations.

In some implementations, a server application uses a server library, designated as 1800 in FIG. 18. The library 1800 contains the open_TCP_conn_config_file( ) 1802, open_UDP_conn_config_file( ) 1804, and accept( ) 1806 functions. In accordance with some implementations, any application installed as a server application (e.g., the server application 1808 in FIG. 18) is provided access to this library. The functionality of these system functions is implemented the by kernel functions 900. The server application 1808 call accepts( ) 1806 any TCP connection request. In order to establish a network connection to another server, the server application 1808 can call either open_TCP_conn_config_file( ) 1802 or open_UDP_conn_config_file( ) 1804, passing in as parameters the identity of the configuration file that contains permitted domain names and the index or other identifier of the desired domain name contained within the configuration file. Both open_TCP_conn- _config_file( ) 1802 and open_UDP_conn_config_file( ) 1804 return a socket to server 1808 upon successful completion.

Update Applications

In some implementations, a copy of each original writable application data file is stored in the prototype writable application data files location at the time of installation, e.g., so that each original writable application data file can be copied to start use with any network status. However, when updated, the application might rely on a revised format of an application data file. If any user data had been written to the application data file then simply replacing the existing application data file with the newly formatted one overwrites that data. In some implementations, to avoid this problem, an "application data" update application is provided that is designed to revise the existing application data files so that they conform with the updated application but without destroying any stored user data. In some implementations, a copy of the new writable application data file that does not contain user data is stored in the prototype area, overwriting the prior original writable application data file.

In some implementations, similar to the configuration applications described previously, the update applications originate from the developer of the main application and are stored in the same location as the main application. In some implementations, the update applications are identified at the time of update. In some implementations, after being screened for illegal system calls, the update application is provided with a system library that affords it the ability to read and write application data files, e.g., regardless of their division of storage. In some implementations, this functionality is achieved using both the open_app_data_file( ) and open_appl_config_file( ) functions, described above. However, in the case of the open_app_data_file( ) function, all locations that contain writable application data files may be accessed. In some implementations, read and write permissions are granted for the open_appl_config_file( ) function.

Figure 19:
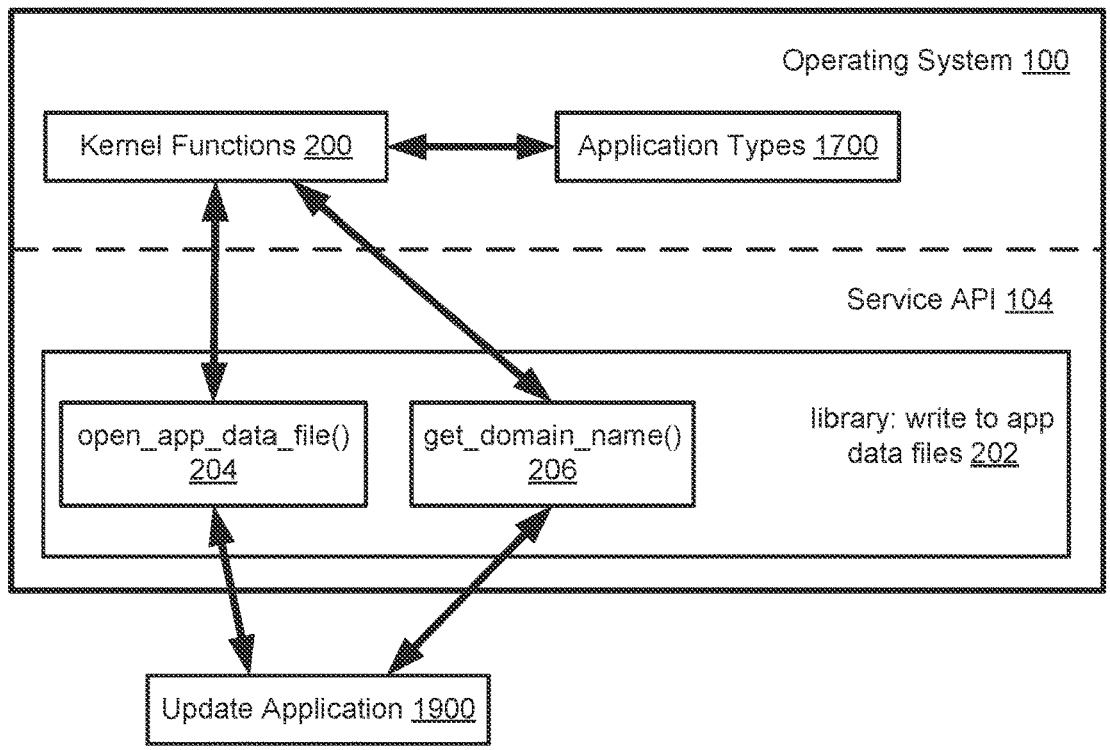
FIGS. 19-21 illustrate an example operating system and example functions to update applications in accordance with some implementations.

In some implementations, the type of an update application is stored at the time of installation in the types table 1700, as shown in FIG. 19. Any update application (e.g., the update application 1900 in FIG. 19) is provided access to the open_app_data_file( ) function 204 through the library 202. When the underlying kernel function 200 implements the desired functionality, it first queries the types table 1700. If the application type is update, then the file handle returned is provided the capabilities of reading and writing to all writable application data files, e.g., regardless of their network status location.

Figure 20:
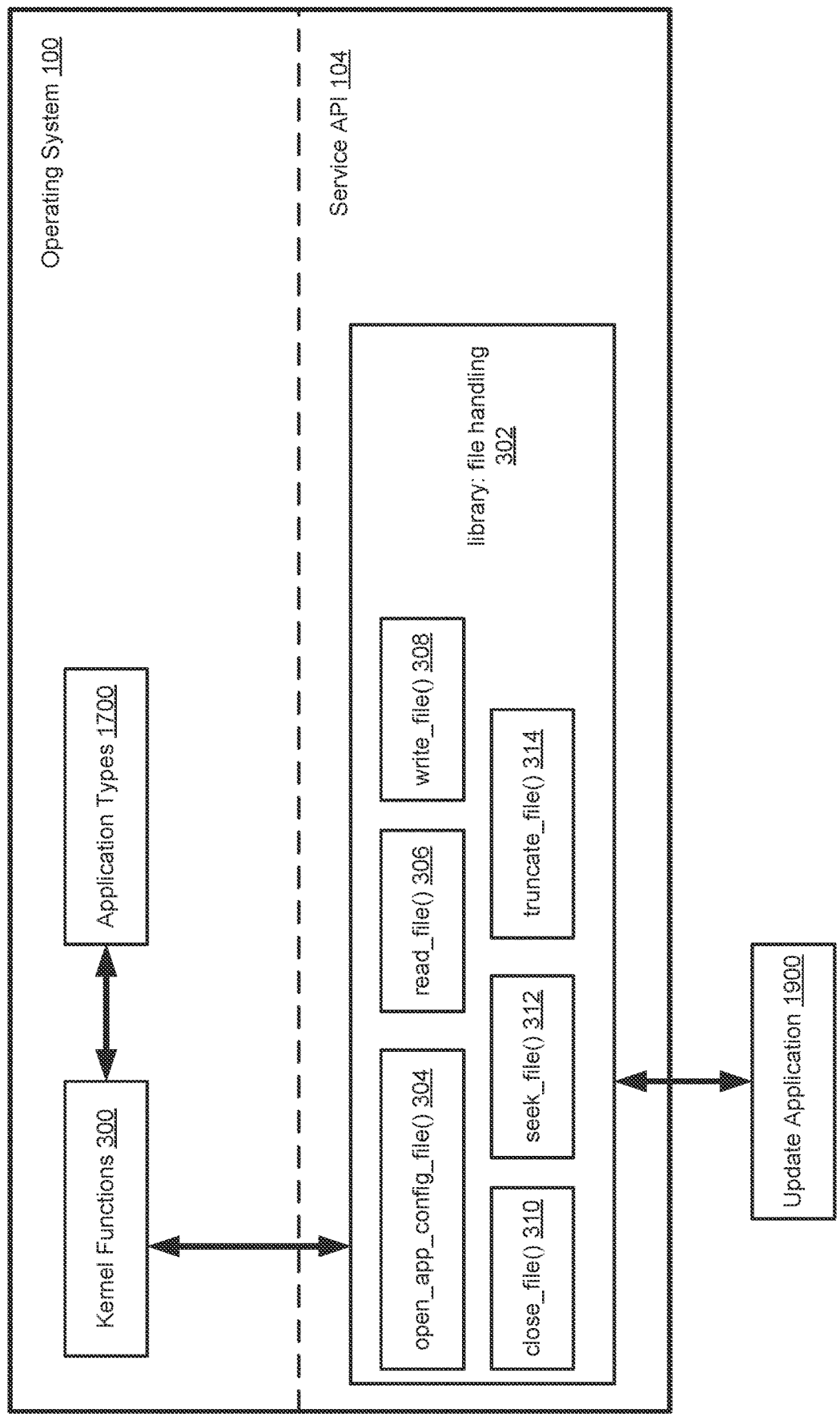

In some implementations, the update application 1900 is provided access to the file handling library 302, as shown in FIG. 20. For example, when an update application 1900 calls the open_app_config_file( ) function 304, the kernel function in kernel functions 300 that implements the functionality queries the types table 1700. If the application is determined to be an update application, then the capabilities of the file handle returned by the call to open_app_config_file( ) 304 are set to read and write, e.g., as opposed to the default value of read only.

Utilities

In addition to file access and network transmission tasks, there can be many other plenary tasks, such as launching programs, configuring wireless network devices, and setting the screen resolution. In some implementations, system library functions are supplied for nearly all plenary tasks, e.g., despite the fact that programmers have no need for that level of control over the computer in ordinary applications. In some implementations, the user is provided a utility application to manage the computer's resources. Developers of operating systems may supply a set of crude system utilities for managing such resources, but users often desire more sophisticated ones. For example, third party utilities that manage file systems are quite common and there is no reason to deprive users of their benefit.

In some circumstances, programmers who create utilities require access to plenary power in limited situations but the structure of current system libraries makes it an "all or nothing" approach. Various incarnations of capability systems have been added to rein in such accesses, but these approaches often falter because of the administrative burden imposed on users, which typically entails a steep learning curve. Additionally, even the educated user is given no assurance as to the behaviors of a particular program.

In some implementations, all system functions that provide programmers with plenary power over a computer resource are moved to plenary system libraries or eliminated. In some implementations, the plenary system libraries are solely for use by system utility programmers and, therefore, carry the least privilege needed to accomplish the task. For example, a third-party file manager utility permits users to copy user files from one application storage location to another, as well as delete user files. To accomplish these goals, plenary system library functions need to access multiple application storage locations simultaneously. However, these functions should not be permitted to violate the principle of least privilege. In some implementations, plenary system libraries are created that address a particular need.

In some implementations, each utility is limited to use only libraries than are needed to perform its purpose. For example, a plenary system library needed to create a file manager utility permits the programmer to perform only a very limited set of plenary operations. For example, the programmer is able to display a list of user files, but the programmer is not provided with any access to application data files, which are beyond the control of users. The plenary system library for file management may also permit the programmer to retrieve information about user files, including their sizes, dates last modified, etc. The plenary system library may also provide a means for the file manager to perform desirable functions but without accessing file content. For example, one such system function, copy_user_file ( ) permits a file manager to create a named copy of a user file without directly accessing it. Similarly, a system function, user_files_are_identical( ) permits a programmer to determine whether two files share the same content without directly accessing either file. The plenary system library may also permit programmers to rename and delete files. Moving a file can be achieved with a combined function, copy_and_delete_user_file( ). In accordance with some implementations, the file management functions include:

- view_first_app_info( ). In some implementations, this function returns information about the first application in the list of applications available to the user.
- view_next_app_info( ). In some implementations, this function returns information about the next application in the list of applications available to the user.
- view_app_first_user_file_info( ). In some implementations, this function returns information about the first user file in the list of user files for a specified application.
- view_app_next_user_file_info( ). In some implementations, this function returns information about the next user file in the list of user files for a specified application.

create_user_dir( ). In some implementations, this function creates a new subdirectory in the user file storage area of a specified application.

remove_user_dir( ). In some implementations, this function removes an empty user file subdirectory in the user file storage area of a specified application. In some implementations, all files are first deleted.

rename_user_dir( ). In some implementations, this function renames a directory in the user file storage area of a specified application and requires user confirmation.

copy_user_file( ). In some implementations, this function copies a user file to the user file storage area of the same application, another application's user storage area, the user's transfer area, or the global transfer area. In some implementations, the arguments include a list of files. In some implementations, this function requires user confirmation if copying overwrites one or more existing files.

rename_user_file( ). In some implementations, this function renames a specified user file and requires user confirmation.

rename_user_files( ). In some implementations, this function renames a list of files, including the set of files within a directory, using a specified renaming pattern; requires user confirmation.

user_files_are_identical( ). In some implementations, this function compares user files within or across storage areas. In some implementations, the comparison is based simply on whether the files are byte identical. In some implementations, a separate application is furnished that displays differences, based on copies of the files being compared.

delete_user_file( ). In some implementations, this function deletes a specified user file. In some implementations, the arguments include a list of user files. In some implementations, this function requires user confirmation.

copy_and_delete_user_file( ). In some implementations, this function copies a user file then deletes original file. In some implementations, the arguments include a list of files. In some implementations, this function requires user confirmation.

launch_app_with_user_file( ). In some implementations, this function launches the application in whose storage area the selected user file resides, opens the user file, and passes the file handle to the application.

Figure 21:
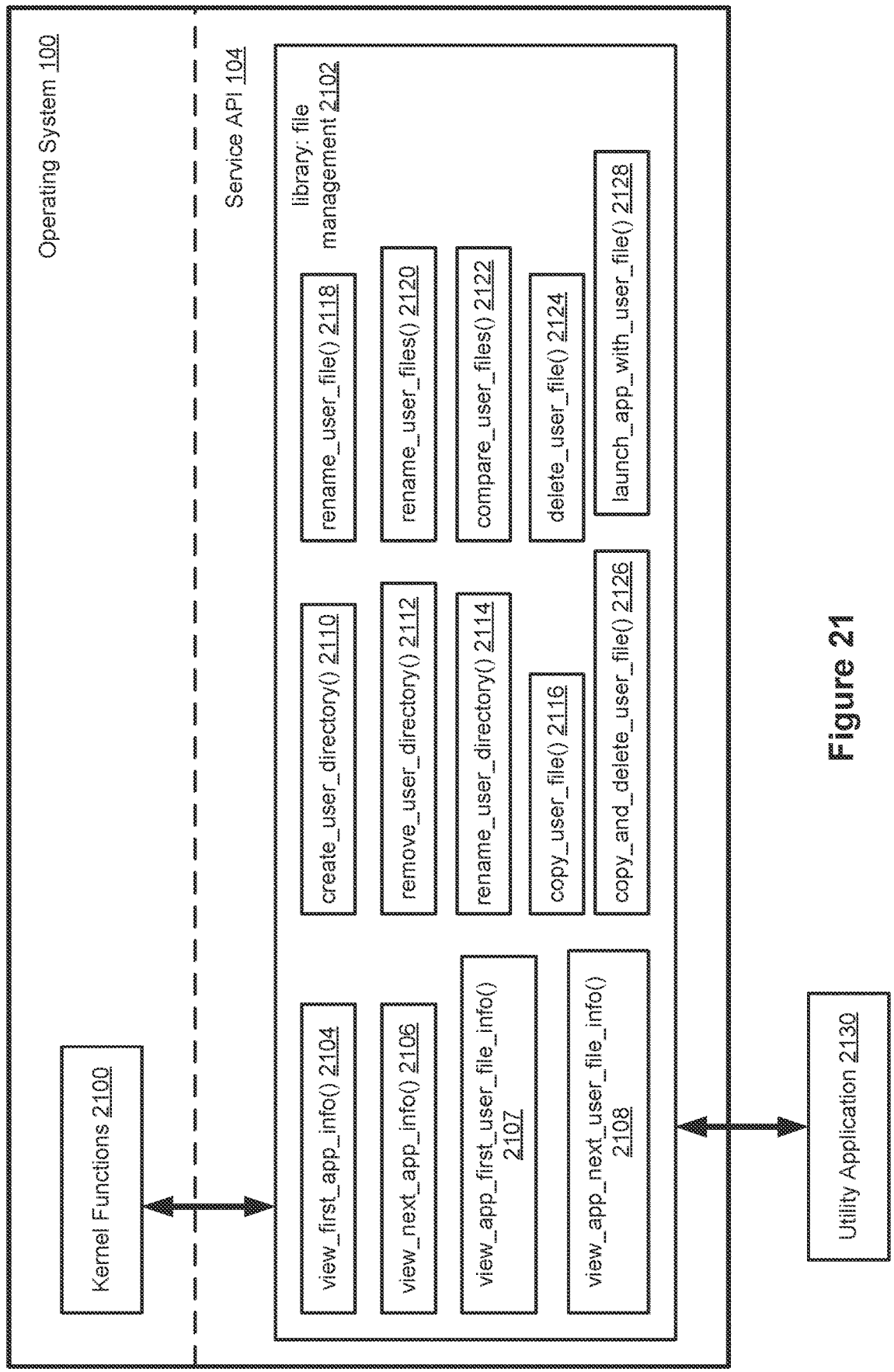

In some implementations, a library of file management system functions, designated 2102 in FIG. 21, contain all of the foregoing functions, designated from 2104 through 2128. In accordance with some implementations, the kernel functions 2100 implement the functionality of each of these system functions. In some implementations, any utility application 2130 may access the system functions in library 2102. Because a file management utility does not need any additional system functions to perform its tasks, the principle of least privilege dictates that the utility should not be provided access to any additional plenary system libraries. Analogous to the choice faced by ordinary applications of writing to user files or application data files, utility applications should choose between plenary system libraries as they are not permitted to access all of them.

The plenary system libraries should afford user approval to the extent practicable. In some implementations, the file management actions that have significant impact are checked by user approval. For example, if a user indicates that one or more user files should be deleted, the plenary system library permits the programmer to request that a list of one or more files be deleted. As an example, the system displays a graphic that shows the list of files to be deleted and ask the user for confirmation. In some implementations, the same approval process is used for requests to overwrite, move, and rename files. In some implementations, the plenary system library permits a request to launch the application associated with a user file but requires that the user approve the request. In some scenarios, separating the request duty from the approval duty allows programmers to create more sophisticated utilities without sacrificing user control.

Figure 22:
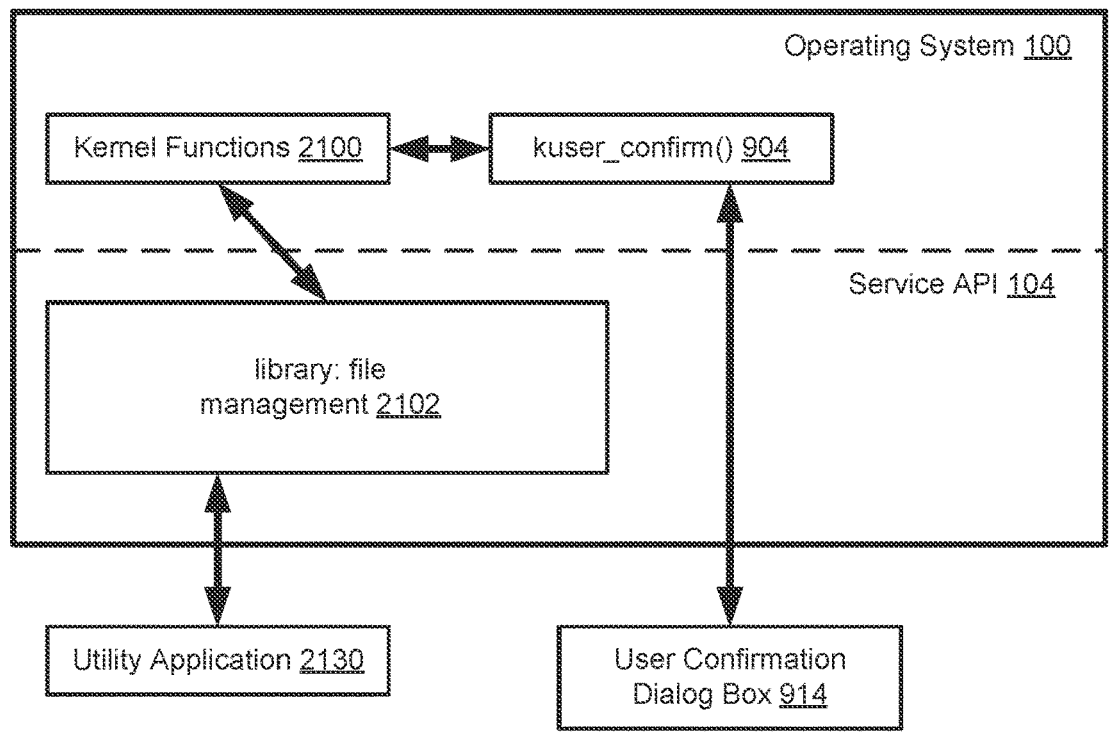
FIG. 22 illustrates an example operating system and example functions for file management in accordance with some implementations.

FIG. 22 shows the involvement of user confirmation in accordance with some implementations. When the utility application 2130 calls one of the functions in library 2102 that requires user confirmation, as noted above in their descriptions, the implementing kernel functions 2100 call kuser_confirm( ) 904, which displays the dialog box 914, e.g., explaining the nature of the intended utility action and requesting user confirmation.

In some implementations, aside from the use of plenary system libraries, all other rules that apply to ordinary applications also apply to system utilities. In this way, system utilities follow similar restrictions as ordinary applications. For example, a utility is not permitted to read or write any application data or user files outside of its own storage area, even though it can manage users' files in different application storage areas. In some implementations, any changes needed to the configuration data used by a utility are accomplished through a configuration application supplied with that utility. In some implementations, a utility that needs to connect to a server application, such as to retrieve data for configuring a hardware device, requests a connection to the server in the same way as an ordinary application, thereby ensuring user approval. In some implementations, no secondary server connections are permitted because exposure to vulnerabilities must be minimized for utilities.

Device Drivers

Whenever a hardware device is connected to a computer, a device driver is required. The driver provides the necessary code interface between applications and the operating system. Unlike applications, users do not interact with a device driver. Device drivers are distinct from applications because they form part of the operation of the kernel and execute in kernel mode rather than user mode. In some implementations, users are not permitted to install device drivers. In some implementations, a device driver is permitted to access its configuration file, if present, using the kernel function within kernel functions 300, depicted in FIG. 3, that implements the functionality of the open_app_config_file( ) function 304. In some implementations, changes to the configuration file are made using a configuration application supplied with the driver or a utility supplied with the operating system.

Batch Processing

At times, more sophisticated computer users employ multiple applications in succession to process data. When they are doing so with lots of data, they typically wish to automate the process. This approach is sometimes referred to as batch processing. Because batch processing involves launching multiple applications and usually copying files between storage locations, it may involve multiple plenary operations. Approval of each step becomes impractical quickly when there are numerous operations in the process. In some implementations, a scripting language that allows a user to complete each plenary operation without manual approval is provided (e.g., to make batch processing practical).

In some implementations, the system warns users about potential risks when they install or use such a scripting language. In some implementations, the potential for damage caused by such languages is further reduced by requiring such languages to rely on use of data importing and exporting as the exclusive means of exchanging data dynamically between the various applications that are being launched by the script. Currently, scripts that control various tools characteristically rely on one-way pipes to move data from one stage of processing to the next. The exporting of data from one application, followed by the importing of that data by the next application in the process, mirrors this approach while reducing exposure to unauthorized data access.

In some implementations, system functions are provided to enable scripting languages to launch applications in succession, as well as import and export files in the process. Accordingly, a scripting language is considered a form of utility. In some implementations, the following plenary system function is added to support scripting languages:

launch_app_by_script( ). In some implementations, this function launches the specified application. In some implementations, the script includes a list of files to be imported and the name of a file to be exported by the application. In some implementations, this function opens import files for reading only, opens the export file for writing only, and passes the file handles to the application.

As this function comprises a combination of the capability to launch an application and perform import and export operations, the underlying functionality is supplied by other system functions. However, in some implementations, the combination is offered in a separate plenary system library. In some implementations, because the function affords the ability to export files, only applications that write to application data files are permitted to be launched in this way. In some implementations, any application called by the script can import from or export to either transfer area, thereby avoiding having to grant the script the privilege to copy files across application storage areas.

Figure 23:
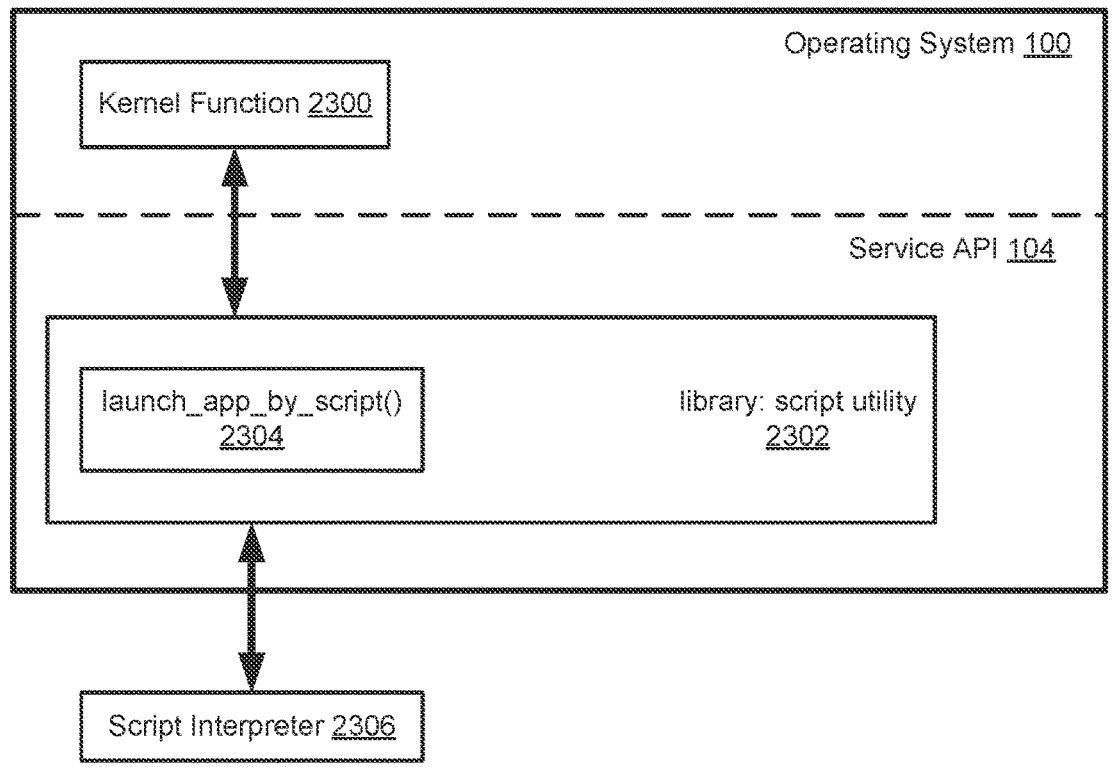
FIG. 23 illustrates an example operating system and example functions for script utilities in accordance with some implementations.

In some implementations, a script utility library 2302 in FIG. 23 provides the launch_app_by_script( ) function 2304. In some implementations, the functionality of function 2304 is implemented by special kernel function 2300. In some implementations, a script interpreter 2306 is provided access to library 2302.

Enforcement by Installation Routine
Ordinary Applications

As discussed above, in some implementations a utility is supplied with the operating system to conduct the installation process. As an example, first, the new software to be installed, and all of its data files, are copied to a transfer area. The user then starts the utility that will install the new software. The utility copies the installation files to a temporary holding area of storage that is accessible only by the kernel in order to prevent interference with the process. In some implementations, the installation also includes a manifest that describes each file of the installation. In some implementations, the manifest distinguishes executable files from application data files. In some implementations, the manifest distinguishes writable application data files from read-only application data files. In some implementations, the manifest specifies which applications are configuration applications.

In order to prevent applications from undermining the separation of capabilities approach by including CPU instructions within their code that directly call system functions, each executable module is parsed in some implementations. In some implementations, if an instruction that raises the privilege level appears within any module of the code, none of the code is installed (e.g., entire installation is rejected). In some implementations, if the installation succeeds, declared application type is compared with the system library calls. If no executable module calls a function in a system library that is not provided for the type of application being installed, a storage location is created for the executable code files. In some implementations, this area is an isolated, read-only section of the file system that only the kernel may access. In some implementations, code modules can only be replaced by a later update (discussed below) or removed by an application removal utility. In some implementations, the code is then copied to its storage area. In some implementations, another storage location is created for the data and user files associated with the main application. In some implementations, the storage area for data files is subdivided, as explained above. In some implementations, the application configuration data files are copied to the read-only area and the writable application data files are copied to the prototype area. In some implementations, the installation function adds the new application to the list of installed applications, including placing text and graphical information in the locations where users select applications to launch.

Figure 24:
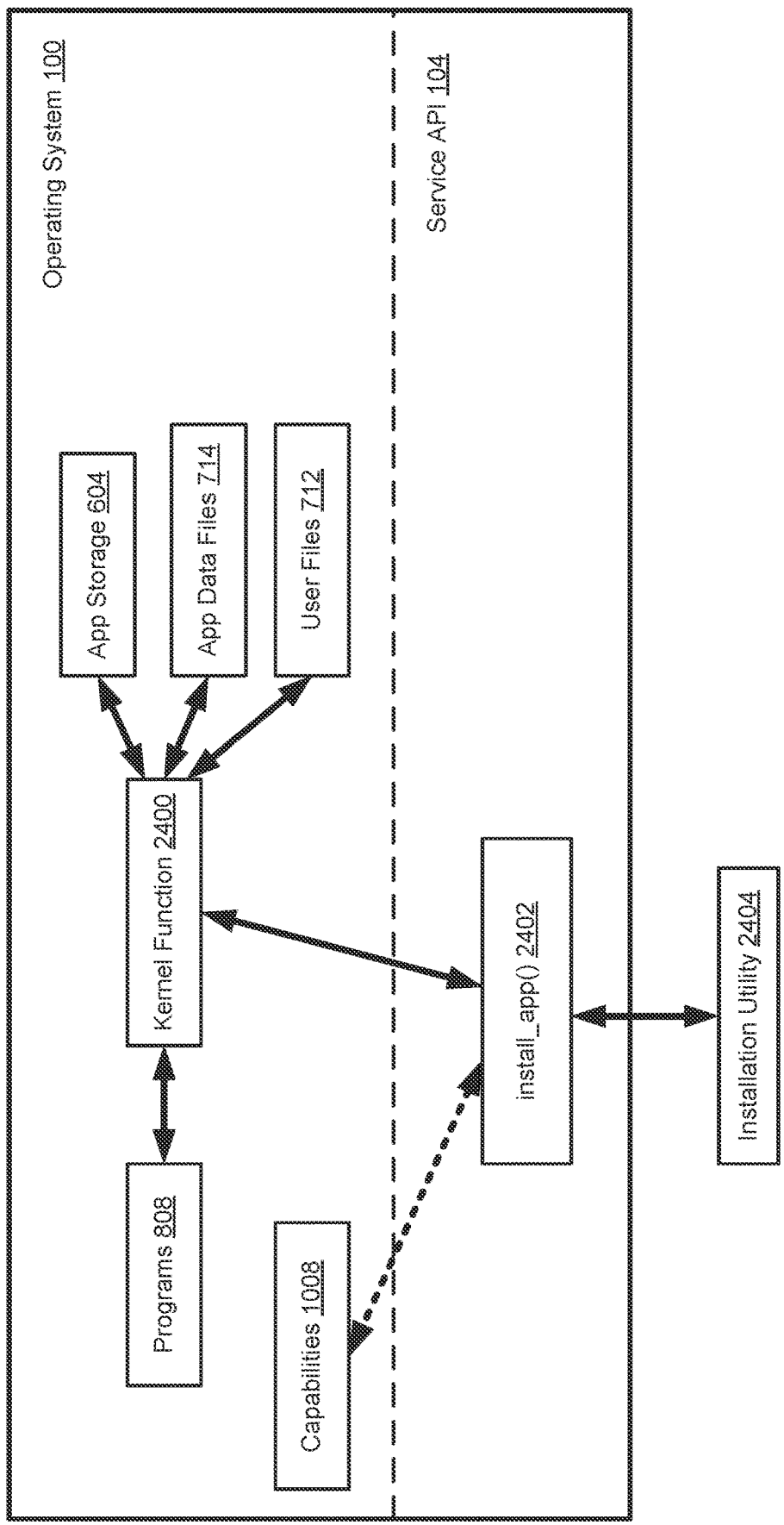
FIGS. 24-26 illustrate an example operating system and example functions for installation utilities in accordance with some implementations.

In some implementations, an install_application( ) function, designated 2402 in FIG. 24, is used to complete the installation process. The actual functionality for this function is implemented by kernel function 2400.

In some implementations, an installation utility (e.g., the installation utility 2404 in FIG. 24) is provided with the operating system. In some implementations, the user designates the files to install using the installation utility 2404 and instructs the utility 2404 to proceed with installation. In some implementations, the utility 2404 calls install_application( ) 2402 and passes the identities of the files to be installed, including the manifest. In some implementations, the install_application( ) 2402 function calls the kernel function 2400 to perform the task. In some implementations, the kernel function 2400 first verifies the integrity of the installation files using the digital signature. In some implementations, the kernel function 2400 verifies that the executable code does not call system functions directly or make unwarranted calls to system libraries, then allocates storage space and copies files. In some implementations, the kernel function 2400 allocates a new area for storage within the programs storage area 808, as depicted in FIG. 8, and copies the application and all executable modules to this new area. In some implementations, the kernel function 2400 copies the read-only files to the read-only section of the application's portion of App storage area 604, as depicted in FIG. 6. In some implementations, the kernel function 2400 copies all writable application data files to the prototype area of the application's App storage area 604, also depicted in FIG. 6. In some implementations, if the application writes to application data files, the kernel function 2400 allocates a storage location for App data files 714, as depicted in FIG. 7. In some implementations, the kernel function 2400 allocates a storage location for the User files 712, also depicted in FIG. 7. In some implementations, if the application writes to application data files, the User files 712 location is named, "Imports and Exports," otherwise, it is labeled, "User files."

In some implementations, other programs and modules are not permitted to call the install_application( ) 2402 function. There are a variety of means to prevent other programs and modules from calling these system functions. In some implementations, a capability is afforded to the installation utility 2404 that permits it to call this function. In some implementations, the capability is stored in the table 1008. In some implementations, the kernel function 2400 confirms the capability before performing its operations, e.g., as represented by the dashed arrow in FIG. 24. In this way, this capability, controlled by the kernel, is not afforded to other programs, thus malware lacks the capability to install applications.

Executable software refers to programs and linkable modules that are written in machine language and, consequently, may be executed directly by the ALU of the CPU. Many programs, however, are not stored in executable format. For example, scripting languages, such as Python, store programs as source code. When run, Python compiles modules that are imported into bytecode and then interpret the bytecode. Similarly, Java source code is compiled into Java bytecode before being interpreted; however, the Java Runtime Environment (JRE) also includes a Just-in-Time (JIT) compiler that compiles the bytecode into machine language that may be executed directly. Some programs are stored as source code within a user document, such as VB Scripts stored within a Microsoft Excel spreadsheet. With such variation, accommodation may need to be made for programs that are not distributed in machine executable form.

In some implementations, for an interpreted language (e.g., including interpreted forms of bytecode), the program source file is treated as a user document. In some implementations, the language interpreter is the installed program and any data generated by the interpreter is saved to the user source file.

If the interpreted program is intended to behave as an independent program that can manage its own application data files or even user files however, it is installed. In some implementations, a small executable program, commonly called a stub, that opens the source file as an application data file and links to a shared library that contains the language interpreter is installed as any other executable.

If, however, an interpreted program that intends to manage other application data files is, itself, stored as an application data file within the application data storage of the interpreter executable, then security can no longer be assured. For example, the interpreted program can open all other application data files belonging to that user for reading and writing, thereby compromising data stored by another interpreted program or even altering another program. Permitting a single interpreter program to interpret multiple programs stored as application data files commingles storage, thereby removing the separation of storage guarantee that the underlying system provides. Hence, using interpreted programs in this manner is considered as a subversion of the security model provided by the system and, therefore, should be avoided. Only advanced computer users, such as programmers who are developing programs, should even consider using such an approach. Nevertheless, there is no practical means to prevent its use. Accordingly, users are warned about this disruption of the security model and advised against its use in the strongest manner.

Another approach is a hybrid approach, such as used by Java. As described above, use of a stub to launch a program stored in Java bytecode complies with the security model. Problems arise when the JRE tries to launch the JIT in order to transform the bytecode into executable code. This transformation, by itself, does not threaten the security model, but the next step by the JRE, which is to execute the newly-transformed module, would. In some implementations, in order to preserve security, use of a JIT is supported if the JIT is converted to a shared library and the JIT compiled module is first installed before being executed by the JRE. Thus, a hybrid approach is permittable, entails a modification of the software involved.

Figure 25:
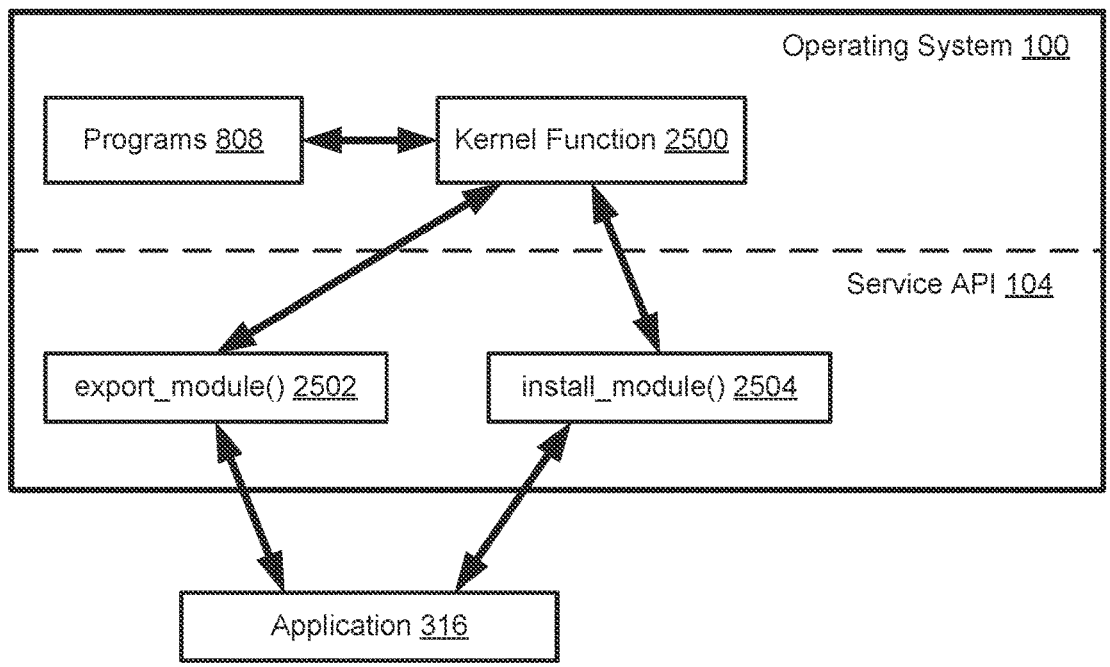

In some implementations, supporting system functions are provided for Just-in-Time installation of modules. Specifically, the export_module( ) and install_module( ) functions, designated respectively 2502 and 2504 in FIG. 25, are added to the operating system. Any application (e.g., the application 316) is permitted to call export_module( ) 2502 to open a file handle for exporting. In some implementations, the functionality is implemented by a function in the kernel functions 2500, which returns the file handle to the application 316. The application 316 may then use its compiler library to export a new executable module into a special export subdirectory of the application's storage within the Programs storage location 808, as depicted in FIG. 8. Notably, the application 316 cannot access the newly exported file at that point. In some implementations, the application 316 calls install_module( ) 2504, passing in the name of the newly exported module. The install_module( ) 2504 function calls an appropriate function in the kernel functions 2500, passing in the name of the executable module to be installed. In some implementations, the function in kernel functions 2500 locates the designated module and then performs the same parsing and review process as described above for the installation of executable modules. In some implementations, if the module passes the inspection, it is moved into the application's storage location within Programs storage location 808 (otherwise it is deleted). If the procedure succeeds and the module is moved, a value indicating success is returned by the function in kernel functions 2500 to install_module( ) 2504, which returns the value to the application 316. At that point, the application 316 can load the module for execution using an existing system library function for loading modules dynamically.

Shared Libraries

In some implementations, the installation utility also addresses the installation of shared libraries. In some implementations, executable library code is placed in a separate location that is never accessible by either users or programmers. For example, only the application launch and library removal utilities are permitted to access this storage area. The installation utility allocates storage for shared library data files.

In some implementations, shared libraries follow the same rules as applications in that they are required to elect between writing to user files or application data files. In some implementations, a program is only permitted to link to a shared library that has elected the same choice. In some implementations, if the shared library stores data in application data files, these application data files are stored with each application using the library. In some implementations, shared library data files are separated from application data files to prevent them from being accessed directly by the application. In some implementations, shared library data files are also separated by network status. For example, a shared library may open only application data files in its offline location when the application is offline. Similarly, a shared library may open only application data files in its location for a particular domain when the application is connected to that domain. In some implementations, read-only application data files that are accessed by the shared library are copied to a read-only application data area for the library. In some implementations, writable application data files are copied to the prototype area for later use when the library is accessed by an application for the first time.

Figure 26:
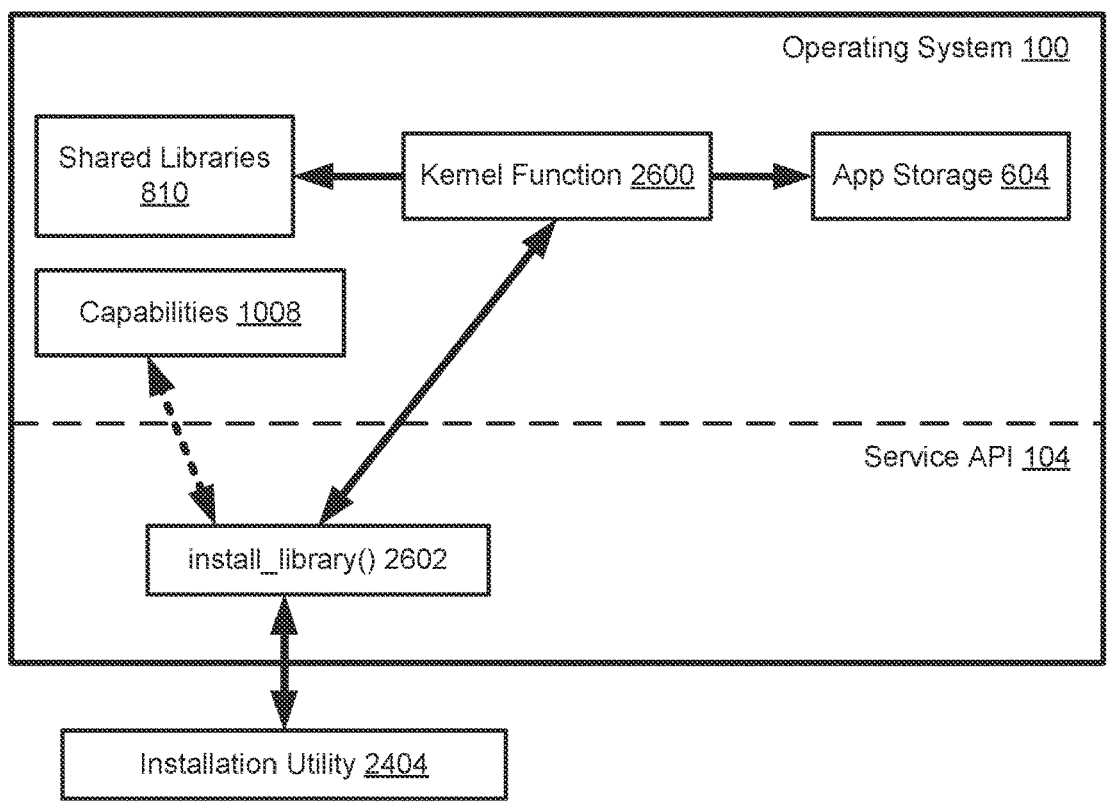

In some implementations, a install_lib( ) function, designated 2602 in FIG. 26, is used to complete the installation process of a shared library. In some implementations, the actual functionality for this function is implemented by the kernel function 2600. In some implementations, the installation utility 2404 affords this functionality to the user. For example, the user designates the files to install using installation utility 2404 and then instructs the utility 2404 to proceed with installation. In some implementations, the utility 2404 calls install_lib( ) 2602 and passes the identities of the files to be installed, including the manifest. The install_lib( ) 2602 function then calls kernel function 2600 to perform the task. In some implementations, as described above, the kernel function 2600 verifies that the executable code does not call system functions directly or make unwarranted calls to system libraries, then allocates storage space and copies files. In some implementations, the kernel function 2600 allocates a new area for storage within the Shared libraries storage area 810, as depicted in FIG. 8, and copies the library and all executable modules to this new area. In some implementations, the kernel function 2600 copies the read-only files to the read-only section of the library's portion of App storage area 604, as depicted in FIG. 6. In some implementations, the kernel function 2600 copies all writable application data files to the prototype area of the library's App storage area 604, also depicted in FIG. 6. In some implementations, if the library writes to application data files, the kernel function 2600 allocates a storage location within the application's data file area within User storage. For example, storage for library 716, used by App 708, include the same types of storage areas, specifically Offline 724, Server1.com 726, and Server2.com 728, as depicted in FIG. 7. In some implementations, if the shared library writes data to user files, the User files area 712, already established when the application was installed, is used.

In some implementations, other programs and modules are not allowed to call the install_lib( ) 2602 function. There are a variety of means to prevent other programs and modules from calling these system functions. In some implementations, a capability is afforded to the installation utility 2404 that permits it to call this function. In some implementations, the capability is stored in the table 1008. In some implementations, the kernel function 2600 confirms the capability before performing its operations, as is represented by the dashed arrow in FIG. 26. In some implementations, this capability, controlled by the kernel, is not afforded to other programs (thus malware lacks the capability to install shared libraries).

Utilities

In some circumstances, similar to the choice between system libraries that write to application data files or user files, utilities elect for use of specific utility system libraries. Given the risk potential of utilities though, the developer of an operating system may elect to serve as the exclusive distributor of all third-party system utilities, thereby giving the operating system developer the opportunity to evaluate and test the utility before publishing it. Conversely, the operating system developer may supply a system utility installation application that, itself a utility, permits users to install utilities supplied to them by any third party. In some implementations, the utility installation application displays to the user a list of powers that are granted to the utility once installed. In some implementations, the installation program provides clear warnings to users of the potential impact caused by use of an installed utility. For example, users are reminded of the power of utilities by labeling them as such, as well as displaying a clear and conspicuous notice during their execution. Even with these warnings however, users without sufficient technical background could be exploited. Varied approaches can serve as points of competition in the marketplace, with some operating systems offering an approved-only utility approach for security-conscious users while other operating systems offer greater freedom and flexibility in managing computers. In some implementations, the procedure for installing a utility follows the process depicted in FIG. 24 and explained above, although the additional warnings are displayed by the installation utility 2404 when the application type is utility.

Securing Installation and Update Files

In some implementations, the developer of the operating system also supplies an update utility (e.g., as part of the installation utility) that updates existing installations of applications and libraries. In some implementations, the utility creates a new version of the application or library every time it is updated. In some implementations, as part of an update, application programmers provide an application data file update application in order to integrate new versions of application data files with existing ones that contain user data. In some implementations, library programmers provide an application data file update application in order to integrate new versions of application data files with existing ones that contain user configuration data or data based on use of the library by applications.

In some implementations, additional care is taken to assure that an update is authenticate, meaning that it was authored by the developer of the program that is to be updated. On a basic level, the update clearly identifies the program that it is intended to update. In fact, the identity of a program is unique and clear so that the update utility can associate the update with the correct program. These same requirements apply to an update of a shared library. In some implementations, both issues of identification and authentication are solved with the use of a digital signature.

In some implementations, the developer digitally signs both the identifying information (e.g., the name of the program and the name of the developer) and the installation files. In some implementations, the developer creates a public/private key pair for use in a digital signature of the original distribution of the program. Thus, the developer distributes the public key and the digital signatures, along with the identifying information and installation files. Thereafter though, the developer distributes only digital signatures of the identifying information and files contained in an update. In some implementations, the user's computer is responsible for storing the original public key in order to authenticate the update.

The above approach is potentially vulnerable to a supply-chain attack, in which the attacker gains sufficient privilege to replace the files and their digital signature with malicious ones that are signed with the developer's private key. In some implementations, in order to reduce the possibility of such an attack, the files are stored on one computer and the digital signature is stored on a different computer (e.g., neither of which is connected to the Internet). In some implementations, at the time a user requests a download, the files and digital signature are copied to a server that is connected to the Internet. Thus, in order to perpetrate the supply-chain attack, the attacker would have to gain sufficient access to replace files stored on two different computers that are not directly connected to the Internet. The attacker could, instead, steal the private key and set up a server to pose as an authorized mirror, using a phishing attack to lure unsuspecting users into downloading the malicious update. In some implementations, in order to reduce this risk, all mirror sites obtain a certificate that is digitally signed by the developer. In some implementations, the user's computer authenticates the mirror server using this certificate before retrieving the update.

In some implementations, each user's computer establishes a basis for authenticating the server that distributes the original installation files and use this information for authenticating updates. For example, one approach involves the user's computer generating a symmetric key and a private/public key pair. In this example, the user's computer encrypts the symmetric key with the private key and sends it, along with the public key, to the server. The server then uses the public key to decrypt the symmetric key and then use the symmetric key to encrypt the entire installation distribution. Finally, the server destroys both the public key and the symmetric key but store the encrypted symmetric key in a separate storage location and associate it with the user's account using some form of index. When the user later wishes to download an update, the server first authenticates the user, then the user's computer transmits the user's public key so that the server can unlock the symmetric key and follow the same procedure for the update distribution. By adding this layer of protection, an attacker would additionally have to steal authentication data for each user, including the association between the user and the encrypted key. If that data is sufficiently protected, then the ersatz mirror server attack fails for another reason, even if the attacker is able to forge a counterfeit certificate. Protection against malicious update attacks rest on the ability of the developer to maintain the integrity of the update distribution and the ability of the user's computer to authenticate the server distributing the update.

In some implementations, once an update has been authenticated, it is installed in the same fashion as an original installation, except that writable application data files are not directly overwritten. In some implementations, the update includes a manifest that indicates which update executables are included and the order in which they are to be executed. In some implementations, as a last step in the update, each update application is executed in order.

Figure 27:
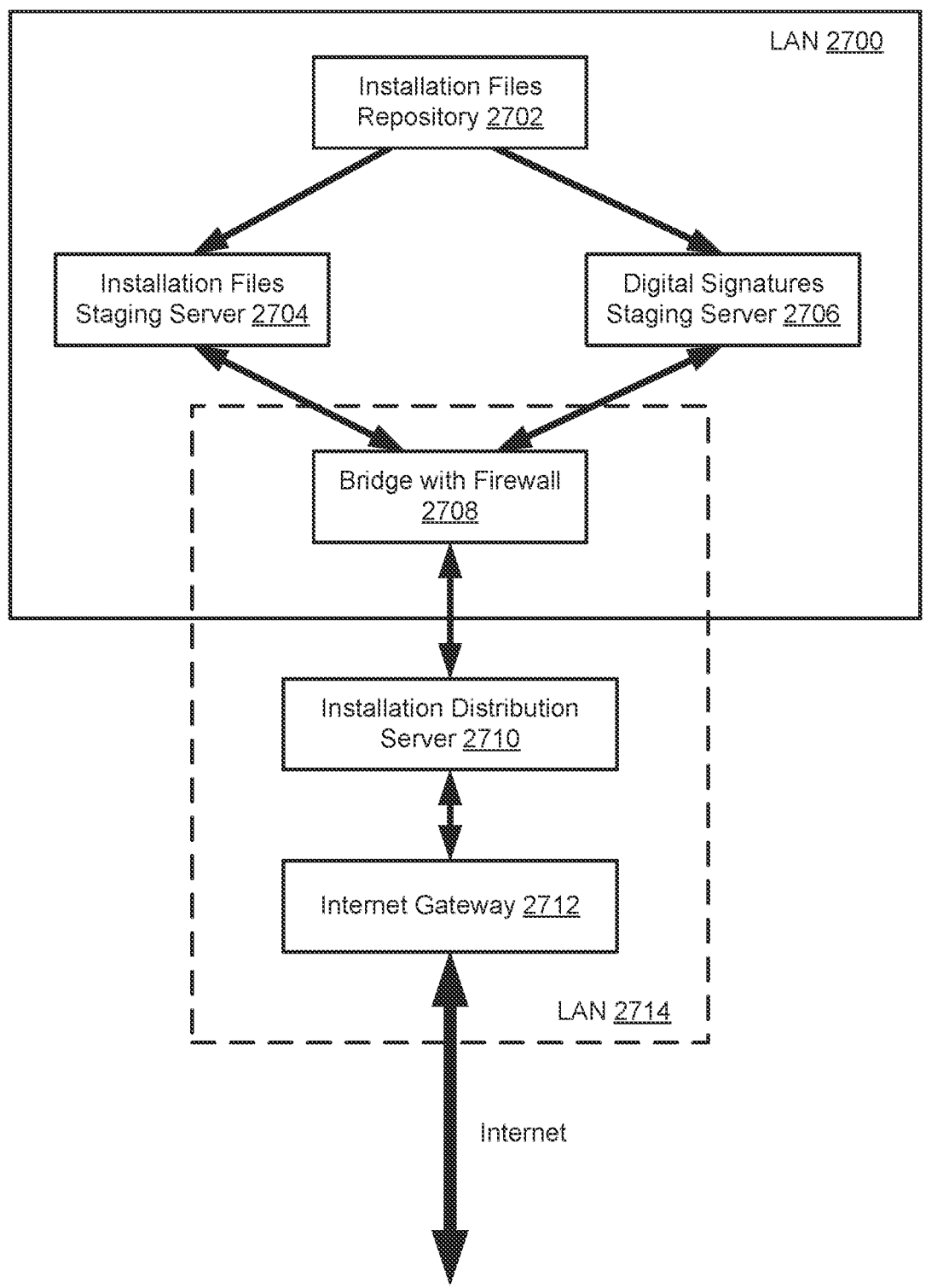
FIG. 27 illustrates an example architecture for providing installation files in accordance with some implementations.

In some implementations, the process of distributing an installation involves a developer setting up two local area networks (LANs), one designated LAN 2700 and the other LAN 2714 in FIG. 27. The LAN 2700 has no gateway server connected to the Internet. Instead, the LAN 2700 connects with the LAN 2714 through a bridge with firewall 2708 that permits only local traffic between the LANs. In some implementations, within the LAN 2700, the files for an installation reside in installation files repository 2702, along with application identity information and a public/private key pair. The key pair is used to compute a digital signature of the identity information and another signature of the installation files. In some implementations, the installation files, along with the identity information, are copied to the installation files staging server 2704. In some implementations, the digital signatures are copied to the digital signatures staging server 2706.

In some implementations, a request for the installation from a user's computer is received through the Internet at the internet gateway 2712 and passed to the installation distribution server 2710. The distribution server 2710 then sends a request to installation files staging server 2704 through the bridge with firewall 2708. In some implementations, in response, the installation files staging server 2704 transmits the installation files, including identity information, to the distribution server 2710 through the bridge 2708. In some implementations, the distribution server 2710 also sends a request to the digital signatures staging server 2706, which responds by transmitting the signatures back to the Distribution server 2710. In some implementations, both the request and response are transmitted through the Bridge 2708. In some implementations, once the Distribution server 2710 is in possession of the installation files and the digital signatures, it proceeds to transmit all of them to the requester through the Internet Gateway 2712 and then the Internet. In some implementations, the user's computer that transmitted the request then authenticates the installation files, including identity information, using the digital signatures.

Figure 28:
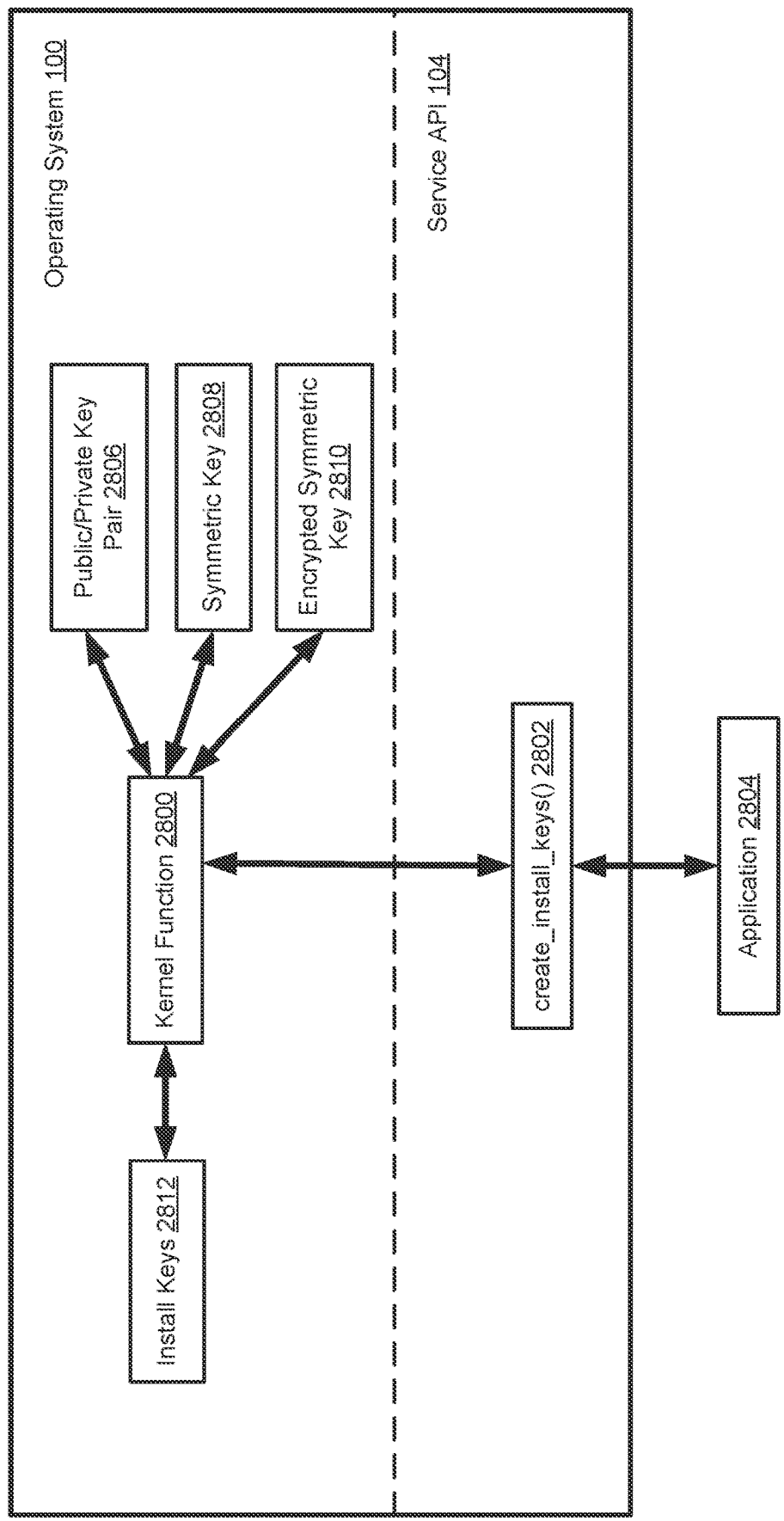
FIG. 28 illustrates an example operating system and example functions for key management in accordance with some implementations.

In some implementations, a system library function, create_install_keys( ) 2802 in FIG. 28, is created and its functionality is implemented in a kernel function 2800. In some implementations, an area of storage accessible only by the kernel, denoted install keys 2812, is allocated.

In some implementations, any application that intends to download an installation from a remote server (e.g., the application 2804 in FIG. 28) calls create_install_keys( ) 2802 with identification information about the installation. This information may be arbitrary and supplied by the user. In some implementations, the only constraint is that the user utilizes this same arbitrary identification information when installing the application, as discussed below.

In some implementations, the create_install_keys( ) function 2802 calls kernel function 2800, which creates a public/private key pair 2806 and a symmetric encryption key 2808. In some implementations, the kernel function 2800 stores a copy of both the key pair 2806 and the symmetric key 2808 in the install keys 2812 table, along with the arbitrary identification information. In some implementations, the kernel function 2800 encrypts symmetric key 2808 by using the private key of key pair 2806, thereby creating encrypted symmetric key 2810. In some implementations, the kernel function 2800 returns the public key of the key pair 2806 and the encrypted symmetric key 2810 to create_install_keys( ) 2802, which returns both to the calling application 2804. In some implementations, the application 2804 then transmits the keys to the server from which it requests the installation files.

In order to support this assurance scheme in some implementations, the developer also allocates storage space to store the encrypted symmetric key 2810 and associate it with the user. A server that stores identity and authentication data of users who request the installation, designated as user data 2900 in FIG. 29, may be maintained anywhere, although for purposes of demonstration it is included within the LAN 2700. In some implementations, when a user submits a request for the installation and includes the keys described above, the installation distribution server 2710 forwards the keys with the request for the installation files to the installation files staging server 2704. In some implementations, the installation files staging server 2704 transmits the encrypted symmetric key 2810, as explained with regards to FIG. 28, to the user data 2900, along with user identification data. The user data 2900 stores the encrypted symmetric key 2810 and associates it with the user. In some implementations, the installation files staging server 2704 decrypts the encrypted symmetric key 2810 using the public key of the key pair 2806, as explained above, and uses the symmetric key to encrypt the installation files before transmitting them to the installation distribution server 2710. In some implementations, the Installation files staging server 2704 then deletes its copy of the symmetric key. In some implementations, the installation distribution server 2710 sends the keys to the digital signatures staging server 2706, which also decrypts the encrypted symmetric key 2810 using the public key of the key pair 2806. In some implementations, the digital signatures staging server 2706 then encrypts the digital signatures using the symmetric key before transmitting them to the installation distribution server 2710. In some implementations, the digital signatures staging server 2706 also deletes its copy of the symmetric key. In some implementations, the installation distribution server 2710 then transmits all of the encrypted files to the computer of the requesting user and deletes its copy of both the public key and the encrypted symmetric key. Thus, by the end of the process, only the user data 2900 has a copy of the encrypted symmetric key and none of the developer's computers have a copy of the public key in accordance with some implementations.

Figure 30:
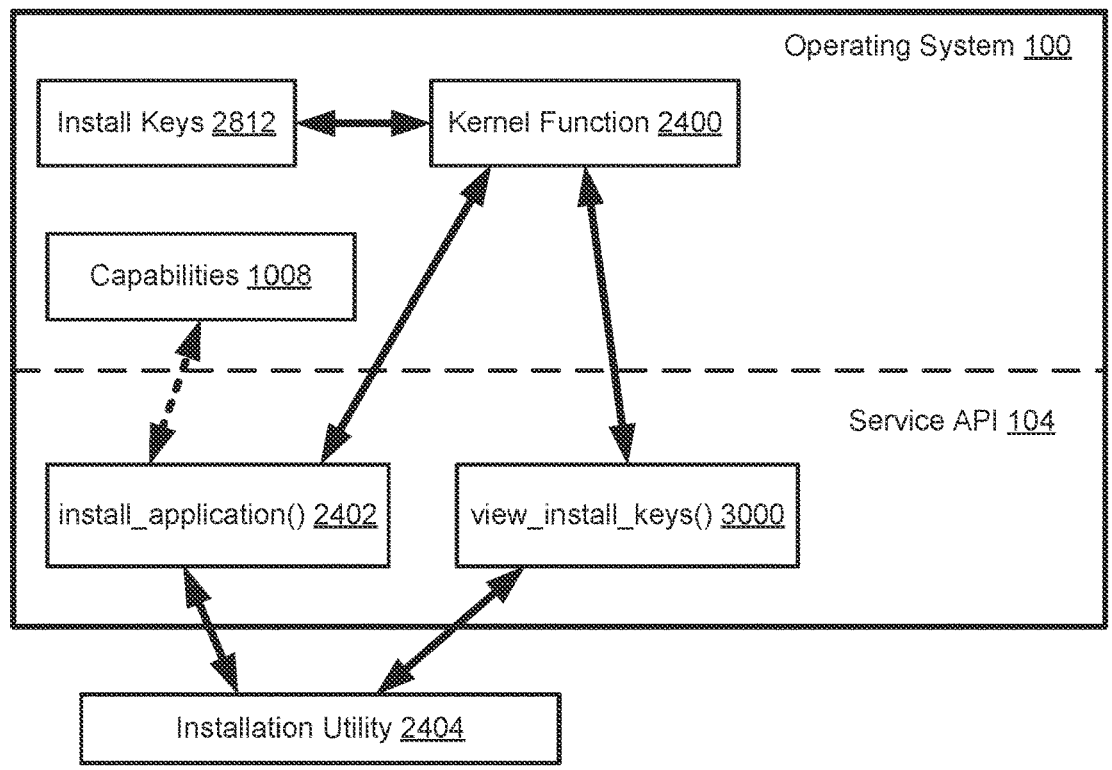
FIGS. 30-32 illustrate an example operating system and example functions for installation and key management in accordance with some implementations.

In some implementations, the application that requested the installation decrypts the installation files and digital signatures as part of the installation process. In some implementations, to support this additional functionality, a system library function, view_install_keys( ) 3000 is added and its functionality is implemented by a function in the kernel functions 2400, as shown in FIG. 30. In some implementations, at the time of installation, the installation utility 2404 calls view_install_keys( ) 3000, which calls the function in kernel functions 2400. In some implementations, the kernel function retrieves the list of keys from install keys 2812 and returns them, by way of the call to view_install_keys( ) 3000, to the installation utility 2404. In some circumstances, by displaying this list, the installation utility 2404 relieves the user of the burden of typing the identity information assigned to the particular installation. In some implementations, once the user has selected the appropriate key set by selecting its associated identity information, the installation utility 2404 calls the install_application( ) 2402 function, passing the symmetric key along with the list of files. In some implementations, the kernel function 2400 that implements the install_application( ) 2402 function decrypts all of the files, including the digital signatures, using the symmetric key, before proceeding with the installation process explained above and depicted in FIG. 24.

Figure 31:
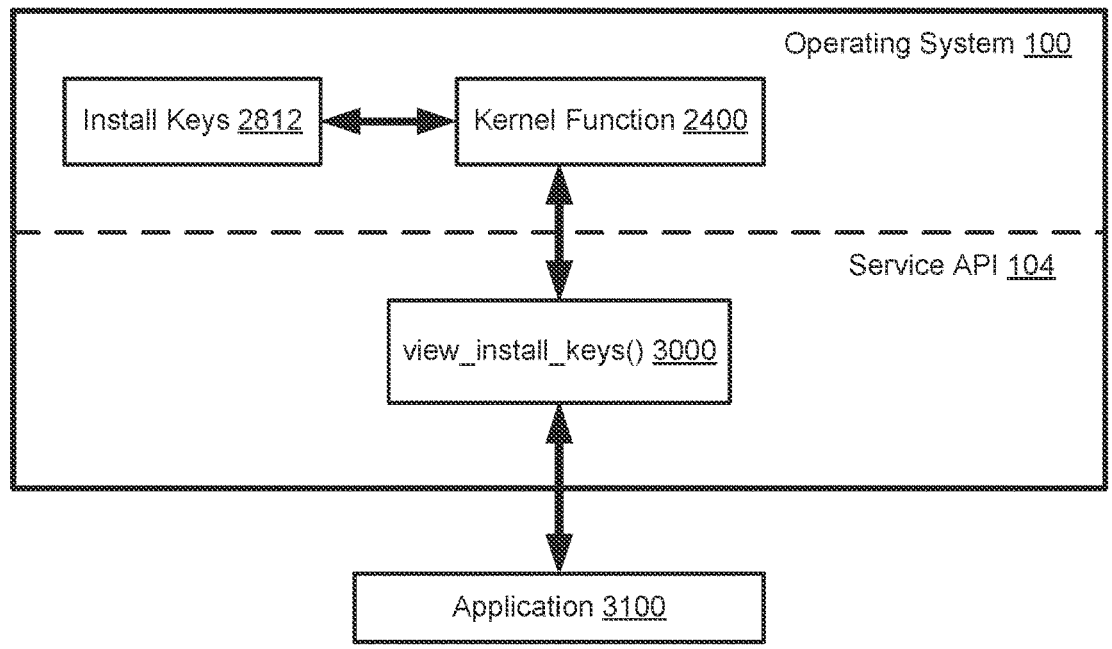

In some implementations, retrieving an update is a very similar process to retrieving an original installation. In some implementations, any application that retrieves an update, designated as 3100 in FIG. 31, calls view_install_keys( ) 3000 to retrieve the list of keys. In some implementations, once the user has selected the appropriate key set by selecting its associated identity information, the application 3100 transmits a request to the developer's computer. In some implementations, this request for the update includes the public key of the key pair 2806.

Figure 29:
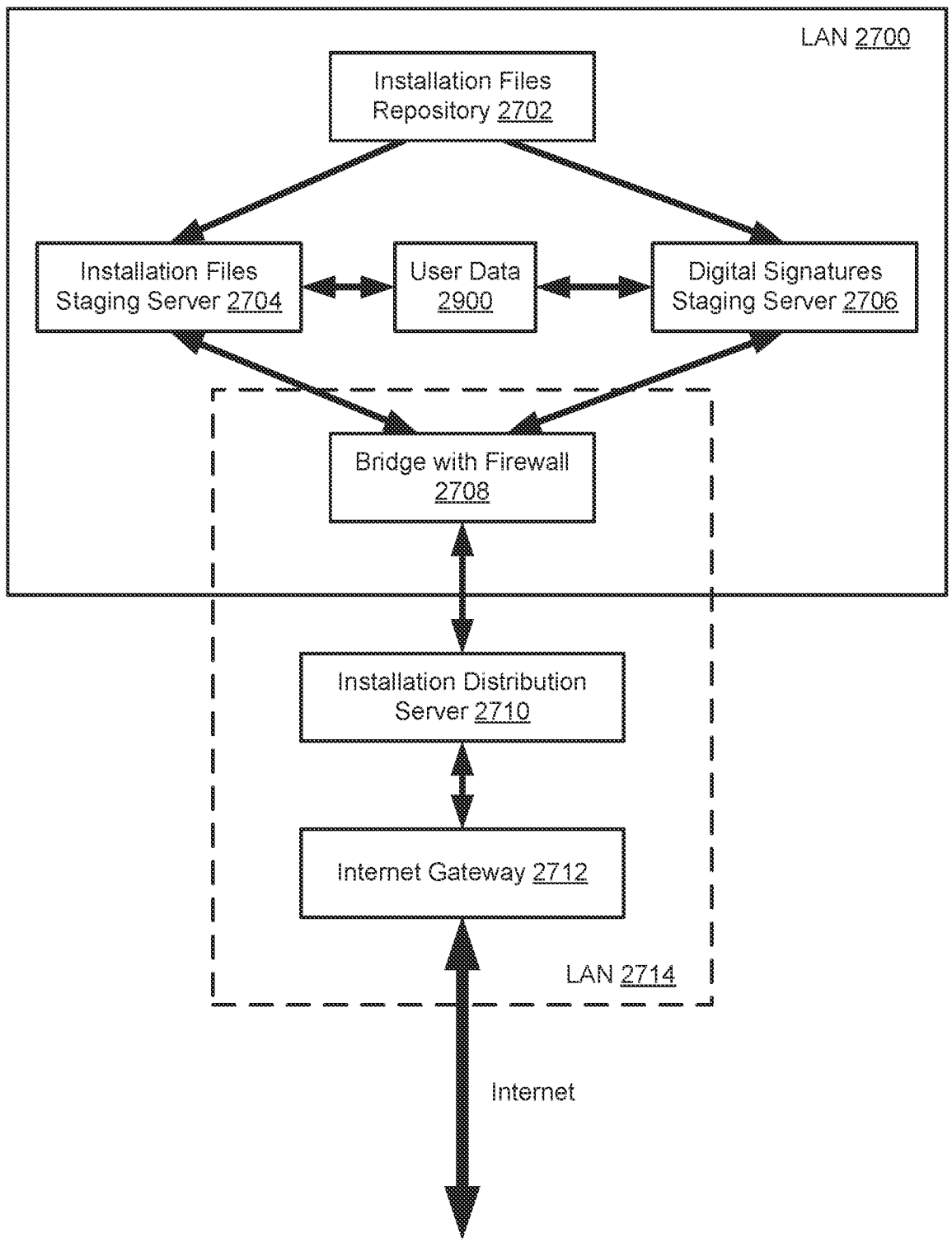
FIG. 29 illustrates another example architecture for providing installation files in accordance with some implementations.

In some implementations, the update installation is stored on the installation files staging server 2704 and its relevant digital signatures are stored on the digital signatures staging server 2706, as depicted in FIG. 29. In some implementations, when the installation distribution server 2710 receives the request for the update, it transmits the request and the public key, along with user identity information, to the installation files staging server 2704. In some implementations, the installation files staging server 2704 sends the user identity information to the user data server 2900 and requests the encrypted symmetric key. In some implementations, once it receives the encrypted key, the installation files staging server 2704 decrypts the encrypted key using the public key. In some implementations, the installation files staging server 2704 encrypts the update installation files using the symmetric key and transmits them to the installation distribution server 2710, then deletes its copies of the public key, the encrypted symmetric key, and the symmetric key. In some implementations, the installation distribution server 2710 sends the update request to the digital signatures staging server 2706, which also uses the user identity information to request the encrypted symmetric key from the user data server 2900. In some implementations, the digital signatures staging server 2706 decrypts the encrypted symmetric key, uses the symmetric key to encrypt the digital signatures, transmits the encrypted signatures to the installation distribution server 2710, and the destroys its copies of the public key, the encrypted symmetric key, and the symmetric key. In this way, by the end of the process of providing the update, neither the public key or the symmetric key remains on any of the developer's computers.

Figure 32:
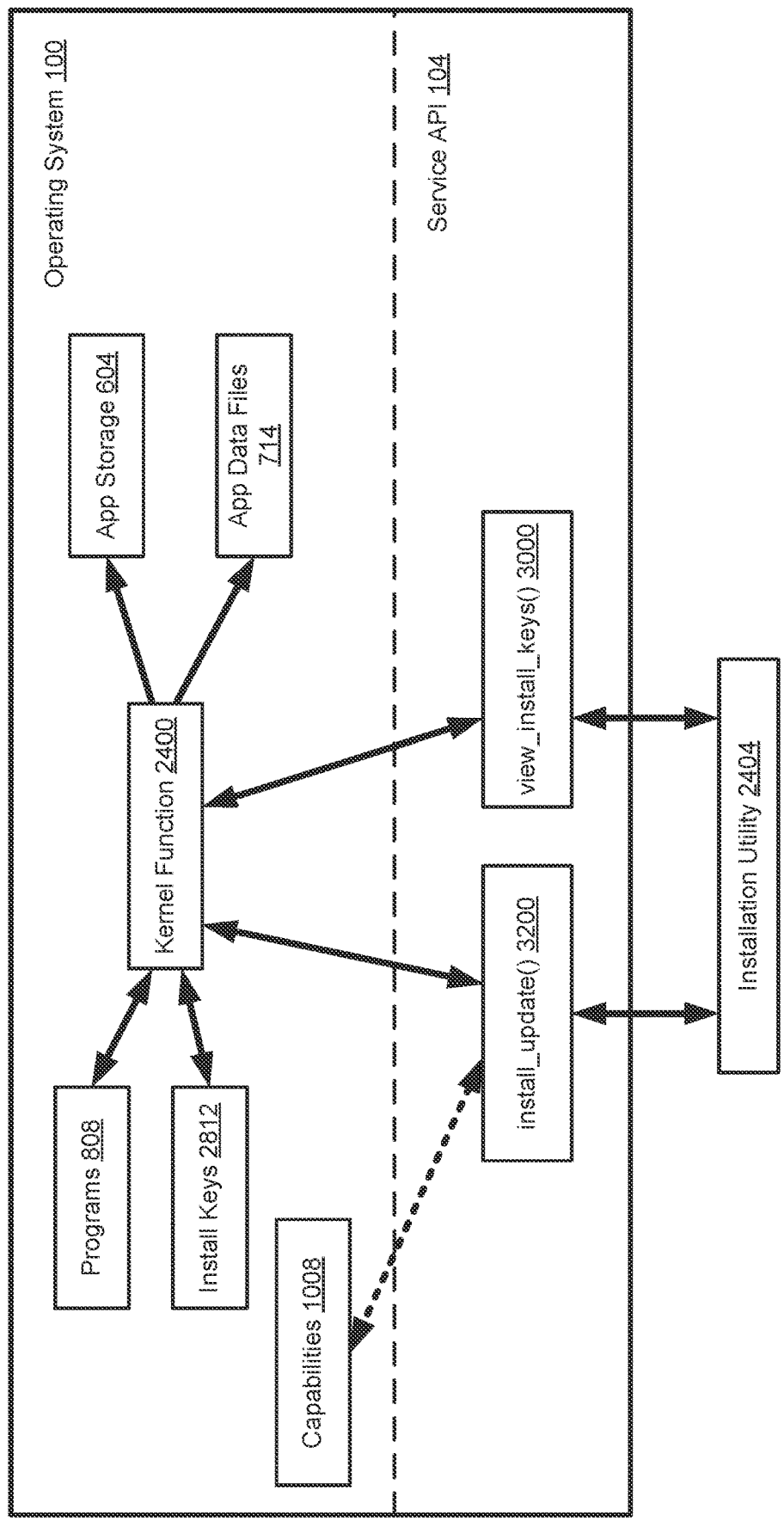

In some implementations, a function, install_update( ) 3200, as shown in FIG. 32, is added to the operating system. The functionality of the install_update( ) function 3200 is implemented by a function in the kernel functions 2400. In some implementations, at the time of installation of the update, the installation utility 2404 calls view_install_keys( ) 3000 in FIG. 32, which calls the function in kernel functions 2400. In some implementations, the implementing kernel function retrieves the list of keys from install keys 2812 and returns them, by way of the call to view_install_keys( ) 3000, to the installation utility 2404. In some circumstances, by displaying this list, the installation utility 2404 relieves the user of the burden of typing the identity information assigned to the particular installation. In some implementations, once the user has selected the appropriate key set by selecting its associated identity information, the installation utility 2404 calls the install_update( ) 3200 function, passing the symmetric key along with the list of files in the update. In some implementations, the kernel function 2400 that implements the install_update( ) 3200 function decrypts all of the files, including the digital signatures, using the symmetric key, and verifies the integrity of the installation files using the digital signatures. Because the installation already exists, the kernel function does not allocate any storage areas. In some implementations, the kernel function in kernel functions 2400 copies all executable modules in the update to the application's storage area within the Programs storage area 808, as depicted in FIG. 8 and shown in FIG. 32.

In some implementations, the manifest included with the update indicates whether each included read-only application data file is added as an overwrite or an update. In some implementations, for read-only files that are marked as overwrite, the kernel function in 2400 copies the read-only files in the update to the read-only section of the application's portion of the app storage 604, as depicted in FIG. 6 and shown again in FIG. 32, thereby overwriting the prior versions. In some implementations, if the read-only files potentially contain user data added via a configuration application, the developer instead includes an update application that revises the read-only application data files rather than overwriting them, which results in the potential loss of user data. In some implementations, the kernel function in 2400 copies all writable application data files to the prototype area of the application's App storage area 604, also depicted in FIG. 6 and shown again in FIG. 32, thereby overwriting the prior versions. In some implementations, if the application writes to application data files, the developer also includes update applications in the update that revise those files within the application's storage location within the App data files 714 location, as depicted in FIG. 7 and shown again in FIG. 32. In some implementations, once the kernel function in 2400 completes the copying of executable files and read-only application files, it executes each included update application in order. If the developer changes the format of user files, the main application is revised to detect when the user opens a user file formatted in a previous style and update it automatically. In some implementations, update applications cannot access user files in order to assure data security. In some implementations, the update procedure applies to updates of shared libraries, as well.

In some implementations, other programs and modules are not permitted to call the install_update( ) 3200 function. There are a variety of means to prevent other programs and modules from calling these system functions. In some implementations, a capability is afforded to the installation utility 2404 that permits it to call this function. In some implementations, the capability is stored in the table 1008. In some implementations, the kernel function in 2400 confirms the capability before performing its operations, as is represented by the dashed arrow in FIG. 32. In some implementations, this capability, controlled by the kernel, is not afforded to other programs (e.g., malware lacks the capability to update applications).

Removal of Applications

Figure 33:
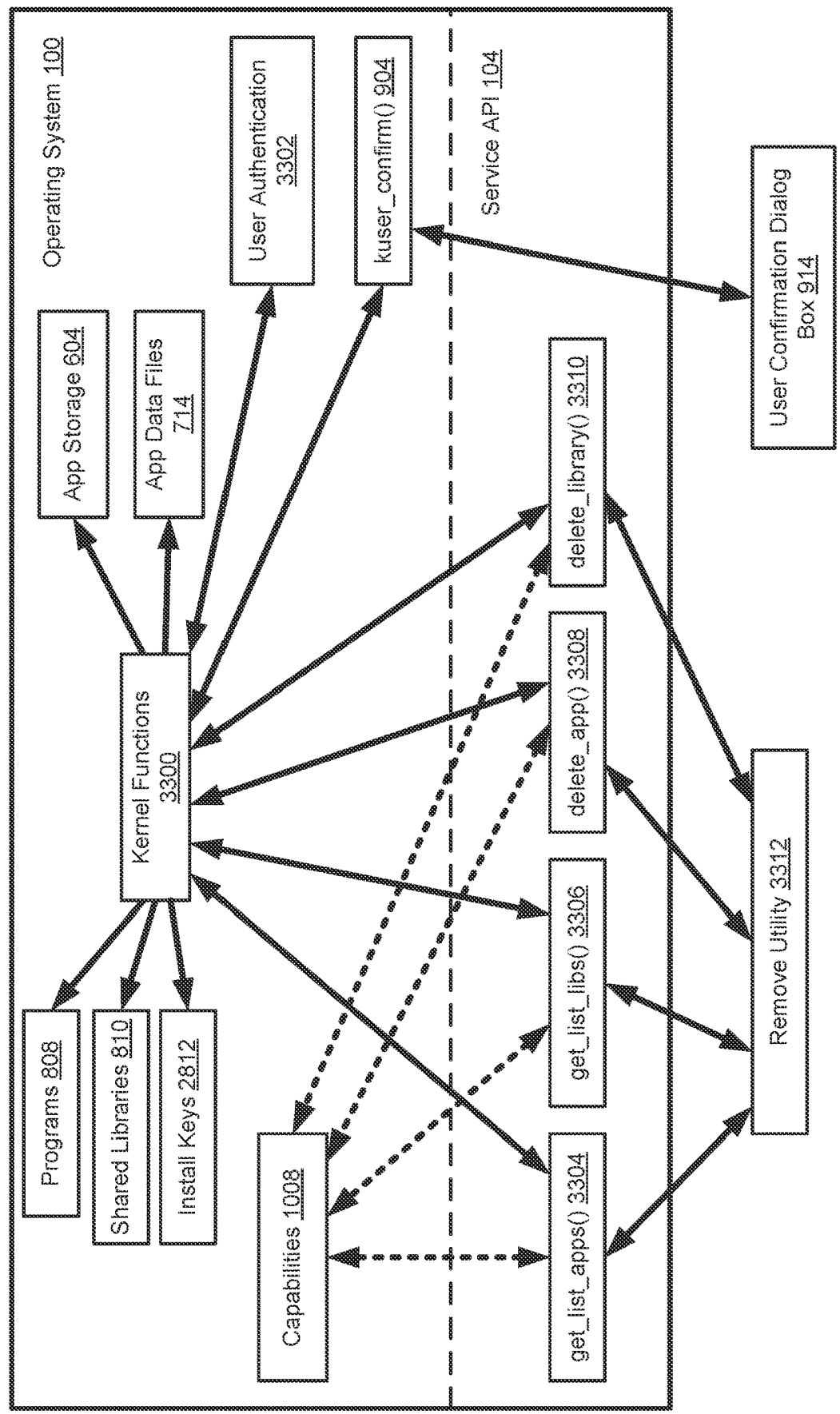
FIG. 33 illustrates an example operating system and example functions for removal utilities in accordance with some implementations.

In some implementations, an application removal utility that removes the software and all application data files is provided with the operating system. In some implementations, the removal utility allows removal of shared libraries. In some implementations, several system library functions are added to manage removal of applications and shared libraries. In some implementations, get_list_apps( ) 3304, get_list_libs( ) 3306, delete_app( ) 3308, and delete_library( ) 3310, depicted in FIG. 33, are added to the operating system. In some implementations, the functionality of each of these functions is implemented in appropriate functions in the group of kernel functions 3300. In some implementations, the user authentication function used by the operating system is identified as the user authentication 3302 function. In some implementations, a remove utility 3312 is added to the operating system distribution, as shown in FIG. 33.

In some implementations, the remove utility 3312 calls get_list_apps( ) 3304 and get_list_libs( ) 3306 in order to retrieve the list of installed applications and shared libraries. In some implementations, the user may select an application or shared library to remove using the remove utility 3312, which then calls delete_app( ) 3308 or delete_library( ) 3310, depending on whether an application is being removed or a shared library. In either situation, the pertinent kernel function in kernel functions 3300 calls the kuser_confirm( ) 904 function, which launches the user confirmation dialog box 914 to request user confirmation of the removal. In some implementations, the dialog box 914 requests user credential information, in addition to the confirmation response. In some implementations, if the user responds affirmatively, the kernel function transmits the user credential information to user authentication 3302 to authenticate the user. If the user is authenticated, the kernel function then removes files.

In some implementations, in the case of an application, the kernel function removes the executable files in the application's storage section within the Programs area 808 and removes the application's storage section. In some implementations, the kernel function removes all storage locations for the application within the App storage 604 section and removes the allocated storage. In some implementations, if the application writes to application data files, the kernel function also removes all storage locations for the application within the App data files 714 section and removes the allocated storage.

In some implementations, in the case of a shared library, the kernel function removes the executable files in the library's storage section within the Shared libraries area 810 and removes the library's storage section. In some implementations, the kernel function removes all storage locations for the library within the App storage 604 section and removes the storage. In some implementations, if the shared library writes to application data files, the kernel function also removes all storage locations for the library within the application's data storage. For example, in the case of shared library 716, depicted in FIG. 7, the kernel removes all files within the section allocated for the library 716 and removes the allocated storage. In some implementations, the kernel function removes the installation keys associated with the application or shared library from Install keys 2812.

In some implementations, a capability to call the get_list_apps( ) 3304, get_list_libs ( ) 3306, delete_app( ) 3308, and delete_library( ) 3310 functions is added to the capabilities table 1008 and afforded only to the remove utility 3312. In some implementations, the pertinent kernel functions that implement these functions check the capabilities table 1008 before executing their functionality. These relationships are represented by the dashed arrows in FIG. 33. In some implementations, this capability, controlled by the kernel, is not afforded to other programs (e.g., malware lacks the capability to remove applications and shared libraries).

In some implementations, updates cannot be removed using this approach. In some implementations, all files are automatically versioned by the operating system. In some implementations, versions of applications and shared libraries may be removed.

Subversion by Residual Memory Access

Although the foregoing procedures for isolating data in accordance with user volition protects against inadvertent exposure of data by file access, it may not prevent such exposures by use of dynamic memory. When an application is launched, the system provides dynamic memory for use by the program. For example, a portion of the dynamic memory is allocated for stack space. The last bytes stored in the stack area are exposed to the application as the stack is accessed. In some implementations, in order to prevent exposure of residual data, the area of dynamic memory that is allocated to the stack is cleared of residual data prior to starting a program. For example, all bytes in that area of memory are set to the value zero prior to calling the main function in the program.

The greater amount of dynamic memory accessed by applications is known as the heap. For example, applications initiate access to memory on the heap by a call to malloc or a system library function that calls malloc. Some systems include an alternative version, called calloc, that allocates a portion of the heap for use by the application but zeros out every byte in the allocation prior to returning to the application. In some implementations, all calls to malloc are rerouted to calloc to eliminate residual data exposures.

Subversion by Self-Modifying Code

In some implementations, the dynamic memory where executable code is loaded at startup or during execution is marked as read-only in order to prevent the code from directly modifying itself. In some implementations, at the time when execution of the application begins, the system records the program type in dynamic memory that is accessible only by the kernel so that the type can then be used as a runtime cross-check at the time system functions are called. Thus, even if the code is somehow able to modify itself, it is still limited to the appropriate set of system functions.

Subversion by GUI Framework Library

Some of the implementations described herein rely on the use of key presses and mouse clicks for evidence of user volition. Certain functions in the GUI framework libraries that are supplied with the operating system permit programmatic simulation of user mouse clicks or key presses. In some implementations, in order to prevent a rogue application from feigning such events, these functions are disabled, at least while evidence of volition is being gathered. Notably, the simulation of mouse clicks and key presses is important for testing applications, but in some implementations these abilities are restricted to special operating systems that are designed specifically for the testing of applications and other software development tasks.

Functions that restrict the simulation of mouse clicks and key presses exist in some GUI framework libraries, but they may be insufficient for the desired goal. For example, in Linux, the Xwindow functions XgrabKeyboard and XallowEvents can be used to restrict the passing of event messages temporarily but they do not eliminate the vulnerability completely. In some implementations, all functions that permit an application to send a fabricated hardware event message are eliminated. In some implementations, applications are afforded only the ability to send messages to the system, not to other applications. In some implementations, the content of such messages is limited to indications of the state of the sending application. In some implementations, the system is afforded the ability to send a message that a hardware event has occurred as only the system, by way of hardware interrupts, is capable of detecting that an event such as a mouse click or key press has actually occurred.

Preventing Unauthorized Access to User Data Files

Preventing surreptitious opening of user files may include determining the root of the area in a file system where a user stores their user files. Generally, the portion of the file system where users store their files is distinct from the areas where executable code and dependent data files are stored. Thus, the location of the user file area may be determined automatically (e.g., without specific user input). In situations and implementations where the location of the user file area is not determined automatically, a utility may be used to obtain user input as to the area(s) where the user files are stored. In some implementations, the user is prompted to indicate whether to allow automatic detection or use the utility.

Almost invariably, users interact with some GUI element on a computer screen prior to opening or deleting of a file. This interaction strongly indicates the volition of the user to open or delete the designated file. Accordingly, this volition information can be harnessed by the operating system to guard against secret attempts to open or delete files by malware. Malware typically lacks the ability to interact with GUI elements prior to an attempt to open a file.

In some implementations, the system "open" function is modified such that if an application attempts to open a file that exists within the user area, the system displays a modal dialog box that requires user approval of the action. User consent can be detected automatically and, therefore, dispensed with in two scenarios. When a user selects a file in a file manager and requests that it be opened by an application, such as by double-clicking on the file name, the user is triggering a call to a system "exec" function that starts the application. The name of the file is then supplied as a command line argument within the "exec" call. When "exec" is called, the system can record the action so that when the newly-launched application tries to open the file, the system will recognize that the user selected it. Similarly, when the user selects an option within an application to open a user file, a file chooser dialog box that is supplied by a GUI toolkit is typically displayed. If the toolkit library is supplied with the OS distribution, the library can be revised so that the system can record the name of the file selected by the user and, thereafter, confirm that the subsequent call to "open" reflects this choice. In short, users characteristically open their files through file manager and file chooser dialog box action, which reflects their volition. Opening a user file without the involvement of these GUI activities renders the "open" call suspect and, therefore, should require explicit user confirmation.

In some implementations, identification of files as user files or application data files depends on the location where a file is located within the file system. As a general rule, current operating systems advocate the storage of user files in a different area of the file system than application data files. The root path for the area where user files are stored is specified by the operating system, although users are not prevented from storing their user files in other locations. Application data files characteristically are stored in a special area of the file system that is associated with the relevant application. Nonetheless, computer operating systems do not commonly enforce "sandboxing." That is, operating systems generally do not require separation of files and imposition of constraints. Because of this, current operating systems do not guarantee the location of application data files relative to their applications, even though they customarily follow a general pattern.

In some implementations, the default path for user files is used as the root path of the locations where user files are stored. In some implementations, a supplied utility permits users to easily designate one or more root paths for locations of their files. In order to guarantee the location of application data files, primitive sandboxing is generally added to the operating system. Although sandboxing of application data files may be achieved in a variety of ways, the following description shows how some implementations achieve this result.

Figure 34:
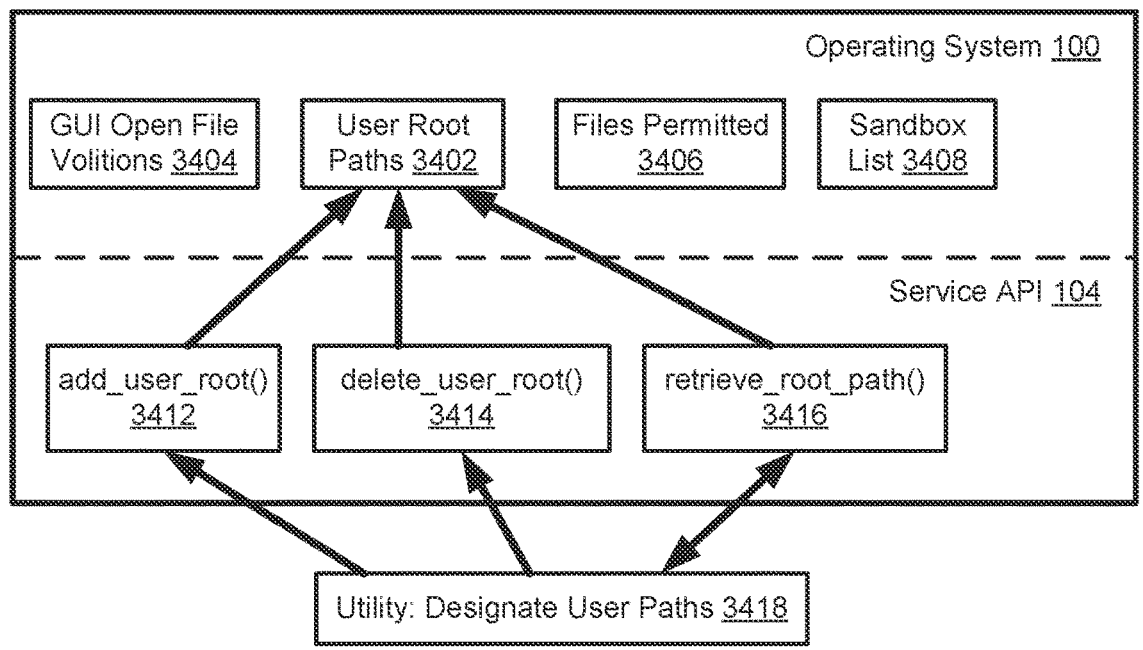
FIGS. 34-41 illustrate an example operating system and example functions used to prevent unauthorized file access in accordance with some implementations.

FIGS. 34-41 illustrate an example operating system and example functions used to prevent unauthorized file access in accordance with some implementations. In some implementations, an area of storage that is accessible only by the kernel is set up within the operating system 100 in FIG. 34 for four tables of information. The user root paths table 3402 in FIG. 34 stores the directory paths where subdirectories containing user files are stored in accordance with some implementations. When the operating system 100 is updated, a default root path is stored in the path table 3402, based on the particular operating system. In some implementations, storage space is allocated for GUI open file volitions table 3404 in FIG. 34 but no entries are added at the time of installation. In some implementations, storage space is allocated for the files permitted table 3406 in FIG. 34 and, again, no entries are added at the time of installation. In some implementations, storage for the sandbox list 3408 in FIG. 34 is also allocated. The sandbox list 3408 stores sandbox records. In some implementations, each sandbox record includes the internal identifier of an application and the filesystem path where data files associated with the application are stored.

In some implementations, the installation includes several operating system functions, accessed through the Service API 104 in FIG. 34, to manage and utilize these tables. The functions add_user_root( ) 3412 and delete_user_root( ) 3414 add and remove root paths in the user root paths table 3402. The function retrieve_root_path( ) 3416 retrieves root paths stored in the user root paths table 3402. A utility called "Designate User Paths" 3418 in FIG. 34 is also added with the installation. In some implementations, this utility is permitted to call the functions add_user_root( ) 3412, delete_user_root( ) 3414, and retrieve_root_path( ) 3416, e.g., to provide an opportunity for the user to manage the path table 3402 by viewing, adding, and removing the root paths.

In some implementations, calls to the add_user_root( ) 3412 and delete_user_root( ) 3414 functions are limited to the utility 3418. There are a variety of means to prevent other programs from calling these system functions. In some implementations, a capability is added to the system that permits a program to call the add_user_root( ) 3412 and delete_user_root( ) 3414 functions. In some implementations, this capability, controlled by the kernel, is afforded to the utility 3418 but no other programs. Hence, malware lacks the capability to remove or revise the user root paths stored in path table 3402.

Figure 35:
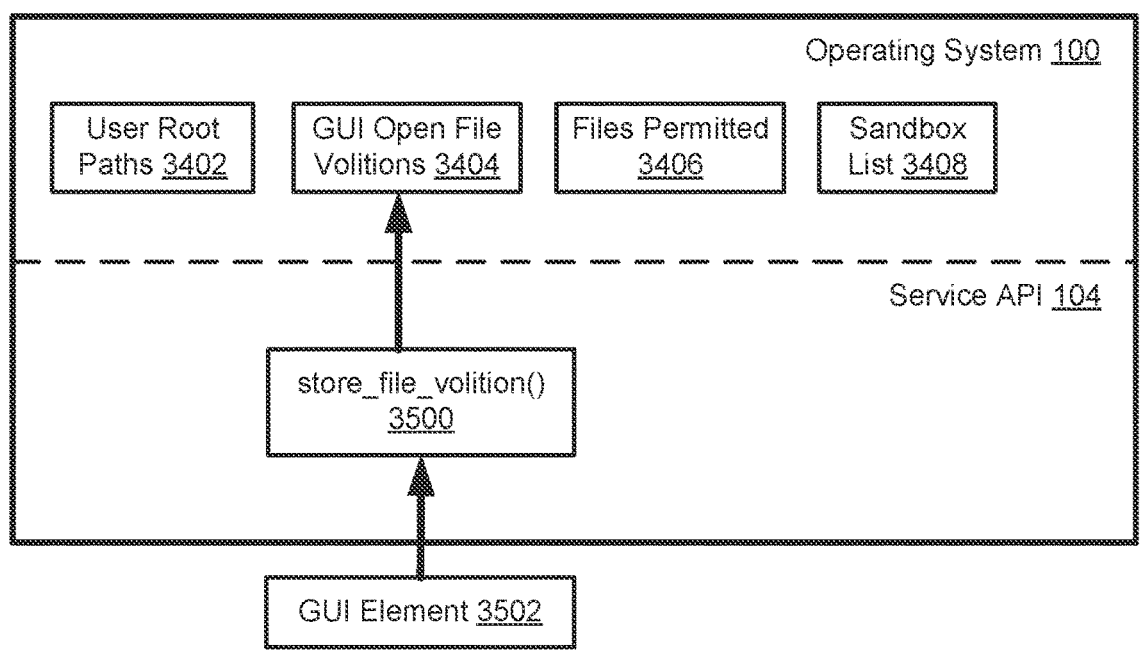
Figure 36:
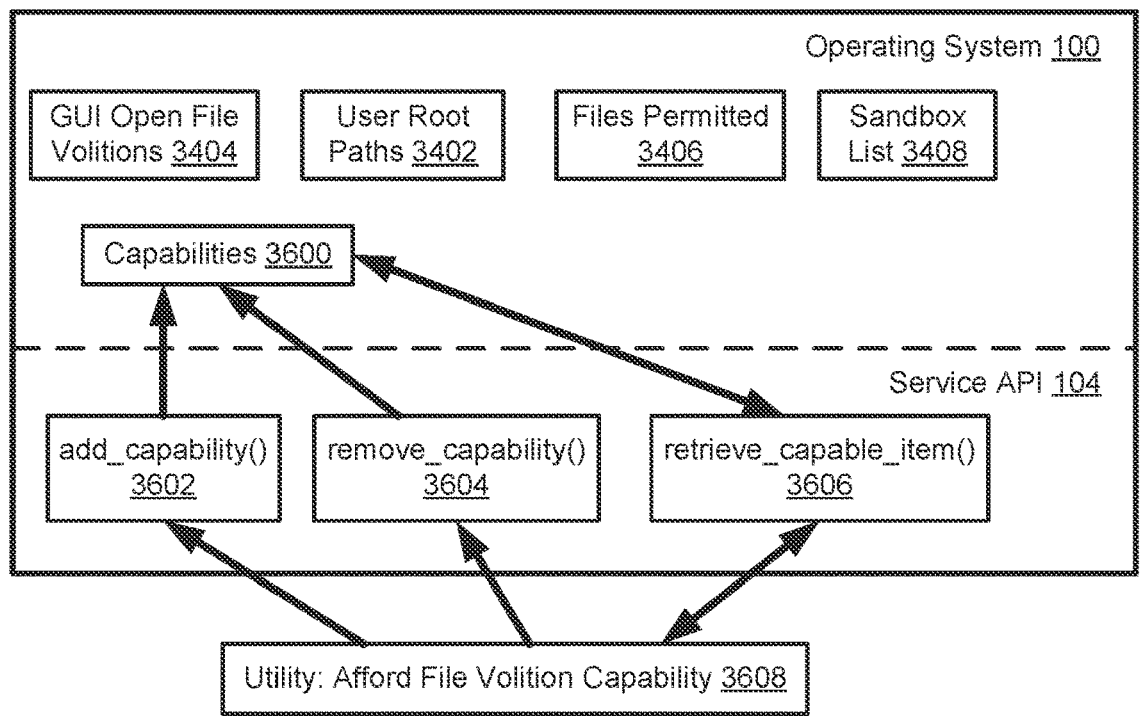

In some implementations, the operating system includes a store_file_volition( ) function 3500, as shown in FIG. 35. This function stores information about a particular file that the user wishes to be opened by a particular application in a GUI open file volitions table 3404 (also referred to as the "Volition Table"). In some implementations, a user volition is derived from user interaction with one of a variety of Graphical User Interface (GUI) elements present on the computer screen. In some implementations, when a GUI element 3502 calls the store_file_volition( ) function 3500, the element passes two pieces of data. Specifically, the call passes the file path, e.g., the name and location of the file, and the name of the application that the user wishes to use to open the file. In some implementations, the store_file_volition( ) function 3500 function creates a data record (in the volition table 3404) of the file path, the time when the function was called, and the name of the application associated with opening the file. The store_file_volition( ) 3500 function inserts the data record into the GUI open file volitions table 3404.

In order to regulate which GUI elements may call the store_file_volition( ) function 3500, operating system protection is added. There are a variety of means to restrict which programs may call the store_file_volition( ) function 3500. In some implementations, additional capabilities and a utility are added. The first capability is the ability to call the store_file_volition( ) function 3500. The remaining capabilities involve managing the first capability. All of these capabilities are stored where the operating system regularly maintains capabilities, designated in FIG. 36 as the capabilities table 3600. In some implementations, management of the first capability involves three system functions: the add_capability( ) function 3602, the remove_capability( ) function 3604, and the retrieve_capable_item( ) function 3606. The capability utility 3608 is a graphical application that is constructed to permit users to directly manage the capability to call the store_file_volition( ) function 3500. In some implementations, the capability utility 3608 manages this capability by calling the functions add_capability( ) 3602, remove_capability( ) 3604, and retrieve_capable_item( ) 3606. In some implementations, capabilities are also added to the capability table 3600 to afford only utility 3608 the capability to call these functions. Consequently, malware lacks the capability to grant itself the ability to call the store_file_volition( ) function 3500.

Figure 37:
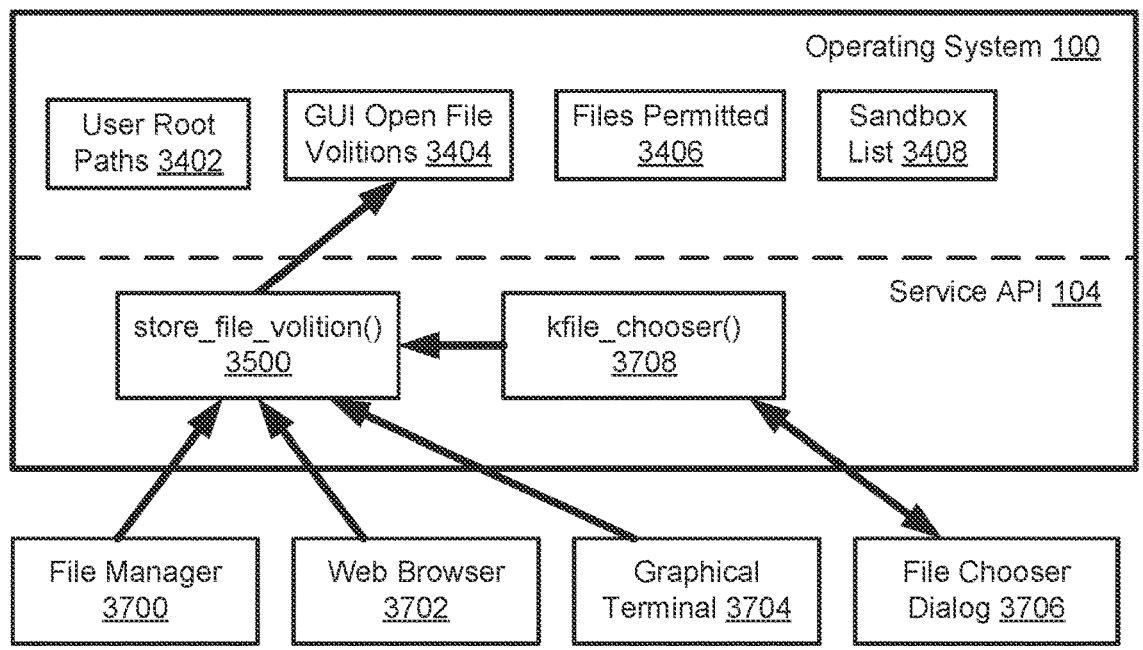

In some implementations, several GUI elements that are distributed with the operating system are afforded the capability to call the store_file_volition( ) function 3500. In particular, the file manager 3700 and a default web browser 3702 in FIG. 37 are afforded the capability to call the store_file_volition( ) function 3500. In some implementations, the graphical command line program 3704, commonly called the terminal program, is also afforded the capability. Notably, the terminal program is used to pass commands to various command line shell programs that are usually included in the operating system distribution. In some implementations, although the terminal program 3704 itself is afforded the capability to call the store_file_volition( ) function 3500, the various command line shell programs are not. In some implementations, GUI toolkits supplied with operating systems contain a function that creates such a file chooser dialog box 3706. The update includes a kfile_chooser( ) function 3708. This function 3708 creates an file chooser dialog box 3706, but it has also been granted the capability to call the store_file_volition( ) function 3500. As part of the update, the GUI toolkit's ordinary file chooser dialog box function is remapped to call the kfile_chooser( ) function 3708. Notably, the file chooser dialog box function typically supplied permits a user to specify the name of an existing file to open for reading and writing, as well as the name for a new file that is being saved.

Figure 38:
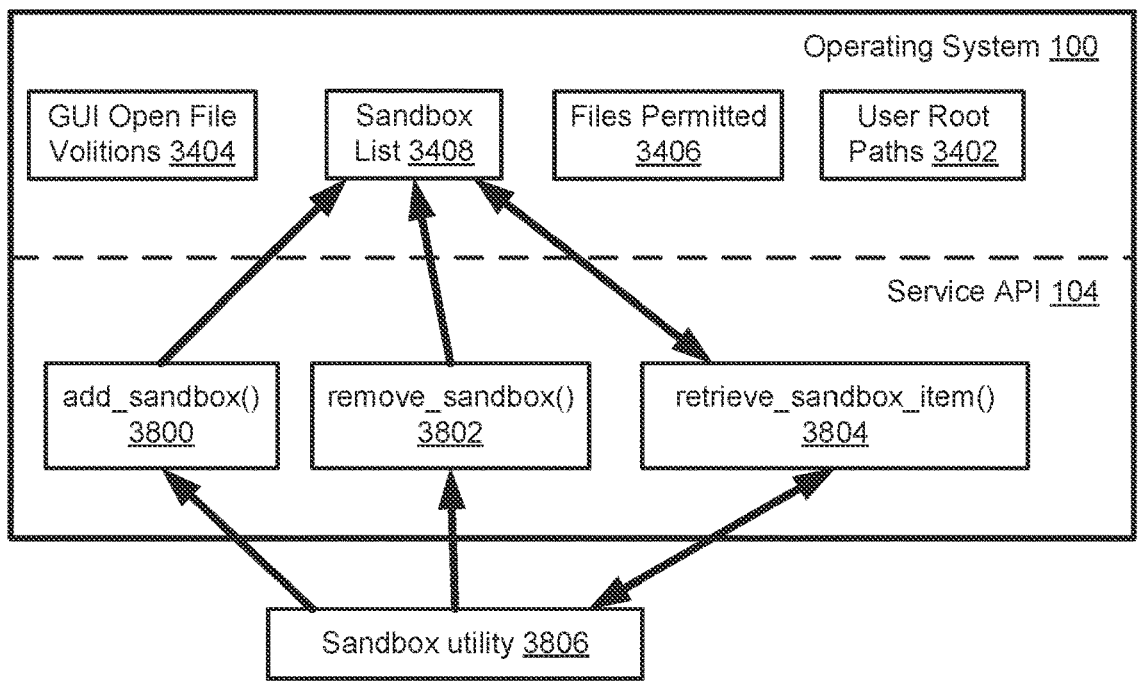

In some implementations, the functions add_sandbox( ) 3800, remove_sandbox( ) 3802, and retrieve_sandbox_item( ) 3804 are added in FIG. 38 to manage the sandbox list 3408. In some implementations, a graphical sandbox utility 3806 calls these functions, thereby permitting users to directly manage the list of applications that are associated with sandboxes. In some implementations, capabilities are added to the capabilities table 3600 so that only the sandbox utility 3806 may call these functions.

Figure 39:
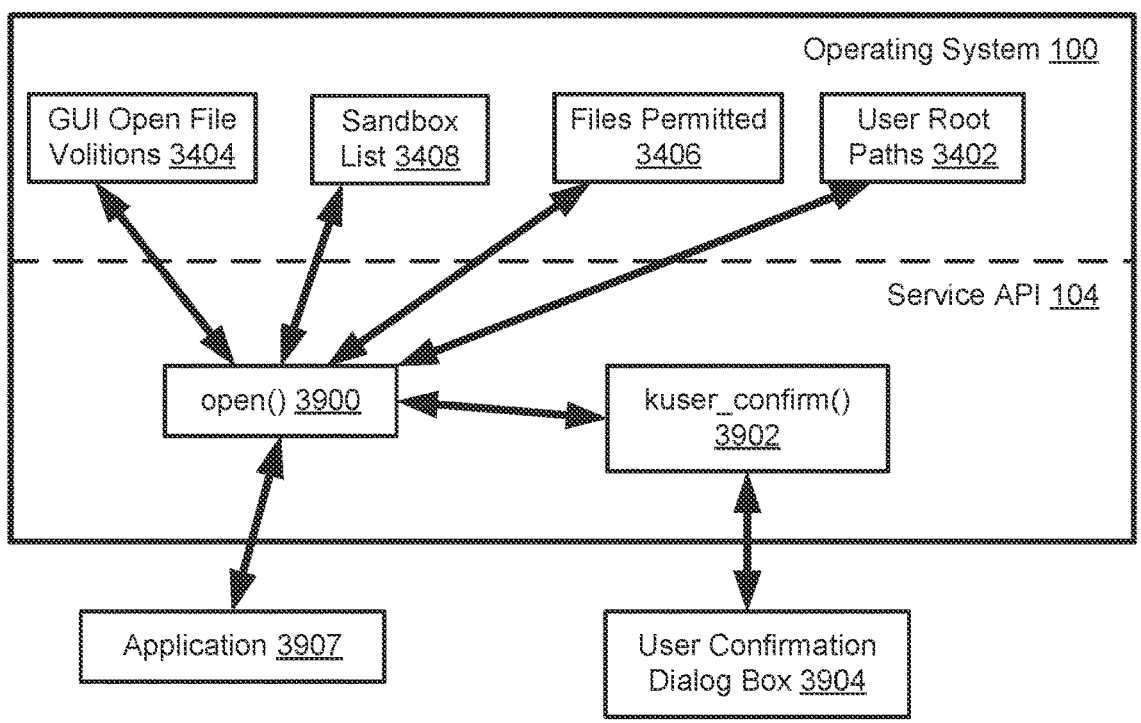

In some implementations, the enhanced operating system also includes a revised version of the typical file open( ) function 3900, as illustrated in FIG. 39. In some implementations, the enhanced operating system also includes a kuser_confirm( ) function 3902, which creates a user confirmation dialog box 3904. The use of these additions is described below.

With all of the previously described components installed and the system initialized with respect to user root paths, the process for regulating the opening of files in order to prevent the surreptitious opening by malware involves the registering of user open file volitions in the volitions table 3404, as described above, and a call to the system function to open a file. For example, at any time though, an application 3907 in FIG. 39 may attempt to open a file by calling the open function 3900. Initially, the open function 3900 queries the files permitted table 3906 for a record indicating that the user has previously permitted the application 3907 to open the named file. If such a record exists, then the open( ) function 3900 continues normally (e.g., the file is opened, without further processing).

In some implementations, if no such record exists, the open( ) function 3900 retrieves the paths stored in user root paths table 3402 to determine whether the file path matches or is a subset of a root path stored in path table 3402. If the test succeeds, the file is considered to be a user file. If no match is found, the file is considered an application data file. In the case of an application data file, the open( ) function 3900 retrieves from the sandbox list 3408 the sandbox record associated with the application 3907. If the file path matches or is a subset of the filesystem path stored in the sandbox record, then the file is related to the application and open( ) function 3900 proceeds normally. Otherwise, the open( ) function 3900 queries the GUI open file volitions table 3404 for a timely entry that matches the name of application 3907 and the file path. In some implementations, timeliness of entries in table 3404 is determined by the difference between the time that the open( ) function 3900 is called and the time that the data record in the GUI open file volitions table 3404 was created. For example, by default, records that are less than 5 seconds old are considered timely and all others are considered expired (and may be removed during the query). Other implementations use different lengths of time to judge timeliness (e.g., less than one second or less than two seconds) The amount of time that is used as the benchmark for timeliness may be configured within certain limits by the user via a utility supplied with the operating system. If such a timely entry is found, the open( ) function 3900 creates a new data record (e.g., consisting of the application name and the internal identifier for the file path) and adds the record to the files permitted table 3406. Thereafter, the open( ) function 3900 proceeds normally. If no such entry is found in table 3404, the open( ) function 3900 calls the kuser_confirm( ) function 3902, which creates a user confirmation dialog box 3904. In some implementations, the dialog box 3904 contains a warning that a program that is trying to access a file is likely malware and asks the user if the application 3907 may open the named file. If the user indicates in the affirmative, such as by clicking on a "Yes" button on the dialog box 3904, then the open( ) function 3900 adds the data record to the file permitted table 3406, as described before, and proceeds normally. If the user indicates negatively, such as by clicking on a "No" button on the dialog box 3904, then the open( ) function 3900 terminates immediately, returning an error message to application 3907. In some implementations, negative decisions are recorded so that repeated attempts by malware do not require user input to reject every time.

With the enhanced operating system deployed, malware will attempt to open a file without the ability to first use a GUI element, such as the file manager 3700, the web browser 3702, the graphical terminal 3704, or the file chooser dialog box 3706. Accordingly, no record relating to that file and the malware application will exist in either the GUI open file volitions table 3404 or the files permitted table 3406, thereby triggering the display of the user confirmation dialog box 3904. Thus, the user confirmation dialog box 3904 will appear almost exclusively when malware is attempting to open a file secretly. Moreover, in some implementations, malware that the user has not explicitly added to the sandbox list will lack the ability to open files without first seeking permission via the dialog box 3904.

In some implementations, a similar mechanism is used to protect files from being deleted surreptitiously. Deletion specifically refers to the removal of the file node from the file system, as opposed to the removal of all file content, which is accomplished by calling the open( ) function 3900 with the truncation flag. In some implementations, the operating system function responsible for deleting files from the file system is revised so that it does not perform its function unless requested by the user or the associated application. One means for achieving this end is to revise an existing system function so that it may not delete user files, although it will still be permitted to delete application data files. In some implementations, an internal version of the function is created for use with the file manager distributed with the operating system, which is the GUI component relied upon primarily by users for deleting their files.

Figure 40:
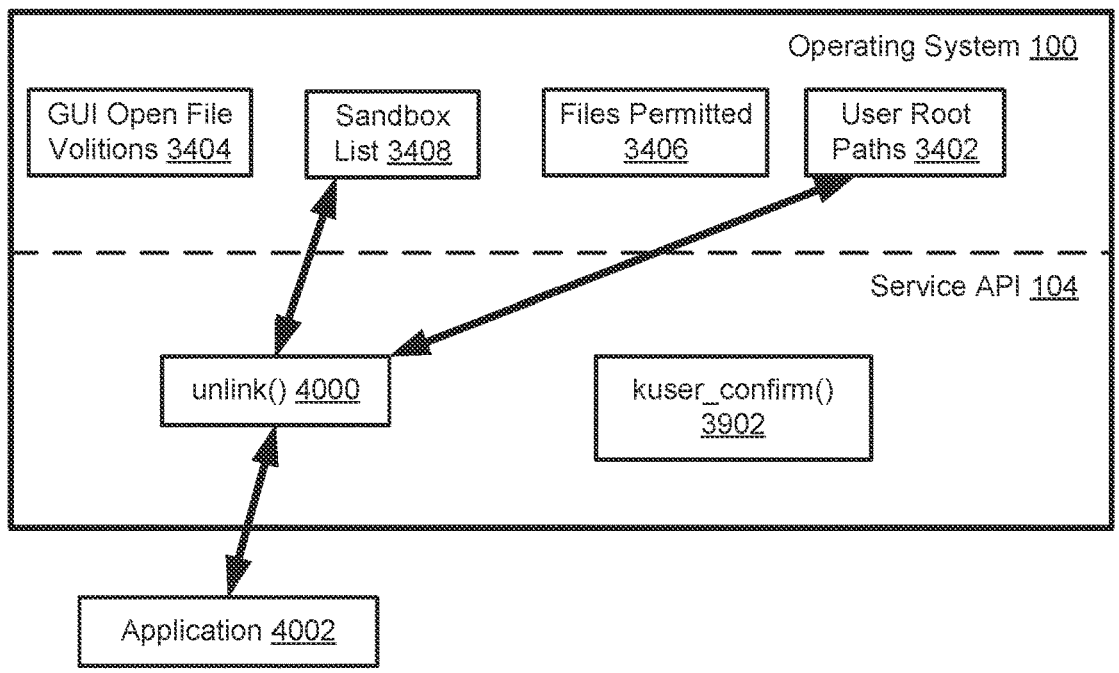

For example, in the Linux operating system, the system function responsible for deleting files is named unlink, noted by the unlink( ) function 4000 in FIG. 40. In some implementations, when any application other than the file manager (e.g., the application 4002) calls the unlink( ) function 4000, the unlink( ) function 4000 retrieves paths from user root paths table 3402 to determine whether the file is a user file or an application data file. If the file is a user data file, the unlink( ) function 4000 merely returns an error message to the calling application 4002. If the file is an application data file, the unlink( ) function 4000 retrieves from the sandbox list 3408 the sandbox record associated with the application 4002. If the file path matches or is a subset of the filesystem path stored in the sandbox record, the file is related to the application and the unlink( ) function 4000 proceeds normally. Otherwise, it returns error message to the application 4002.

Figure 41:
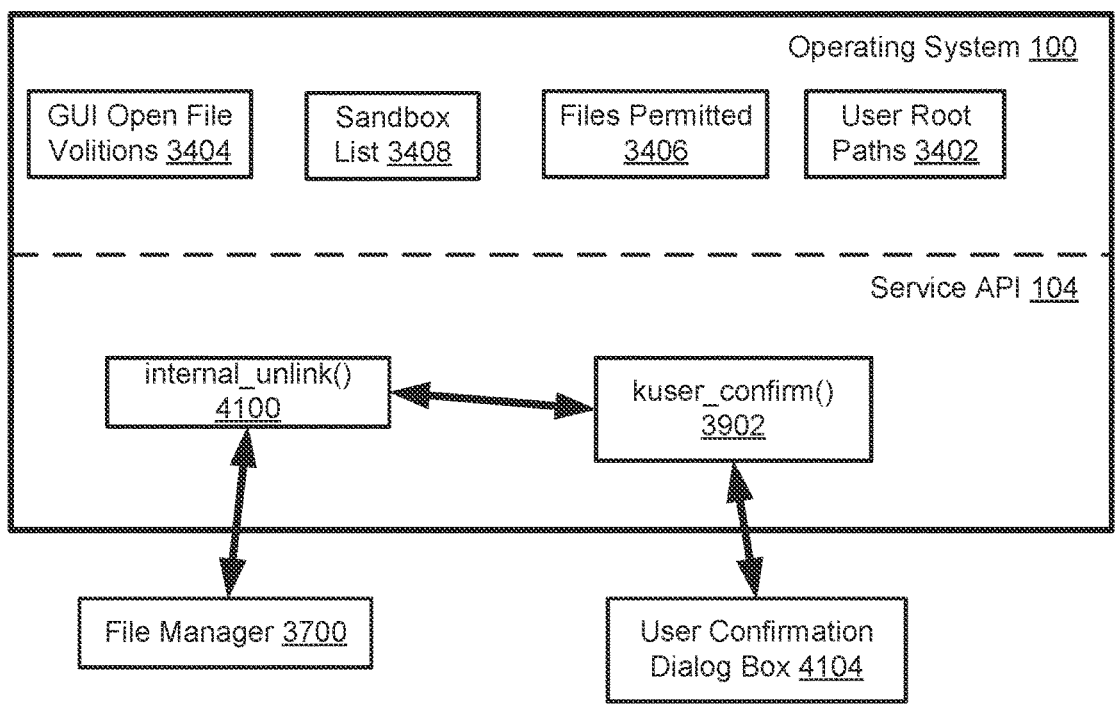

In accordance with some implementations, a new internal version of the unlink( ) function 4000 is the internal unlink( ) function 4100, as shown in FIG. 41. In some implementations, the internal unlink( ) function 4100 is created with the same function prototype as the unlink( ) function, so that it receives the path of the file to be deleted as a parameter. In some implementations, the internal_unlink( ) function 4100 calls the kuser_confirm( ) function 3902, which displays the user confirmation dialog box 4104. In some implementations, the dialog box 4104 displays a standard message asking whether the user wishes to delete the designated file. Notably, users are accustomed to seeing such a request for confirmation when deleting files using a file manager. The dialog box 4104 returns the user's response to the internal_unlink function 4100, which deletes the file if the user confirmed the action.

If malware could call the internal_unlink( ) function 4100, the user confirmation dialog box 4104 would appear and, perhaps, cause confusion. A careless user may well click on the "Ok" button simply to avoid further inconvenience, not realizing that the request was generated by malware. Accordingly, in some implementations, the internal_unlink( ) function 4100 is protected from being called by malware. There are various ways to prevent malware from calling this function. In some implementations, a capability to call the function is created in the kernel of operating system 100 and afforded to the file manager program 3700 that is distributed with the operating system. No other program is afforded this capability. Accordingly, malware is prevented from calling the internal_unlink( ) function 4100.

Figure 42A:
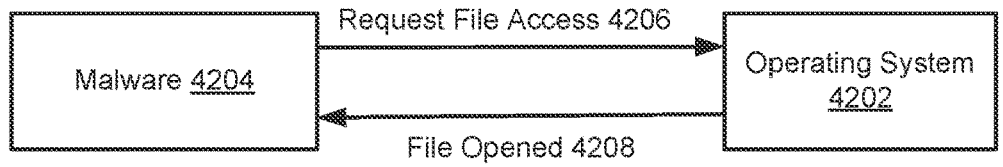
FIG. 42A illustrates typical file access in accordance with some implementations.

FIG. 42A shows typical file access. An application (including malware 4204) can request 4206 access to a file from the operating system 4202. In general, the file is opened 4208, unless the requested file is a system file. In this way, malware 4204 can gain access to user data files without a user's knowledge or permission.

Figure 42B:
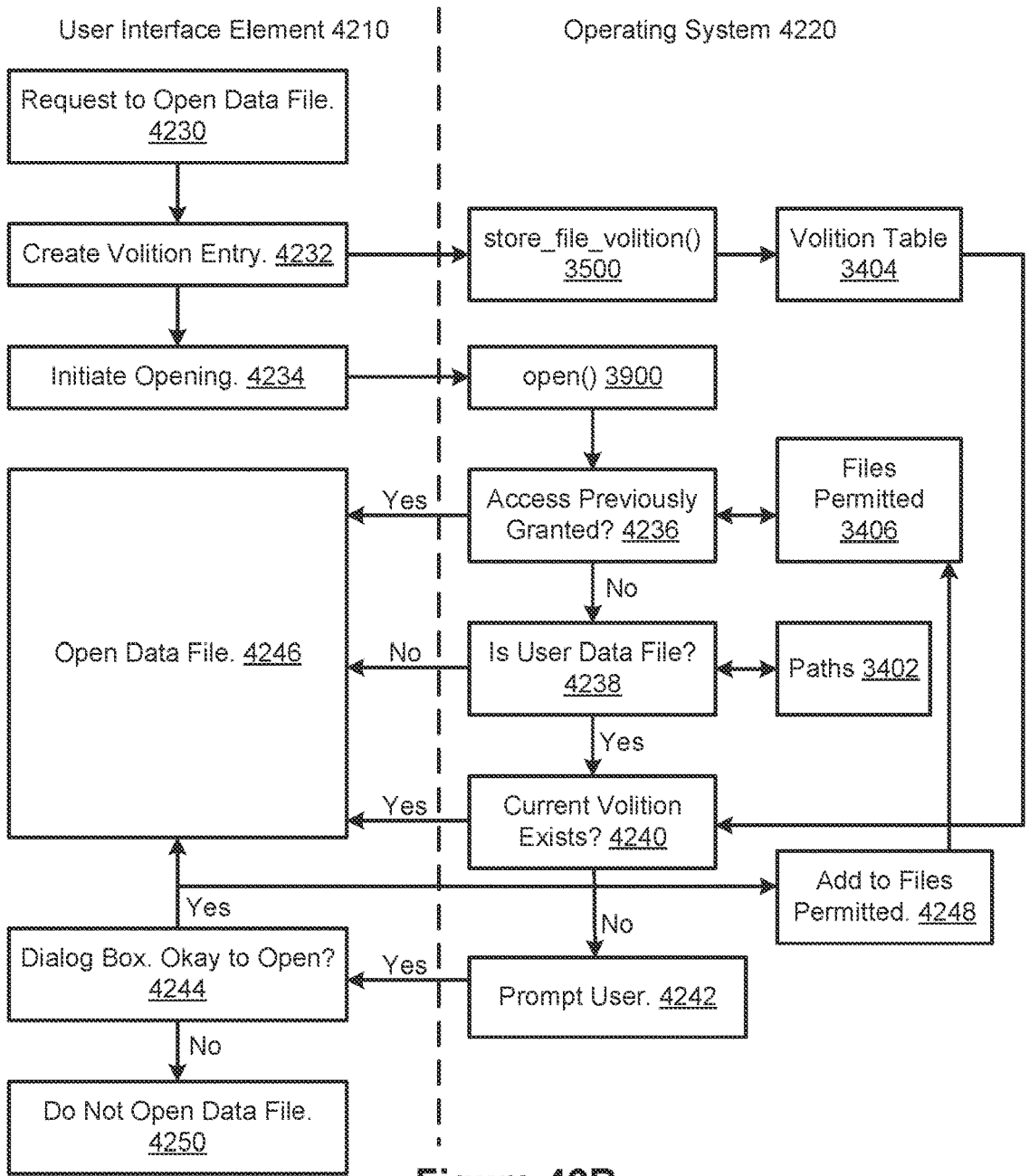
FIGS. 42B and 42C illustrate example file access with enhanced features of disclosed implementations.
Figure 42C:
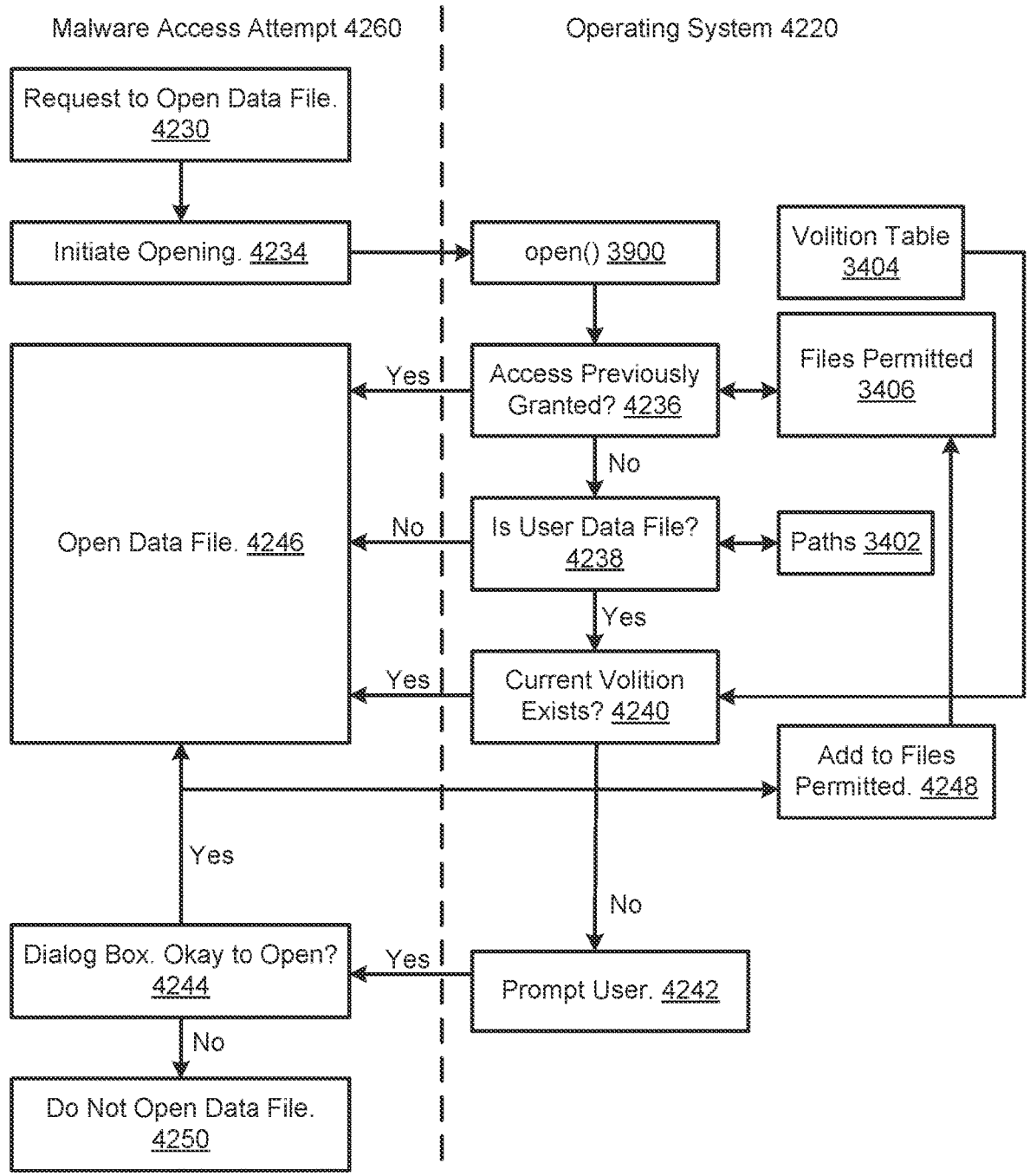

FIGS. 42B and 42C illustrate enhanced file access in accordance with some implementations. In these two figures, the left side illustrates the actions of a user and/or an application. The right-hand side illustrates operations and tables within the operating system.

In FIG. 42B, a legitimate user interface element 4210 is accessed by a user and needs to open a data file. At this stage, it is not known whether it is a user data file or an application data file. The application begins (4230) a request to open the data file. Coming from a legitimate user interface element, the application calls (4232) the store_file_volition( ) function 3500 in the operating system 4220, which adds the volition to the volition table 3404. The data stored includes the name and path of the data file, the application indicating the volition to open the file, and a timestamp of when the function was called. Subsequently, the user interface element 4210 initiates (4234) opening the data file by calling the open( ) function 3900. The open( ) function 3900 performs a sequence of operations. First, the open( ) function 3900 checks (4236) whether the specified application has already been granted access to the specified data file. This determination is made using the files permitted table 3406. If permission has already been granted, the data file is opened (4246). If permission has not already been granted, the open( ) function 3900 determines (4238) whether the data file is a user data file or an application data file. In some implementations, the open( ) function makes this determination using a paths table 3402. Because the disclosed implementations are focused on protecting user data, access to application data files does not utilize volitions. In some implementations (not illustrated in FIG. 42B), there is a further test by checking the sandbox list 3408 to determine whether the data file is an application data file for the specific application making the request (e.g., one application can't modify the application files of another application).

If the data file is a user data file, the open( ) function proceeds to the next test, which is to check (4240) for volitions. If there is a timely volition in the volition table 3604 for the data file and/or application combination, then the open( ) function 3900 proceeds to open (4246) the file. If not, there is a good chance it is malware attempting to open the data file, so the open( ) function 3900 prompts (4242) the user for a decision (e.g., a dialog box), which determines (4244) whether it is okay to open the data file. If the user says "no," the file is not opened (4250). In some implementations, when a user says no, the operating system records the denial of access for the data file and/or application combination, so that the user does not have to deal with repeated attempts at access. In some implementations, the denials are stored in the files permitted table 3406 (specifying that access is not permitted). If the user grants access for the application to open the data file, the data file and/or application is added (4248) to the files permitted table 3406 and the data file is opened (4246).

FIG. 42C is essentially the same as FIG. 42B, except that opening the data file is initiated (4230) by a malware program 4260. Because the malware program 4260 has no access to the store_file_volition( ) function 3500, that portion of FIG. 42B is omitted in FIG. 42C. Because of that, if the process flow reaches box 4240 (checking for a current volition), it will necessarily fail, and therefore prompt the user to decide whether to open the file.

Figure 43:
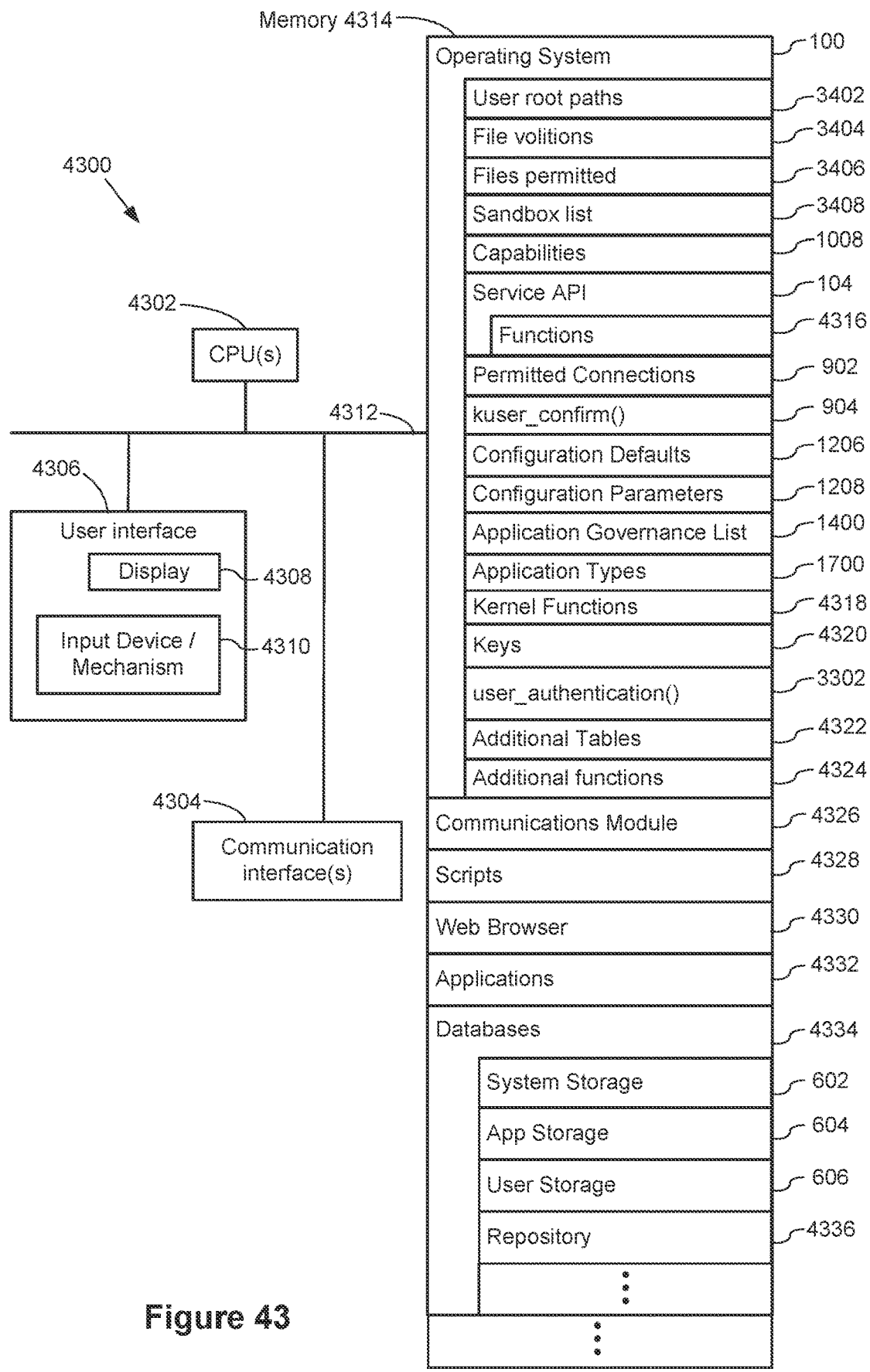
FIG. 43 is a block diagram of an example computing device in accordance with some implementations.

FIG. 43 is a block diagram illustrating a computing device 4300 in accordance with some implementations. Various examples of the computing device 4300 include a desktop computer, a laptop computer, a tablet computer, and other computing devices. The computing device 4300 typically includes one or more processing units/cores (CPUs) 4302 for executing modules, programs, and/or instructions stored in the memory 4314 and thereby performing processing operations; one or more network or other communications interfaces 4304; memory 4314; and one or more communication buses 4312 for interconnecting these components. The communication buses 4312 may include circuitry that interconnects and controls communications between system components.

The computing device 4300 includes a user interface 4306 comprising a display device 4308 and one or more input devices or mechanisms 4310. In some implementations, the input device/mechanism includes a keyboard. In some implementations, the input device/mechanism includes a "soft" keyboard, which is displayed as needed on the display device 4308, enabling a user to "press keys" that appear on the display 4308. In some implementations, the display 4308 and input device/mechanism 4310 comprise a touch screen display (also called a touch sensitive display).

In some implementations, the memory 4314 includes high-speed random-access memory, such as DRAM, SRAM, DDR RAM or other random access solid state memory devices. In some implementations, the memory 4314 includes non-volatile memory, such as one or more magnetic disk storage devices, optical disk storage devices, flash memory devices, or other non-volatile solid state storage devices. In some implementations, the memory 4314 includes one or more storage devices remotely located from the CPU(s) 4302. The memory 4314, or alternatively the non-volatile memory devices within the memory 4314, comprises a non-transitory computer-readable storage medium. In some implementations, the memory 4314, or the computer-readable storage medium of the memory 4314, stores the following programs, modules, and data structures, or a subset thereof:

an operating system 100, which includes procedures for handling various basic system services and for performing hardware dependent tasks. In various implementations, the operating system 100 includes one or more of:

the table of user root paths 3402 storing directory paths where subdirectories containing user files are stored in accordance with some implementations, the file volitions table 3404 storing volition entries indicating a user volition, a time, an application, and a file path in accordance with some implementations, the permitted files table 3406 storing records indicating an application and an identifier for the file path in accordance with some implementations, the sandbox list 3408 storing records indicating applications and associated applications in accordance with some implementations, the table of capabilities 1008 storing capabilities indicating functions and associated capable applications in accordance with some implementations, the service API 104 for coupling applications 4332 with functions of the operating system 100 in accordance with some implementations. The service API 104 including functions 4316, such as the functions described above with reference to FIGS. 1-41 and the functions described below with reference to FIGS. 44-68, the permitted connections table 902 storing associations between applications and domain names in accordance with some implementations, a kuser_confirm( ) function 904 for obtaining user input as to whether an application is permitted to take a particular action in accordance with some implementations, the configuration defaults 1206 for constraints on network connections in accordance with some implementations, the configuration parameters 1208 for user constraints on network connections in accordance with some implementations, the application governance list 1400 that stores data about the mode assigned to specified applications in accordance with some implementations, the application types table 1700 storing application type data for the applications 4332 in accordance with some implementations, kernel functions 4318 such as the kernel functions described above with respect to FIGS. 1-41 (e.g., functions that the applications 4332 are not permitted to directly call or invoke), keys 4320 including public keys, private keys, and symmetric keys as described above with respect to FIG. 28 in accordance with some implementations, and the user_authentication( ) function 3302 for authentication a user of the computing device 4300 in accordance with some implementations.

some implementations include additional tables 4322. As described above, the operating system 1016 also includes a set of functions and procedures, which are part of the service API 104. Some implementations include additional functions 4324 not described above;

a communications module 4326, which is used for connecting the computing device 4300 to other computers and devices via the one or more communication network interfaces 4304 (wired or wireless) and one or more communication networks, such as the Internet, other wide area networks, local area networks, metropolitan area networks, and so on;

one or more scripts 4328 such as the scripts described above with respect to installation and batch processing;

a web browser 4330 (or other application capable of displaying web pages), which enables a user to communicate over a network with remote computers or devices;

the applications 4332 including the applications described above with respect to FIGS. 1-41 and the application described below with reference to FIGS. 44-68; and one or more databases 4334. In some implementations, the database(s) 4334 include the system storage 602, the application storage 604, and the user storage 606. In some implementations, the database(s) 4334 include one or more repositories 4336 for data versioning and version control.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 4314 stores a subset of the modules and data structures identified above. Furthermore, the memory 4314 may store additional modules or data structures not described above.

Although FIG. 43 shows a computing device 4300, FIG. 43 is intended more as a functional description of the various features that may be present rather than as a structural schematic of the implementations described herein. In practice, and as recognized by those of ordinary skill in the art, items shown separately could be combined and some items could be separated.

Preventing Unauthorized Launching of Applications

Malware exploits the customarily unfettered ability to launch other programs secretly. In some implementations, when an ordinary application attempts to launch another program, user confirmation is required before proceeding. In some implementations, programs that are distributed with operating systems and are used routinely to launch other applications are modified to use a separate mechanism for launching applications that does not require explicit user approval.

In many operating systems, linking is permissive, meaning any program may link to any library. Consequently, any program can link to the system library code that contains the "exec" family of functions, which are used to launch other programs. Malware exploits this permissive linking model by posing as a legitimate program while surreptitiously launching other malicious programs. Hence, a solution to this problem involves the disabling of silent, permissive linking.

In a solution that will not disrupt the operation of existing applications, the use of exec functions is guarded to ensure that programs are not launched absent user volition. In some implementations, several software modules that are added to a distribution of an operating system (e.g., obtainable by way of a single update to the operating system).

In some implementations, when a third-party application calls an "exec" function or a toolkit library function (that, in turn, calls an "exec" function) the system displays a modal dialog box that requires user approval of the action. In some implementations, the dialog box clearly identifies the application that is attempting to start the other application, as well as the identity of the application to be started. In some implementations, in the case of third-party file managers, the dialog box includes a checkbox to permit the user to always allow the application generating the "exec" call, whether directly or indirectly, to launch the specified application (e.g., for the convenience of the user).

In some implementations, an internal version of the "exec" function is used for all application launch utilities supplied with the operating system. For example, desktop menus that provide users with the names and/or icons of programs to start are required to use the internal "exec" function. In some implementations, the file manager supplied with the operating system uses the internal "exec" function, such as when a user double-clicks on the name of a data file, in order to start the application associated with that file type. In some implementations, an executable sandbox is created for each application by creating a storage area for the executable code and its application data files.

In some implementations, a utility is provided for users to modify the installation of applications. In some implementations, the utility creates an appropriate sandbox and moves the executable code and application data files to that location. In some implementations, all executable code is marked as read-only and, then, only the system is permitted to read such files. In some implementations, the new locations are propagated to the links utilized by file launch programs. In some implementations, system libraries are revised to be used by installation utilities so that the sandbox is created automatically, and the files are placed in it, when the user starts an installation utility. In some implementations, the operating system restricts the launching of executable code to that which resides in a sandbox.

Figure 46:
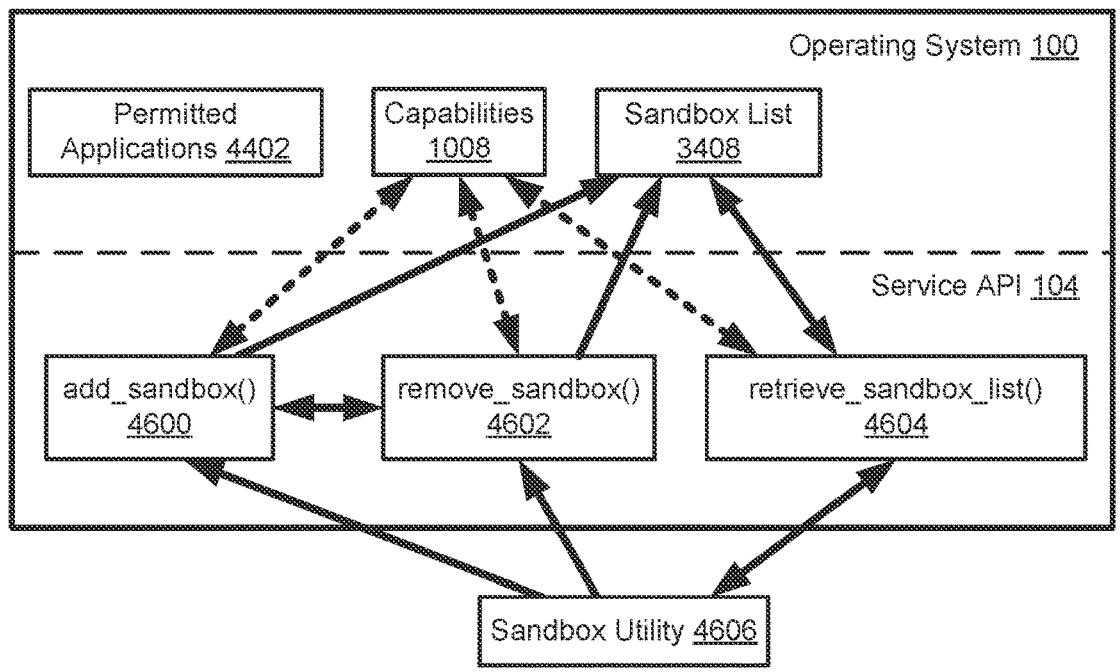

In some implementations, an area of storage, accessible only by the kernel of operating system 100 in FIG. 46 is set aside to store records relating to user volition. This table is designated as permitted applications 4402 in FIG. 46. In some implementations, a system function kuser_confirm( ) 908 is utilized, which displays a user confirmation dialog box 914. In some implementations, all of the exec functions 4408 from the service API 114 of the operating system 100 are modified to call kuser_confirm( ) 908, as explained below.

Figure 47:
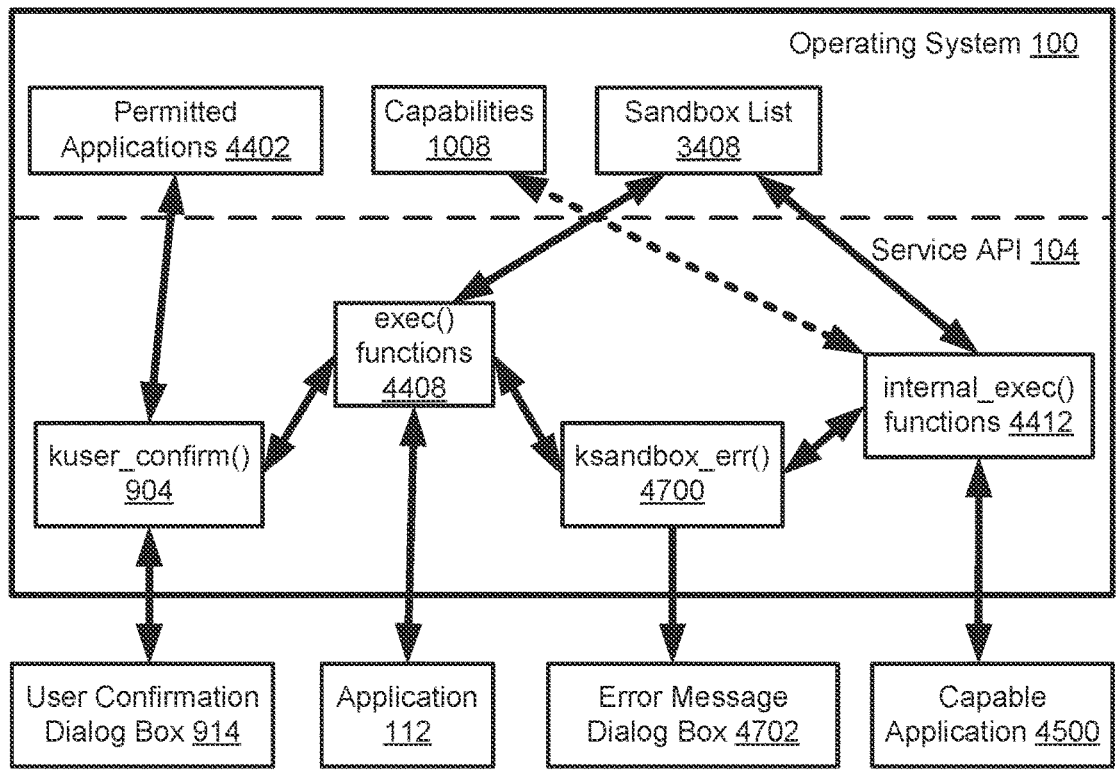

In some implementations, when the application 112 in FIG. 47 calls one of the exec functions 4408 or a toolkit library function that, in turn, calls one of the exec functions 4408, the exec function 4408 called is required, in turn, to call the function kuser_confirm( ) 908, passing in the name of the application that is to be launched using the exec function 4408. In some implementations, the kuser_confirm( ) 908 function first interrogates the permitted applications 4402 table to determine whether user permission for application 112 to launch the named application already exists. If so, kuser_confirm( ) 908 returns to the calling exec function 4408 that the user has confirmed the request. If no record of such permission exists in the Permitted applications 4402 table, kuser_confirm( ) 908 displays user confirmation dialog box 914. In some implementations, the dialog box 914 warns the user of the attempt by the application 112 to launch another application and asks whether the user approves of the action. In some implementations, the user confirmation dialog box 914 identifies the application 112, which is attempting to start the other application, as well as the identity of the other application to be started.

For the convenience of the user, particularly in the case of third-party file managers, the dialog box 914 may include a checkbox option to permit the user to always allow the application 112, which generated the exec call, whether directly or indirectly, to launch the specified application. If the user confirms that the application 112 may start the other application, then kuser_confirm( ) 908 reports this approval to the exec function 4408, which then proceeds normally. If the user also selects the checkbox option on the dialog box 914, kuser_confirm( ) 908 also constructs a record that includes the internal identifier for the application 112 and an internal identifier for the named application to be launched and adds this record to the permitted applications 4402 table before returning the approval to the exec function 4408. On the other hand, if the user does not agree to the application 112 starting the other application, kuser_confirm( ) 908 reports this disapproval to the exec function 4408, which returns an error code to application 112.

Using this approach, certain programs may generate the dialog box frequently and lead to user habituation of acceptance. In order to reduce unnecessary use of the dialog box, internal versions of the exec functions, designated as internal exec functions 4412 in FIG. 47, are used in some implementations. In some implementations, the use of internal exec functions 4412 is restricted to programs and modules supplied with the operating system. There are a variety of means to prevent programs and modules from calling system functions. In some implementations, programs and modules are restricted from calling the internal_exec functions 4412 by use of a capability. In some implementations, a capability that permits calling internal_exec functions 4412 is added to the system and stored where the operating system 100 ordinarily stores capabilities. In accordance with some implementations, the area where the operating system 100 stores capabilities is designated as capabilities 1008 in FIG. 46. This capability may be afforded only to programs that are supplied with the operating system and are routinely relied upon by users to launch programs, such as desktop menus that provide users with the names and/or icons of programs. For example, the file manager supplied with the operating system, as well as customary alternatives endorsed by the developers of the operating system, should also be afforded the capability to call any of the internal_exec functions 4412, such as when a user double-clicks on the name of a data file in order to start the application associated with that file type.

When an application that has been afforded this capability, designated as a capable application 4500 in FIG. 47, calls one of the internal_exec functions 4412, the function verifies that the application 4500 has, in fact, been afforded the capability to call internal_exec functions 4412 by interrogating the capabilities table 1008. This relationship is represented by the dashed arrow in FIG. 47. In some implementations, because the application 4500 has been afforded the capability, the particular internal_exec function 4412 called proceeds normally. If a non-capable application, however, had called any of the internal_exec functions 4412, no relevant capability would have been found. Accordingly, the internal_exec function would return an error code. If application programs that are not supplied with the operating system are not afforded this capability, use of these restricted internal versions of the exec functions will be considered sufficient evidence of user volition, thereby obviating the need for explicit user confirmation under usual circumstances.

Preventing Unauthorized Installation of Executable Code

Attackers often download applications to a victim's computer secretly for later use. In some implementations, the operating system is revised to prohibit all applications from being started unless they reside in a sandbox (e.g., to prevent such programs from being launched). In some implementations, a utility supplied with the revisions permits users to add and remove applications from sandboxes, thereby affording them direct, plenary control over which programs may be launched.

A common purpose of a sandbox is to isolate and restrict the activity of an application program. Thus, an application that does not reside within a sandbox may act without restriction in some systems. Computer operating systems do not commonly enforce sandboxing however and applications may ordinarily act without restriction. In some implementations, users are provided the ability to countenance an application before it may be launched. A solution to the problem of surreptitious installation of executable code is to prohibit applications from being launched until they have been added explicitly by the user to a sandbox.

In some implementations, functionality is added to the operating system and certain existing functionality is altered. In some implementations, several software modules are added to a distribution of an operating system (e.g., obtained by way of a single update to the operating system).

In some implementations, an area of storage accessible only by the kernel of the operating system is set up to store data regarding sandboxes. This area, designated as sandbox list 3408 in FIG. 47, stores the internal identifiers of programs that have been associated with a sandbox. In some implementations, each sandbox record in the sandbox list 3408 includes the filesystem path where data files associated with the application are stored.

In some implementations, as depicted in FIG. 46, the functions add_sandbox( ) 5600, remove_sandbox( ) 4602, and retrieve_sandbox_list( ) 4604 are added to the service API layer 104 of the operating system 100. In some implementations, these functions are used to manage the sandbox list 3408. In accordance with some implementations, a graphical sandbox utility 4606 in FIG. 46 is constructed and supplied with the operating system to permit users to select applications for inclusion in a sandbox. In some implementations, the sandbox utility 4606 calls the add_sandbox( ) 4600, remove_sandbox( ) 4602, and retrieve_sandbox_ list( ) 4604 functions, respectively, to add, remove, and retrieve sandbox entries in the sandbox list 3408, thereby permitting users to directly manage the list of applications that are associated with sandboxes. In some implementations, a capability that permits calling the add_sandbox( ) 4600, remove_sandbox( ) 4602, and retrieve_sandbox_list( ) 4604 functions is added to the table 1008. In some implementations, this capability is afforded only to the sandbox utility 4606 so that only the sandbox utility 4606 may call these functions, as is represented by the dashed arrows in FIG. 46. In some implementations, the sandbox list 4606 and the sandbox utility program 4606 are expanded to store additional data, such as the name of the publisher of the application and a brief description of the application.

Figure 44:
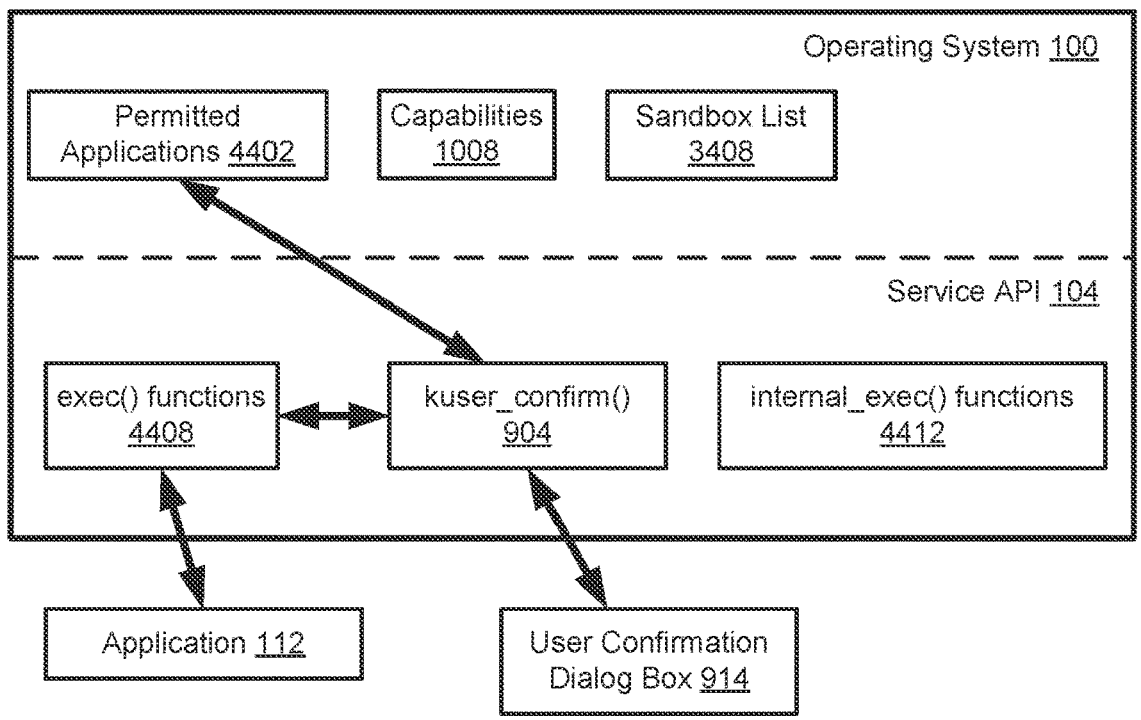
FIGS. 44-47 illustrate an example operating system and example functions for preventing unauthorized launching of applications in accordance with some implementations.
Figure 45:
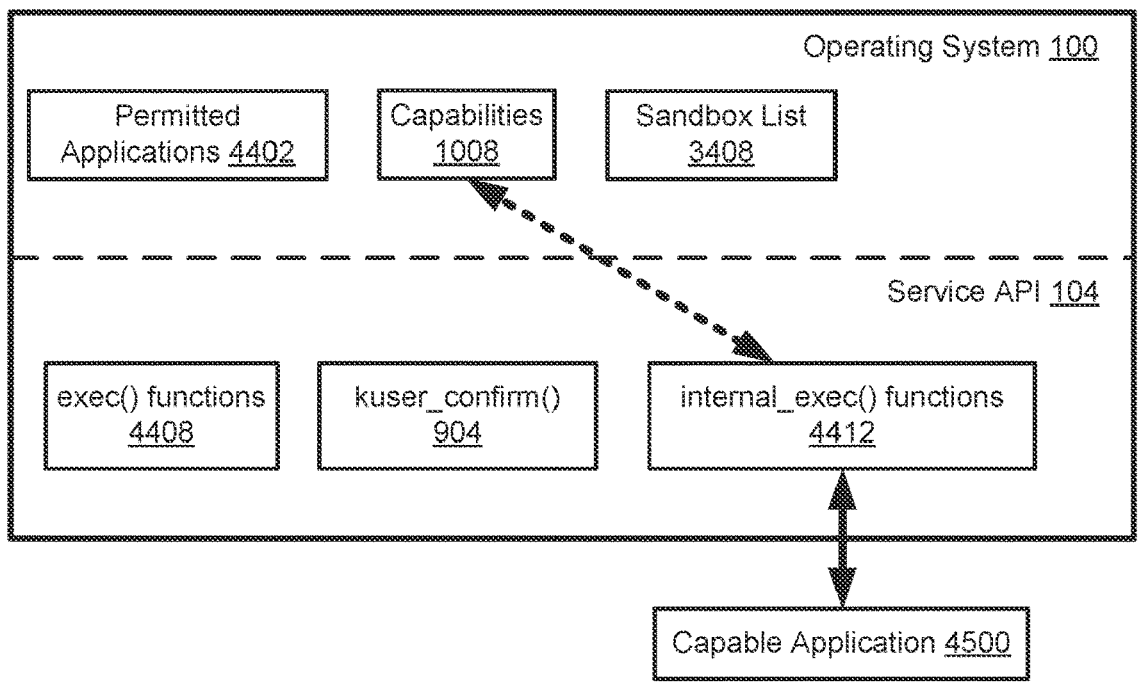

In some implementations, the "exec" family of functions that are used to launch programs, designated as exec functions 4408 in FIG. 44, are revised. In some implementations, the internal functions are revised in the same way as the exec functions 4408. In some implementations, a function designated ksandbox_err( ) 4700 in FIG. 47 is created that displays a modal dialog box, designated as error message dialog box 4702 in FIG. 47.

In some implementations, all of the exec functions 4408 are revised. As shown in FIG. 47, each revised exec function 4408, as described above, first confirms that the calling application 112 has permission to start the named application by calling kuser_confirm( ) 908. If the user gives permission to launch the named application, the exec function 4408 then searches the sandbox list 3408 in FIG. 47 for a matching record to determine whether the application to be started resides in a user-designated sandbox. In some implementations, if a record is found indicating that the named application resides in a sandbox, the exec function 4408 continues normally; otherwise, it returns an error code to the application 112.

In some implementations, all of the internal_exec functions 4412 are revised in a similar fashion. In some implementations, if a capable application 4500 calls an internal_exec function 4412, the internal_exec function 4412 verifies that application 4500 has been afforded the capability to call internal_exec functions 4412 by interrogating the capabilities table 1008. Once a capability is confirmed, the internal_exec function 4412 performs a search of the sandbox list 3408 in FIG. 47 for a matching record to determine whether the application to be started resides in a user-designated sandbox. If a record is found, indicating that the named application resides in a sandbox, then the internal_exec function 4412 continues normally; otherwise, it returns an error code to application 4500.

In some implementations, once executable code has been sandboxed, an application is permitted to open only the application data files that reside within its sandbox. In some implementations, applications may open any user files, subject to the constraints described previously.

In some implementations, applications that do not reside in a user-designated sandbox are prohibited from execution, regardless of user volition established in the permitted applications table 4402, or by use of the user confirmation dialog box 914. In some implementations, if the user attempts to start a program that has not been placed in a sandbox, the exec function 4408 or internal_exec function 4412 that was called, prior to returning the error code, calls the ksandbox_err( ) function 4700 in FIG. 47, which displays the error message dialog box 4702. In some implementations, the dialog box 4702 displays a message that the user must add the program to a sandbox in order to run it.

In some implementations, the dialog box 4702 also includes a link that permits the user to immediately launch the sandbox utility 4606.

In some circumstances the distribution of an application includes supporting utility programs written by the same developer. In some implementations, these additional programs are added to the same sandbox by the user. If an attacker takes control of an application that the user has placed in a sandbox and causes it to download another malicious program to the same filesystem path, the new program will not be launched, however, because the user did not specify it as part of the sandbox, despite it sharing the same location in the filesystem as a sandboxed application.

In some implementations, the developers of the operating system trigger the sandbox utility 4606 whenever the user installs software using the installation mechanism provided by the operating system developers, thereby guiding the user to add the newly installed software to a sandbox as a final step in the installation process.

Automated Version Control

Some implementations include creating backup files and visibly extending restoration privileges to the end user by employing version control mechanisms. In some implementations, users are provided with a utility to delete backup files.

When file protections fail, malware can capitalize on the opportunity and either rewrite or delete files maliciously. Hence, a fallback form of protection is needed. Although the admonition to routinely backup files is repeated often, the actual process for doing so and later recovering data is not straightforward and causes its own set of problems. In some implementations, automated versioning of files is added to the management of the file system by the operating system. In some implementations, users are able to take advantage of this enhancement by way of a simple user interface that permits them to retrieve any version of any file upon demand.

In some implementations, new functionality is added to the operating system and certain existing functionality is altered. In some implementations, several software modules are added to a distribution of an operating system (e.g., obtainable by way of a single update to the operating system).

In some implementations, existing version control software is incorporated into the operating system kernel (e.g., for automatic file versioning). Version control software typically refers to the process of saving the changes made to the file as a commit transaction. When a file is opened by an application, the actual file opened is a working copy known as the current version of the file. After the file is modified and then closed by the application, the revised file becomes the current version but the changes are also committed to a separate file managed by the version control software, known colloquially as a commit. By definition then, the latest commit reflects the current version of the file. Over time, a new commit is created every time the file is modified, thereby producing a series of commits that reflect the history of editing the file.

Notably, version control software can save either a copy of the entire modified file as a commit or merely the changes made to the prior version. If the version control software commits the changes, the current version of the file is represented by combining the entire series of commits, starting with the first commit and ending with the last commit. For the sake of simplicity though, each commit will be referred to as though it were a complete copy of the file.

Figure 48:
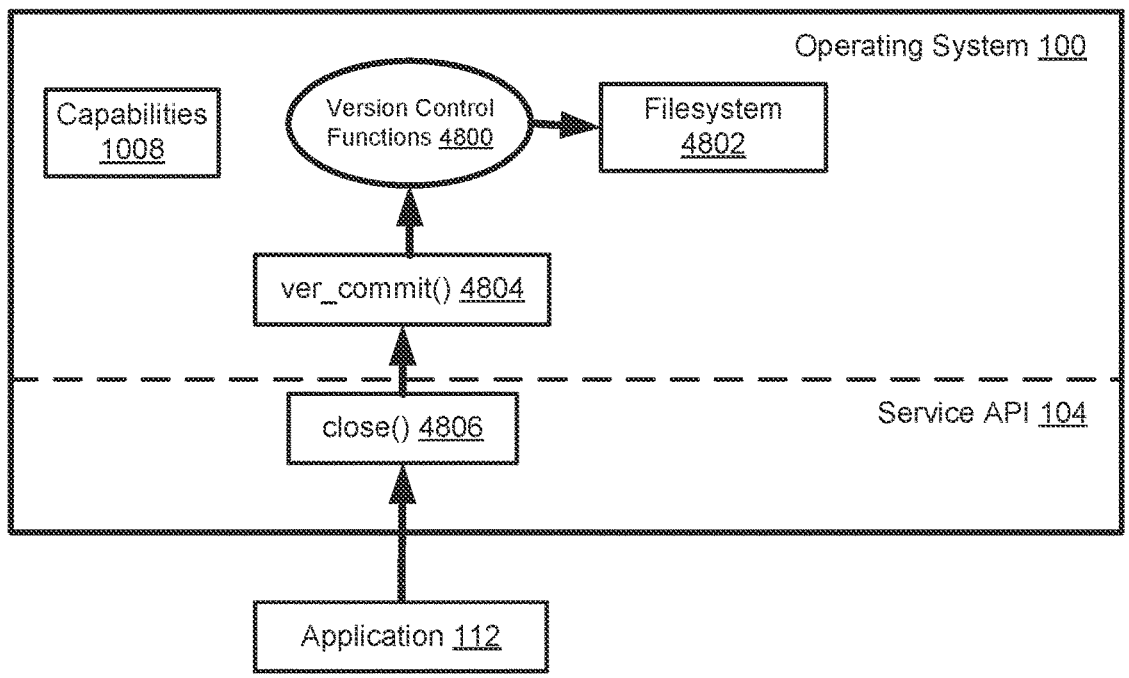
FIGS. 48-51 illustrate an example operating system and example functions for version control in accordance with some implementations.

Version control software, designated as version control functions 4800 in FIG. 48, stores accumulated committed transactions in an area of file storage known as a repository. In some implementations, one or more repositories are created to store all versions of files that are altered. In some implementations, a single repository is created for each subdirectory in the filesystem, designated 4802 in FIG. 48. The repository stores commits for all of the files located in that subdirectory, thereby distributing the load for storage. In some implementations, the operating system kernel never affords applications access to the filesystem area where a repository is located and the repository is managed exclusively by the version control functions 4800 embedded into the kernel.

In some implementations, a kernel function, ver_commit( ) 4804 in FIG. 48, is added that calls the commit function of the version control software 4800. In some implementations, the system close( ) function, designated 4806 in FIG. 5, is revised so that any file opened for writing that is changed is given a new version at the time it is closed. In some implementations, at the time when a file opened for writing by any application 112 in FIG. 48 is closed by the call to close( ) 4806 by the application 112, the close( ) function 4806 calls the ver_commit( ) function 4804, which, in turn, calls the version control software 4800 commit function to store the changes to the file, if any, as the most recent commit in the repository in the filesystem 4802. If the file is being created, the new file is stored entirely as the first commit, sometimes known as version 1 of the file. In some implementations, the ability to call the ver_commit( ) function 4804 is restricted to the close function 4806 in the operating system kernel.

Figure 49:
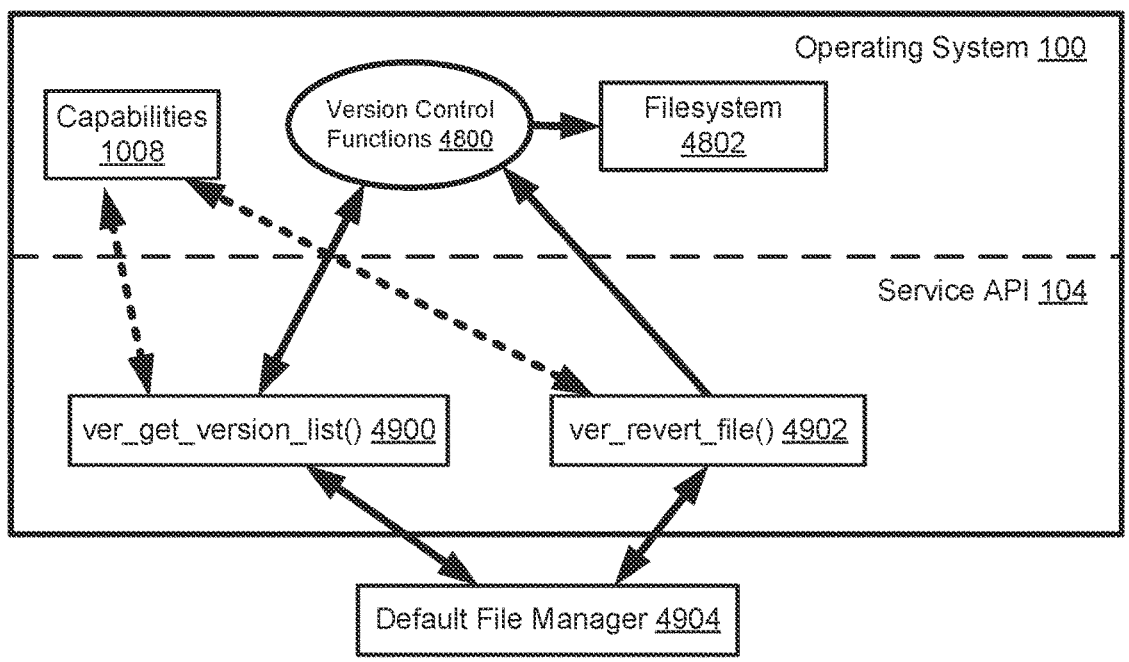

In some implementations, system functions, ver_get_version_list( ) 4900 and ver_revert_file( ) 4902 in FIG. 49, are added to the operating system. In some implementations, the ver_get_version_list( ) function 4900 retrieves a list of commit metadata, which includes the timestamp of the transaction and the version number, and the ver_revert_file( ) function 4902 causes the version control software to revert the current version of a file to a prior version identified by this metadata. In some implementations, the call to these functions is restricted to code supplied with the operating system. There are a variety of means to prevent other programs and modules from calling system functions. In some implementations, a capability is added to the portion of the operating system that stores capabilities, designated as capabilities 1008 in FIG. 49. This capability permits a program or module to call the ver_get_version_list( ) 4900 and the ver_revert_file( ) 4902 functions. In some implementations, the capability is afforded to the default file manager, the file chooser dialog box functionality in the GUI toolkit, and certain utilities discussed below. In this way, malware will lack the capability to revert files, let alone observe their version information.

With the addition of these new system functions, the default file manager and the file chooser dialog box are able to present users with complete information about the versions stored in the repositories, as well as permit users to replace current versions with prior ones in accordance with some implementations. For example, when viewing documents in the default file manager 4904 in FIG. 49, the file manager 4904 presents an option for the user to view the dates and numbers of the versions of the documents. If the user selects this option for a particular file, the file manager 4904 calls ver_get_version_list( ) 4900 with regard to that file. In some implementations, ver_get_version_list( ) 4900 confirms the capability of file manager 4904 to call this function by interrogating the capabilities 1008, as represented by a dashed arrow. In some implementations, because file manager 4904 has been afforded this capability, ver_get_version_list( ) 4900 calls the version control functions 4800 to retrieve the list of version information concerning the designated file and returns the list to file manager 4904, which then displays the version list. In some implementations, if the user selects a prior particular version to be opened by a particular application, the file manager 4904 calls the ver_revert_file( ) 4902 function with either the version date or number. In some implementations, similar to ver_get_version_list( ) 4900, ver_revert_file( ) 4902 confirms the capability of file manager 4904, again represented by a dashed arrow, and then calls the version control software, which in turn will overwrite the current version of the file with the version specified. In some implementations, following the call to ver_revert_file( ) 4902, the file manager 4904 continues with launching the application that, in turn, opens the revised current version of the file. In some implementations, when closed, any new changes to the file are committed as a new version of the file, as described above.

Figure 50:
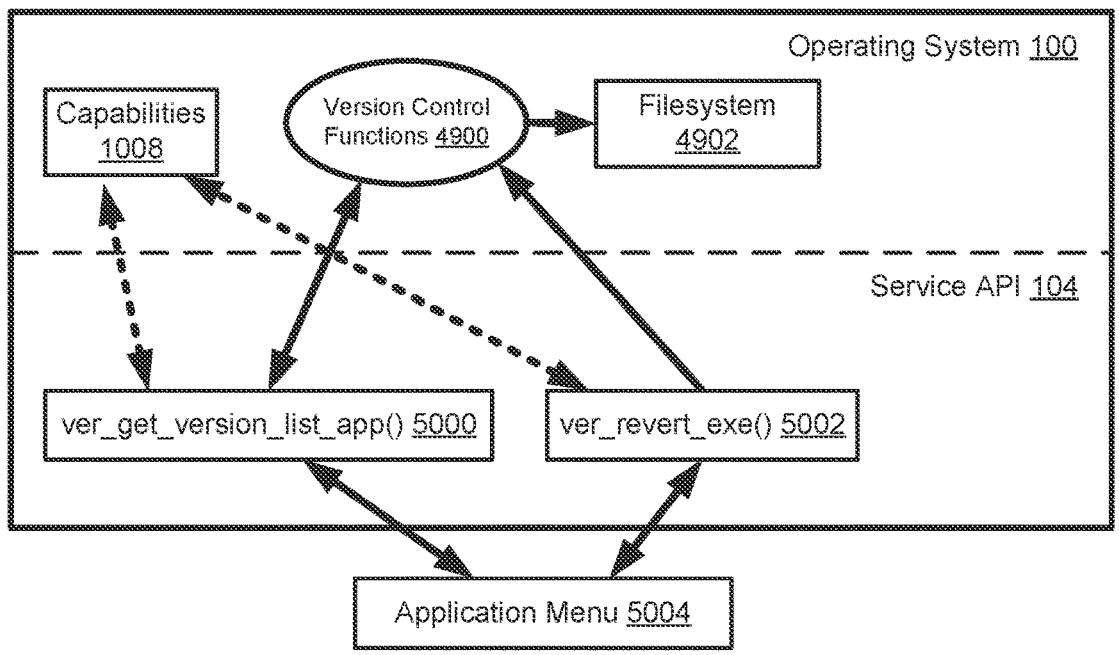
Figure 51:
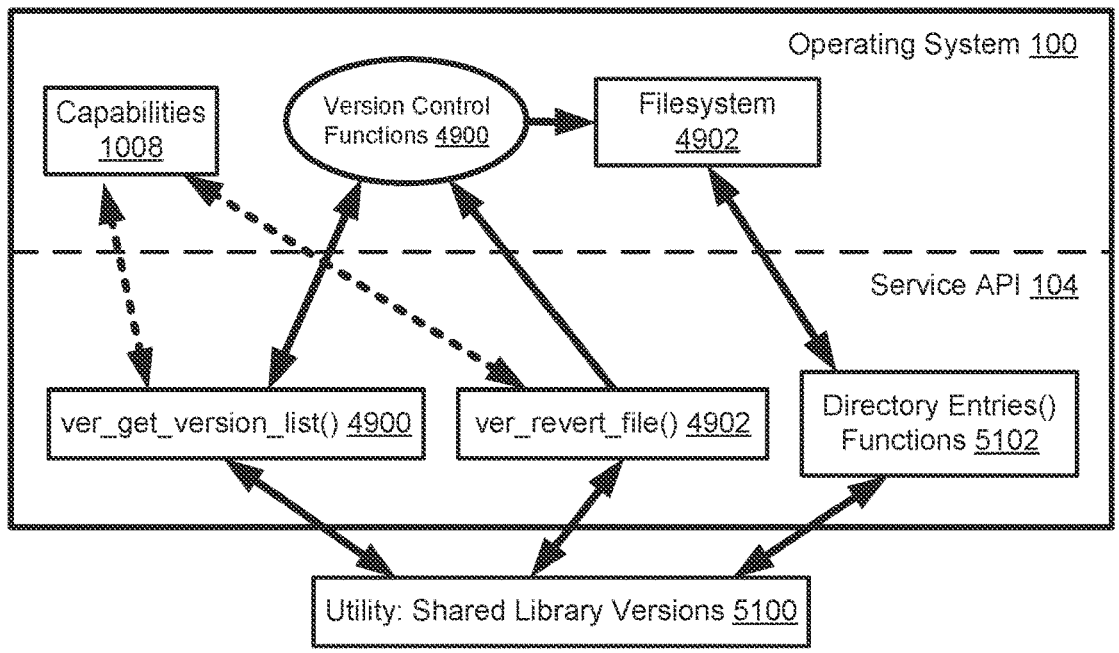

In some implementations, related functions, ver_get_version_list_app( ) 5000 and ver_revert_exe( ) 5002 in FIG. 50, are added for use by application launchers supplied with the operating system, such as application menus and desktop links. These system functions enable such menus and links to provide users with a similar ability to view and select a prior version of the application that is to be launched. In some implementations, as with the calls to ver_get_version_list( ) 4900 and ver_revert_file( ) 4902, described above, calls to ver_get_version_list_app( ) 5000 and ver_revert_exe( ) 5002 are restricted to code supplied with the operating system. In some implementations, a capability for calling these functions is added to capabilities 1008 in FIG. 50. In some implementations, this capability is afforded only to application launchers supplied with the operating system, thereby preventing malware from reverting applications. The capability relationship is represented with dashed arrows in FIG. 50.

In some implementations, the application menu 5004 shown in FIG. 50 is supplied with the operating system and includes an option for the user to view all versions of the application. In some implementations, if the user selects the option, the application menu 5004 calls ver_get_version_list_app( ) 5000, which, upon confirming the capability of the application menu 5004, calls the version control functions 4900 to retrieve the list of application versions. In some implementations, ver_get_version_list_app( ) 5000 returns the list to the application menu 5004, which displays the information to the user. In some implementations, the application menu 5004 provides the user with an opportunity to select one of the displayed versions. In some implementations, if the user selects a different version than is currently being used, the application menu 5004 calls ver_revert_exe( ) 5002 and passes the identity of the application and the desired version, along with a range of time, as is explained further below. In some implementations, ver_revert_exe( ) 5002 confirms the capability and then calls the version control software 4900 to revert the application.

The launching of an application may involve several executable files, with quite disparate version dates due to periodic updates of select files. Because the operating system is not made aware that a set of file revisions close in time comprise a singular update, each file receives its own versions. In some implementations, to earmark particular versions of the application as a whole, the files in the application's subdirectory are clustered on the basis of version timestamps. In some implementations, the size of the cluster is defined as a range of time, which is passed in the call to the ver_get_version_list_app( ) function 5000. For example, if the range is five minutes, then each cluster consists of one or more files where the timestamp of the earliest file is not more than five minutes before the timestamp of the latest file. In some implementations, the latest timestamp in each cluster is used to identify each version. In some implementations, each version of the application includes the most recent versions of each file in the subdirectory that match or occur prior to the version timestamp.

Shared libraries present several issues. For example, if the version of an application is reverted by a user and the older version requires an older version of a shared library, reverting the shared library would disrupt other applications that require use of the more recent version. More importantly, an attacker must not be allowed to introduce malicious code by updating a shared library. In gist, severe problems can easily arise when control over shared libraries rests with users or when attackers gain the ability to modify them. One way to protect shared libraries is to restrict control to the operating system. Thus, in some implementations, only kernel code is permitted to install or update shared libraries. In some implementations, no application is permitted to access the area of storage in the filesystem where shared libraries are located.

Security vulnerabilities can exist in shared libraries and therefore, in some implementations, library files are subject to the same versioning as other files. Some implementations include a utility (e.g., the utility: shared library versions 5100 in FIG. 51) to permit users to view and revert shared library files. In some implementations, similar to the default file manager 4904, the shared library version utility 5100 relies on calls to ver_get_version_list( ) 4900 and ver_revert_file( ) 4902 to achieve this functionality. In some implementations, the capability to call these functions is afforded to shared library versions utility 5100, as is represented by the dashed arrows in FIG. 51.

In some implementations, the shared library version utility 5100 calls the directory entries functions 5102 that are supplied with the operating system 100 to display a list of shared libraries, along with an option to view the versions of a selected library file. If the user selects this option, shared library version utility 5100 retrieves a list of versions for the selected file by calling ver_get_version_list( ) 4900. In some implementations, the shared library version utility 5100 provides the user with an option to select a particular version for reverting. If the user chooses another version, the shared library version utility 5100 calls ver_revert_file( ) 4902 to have the version control software 4900 replace the current version of the shared library with the user-selected version. Ordinary users may not use such a utility except in extraordinary circumstances. If vulnerability in a shared library becomes known, the operating system developers can furnish an immediate update to the system that replaces the current version of the shared library with a repaired version.

As an example, FIG. 52 shows a set of files that comprise an application: app_main, app_lib1, and app_lib2. When the application was installed in the file system, the original versions of each file shared the same timestamp, in this example, Jan. 20, 2018 9:35 am. In July of that year, the files app_main and app_lib2 were updated. In February of 2019, app_lib1 and app_lib2 were updated. Finally, app_lib2 was updated in May of 2019. In this example, due to a problem, such as a security vulnerability, the user decides to revert the application. As described with reference to FIG. 50, suppose that a user requests to view the versions for the application that launches with the file app_main, depicted in FIG. 52. The application menu 5004 calls ver_get_version_list_app( ) 5000 with a range of five minutes, for example. Using this range, ver_get_version_list_app( ) 5000 returns a list of four versions, based on the clustering algorithm depicted in FIG. 52. These versions are identified by the latest timestamp in the cluster; hence, the four versions in the list would be identified by the following four timestamps: Jan. 20, 2018 9:35 am; Jul. 30, 2018 4:21 pm; Feb. 24, 2019 10:06 am; and May 1, 2019 3:15 pm. If the user selects version 3 from the list, with timestamp Feb. 24, 2019 10:06 am, the application menu 5004 calls ver_revert_exe( ) 4902 with the name app_main, the version date of Feb. 24, 2019 10:06 am, and the same range of five minutes. In this example, ver_revert_exe( ) 5002 calls the version control software to replace the current version of the application files. Because the current version of app_lib1 in FIG. 52 is already the desired version and the current version of main is the most recent version that precedes the version timestamp, the only change needed is to revert app_lib2. Accordingly, the version control software replaces the current version of app_lib2 with the version dated Feb. 24, 2019 10:06 am. From the perspective of the user, the current version of the application, version 4, was replaced with the prior version 3.

Figure 54:
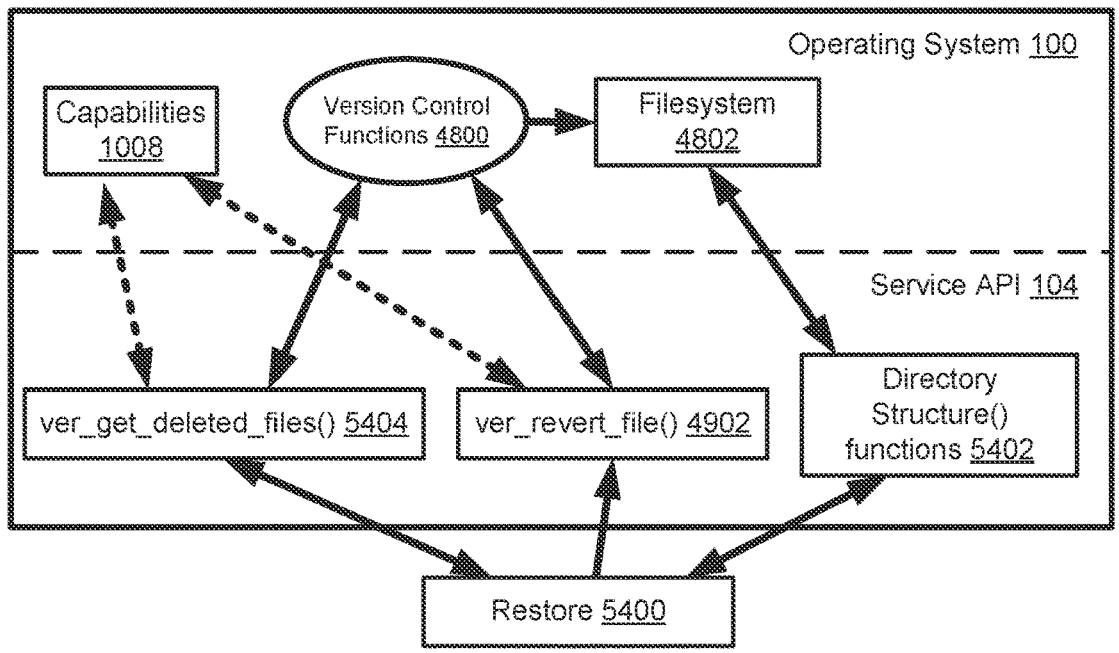

In some implementations, when a file is deleted by the user, such as by use of a file manager, the repository continues to maintain all of the committed versions. In some implementations, a restore utility 5400 is provided, as shown in FIG. 54, that permits users to view deleted_files within a directory and select a version to restore. Some operating systems include a directory for each user account that is used to store deleted files and directories, e.g., a directory known as the trash or "Recycle Bin." In some implementations, these operating systems provide a filesystem utility that permits users to view the files and directories stored in the trash, as well as to restore them to their former location in the filesystem. In some implementations, existing operating system functionality is revised so that when a file is restored from the trash, the version control software stores information indicating that the current version of the restored file is the last commit.

Figure 53:
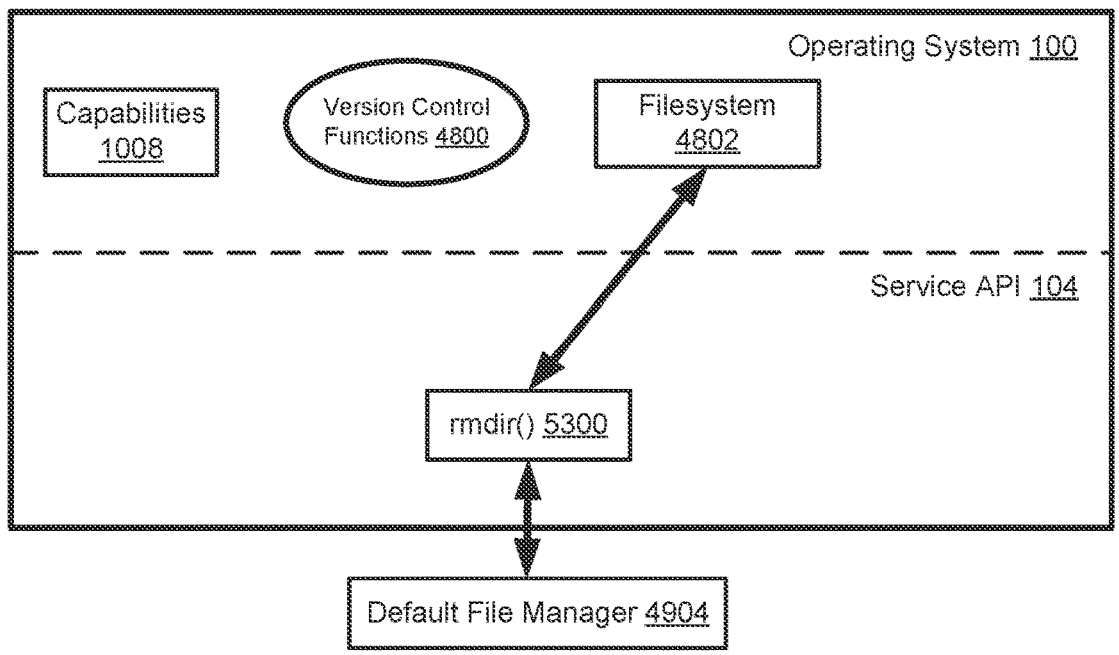
FIGS. 53-57 illustrate an example operating system and example functions for version control in accordance with some implementations.

In current systems, the deletion of a subdirectory itself would result in deletion of the repository as well. In some implementations, the kernel function that removes directories from the filesystem is modified so that it does not affect repositories (e.g., to prevent attackers from destroying backup copies of files by deleting subdirectories). In some implementations, if a user desires to delete an entire subdirectory, such as with the file manager, the action is permitted but the orphaned repository is reparented to a special area of the filesystem that is not accessible to applications. For example, on Linux, the system function rmdir( ) removes an empty directory. Because the repository is not accessible to applications and, therefore, cannot be deleted by applications such as file managers, the directory still contains the repository when a call to rmdir( ) is issued. In some implementations, if an application such as the default file manager 4904 calls the rmdir( ) function 5300, as shown in FIG. 53, the rmdir( ) function 5300 is revised so that it does not return an error code that the directory is not empty because of the presence of the repository. In some implementations, the rmdir( ) function 5300 reparents the repository to an area of the filesystem 4802 known as "obsolete_repos." In some implementations, the obsolete_repos directory is itself hidden from system functions that retrieve file system structure for applications, such as file managers.

In some implementations, each orphaned repository is added to the obsolete_repos directory in its own subdirectory, using the former subdirectory name (e.g., to preserve distribution of load). In some implementations, once the repository is reparented, rmdir( ) 5300 removes the designated directory from the filesystem.

In some implementations, the restore utility 5400 is constructed and included in the update for users to view deleted files whose repositories have not become obsolete. In some implementations, the restore utility 5400 displays the directory structure of the application-accessible area of filesystem 4802 by calling directory structure functions 5402 that are supplied with the operating system. In some implementations, within each directory, the restore utility 5400 displays files that have been deleted. In some implementations, a system function, ver_get_deleted_files( ) 5404 in FIG. 54, is usable to construct the list of deleted files. Thus, for each directory in the filesystem, the restore utility 5400 calls ver_get_deleted_files( ) 5404 to retrieve the list of deleted files. In some implementations, ver_get_deleted_files( ) 5404 obtains this list by calling the version control software 4800. In some implementations, the restore utility 5400 provides the user with the ability to select one or more files in the directory for restoration to the directory. In some implementations, if the user selects a file for restoration, the restore utility 5400 calls ver_revert_file( ) 4902, which calls the version control software 4800 to request that the latest commit be restored to the directory. Once restored, the user can utilize other programs, discussed above, to view the various versions of the file and revert it, if desired.

Figure 55:
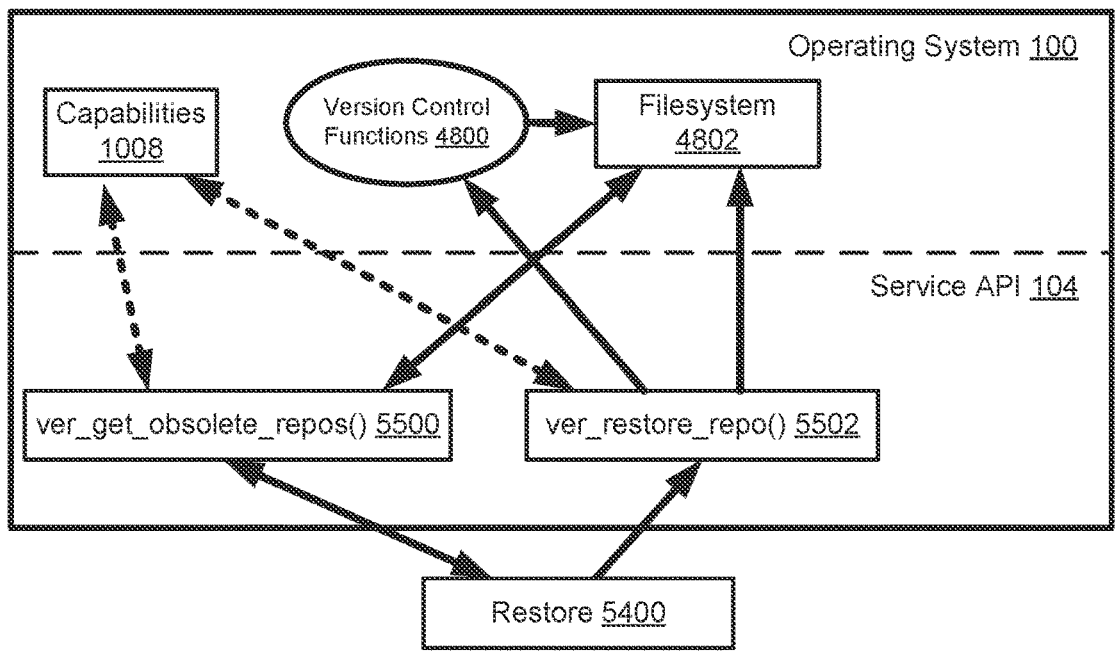

In some implementations, the restore utility 5400 provides users with a view of the list of obsolete repositories by subdirectory name. In some implementations, a system function, ver_get_obsolete_repos( ) 5500 in FIG. 55, is created and included in the OS update. In some implementations, when called by the restore utility 5400, ver_get_obsolete_repos( ) 5500 retrieves a list of obsolete repositories from the filesystem 4802 and returns the list to the restore utility 5400. In some implementations, the restore utility 5400 permits users to select one or more displayed repositories and restore them as subdirectories of a user-designated directory in the application-accessible area of filesystem 4802. In some implementations, a system function, ver_restore_repo( ) 5502 in FIG. 55, is created and included with the OS update.

In some implementations, when a user requests that a repository be restored using the restore utility 5400, the utility 5400 calls ver_restore_repo( ) 5502 with the name of the repository to be restored and the name of the directory in the accessible part of the filesystem that will become the new parent of the repository directory. In some implementations, ver_restore_repo( ) 5502 makes the subdirectory containing the obsolete repository a child of the specified parent directory in filesystem 4802. In some implementations, ver_restore_repo( ) 5502 calls the version control software 4800 to restore to the subdirectory current versions of all files in the repository, thereby restoring the state of the repository so that the user can interact with the files using various software modules, such as the default file manager 4904. Using this approach, users can readily obtain copies of all of the files that were located in a deleted directory, including all of their versions.

In some implementations, the capability to call the ver_revert_file( ) 4902 function is afforded to the restore utility 5400 (e.g., to protection the restoration functionality). In some implementations, a new capability is provided that controls whether a program or module can call ver_get_deleted_files( ) 5404, ver_get_obsolete_repos( ) 5500, and ver_restore_repo( ) 5502. In some implementations, only the restore utility 5400, and a purge utility described below, are afforded the capability to call these system functions, which each confirm the capability when called before continuing. These relationships are represented by the dashed arrows in FIGS. 54 and 55.

Figure 56:
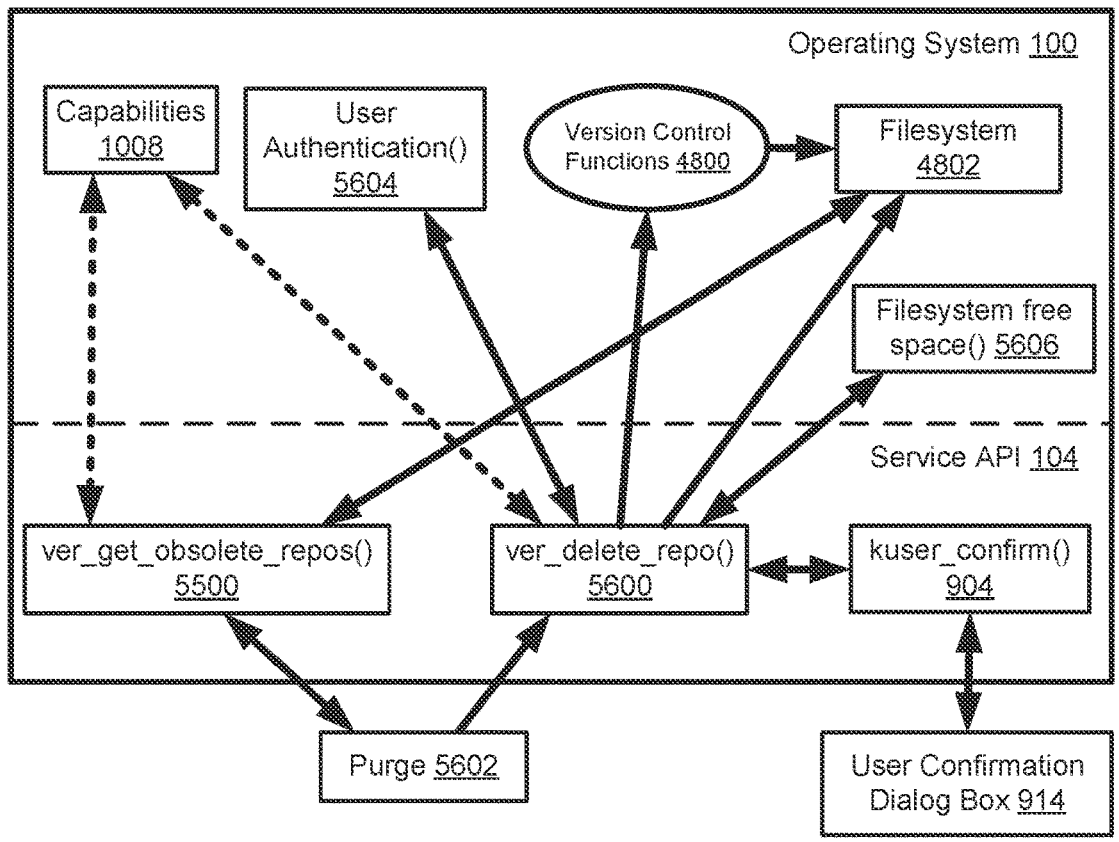

In some implementations, in order to allow a user to delete a repository, a system function, named ver_delete_repo( ) 5600 in FIG. 56, is provided. In some implementations, a utility, designated purge 5602 in FIG. 56, is provided that permits users to view and select obsolete repositories for permanent deletion. In some implementations, purge 5602 calls ver_get_obsolete_repos( ) 5500 to obtain the list of obsolete repositories. In some implementations, purge 5602 permits users to select one or more obsolete repositories for destruction. In some implementations, once the user selects a repository for obliteration, purge 5602 calls ver_delete_repo( ) 5600, passing the name of the repository to be destroyed. In some implementations, prior to such permanent action, ver_delete_repo( ) 5600 requires user confirmation. In some implementations, the ver_delete_repo( ) 5600 calls kuser_confirm( ) 908, which displays a user confirmation dialog box 914 that requires confirmation of the action, including sufficient credential data to authenticate the user, before proceeding. If the user confirms the deletion of the obsolete repository, ver_delete_repo( ) 5600 calls the user authentication function 5604 that is supplied with the operating system to authenticate the user. In some implementations, even if the user is properly authenticated, the ver_delete_repo( ) 5600 function then calls the file system free space function 5606 that is supplied with the operating system to determine the amount of storage space available in the filesystem. In some implementations, if sufficient space is found to conduct normal operations of the computer, ver_delete_repo( ) 5600 does not delete the specified repository, and instead returns an error code indicating that sufficient space is available. In some implementations, if there is a substantial chance that the limited amount of space remaining will interfere with normal operation of the computer, ver_delete_repo( ) 5600 deletes the repository from the filesystem.

In some implementations, a capability to call the ver_delete_repo( ) 5600 function is added to the capabilities 1008 and afforded only to the purge utility 5602. In some implementations, the purge utility 5602 is afforded the capability to call the ver_get_obsolete_repos( ) 5500 function, as mentioned above. These relationships are represented with dashed arrows in FIG. 56.

Executable code creates an exception to the general rule against permanent deletion. Rather than delete an entire repository, a user may wish to delete a version of an application, particularly if one or more files of the version contains a known security vulnerability or, worse, is suspected malware. Although reverting disables the undesirable version, a user may wish to eliminate it permanently to avoid accidentally selecting it when reverting from a later, undesirable current version. The same is true of shared libraries. In some implementations, functionality and a utility to permit users to permanently remove versions of application and shared library files is provided.

Figure 57:
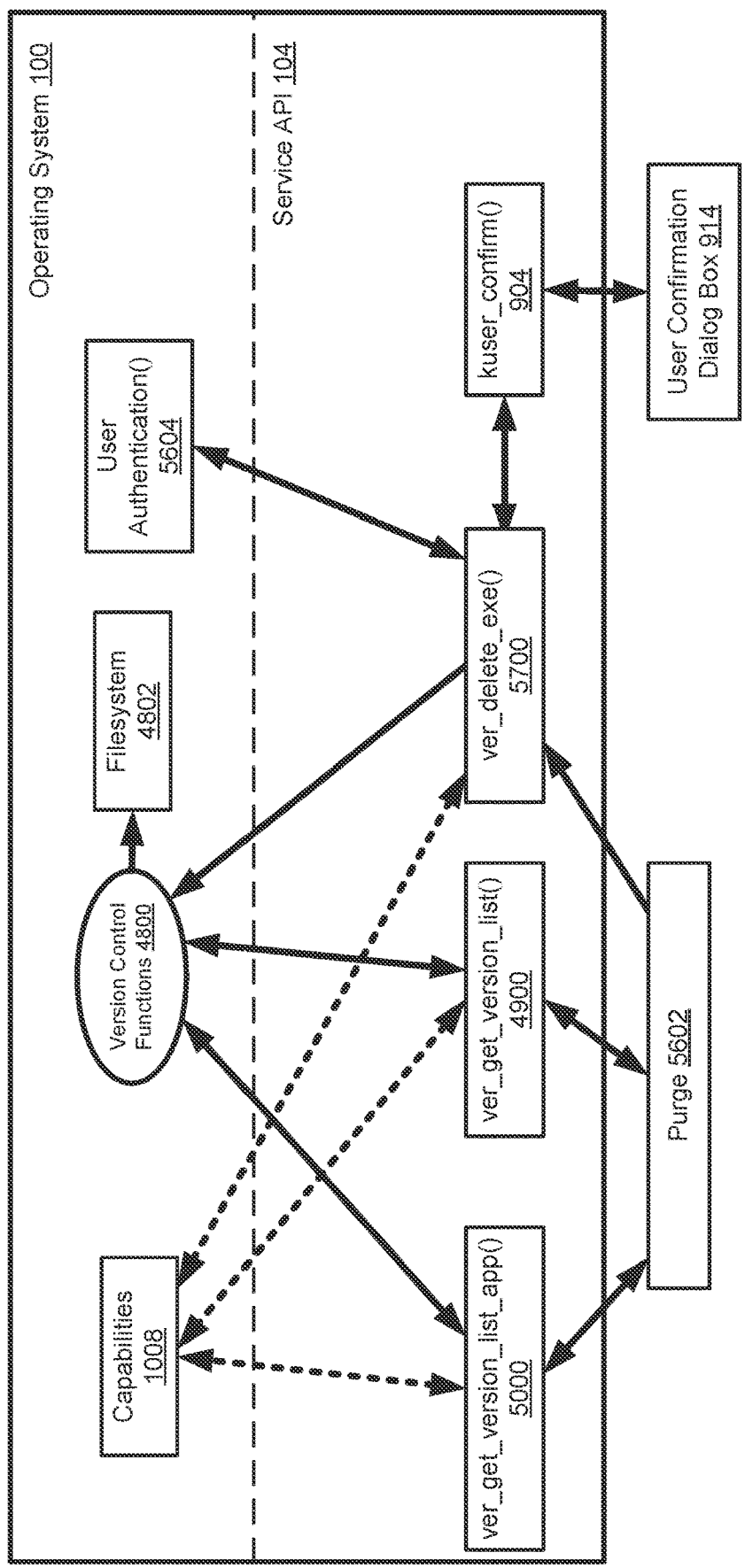

In some implementations, only the last commit is able to be permanently deleted (e.g., given the nature of how commit transactions are stored). In some implementations, a system function, ver_delete_exe( ) 5700 in FIG. 57, is provided that deletes the last cluster of application files or the last commit of a shared library file. Use of this function recursively removes the tail end of commits. In some implementations, the purge utility 5602 calls ver_get_version_list_app( ) 5000 to permit users to view application files and their versions (e.g., using the range criterion described above). In some implementations, the purge utility 5602 permits users to view shared library files and their versions by calling ver_get_version_list( ) 4900. In some implementations, the purge utility 5602 permits the user to delete only the most recent version of an application or shared library. If the user selects an application or shared library for deletion, the purge utility 5602 calls the ver_delete_exe( ) 5700 function. In some implementations, prior to such permanent action, ver_delete_exe( ) 5700 requires user confirmation. In some implementations, the ver_delete_exe( ) 5700 function calls kuser_confirm( ) 908, which displays a modal user confirmation dialog box 914 that requires confirmation of the action, including sufficient credential data to authenticate the user, before proceeding. In some implementations, if the user confirms the deletion of the designated version, ver_delete_exe( ) 5700 calls the user authentication function 5604 that is supplied with the operating system to authenticate the user. In some implementations, if the user is properly authenticated, ver_delete_exe( ) 5700 calls the version control software function 4800 to delete the selected version. In some implementations, if an application is specified by the user, ver_delete_exe( ) 5700 calls the version control software 4800 repeatedly to remove each application file that exists within the final cluster, as explained above. In some implementations, if the current version of the file is the last commit, ver_delete_exe( ) 5700 calls the version control software 4800 to revert the file to the penultimate commit, which then becomes the final commit. In some implementations, in the case of a shared library, ver_delete_exe( ) 5700 calls the version control software 4800 to remove the last commit of the selected shared library, also reverting the current version if necessary.

In some implementations, a capability to call the ver_delete_exe( ) function 5700 is added to the capabilities 1008 and afforded only to the purge utility 5602. In some implementations, the purge utility 5602 is afforded the capabilities to call the ver_get_version_list_app( ) 5000 and ver_get_version_list( ) 4900 functions. These relationships are represented by the dashed arrows in FIG. 57.

Preventing Unauthorized Network Access

As described previously, the systems described herein obtain user approval, e.g., by use of a modal dialog box, when an application calls a system function to connect a TCP socket. Similarly, user approval is obtained before executing a system call to send data to a listening UDP socket in some implementations.

Web browsers, however, are designed to function as part of a distributed system and, consequently, engage in network transmissions with nearly every user click. Thus, typical user behavior would trigger a flood of approval dialog boxes, which could be annoying and overtaxing for the user. Additionally, the ad-supported model of many, if not most, websites includes network activity with ad content servers that the user had no intention, let alone knowledge, of accessing. Unlike the situation with opening files, systems lack the ability to distinguish between network transmissions intended by the user from those initiated by web page content. Moreover, URLs may be subjected to redirect responses, further confounding the process of gathering user intent.

A solution would be to authorize users to remove the approval restriction on a selected application, such as a web browser. Security-conscious users, however, may wish to avail themselves of a more limited manual approval process that could still provide significant protection. Notably, ad content is retrieved secondarily after the desired web page has been retrieved. The network transmissions involving ad content occur as the page loads in the browser, characteristically prior to further user inputting of mouse clicks and key strokes. This timing characteristic can be exploited to distinguish primary user-intended network activity from that involving ad content.

In some implementations, for applications that are not subject to prior approval for all network actions, the system provides the user an option that would still require approval for primary user actions but also configures a short timer, such as between 1 and 10 seconds, that the system will then use as a grace period for automatically approving all secondary network activity by the application. In some implementations, the system restricts secondary activity by limiting the amount of data that can be transmitted by the application to the server, such as to a total of 1024 bytes prior to receiving data from the server and none thereafter. In some implementations, the system suspends propagating user input to the application until the timer has expired, thereby limiting the data that is transmitted to secondary servers to only data contained within the web page response transmitted from the primary source. The user would experience this approach as having to approve of each link clicked or domain typed in the address bar. If a modal approval dialog box appeared that did not match a link clicked or typed domain name, the user would be alerted that surreptitious activity outside of the limited secondary activity is being attempted by the web page.

Some implementations include a utility that permits the user to select network transmission approval settings for each application. In some implementations, the user is permitted to elect to entirely exempt an application from manual approval of network activity or leave manual approval in place. In some implementations, the user is permitted to elect to automatically allow secondary network activity following a user approval of network activity. In some implementations, the user is permitted to set constraints on secondary activity, including a window of time for it to begin, a limit on the amount of data transmitted to a secondary server, and whether secondary activity is permitted after the app attempts to retrieve user input.

In some implementations, a default mode seeks explicit user permission whenever an application initiates network activity. In some implementations, a governed network activity mode requires explicit user permission when an application first initiates network activity but then permits additional activity without user approval. In some implementations, the additional activity is limited in time and scope by use of various configurable parameters. Thus, this mode burdens the user with fewer requests for permission but limits the subsequent network activity in order to reduce the impact of potentially malicious code. Some implementations include a utility that permits users to exempt applications from control, as well designate that an application is subject to governed network activity mode rather than the default mode.

In some implementations, code used by the operating system to regulate hidden network activity is modified, specifically the sending and receiving of packets across a network without user knowledge or permission. In some implementations, several software modules are added to a distribution of an operating system, as well as revisions to existing software modules that comprise the operating system kernel.

Thus, some implementations include constraints on network activity by application programs in either a default mode or a governed network activity mode. In some implementations, all programs are constrained by default. In some implementations, a utility is provided that permits users to exempt designated programs from such default control. In some implementations, the utility permits users to designate programs for control in governed network activity mode.

Figure 58:
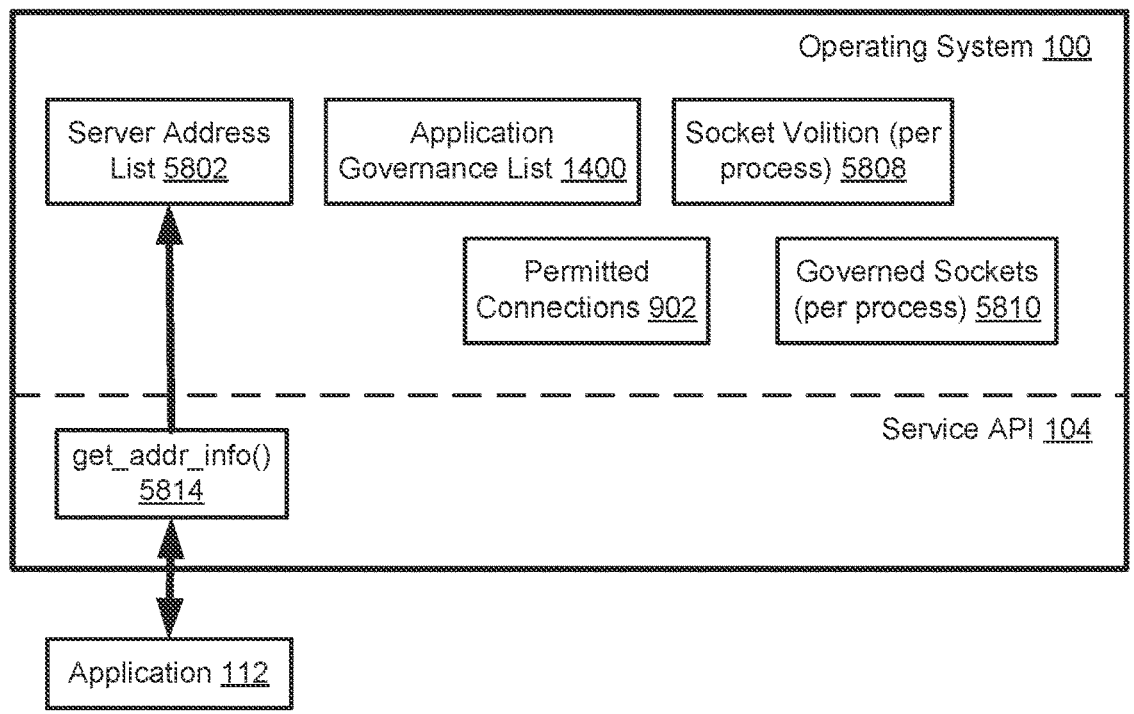
FIGS. 58-68 illustrate an example operating system and example functions for preventing unauthorized network access in accordance with some implementations.

In some implementations, an area of storage, designated server address list 5802 in FIG. 58 and accessible only by the kernel, is set up for a table of server addresses. In some implementations, each table entry includes a domain name supplied, directly or indirectly, by the user, and its corresponding IP address. In some implementations, another area of storage, designated application governance list 1400 in FIG. 58 and accessible only by the kernel, is set up for associations between applications and the type of governance. In some implementations, each entry in the list includes an application name and a flag indicating that the program is either exempted from control or is subject to governed network activity mode. In some implementations, an area of storage, designated permitted connections 902 in FIG. 58 and accessible only by the kernel, is set up for a table of associations between applications and domain names. In some implementations, each entry in the list includes an application name and a domain name. In some implementations, the entry represents permission by the user for the named application to connect to the named domain. In some implementations, a utility permits users to manage the application governance list 1400 and permitted connections 902 tables directly.

In some implementations, the governed network activity mode requires additional storage. For example, a record for each application, designated as socket volition 5808 in FIG. 58 and accessible only by the kernel, stores the record of volition when it exists for an application. In some implementations, an area of storage, designated as governed sockets 5810 in FIG. 58 and accessible only by the kernel, is set up for a list of sockets that are subject to certain restrictions with respect to network activity. In some implementations, various system-wide, user configurable parameters are stored. In some implementations, the following parameters are included: a volition expiration time, a maximum number of secondary sockets permitted, whether multiple transactions may be conducted by a secondary socket, and a maximum number of bytes a secondary connection is permitted to send. In some implementations, various networking functions in the kernel that map to the external socket library functions are modified.

In some implementations, in the default mode, the system checks before permitting initiation of network activity. In some implementations, the application 112 in FIG. 58 obtains an IP address associated with a domain name. In some implementations, the application makes a request by calling the getaddrinfo( ) function 5814 in FIG. 58 that is supplied with the operating system.

In some implementations, getaddrinfo( ) 5814 retrieves the IP address and creates and adds a table entry, including the domain name passed to getaddrinfo( ) 5814 and the IP address associated with that domain name, to the server address list 5802. In some implementations, if multiple IP addresses are returned by accessing the DNS system, getaddrinfo( ) 5814 constructs an entry for each one and adds all of these records to the server address list 5802.

Figure 59:
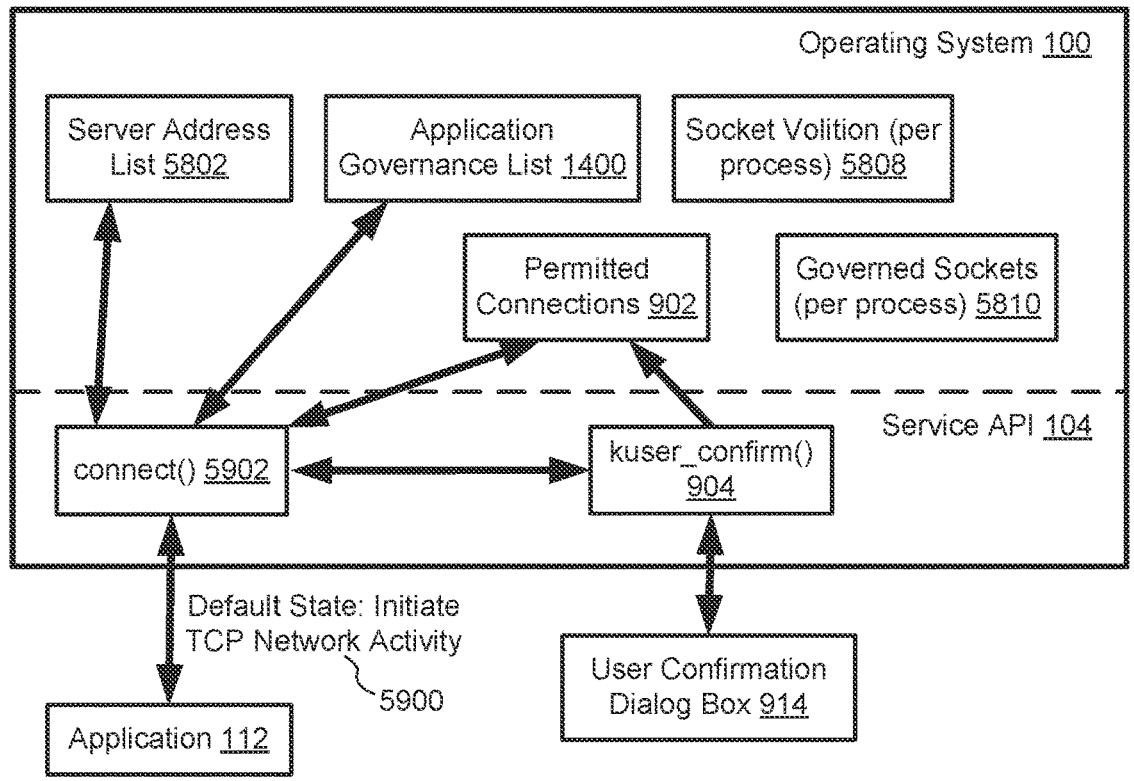

In some implementations, having obtained the IP address, an application initiates network activity in one of two ways. In FIG. 59, application 112 calls the connect( ) function 5902 (e.g., supplied with the operating system) with the IP address to establish a TCP connection. In some implementations, before establishing the connection, the connect( ) function 5902 checks the application governance list 1400 in order to determine whether the application has been exempted from network control. If so, the connect( ) function 5902 proceeds normally. In some implementations, otherwise the connect( ) function 5902 uses the IP address to obtain the associated domain name from the server address list 5802 and then queries the permitted connections table 902 to determine whether the application already has user permission to connect to the named domain. If so, the connect( ) function 5902 proceeds normally, otherwise, it calls the kuser_confirm( ) function 904, which displays a user confirmation dialog box 914 that asks the user whether the named application may connect to the named server (e.g., domain). For example, if the user clicks "Yes" or "OK" in dialog box 914, the kuser_confirm( ) function 908 returns a code indicating user approval to the connect( ) function 5902, which then proceeds normally. In some implementations, otherwise, the kuser_confirm( ) function 908 returns an error code to the connect( ) function 5902, which returns the error code to the application 112. In some implementations, the dialog box 914 displays a checkbox that, if checked by the user, permits the application to always connect to the named server. In some implementations, if the user also selects the checkbox, the kuser_confirm( ) function 908 creates and adds an entry to the permitted connections table 902, thereby eliminating the need for future dialog boxes with the exact same message.

Figure 60:
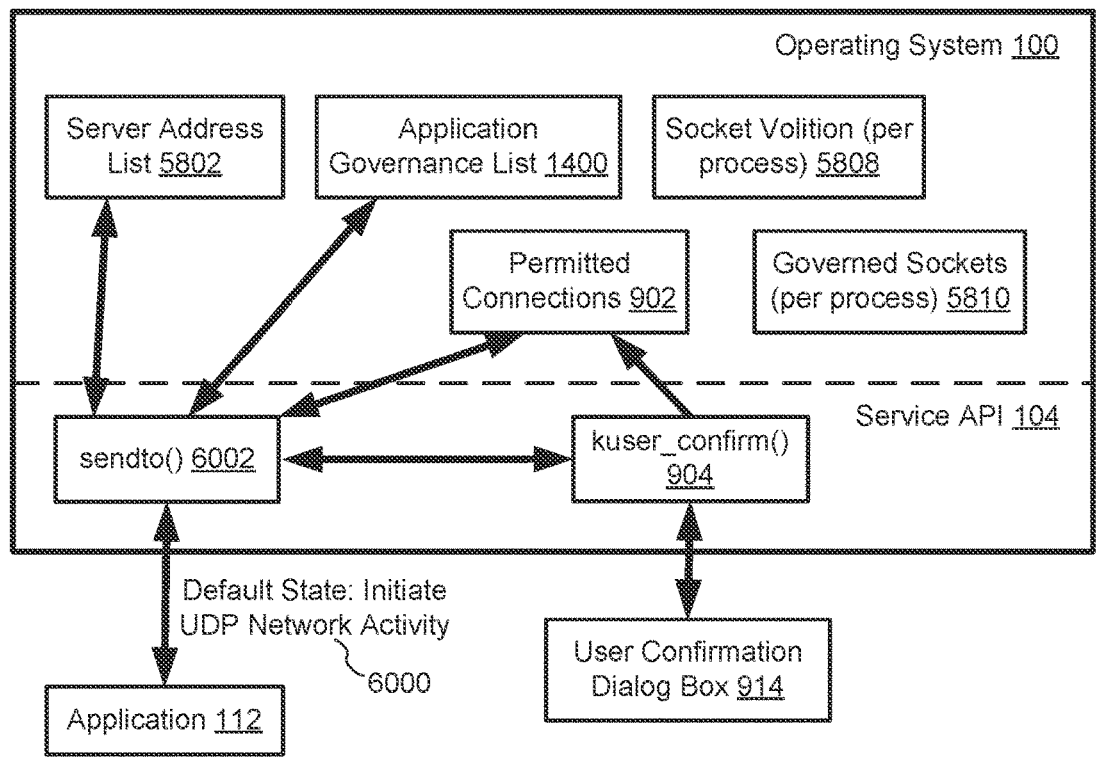

In some implementations, an application 112 initiates UDP network activity by attempting to send data using the sendto( ) function 6002 in FIG. 60. As with the connect( ) function 5902, the sendto( ) function 6002 performs the same steps with respect to the application governance list 1400, the server address list 5802, the permitted connections table 902, and, if needed, the kuser_confirm( ) function 904. In some implementations, if the user permits this network activity, either by way of the dialog box 914 or the permitted connections list 902, then the sendto( ) function 6002 proceeds normally and transmits the data. In some implementations, otherwise, the sendto( ) function 6002 returns an error code to the application 112. In this way, the default mode seeks user permission whenever an application initiates network activity.

Figure 61:
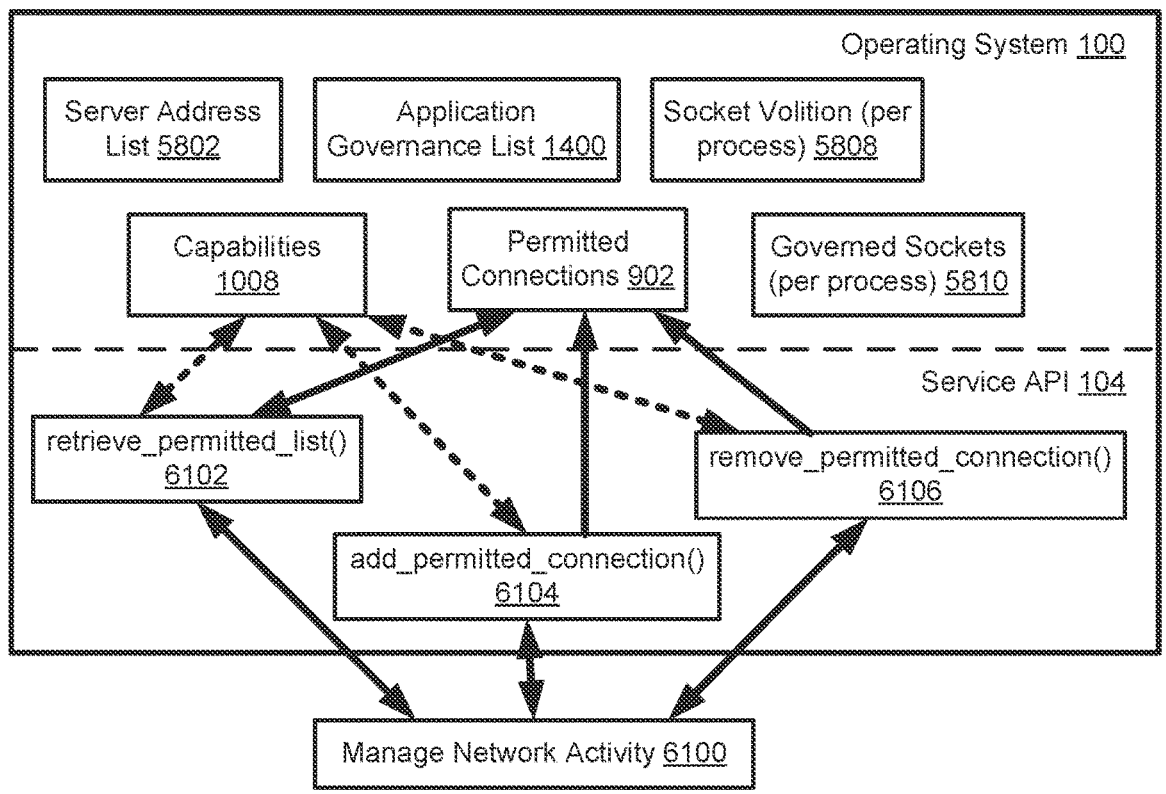

FIG. 61 shows a manage network activity utility 6100, which is a utility program provided to users that permits the users to directly manage entries in the permitted connections table 902. In some implementations, system functions retrieve_permitted_list( ) 6102, add_permitted_connection( ) 6104, and remove_permitted_connection( ) 6106, in FIG. 61, are added to the operating system. In some implementations, the utility 6100 calls the retrieve_permitted_list( ) 6102, the remove_permitted_connection( ) 6106, and the add_permitted_connection( ) 6104, functions to, respectively, allow users to view entries in the permitted connections table 902, remove existing entries that were added because of the checkbox on the dialog box, and add entries to avoid the dialog box.

In some implementations, other programs and modules are not allowed to call the retrieve_permitted_list( ) 6102, the add_permitted_connection( ) 6104, and the remove_permitted_connection( ) 6106 functions. There are a variety of means to prevent other programs and modules from calling these system functions. In some implementations, a capability is afforded to the manage network activity utility 6100 that permits it to call these functions. In some implementations, the capability is stored where the operating system regularly maintains capabilities, designated in FIG. 61 as capabilities table 1008. In some implementations, each of these functions confirm the capability before performing their operations, as represented by the dashed arrows in FIG. 61. In some implementations, this capability, controlled by the kernel, is not afforded to other programs (e.g., malware will lack the capability to alter the list of permitted connections 902).

Figure 62:
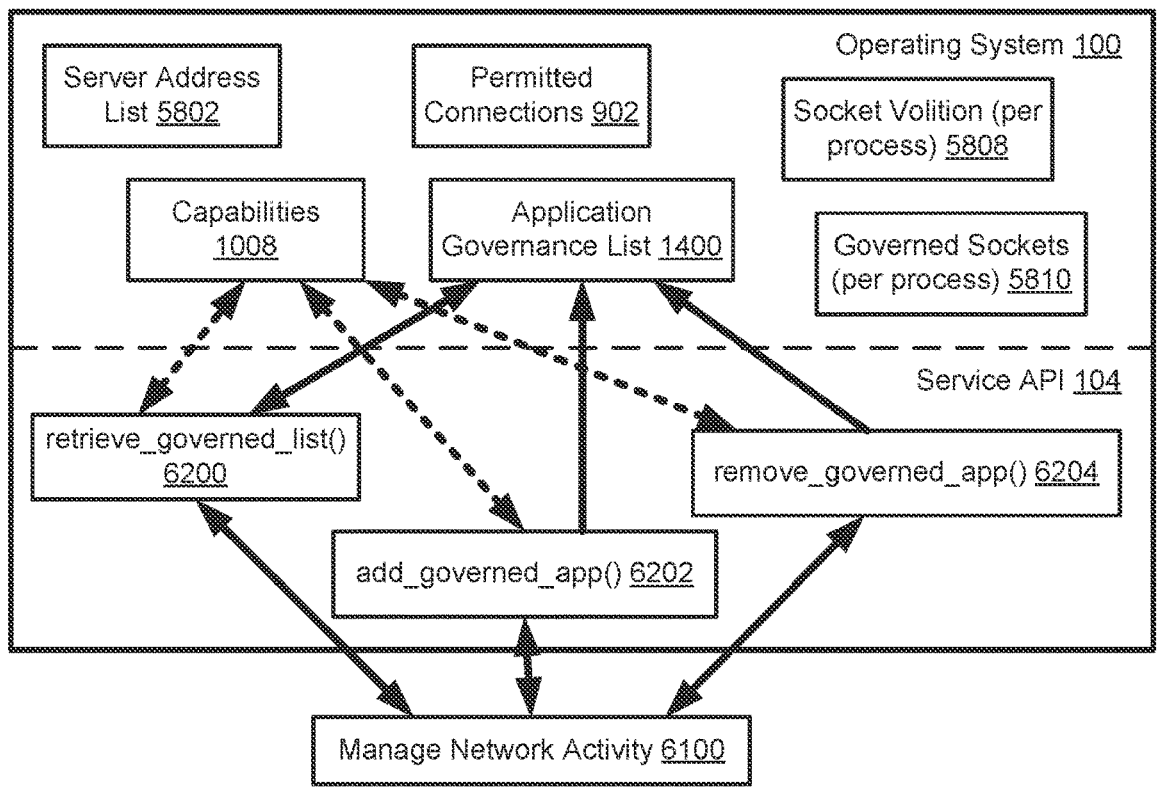
Figure 63:
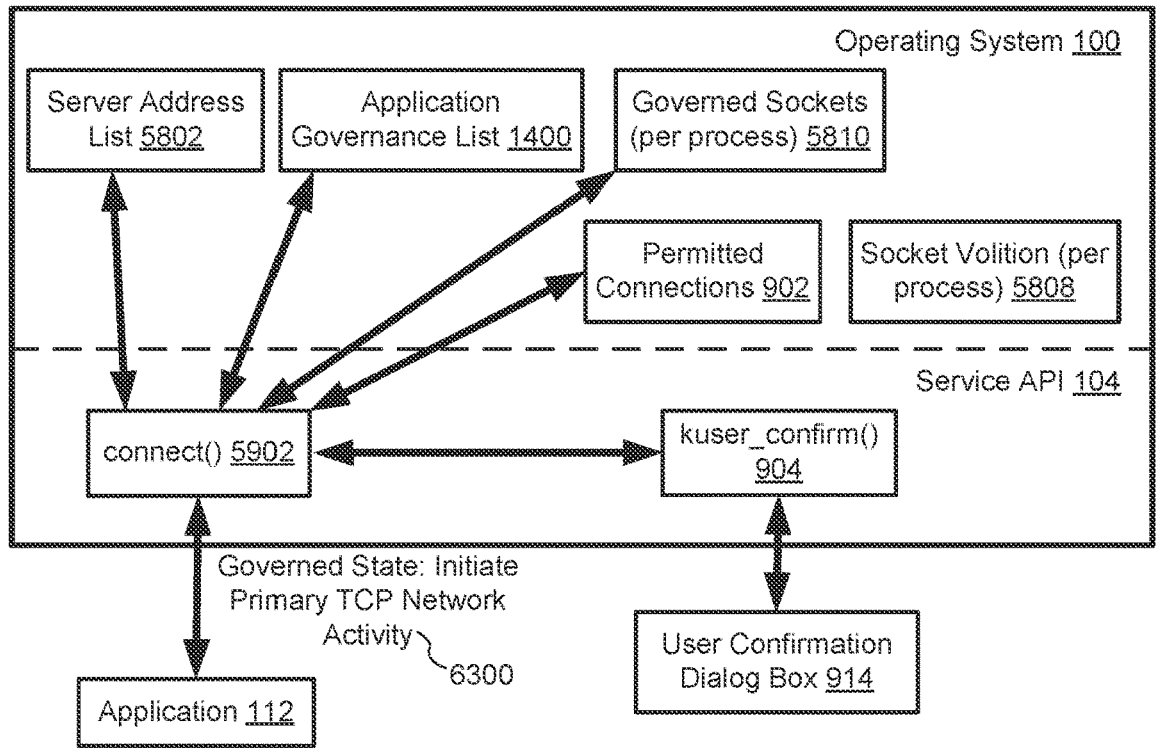

FIG. 62 shows the manage network activity utility 6100 providing users with the ability to directly manage the entries in the application governance list 1400. In some implementations, system functions retrieve_governed_list( ) 6200, add_governed_app( ) 6202, and remove_governed_app( ) 6204 are provided (e.g., via an OS update). In some implementations, the manage network activity utility 6100 calls the retrieve_governed_list( ) 6200, add_governed_app( ) 6202, and remove_governed_app( ) 6204 functions to, respectively, view the list of entries in the application governance list 1400, add applications to the list 1400, and remove designated applications from the list 1400. In some implementations, if a user removes a designated application from list 1400, the application automatically returns to default control.

In some implementations, other programs and modules are not allowed to call the retrieve_governed_list( ) 6200, add_governed_app( ) 6202, and remove_governed_app( ) 6204 functions. There are a variety of means to prevent other programs and modules from calling these system functions. In some implementations, a capability is afforded to the manage network activity utility 6100 that permits it to call these functions. In some implementations, the capability is stored in the table 1008. In some implementations, each of these functions confirm the capability before performing their operations, as is represented by the dashed arrows in FIG. 62.

In some implementations, in the governed network activity state, applications initiate TCP activity in the same way. For example, the application 112 in FIG. 64 calls the connect( ) function 5902, which queries the application governance list 1400 to determine that the application is subject to the governed network activity mode. In some implementations, the connect( ) function 5902 then retrieves the server domain name from the server address list 5802. In some implementations, the connect( ) function 5902 next tests whether the socket volition 5808 contains a volition record. In some implementations, because the application starts in the state of "No volition," the answer is negative. Accordingly, the connect( ) function 5902 queries the permitted connections table 902 to determine whether the application already has user permission to connect to the named domain. If not, the connect( ) function 5902 calls the kuser_confirm( ) function 904, as described above. In some implementations, if the user permits a connection to the named server, the connect( ) function 5902 proceeds to establish an ordinary TCP connection. In some implementations, if successful, the connect( ) function 5902 creates a volition record and stores it as a socket volition 5808. At that time, the application changes into the "Volition exists" state.

Figure 64:
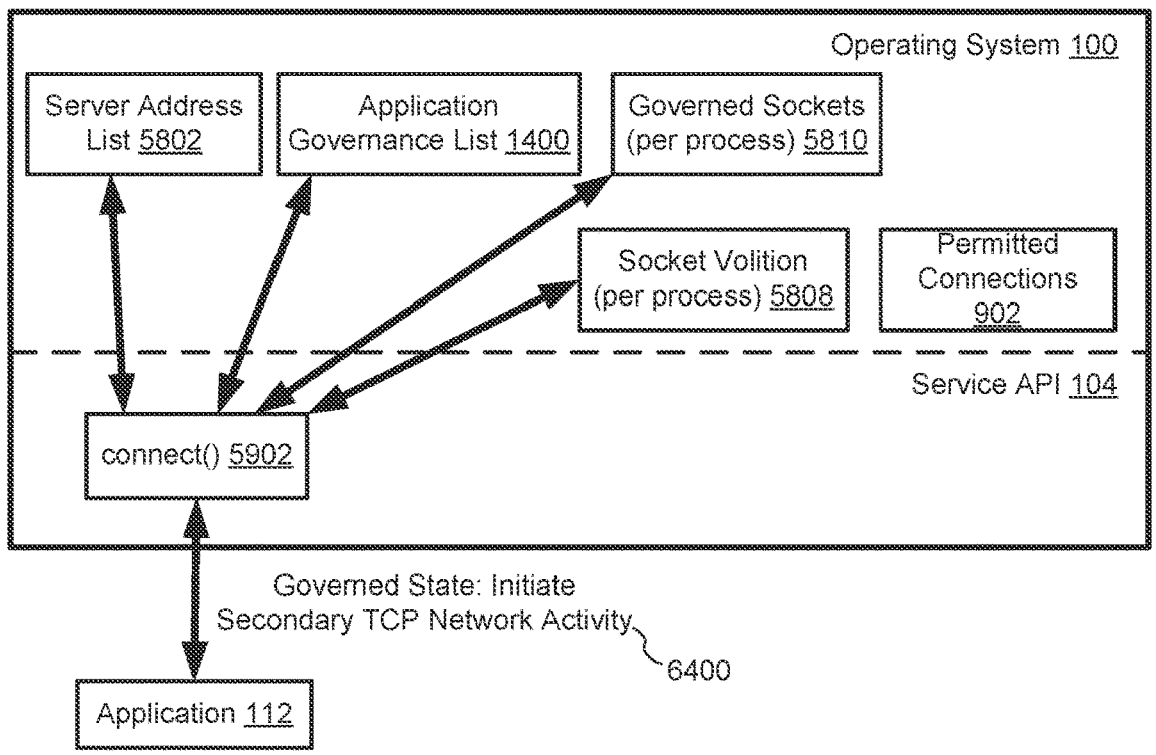

In some implementations, if the application 112 again calls the connect( ) function 5902 in FIG. 64, the process results in the connect( ) function 5902 retrieving the newly-constructed socket volition 5808 record. In some implementations, the connect( ) function 5902 then compares the domain name associated with the IP address passed into the function call with the domain name stored in the socket volition 5808 record. If the domain names match, then the connect( ) function 5902 proceeds with an ordinary TCP connection. Hence, while in the "Volition exists" state, an application can create additional TCP connections with the server named in the socket volition 5808 record. In some implementations, if the domain name associated with the call to the connect( ) function 5902 differs from the one stored in the volition record, then the socket passed into the call is considered secondary activity. In that case, the connect function( ) 5902 adds the socket to the governed sockets list 5810 if the time for secondary activity has not expired and the maximum number of secondary sockets has not been reached. In some implementations, otherwise, the connect( ) function 5902 returns an error code that the server may not be accessed. As mentioned above, in some implementations, the expiration time and maximum number of secondary sockets are system-wide, user configurable parameters.

Figure 65:
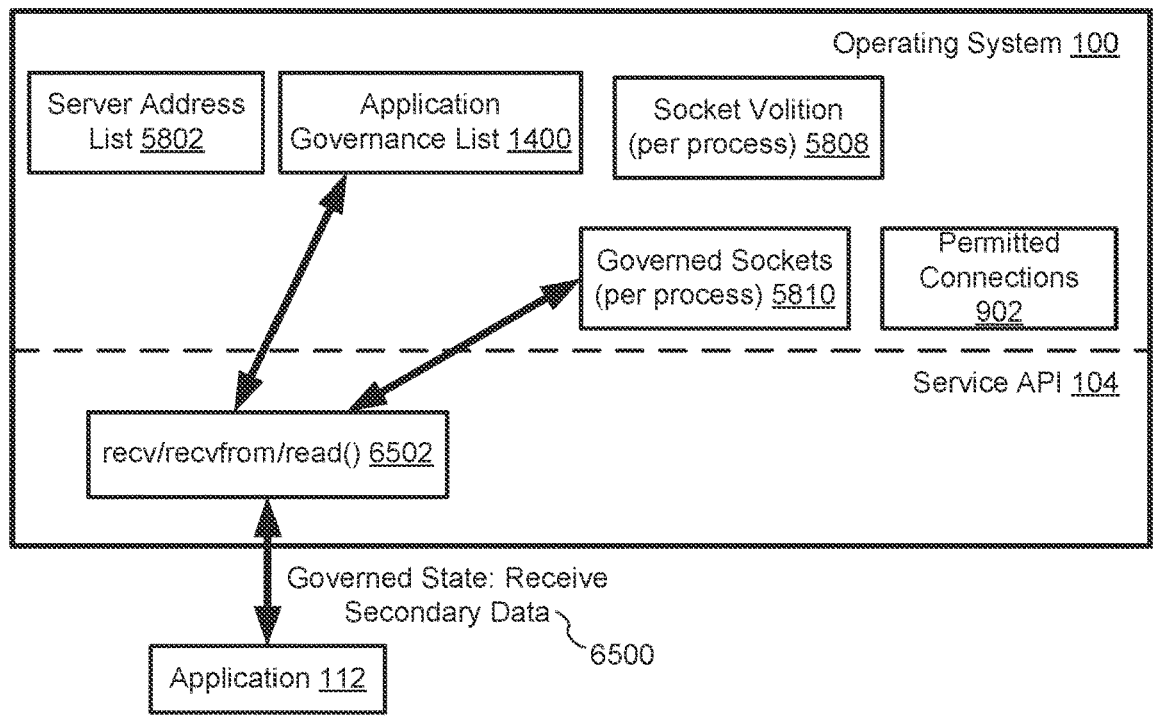

In some implementations, receiving transmissions involves changes to the kernel functionality that map to the external socket library functions recv( ) and recvfrom( ) as well as the generic kernel functionality associated with the primitive read( ) library function, all designated as recv/recvfrom/read( ) 6502 on FIG. 65. In some implementations, when the application 112 calls recv/recvfrom/read( ) 6502 to receive secondary data 6500, the recv( ) and recvfrom( ) functions check whether the application is subject to the governed network activity mode by querying the application governance list 1400. If the application is not so governed, each function will behave normally. Otherwise, recv( ) and recvfrom( ) attempt to retrieve the entry in the governed sockets list 5810 for the socket passed into the function call. In some implementations, if the socket is indeed governed, the functions access the system parameter that decides whether multiple transactions are disabled. In some implementations, if such transactions are disabled, then both functions set the state of the governed sockets 5810 entry as unable to send. In some implementations, each function then performs its normal receiving function. In some implementations, if the application 112 calls the read function and the file descriptor passed in is a socket, then the call is redirected to the modified recv( ) function.

Figure 66:
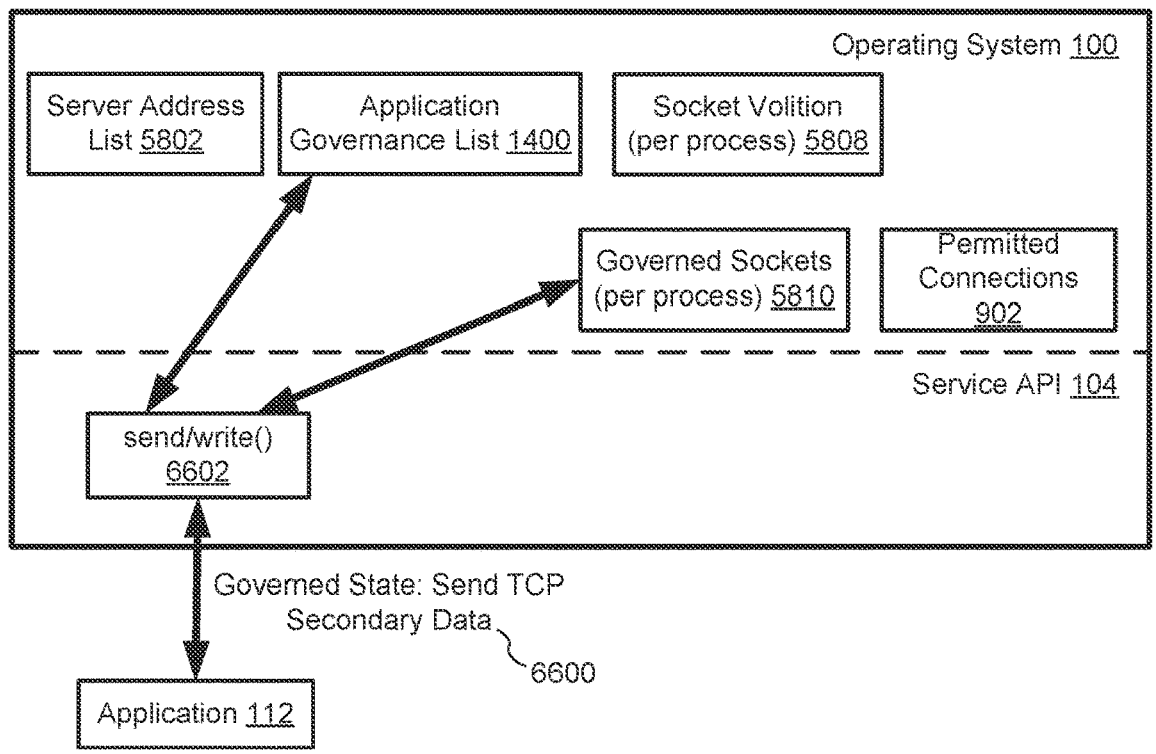
Figure 67:
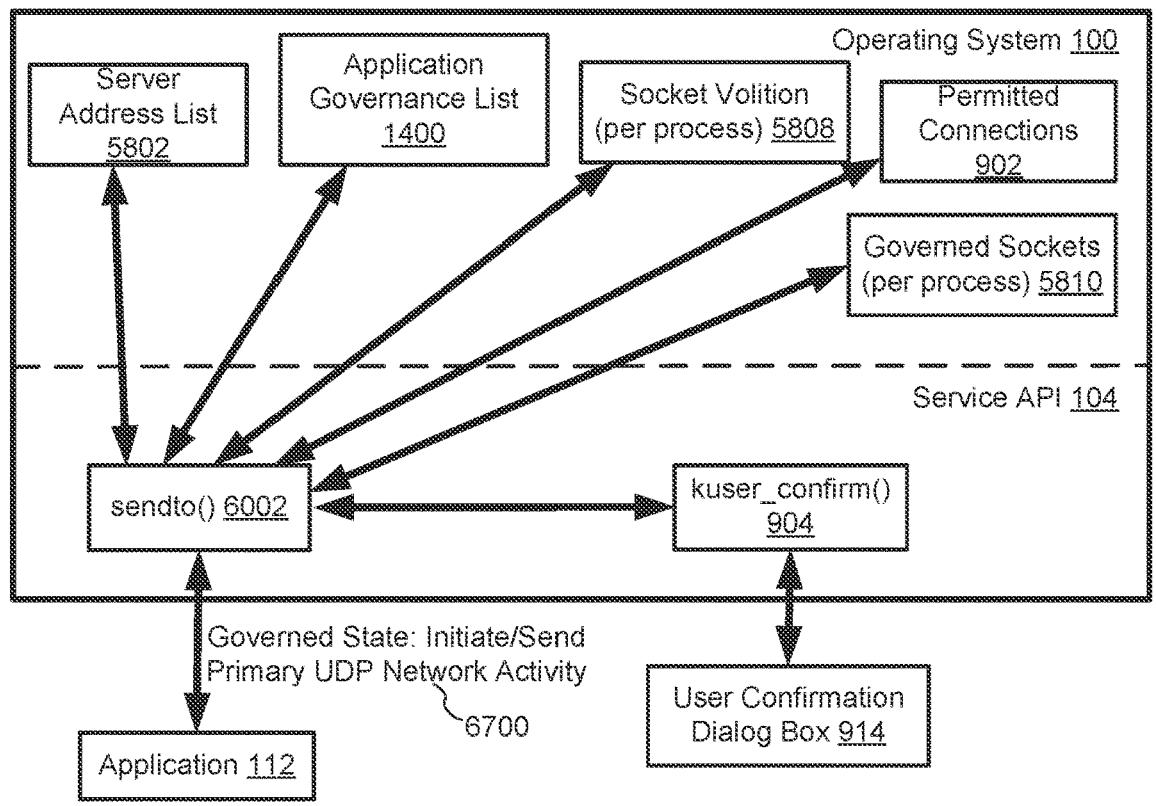

In some implementations, sending TCP network data involves a few changes to the kernel functionality that maps to the external socket function send( ) and the primitive library write( ) function, designated together as send/write( ) 6602 in FIG. 66. In some implementations, similar to the receiving functions, the send( ) function 6602 tests whether the application is subject to the governed network activity mode from the application governance list 1400 and, if so, whether the socket passed into the call is governed by attempting to retrieve its entry from the governed sockets 5810. If either condition is false, the function will behave normally. Otherwise, the send( ) function 6602 reduces the number of bytes that may be transmitted in accordance with how many bytes the governed socket has already sent and any limit imposed by system-wide governance parameter. In some implementations, if the send( ) function 6602 may no longer transmit, it sets an error condition indicating that the local endpoint for sending has been shutdown and returns an error code immediately. If the socket may still send, the normal send function is executed and the actual number of bytes added to the amount of bytes already sent is stored in the governed sockets 5810 entry. In some implementations, if the application 112 calls the write( ) function 6602 and the file descriptor passed in is a socket, then the call is redirected to the modified send( ) function 6602.

The sending of UDP network transmissions can present issues, some closely related to those faced by TCP connect functionality and others more related to governance constraints, such as those imposed on the network transmission receiving functions. In some implementations, when the application 112 calls the sendto( ) function 6002 in FIG. 67, the sendto( ) function 6002 tests whether the application is subject to the governed network activity mode from the application governance list 1400. In some implementations, if the application is subjected to the governed network activity mode, the sendto( ) function 6002 attempts to retrieve the entry from the governed sockets 5810 that pertains to the socket passed into the function call. In some implementations, if no relevant entry exists, the sendto( ) function 6002 checks volition. In some implementations, similar to the connect( ) function 5902 in FIG. 64, the sendto( ) function 6002 in FIG. 67 retrieves the name of the server associated with the address passed in as an argument from the server address list 5802 and attempts to retrieve the socket volition 5808 record. If no volition record exists, the socket passed in as an argument is considered to be a primary connection. In some implementations, the sendto( ) function 6002 in FIG. 67 queries the permitted connections 902, and, if needed, calls kuser_confirm( ) function 904 to determine whether the user permits this activity. In some implementations, if the user permits, the sendto( ) function 6002 transmits the data, then creates and stores a record of the user's volition in the socket volition list 5808. In some implementations, if a volition record already exists, the sendto( ) function 6002 compares the server domain name in the volition record to the server name associated with the address passed into the sendto( ) 6002 call. In some implementations, if the names match, then the activity is considered primary, regardless of the actual socket involved, and the sendto( ) function 6002 transmits the data.

Figure 68:
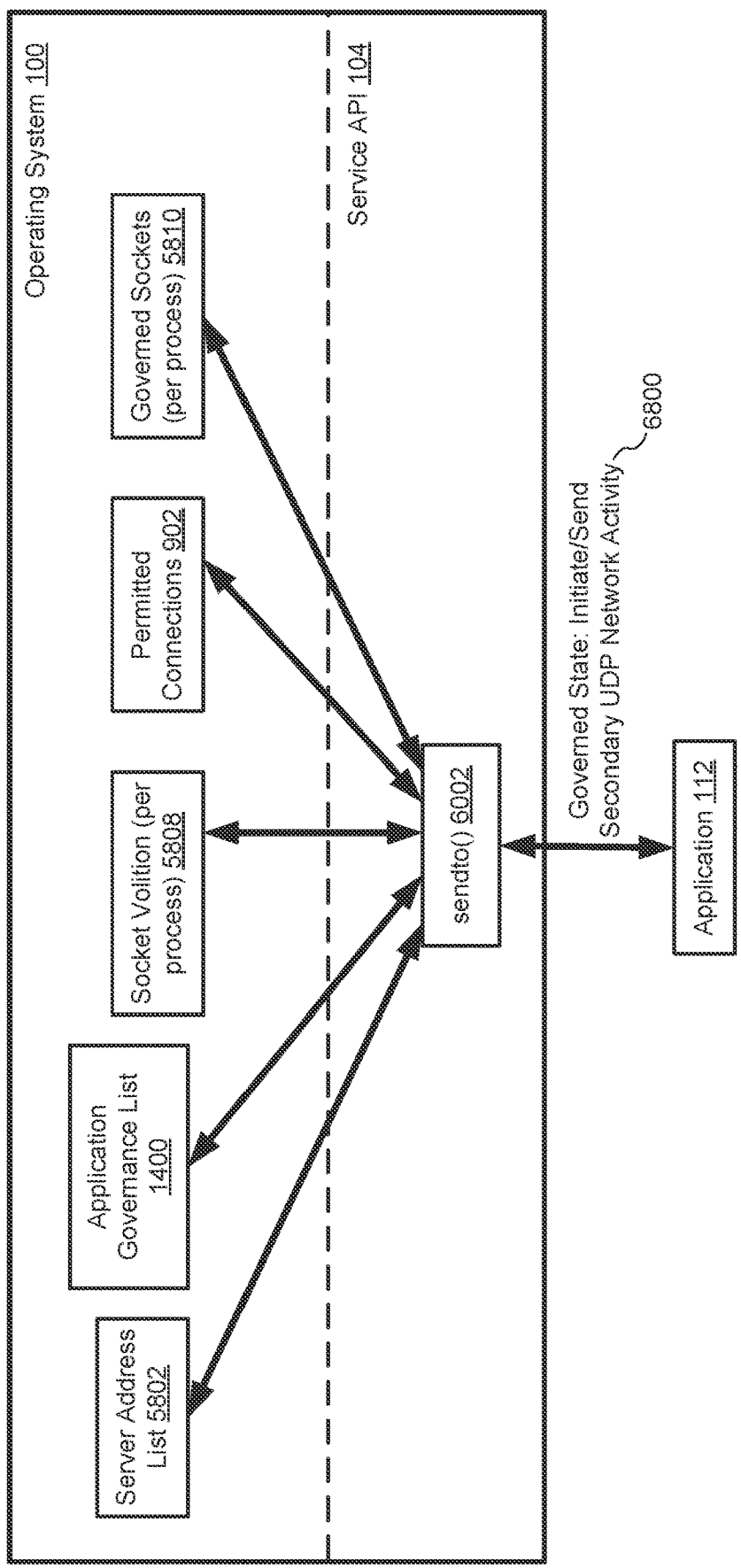

In some implementations, if the socket volition 5808 record exists but the domain names differ, then the activity is considered secondary, as depicted in FIG. 68. In that case, the sendto( ) function 6002 adds the socket to the governed sockets list 5810 in FIG. 68 if the time for secondary activity has not expired and the maximum number of secondary sockets has not been reached. In some implementations, otherwise, the sendto( ) function 6002 returns an error code that the server may not be accessed. In some implementations, assuming the socket is added to the governed sockets 5810 list, the sendto( ) function 6002 behaves as the send( ) function 6602 with respect to transmitting the data of a governed socket. In some implementations, if an entry from the governed sockets 5810 is returned when the sendto( ) function 6002 begins processing the call, it proceeds in the same manner because the activity is already known to be secondary.

As an example, the governed network activity mode seeks user permission whenever an application initiates network activity, known as primary activity, but then places the application into a "Volition exists" state. During the "Volition exists" state, the application can initiate network to other servers without explicit user permission, but this activity is constrained by various configurable parameters. The "Volition exists" state expires after a short period of time, which is configurable, and the application returns to the original "No volition" state. Thereafter, the process starts over when the user, again, permits additional primary activity.

In some implementations, system-wide parameters that are used for governed secondary activity are configurable by users. In some implementations, a utility is provided that enables users to configure the system-wide parameters. In some implementations, this functionality is incorporated into an existing system parameter configuration utility.

Figure 69A:
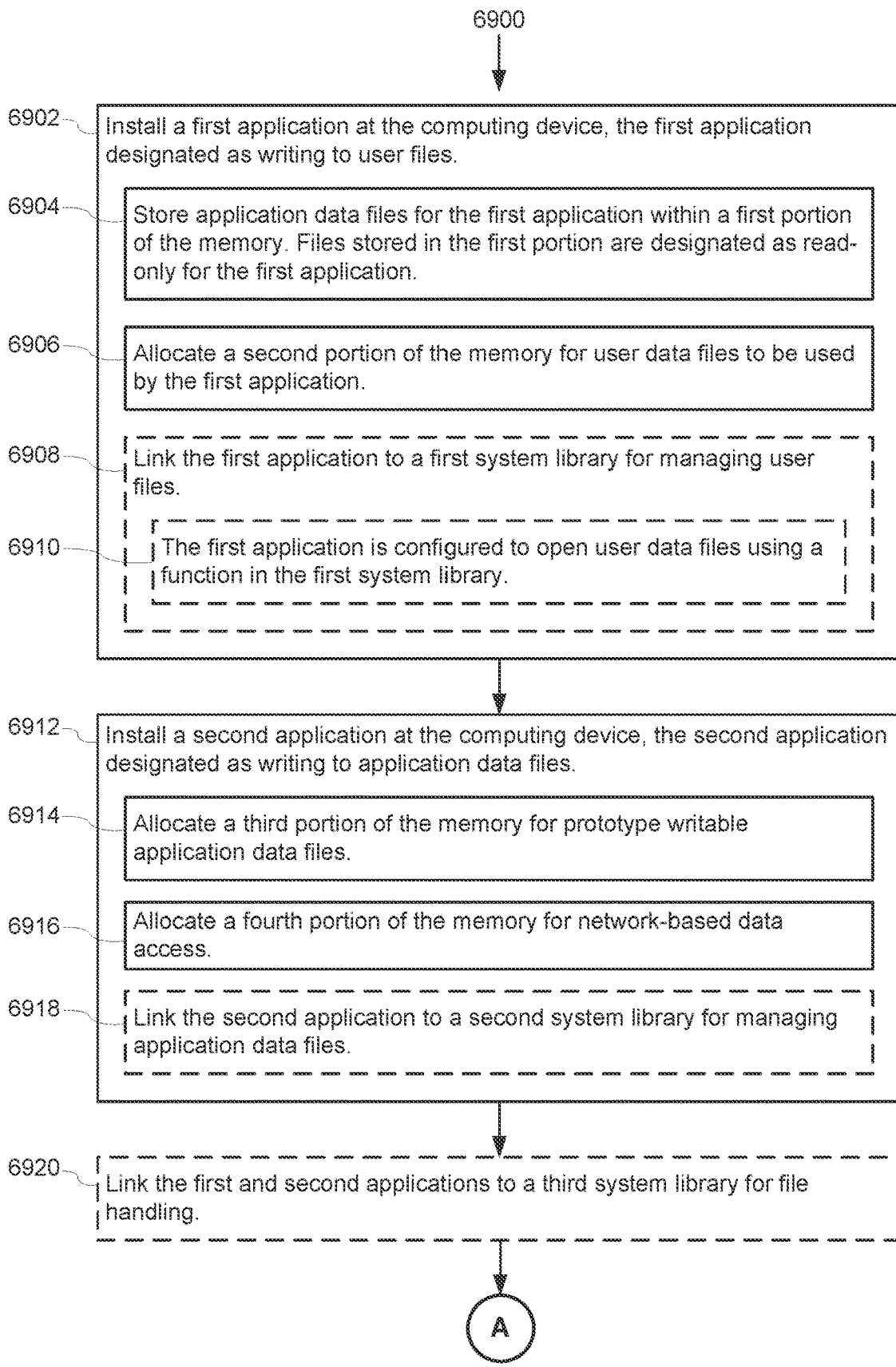
FIGS. 69A-69B are flow diagrams illustrating a method of preventing unauthorized access to data files in accordance with some implementations.
Figure 69B:
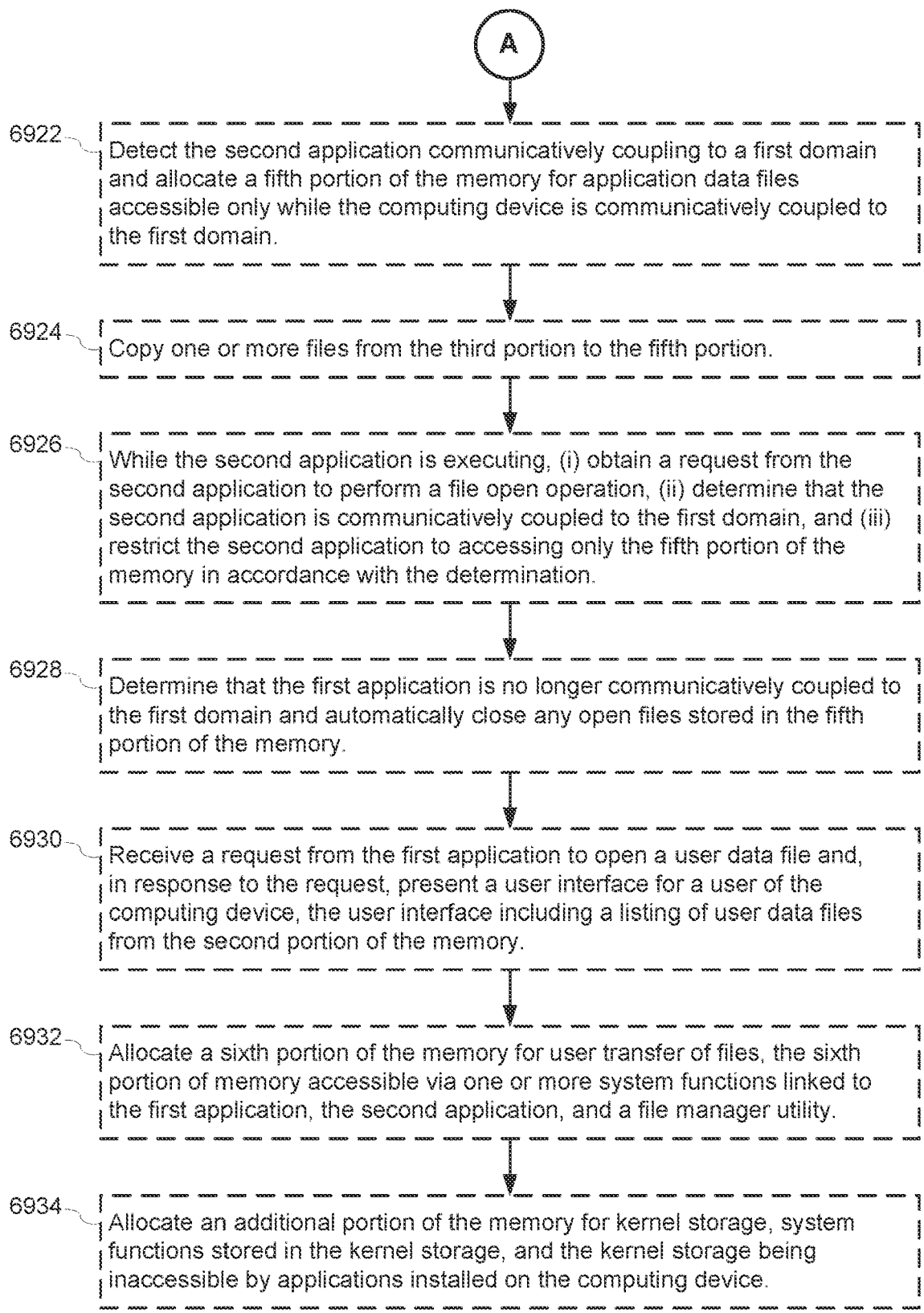

FIGS. 69A-69B are flow diagrams illustrating a method 6900 of preventing unauthorized access to data files in accordance with some implementations. In some implementations, the method 6900 is performed at a computing system (e.g., the computing device 4300) having one or more processors (e.g., the CPU(s) 4302) and memory (e.g., the memory 4314). In accordance with some implementations, the computing system includes an operating system (e.g., the operating system 100) and a service application programming interface (e.g., the service API 104). In some embodiments, the memory stores one or more programs configured for execution by the one or more processors. At least some of the operations shown in FIGS. 69A-69B correspond to instructions stored in a computer memory or computer-readable storage medium (e.g., the memory 1434).

The system installs (6902) a first application at the computing device, the first application designated as writing to user files. For example, the application 112 in FIG. 1 is designated as writing to user files.

The system stores (6904) application data files for the first application within a first portion of the memory. Files stored in the first portion are designated as read-only for the first application. For example, FIG. 6 shows application storage 604 with a portion designated for the application 608 and a sub-portion designated for read-only files 612.

The system allocates (6906) a second portion of the memory for user data files to be used by the first application. For example, FIG. 7 shows user storage 606 with a portion designated for the application 708 and a sub-portion designated for user files 712.

In some implementations, the system links (6908) the first application to a first system library for managing user files. For example, FIG. 7 shows the application 708 linked to the library 716.

In some implementations, the first application is configured (6910) to open user data files using a function in the first system library. For example, the application 112 in FIG. 1 opens user data files using the open_user_file( ) function 108 in the library 106.

The system installs (6912) a second application at the computing device, the second application designated as writing to application data files. For example, the application 208 in FIG. 2 is designated as writing to application data files.

The system allocates (6914) a third portion of the memory for prototype writable application data files. For example, FIG. 6 shows application storage 604 with a portion designated for the application 608 and a sub-portion designated for prototype writable data files 614.

The system allocates (6916) a fourth portion of the memory for network-based data access. For example, FIG. 7 shows user storage 606 with a portion designated for the application 708 and a sub-portion designated for application data files 714, which are divided by network status (e.g., offline 718, server1.com 720, and server2.com 722).

In some implementations, the system links (6918) the second application to a second system library for managing application data files (e.g., the library 202). For example, FIG. 7 shows the application 708 linked to the library 716.

In some implementations, the system links (6920) the first and second applications to a third system library for file handling (e.g., the library 302).

In some implementations, the system detects (6922) the second application communicatively coupling to a first domain and allocates a fifth portion of the memory for application data files accessible only while the computing device is communicatively coupled to the first domain. For example, the first domain is server1.com and the system designates the memory portion server1.com 720 for the application 708.

In some implementations, the system copies (6924) one or more files from the third portion to the fifth portion. For example, the system copies the prototype files from the prototype writable application data files portion 614 to the server1.com portion 720.

In some implementations, while the second application is executing, the system: (i) obtains (6926) a request from the second application to perform a file open operation, (ii) determines that the second application is communicatively coupled to the first domain, and (iii) restricts the second application to accessing only the fifth portion of the memory in accordance with the determination. In some implementations, a system library tracks the network status (e.g., the library 202). For example, when an application is not connected to a server over a network, the application data files involved are associated with an offline network status. When the application is connected to a particular server, the application data files are associated with the particular server.

In some implementations, the system determines (6928) that the first application is no longer communicatively coupled to the first domain and automatically closes any open files stored in the fifth portion of the memory. In some implementations, if the application closes the network connection, then the status changes automatically to offline, which automatically forces the closing of any application data files that were open for reading and writing during that particular network status.

In some implementations, the system receives (6930) a request from the first application to open a user data file and, in response to the request, presents a user interface for a user of the computing device, the user interface including a listing of user data files from the second portion of the memory, e.g., as described above with respect to the open_user_file( ) function 108.

In some implementations, the system allocates (6932) a sixth portion of the memory for user transfer of files, the sixth portion of memory accessible via one or more system functions linked to the first application, the second application, and a file manager utility. For example, FIG. 7 shows a transfer area 706 for the user 702 and a global transfer area 700 (e.g., for all users).

In some implementations, the system allocates (6934) an additional portion of the memory for kernel storage (e.g., the kernel storage 800), system functions stored in the kernel storage (e.g., the kernel modules 804), and the kernel storage being inaccessible by applications installed on the computing device.

Figure 70A:
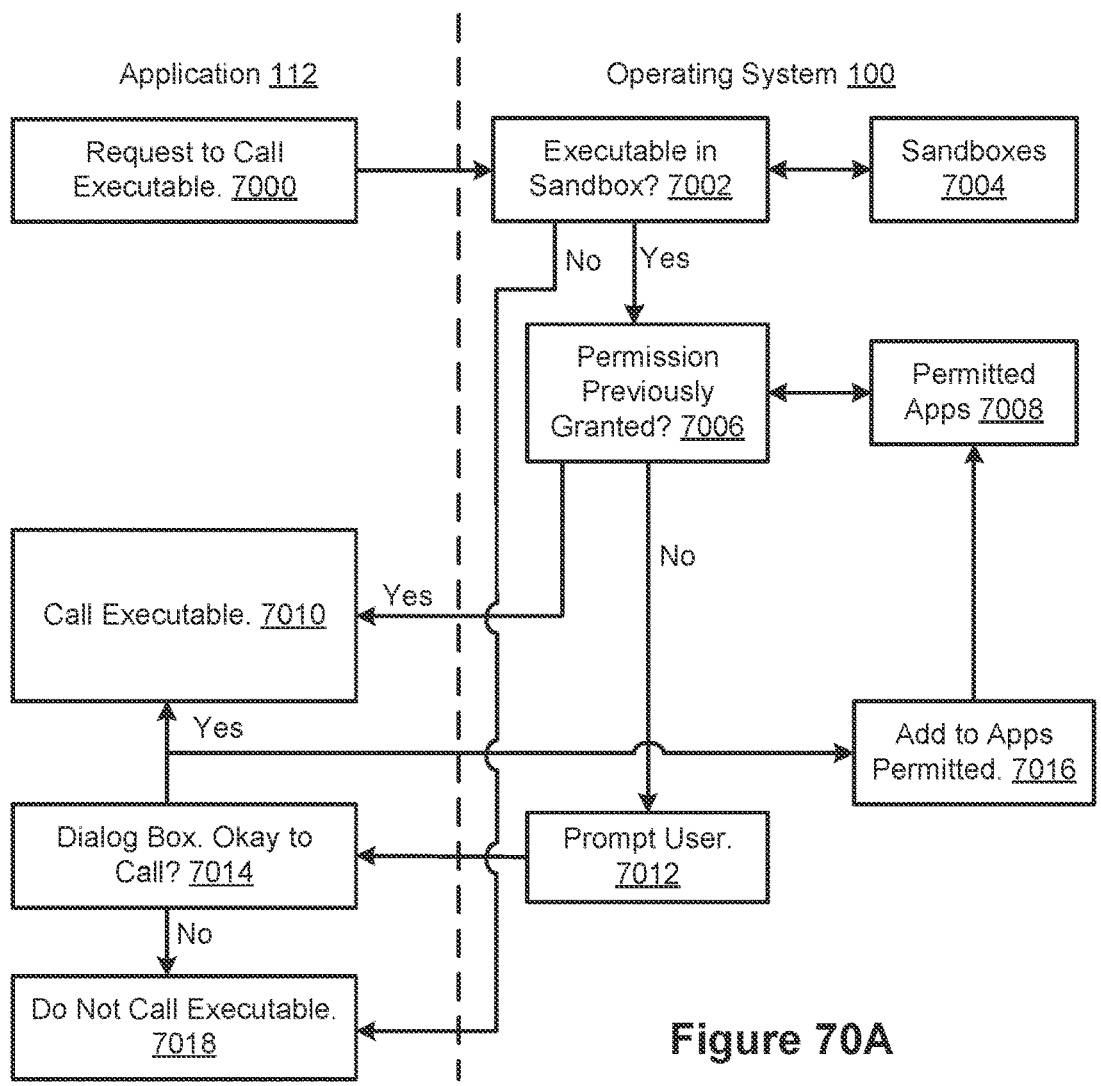
FIG. 70A is a flow diagram illustrating a method of preventing unauthorized calls to executable functions in accordance with some implementations.

FIG. 70A is a flow diagram illustrating a method of preventing unauthorized calls to executable functions in accordance with some implementations. In some implementations, the method in FIG. 70A is performed at a computing system (e.g., the computing device 4300) having one or more processors (e.g., the CPU(s) 4302) and memory (e.g., the memory 4314). In accordance with some implementations, the computing system includes an operating system (e.g., the operating system 100) and an application (e.g., the application 112). In some embodiments, the memory stores one or more programs configured for execution by the one or more processors. At least some of the operations shown in FIG. 70A correspond to instructions stored in a computer memory or computer-readable storage medium (e.g., the memory 1434).

The application 112 requests (7000) to call an executable. For example, the application 112 calls one of the exec( ) functions 4408, as described above in reference to FIGS. 44-47.

The operating system 100 determines (7002) whether the executable is in a sandbox of the sandboxes 7004. For example, the system queries a sandbox list (e.g., the sandbox list 3408).

If the executable is not in a sandbox, the application 112 is not permitted (7018) to call the executable. For example, the call is denied and, optionally, a dialog box is displayed to the user (e.g., the dialog box 4702).

If the executable is in a sandbox, the operating system 100 determines (7006) whether permission had been previously granted by querying the permitted application 7008. For example, the operating system queries a permitted applications database (e.g., the permitted applications 4402). In some implementations, the system determines whether permission has been previously granted prior to (or concurrently with) determining whether the executable is in a sandbox. If permission has been previously granted, the application 112 is permitted to call (7010) the executable.

If permission has not previously been granted, the operating system 100 prompts (7014) the user to confirm whether to permit the application 112 to call the executable via the dialog box 7014 (e.g., the dialog box 7020). For example, the kuser_confirm( ) function 904 causes a dialog box 914 to be displayed to the user as described previously with respect to FIG. 47.

If the user does not give permission, the application 112 is not permitted (7018) to call the executable. For example, the call is denied and, optionally, a dialog box is displayed to the user (e.g., the dialog box 4702).

If the user does give permission, the application 112 is permitted to call (7010) the executable and the application 112 is added (7016) to the permitted applications 7016. For example, the application is added to the permitted applications 4402.

Figure 70B:
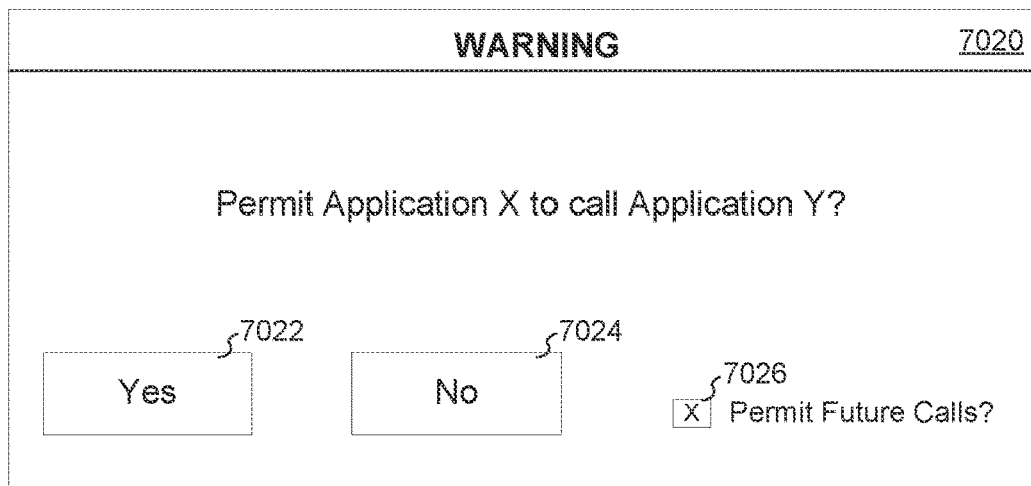
FIG. 70B illustrates an example dialog box in accordance with some implementations.

FIG. 70B illustrates a dialog box 7020 in accordance with some implementations. The dialog box 7020 includes an affordance 7022 for the user to permit the application to call the executable, an affordance 7024 for the user to prevent the application from calling the executable, and an affordance 7026 for the user to permit the application to make future calls to the executable in accordance with some implementations. In some implementations, the dialog box 7020 is an instance of the user confirmation dialog box 914. In some implementations, the dialog box 7020 is an instance of the dialog box 7014.

Figure 71A:
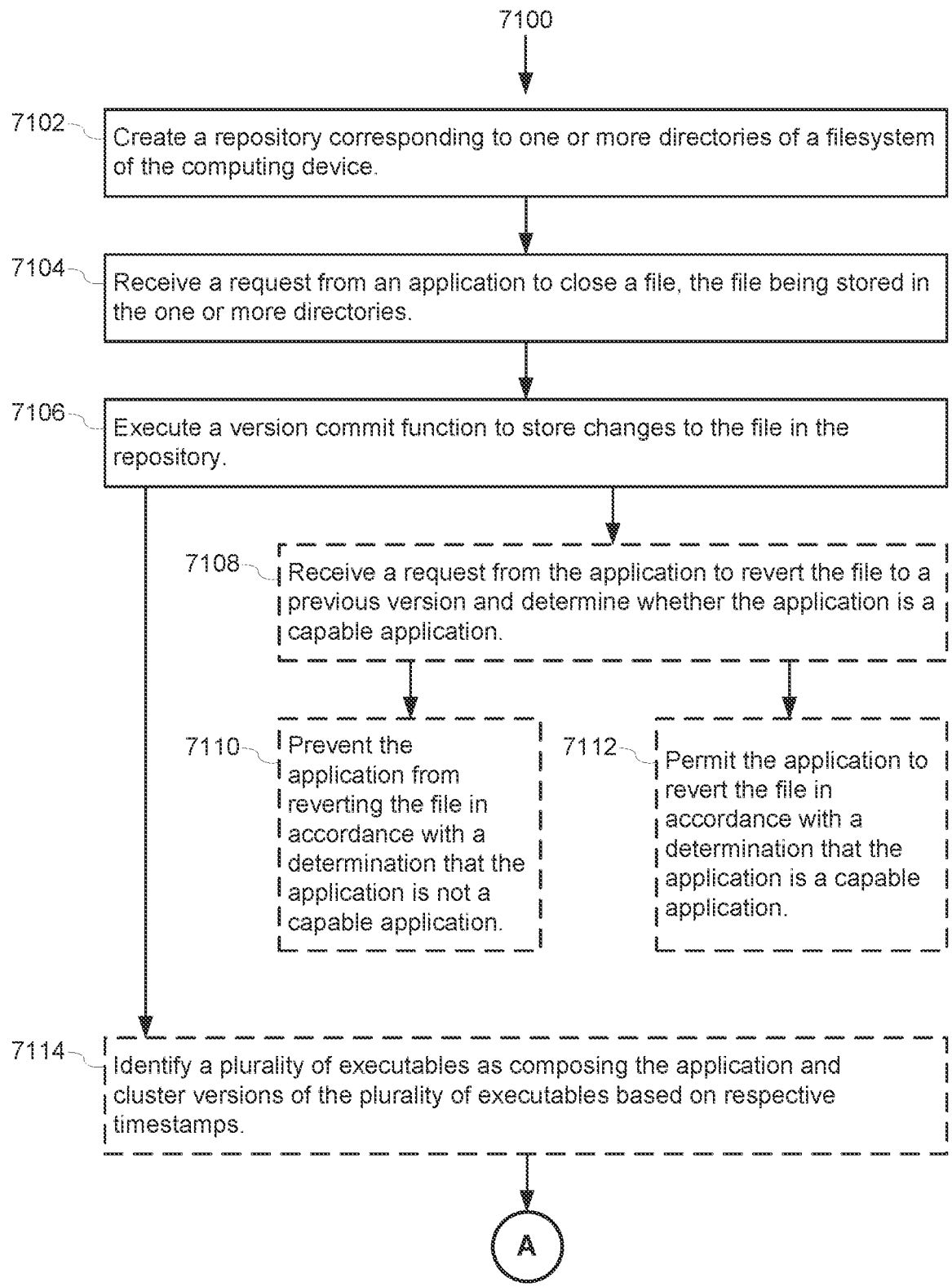
FIGS. 71A-71B are flow diagrams illustrating a method of version control in accordance with some implementations.
Figure 71B:
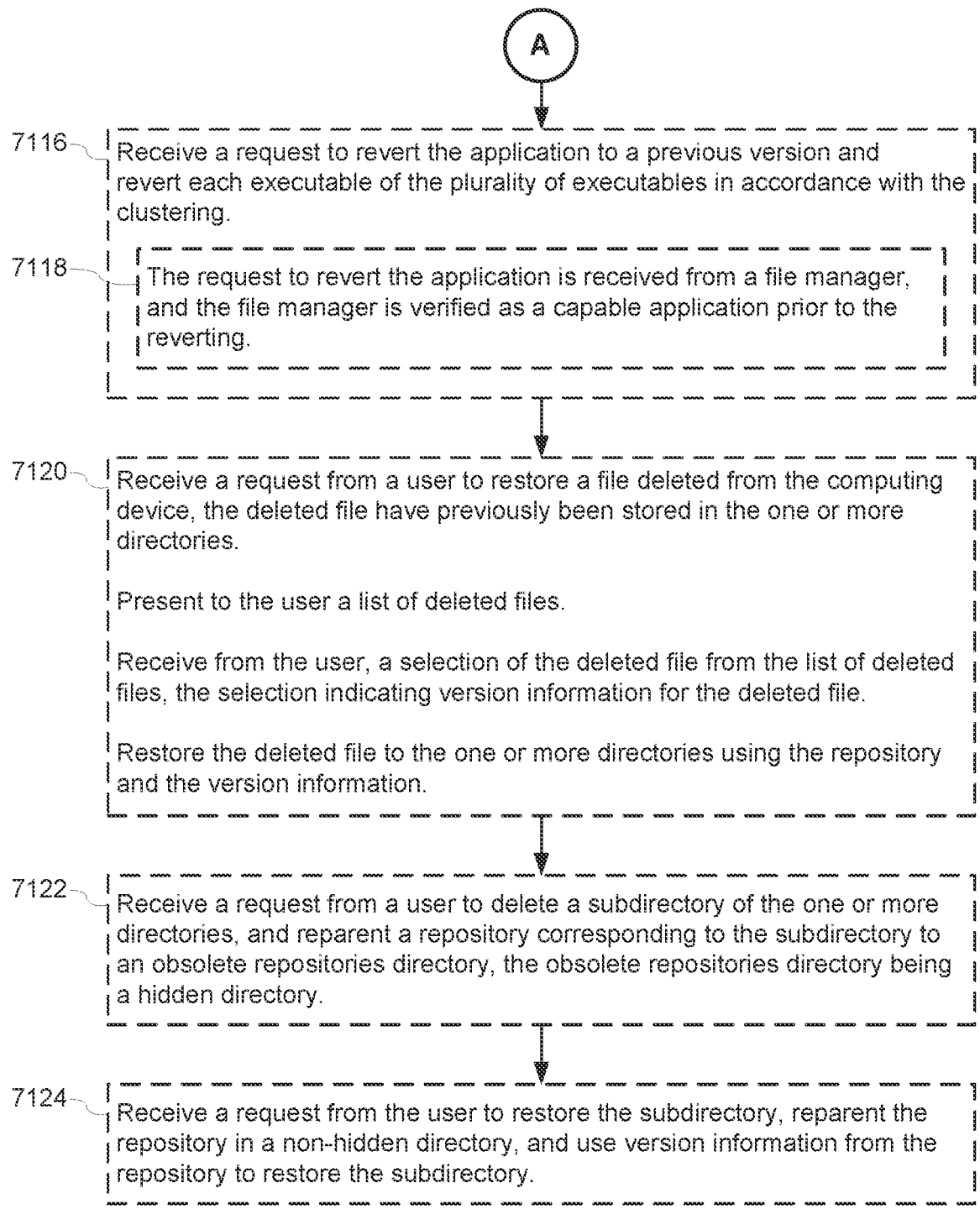

FIGS. 71A-71B are flow diagrams illustrating a method 7100 of version control in accordance with some implementations. In some implementations, the method 7100 is performed at a computing system (e.g., the computing device 4300) having one or more processors (e.g., the CPU(s) 4302) and memory (e.g., the memory 4314). In accordance with some implementations, the computing system includes an operating system (e.g., the operating system 100) and a service application programming interface (e.g., the service API 104). In some embodiments, the memory stores one or more programs configured for execution by the one or more processors. At least some of the operations shown in FIGS. 71A-71B correspond to instructions stored in a computer memory or computer-readable storage medium (e.g., the memory 1434).

The system creates (7102) a repository (e.g., the repository 4336) corresponding to one or more directories of a filesystem of the computing device (e.g., the filesystem 4802).

The system receives (7104) a request from an application to close a file, the file being stored in the one or more directories. For example, the application 112 calls the close( ) function 4806, as described above with reference to FIG. 48.

The system executes (7106) a version commit function to store changes to the file in the repository. For example, the system calls the ver_commit( ) function 4804, as described above with reference to FIG. 48.

In some implementations, the system receives (7108) a request from the application to revert the file to a previous version and determine whether the application is a capable application. For example, the file manager 4904 calls the ver_revert_file( ) function 4902 in FIG. 49.

In some implementations, the system prevents (7110) the application from reverting the file in accordance with a determination that the application is not a capable application. For example, the application is not identified in a capabilities database (e.g., the capabilities list 1008) as being capable of calling the ver_revert_file( ) function 4902.

In some implementations, the system permits (7112) the application to revert the file in accordance with a determination that the application is a capable application. For example, the application is identified in a capabilities database (e.g., the capabilities list 1008) as being capable of calling the ver_revert_file( ) function 4902.

In some implementations, the system identifies (7114) a plurality of executables as composing the application and clusters versions of the plurality of executables based on respective timestamps (e.g., as described above with respect to FIG. 52).

In some implementations, the system receives (7116) a request to revert the application to a previous version and reverts each executable of the plurality of executables in accordance with the clustering. For example, an application or utility calls the ver_revert_exe( ) function 4902, as described previously with respect to FIG. 49.

In some implementations, the request to revert the application is received (7118) from a file manager, and the file manager is verified as a capable application prior to the reverting (e.g., as described previously with respect to FIG. 49).

In some implementations, the system: (i) receives (7120) a request from a user to restore a file deleted from the computing device, the deleted file have previously been stored in the one or more directories; (ii) presents to the user a list of deleted files; (iii) receives from the user, a selection of the deleted file from the list of deleted files, the selection indicating version information for the deleted file; and restores the deleted file to the one or more directories using the repository and the version information (e.g., as described previously with respect to FIG. 54).

In some implementations, the system receives (7122) a request from a user to delete a subdirectory of the one or more directories, and reparent a repository corresponding to the subdirectory to an obsolete repositories directory, the obsolete repositories directory being a hidden directory (e.g., as described previously with respect to FIG. 53).

In some implementations, the system receives (7124) a request from the user to restore the subdirectory, reparent the repository in a non-hidden directory, and use version information from the repository to restore the subdirectory (e.g., as described previously with respect to FIG. 55).

Figure 72:
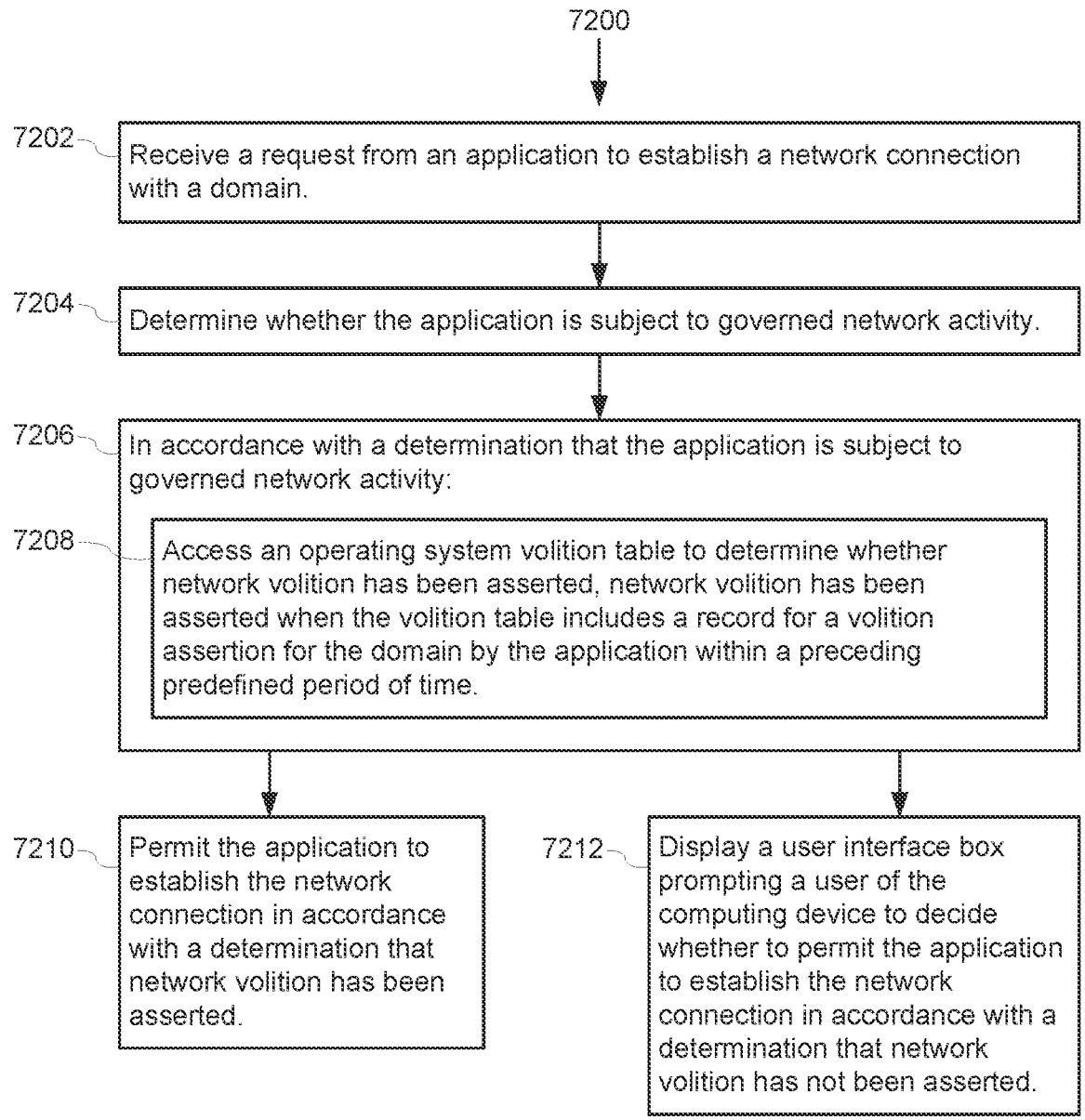
FIG. 72 is a flow diagram illustrating a method of preventing unauthorized network access in accordance with some implementations.

FIG. 72 is a flow diagram illustrating a method 7200 of preventing unauthorized network access in accordance with some implementations. In some implementations, the method 7200 is performed at a computing system (e.g., the computing device 4300) having one or more processors (e.g., the CPU(s) 4302) and memory (e.g., the memory 4314). In accordance with some implementations, the computing system includes an operating system (e.g., the operating system 100) and a service application programming interface (e.g., the service API 104). In some embodiments, the memory stores one or more programs configured for execution by the one or more processors. At least some of the operations shown in FIG. 72 correspond to instructions stored in a computer memory or computer-readable storage medium (e.g., the memory 1434).

The system receives (7202) a request from an application to establish a network connection with a domain. For example, the application 112 calls the connect( ) function 5902 to initiate network activity as described previously with respect to FIG. 59.

The system determines (7204) whether the application is subject to governed network activity. For example, the system queries an application governance database (e.g., the application governance list 1400) to determine whether the application is subject to governed network activity.

In accordance with a determination (7206) that the application is subject to governed network activity: the system accesses (7208) an operating system volition table to determine whether network volition has been asserted, network volition has been asserted when the volition table includes a record for a volition assertion for the domain by the application within a preceding predefined period of time (e.g., as described previously with respect to FIG. 59). The system permits (7210) the application to establish the network connection in accordance with a determination that network volition has been asserted.

The system displays (7212) a user interface box prompting a user of the computing device to decide whether to permit the application to establish the network connection in accordance with a determination that network volition has not been asserted. For example, the kuser_confirm( ) function 904 causes the dialog box 914 to be presented to the user, as described previously with respect to FIG. 49.

Figure 73A:
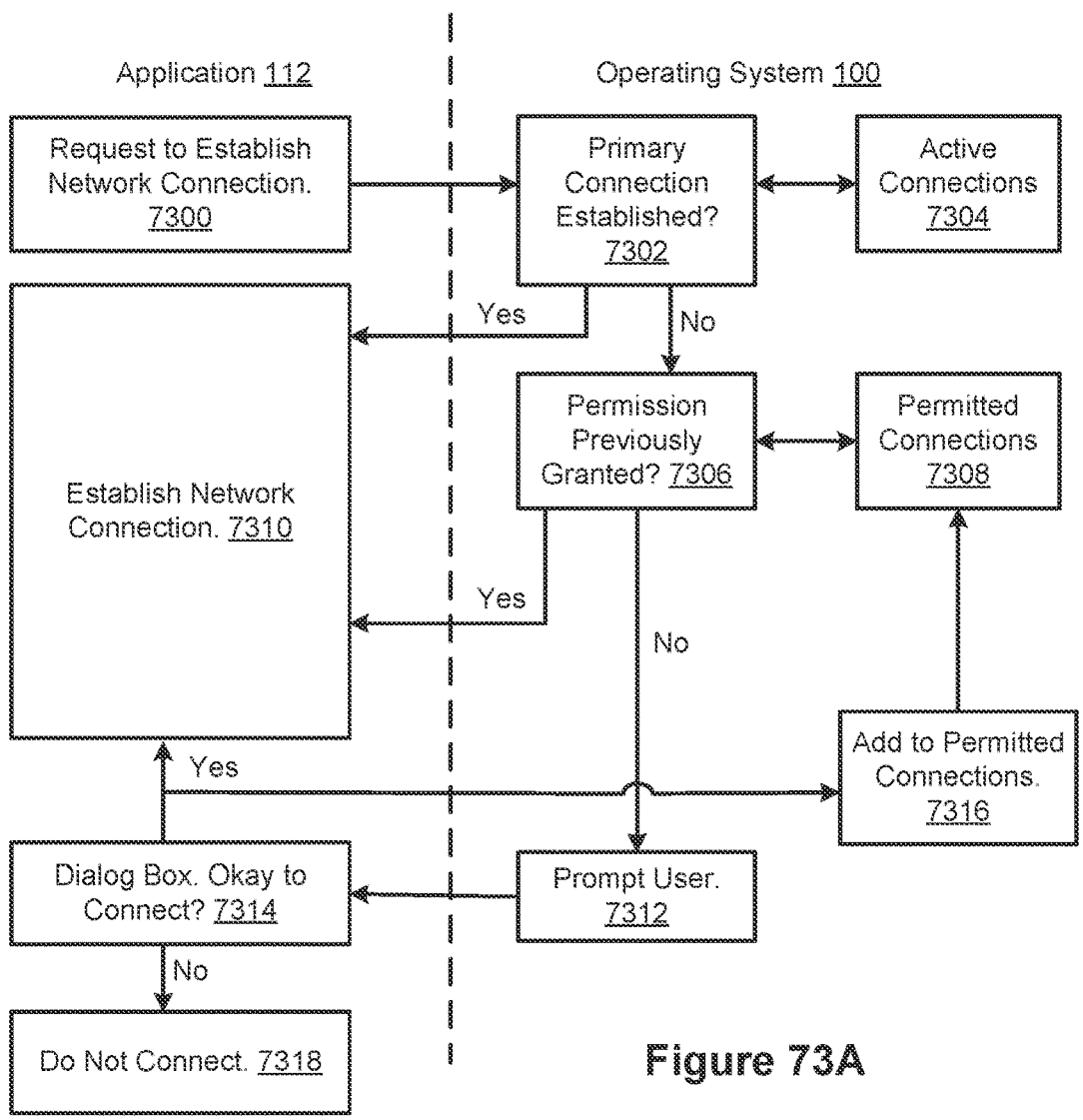
FIG. 73A is a flow diagram illustrating a method of preventing unauthorized network access in accordance with some implementations.

FIG. 73A is a flow diagram illustrating a method of preventing unauthorized network access in accordance with some implementations. In some implementations, the method in FIG. 73A is performed at a computing system (e.g., the computing device 4300) having one or more processors (e.g., the CPU(s) 4302) and memory (e.g., the memory 4314). In accordance with some implementations, the computing system includes an operating system (e.g., the operating system 100) and an application (e.g., the application 112). In some embodiments, the memory stores one or more programs configured for execution by the one or more processors. At least some of the operations shown in FIG. 73A correspond to instructions stored in a computer memory or computer-readable storage medium (e.g., the memory 1434).

The application 112 requests (7300) to establish a network connection. For example, the application 912 in FIG. 9 utilizes the library 906 to request to establish a network connection.

The operating system 100 determines (7302) whether a primary connection has been established (7302) by querying the active connections 7304 (e.g., as described previously with respect to FIG. 12). If a primary connection has been established, the operating system 100 permits (7310) the application 112 to establish the network connection.

If a primary connection has not been established, the operating system 100 determines (7306) whether permission has previously been granted by querying the permitted connections 7308 (e.g., the permitted connections 902). If permission has previously been granted, the operating system 100 permits (7310) the application 112 to establish the network connection.

If permission has not previously been granted, the operating system 100 prompts (7312) the user to confirm whether to permit the application 112 to establish the network connection via the dialog box 7314 (e.g., the dialog box 7320). For example, the kuser_confirm( ) function 904 causes the dialog box 914 to be displayed to the user, as described previously with respect to FIG. 9. If the user does not give permission, the application 112 is not permitted (7318) to establish the network connection.

If the user does give permission, the application 112 is permitted to establish (7310) the network connection and the connection is added (7316) to the permitted connections 7308 (e.g., as described previously with respect to FIG. 9).

Figure 73B:
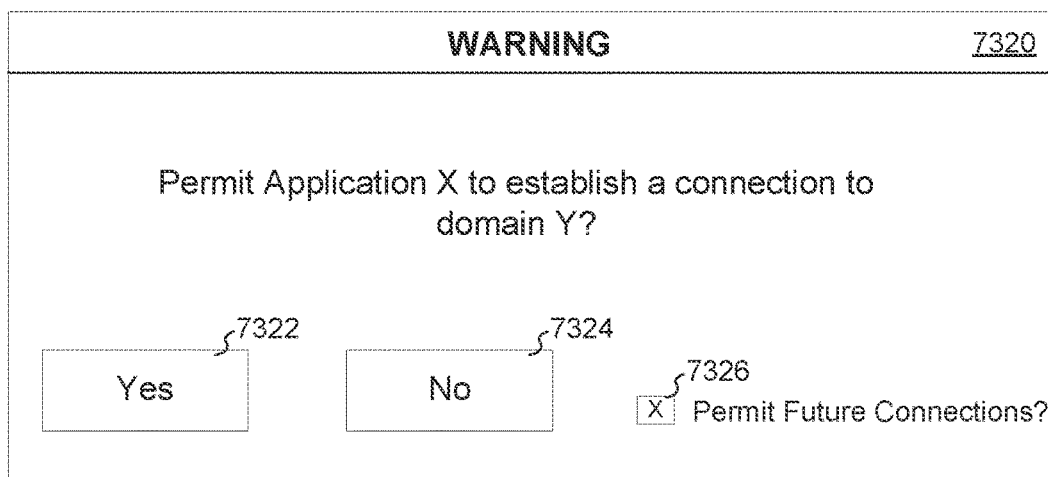
FIG. 73B illustrates an example dialog box in accordance with some implementations.

FIG. 73B illustrates a dialog box 7320 in accordance with some implementations. The dialog box 7320 includes an affordance 7322 for the user to permit the application to establish the network connection, an affordance 7324 for the user to prevent the application from establishing the connection, and an affordance 7326 for the user to permit the application to establish future connections (to the same domain) in accordance with some implementations. In some implementations, the dialog box 7320 is an instance of the user confirmation dialog box 914. In some implementations, the dialog box 7320 is an instance of the dialog box 7314.

Figure 74A:
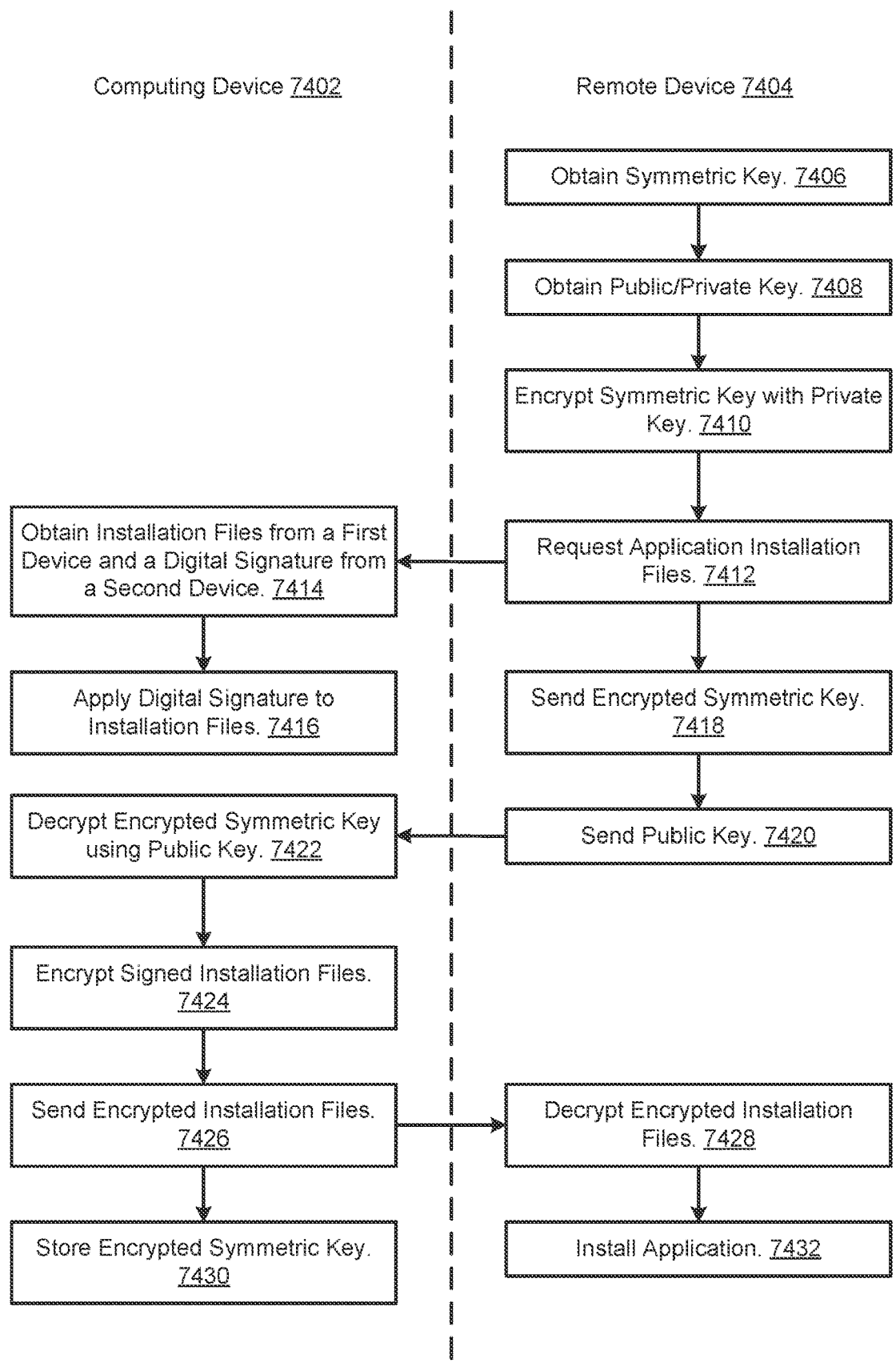
FIGS. 74A-74B are flow diagrams illustrating a method of file installation and updating in accordance with some implementations.
Figure 74B:
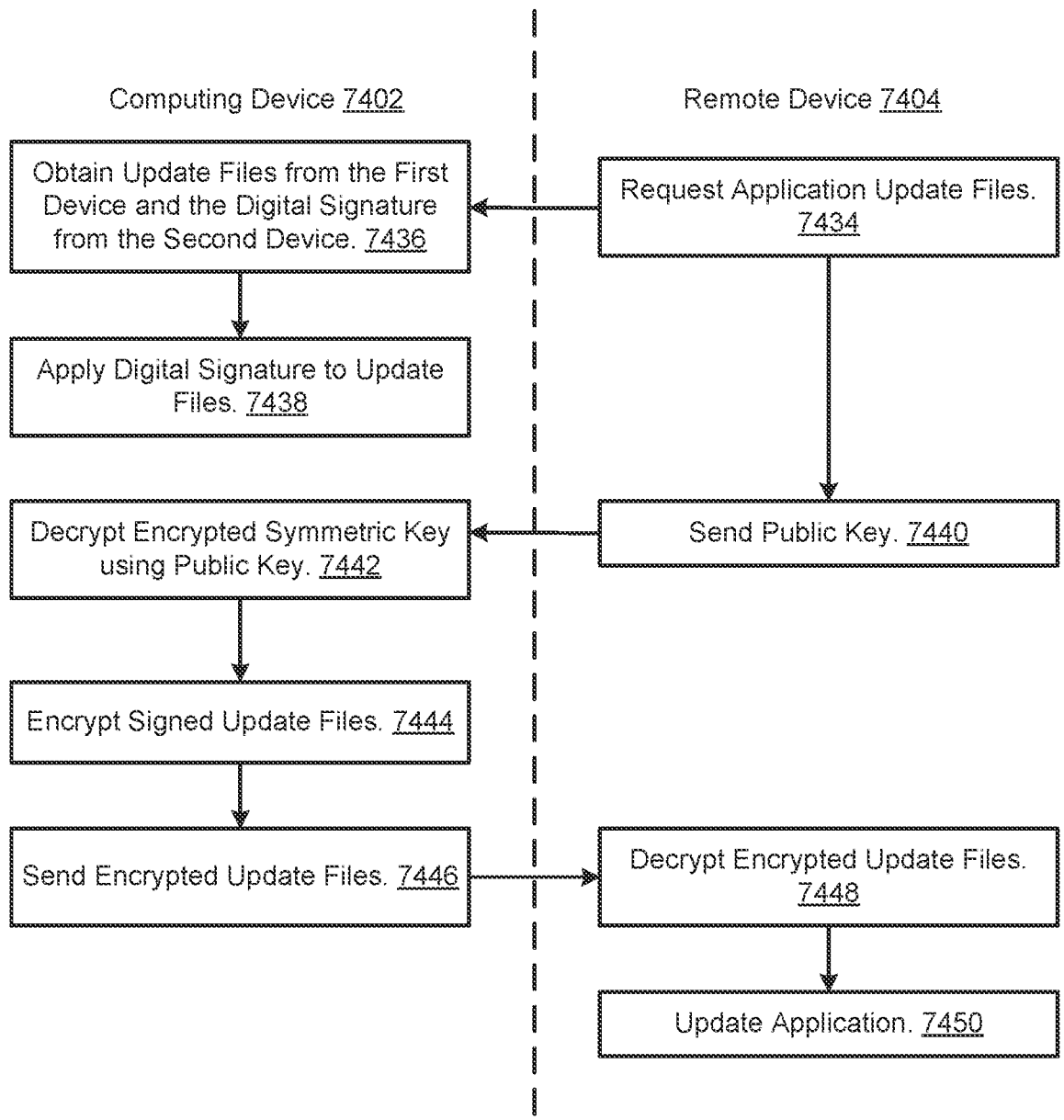

FIGS. 74A-74B are flow diagrams illustrating a method of file installation and updating in accordance with some implementations. In accordance with some implementations, at least some of the operations shown in FIGS. 74A-74B are performed at a computing device (e.g., the installation distribution server 2710), and at least some of the operations shown in FIGS. 74A-74B are performed at a remote device 7404 (e.g., the computing device 4300). In accordance with some implementations, the remote device includes an operating system (e.g., the operating system 100). At least some of the operations shown in FIGS. 74A-74B correspond to instructions stored in computer memory or computer-readable storage medium (e.g., the memory 1434).

FIG. 74A is a flow diagram illustrating a method of file installation in accordance with some implementations. The remote device 7404 obtains (7406) a symmetric key. For example, the create_install_keys( ) function 2802 causes the symmetric key 2808 to be created as described previously with respect to FIG. 28.

The remote device 7404 obtains (7408) a public/private key pair. For example, the create_install_keys( ) function 2802 causes the public/private key pair 2806 to be created as described previously with respect to FIG. 28.

The remote device 7404 encrypts (7410) the symmetric key using the private key. For example, the kernel function 2800 in FIG. 28 encrypts symmetric key 2808 by using the private key of key pair 2806, thereby creating encrypted symmetric key 2810.

The remote device 7404 requests (7412) application installation files from the computing device 7402 (e.g., as described previously with respect to FIG. 29).

The computing device 7402 obtains (7414) installation files from a first device and a digital signature from a second device. For example, the installation distribution server 2710 obtains installation files from the installation files staging server 2704 and obtains a digital signature from the digital signatures staging server 2706, as described previously with respect to FIG. 29.

The computing device 7402 applies (7416) the digital signature to the installation files (e.g., as described previously with respect to FIGS. 27 and 29).

The remote device 7404 sends (7418) the encrypted symmetric key to the computing device 7402. For example, the remote device sends the encrypted symmetric key to the installation distribution server 2710 via the internet gateway 2712 as discussed previously with respect to FIG. 29.

The remote device 7404 sends (7420) the public key to the computing device (e.g., in a separate communication than used to transmit the encrypted symmetric key). For example, the remote device sends the public key to the installation distribution server 2710 via the internet gateway 2712 as discussed previously with respect to FIG. 27.

The computing device 7402 decrypts (7422) the encrypted symmetric key using the public key. In some implementations, the computing device deletes the public key after using it to decrypt the encrypted symmetric key.

The computing device 7402 encrypts (7424) the signed installation files (using the decrypted symmetric key). The computing device 7402 sends (7426) the encrypted installation files to the remote device 7404.

The computing device 7402 stores (7430) the encrypted symmetric key. For example, the encrypted symmetric key is stored in the user data 2900. In some implementations, the computing device 7402 deletes the decrypted symmetric key and the public key (e.g., after encrypting the installation files).

FIG. 74B is a flow diagram illustrating a method of file updating in accordance with some implementations. The remote device 7404 requests (7434) application update files from the computing device 7402. For example, the installation utility 2404 calls the install_update( ) 3200 function, passing the symmetric key along with the list of files in the update, as described previously with respect to FIG. 32. In some implementations, the remote device requests the update files from the installation distribution server 2710 via the internet gateway 2712.

The computing device 7402 obtains (7436) update files from the first device and the digital signature from the second device. For example, the installation distribution server 2710 obtains the update files from the installation files staging server 2704 and obtains a digital signature from the digital signatures staging server 2706, as described previously with respect to FIG. 29.

The computing device 7402 applies (7438) the digital signature to the update files (e.g., as described previously with respect to FIG. 29).

The remote device 7404 sends (7440) the public key to the computing device 7402. In some implementations, the remote device 7404 sends the public key in a separate transmission from the request for the update files. For example, the remote device sends the public key to the installation distribution server 2710 via the internet gateway 2712 as discussed previously with respect to FIG. 29.

The computing device 7402 decrypts (7442) the encrypted symmetric key using the public key. In some implementations, the computing device deletes the public key after using it to decrypt the encrypted symmetric key.

The computing device 7402 encrypts (7444) the signed update files using the decrypted symmetric key. The computing device 7402 sends (7446) the encrypted update files to the remote device 7404.

The remote device 7404 decrypts (7448) the encrypted update files using the symmetric key. For example, the remote device obtains the symmetric key from the install keys storage area 2812 and uses it to decrypt the encrypted update files.

The remote device 7404 updates (7450) the application using the decrypted update files. For example, the installation utility 2404 updates the application (via the install_update( ) function 3200) as described previously with respect to FIG. 32.

Multipiler

The disclosed Multipiler toolset includes a set of tools and a set of standards. Unlike typical compiler construction tools, the Multipiler toolset does not generate parsers. In some implementations, the syntax for expressing a computer language uses a simple modified version of regular expressions. The Multipiler general parser tool parses any text in accordance with any compliant syntax. In this way, the general parser tool is a metacompiler (e.g., does not generate a parser skeleton).

In some implementations, the Multipiler general parser uses a recursive descent parsing algorithm to achieve depth-first searches of rules to match the grammar of the source text that is being parsed. The resulting output is an Abstract Syntax Tree (AST). In some implementations, the AST is saved to a file using a Secure Protocol Format (SPF). In some implementations, SPF is a simplification of the Distinguished Encoding Rules (DER) standard of the ASN.1 format (e.g., provides integrity against injection attacks). In some implementations, SPF is binary and therefore SPF formatted files cannot be viewed by ordinary text editors. In some implementations, the Multipiler toolset includes one or more SPF viewing tools. In some implementations, the Multiplier toolset includes a module for reading data from SPF files and other modules for reconstructing the AST in memory automatically. Third-party tools may rely on these standards to create additional functionality.

In some implementations, using the SPF and AST standards, the file produced by the general parser tool is readable and modifiable by other Multiplier tools. In some implementations, the Multiplier tools are independent, and thus the file can be analyzed, modified, and reinterpreted incrementally as desired. Because the format of the intermediate file is simple, third parties can contribute additional tools. Hence, because the Multipiler toolset does not require hand coding, a compiler or interpreter can be constructed by the aggregate effort of various third parties, even working in isolation. One advantage is that anyone can use the Multiplier toolset to add a new feature to a language without disturbing the existing compilation, provided the new feature can be implemented using existing syntax.

Multiplier Standards

In some implementations, the rules for language tokens follow these rules: (1) Each token comprises a simple pair: the token to be parsed in the source file and its identifier string. (2) A plain text token is enclosed by double quote marks. (3) If a token is not enclosed by quote marks, it is considered to be a regular expression.

In some implementations, the following regular expression elements are recognized: (1) Brackets for matching a list of characters. In some implementations, if the first character is the '^' symbol, parsing tests whether characters encountered are NOT in the list. (2) A list can be followed by a wildcard, such as an asterisk, '*', to indicate zero or more times or a plus, '+', to indicate one or more times. (3) The pipe symbol, '|', expresses logical OR. (4) Parentheses group elements together, and a group must be followed by a wildcard. (5) A single period, or dot, indicates any character. (6) A backslash, '\', escapes the next character, meaning that the next character is interpreted literally, rather than as a regular expression. Hence, the backslash character must itself be escaped by placing two of them together (e.g., '\\').

In some implementations, if the first character is an asterisk, the token is considered superfluous. Thus, tokens that are not included within the rules of a language, such as comments, can be present during parsing without interfering with the rule selection.

Each independent, complete thought of a language is known as a statement. In some implementations, each line of code contains a single statement (e.g., languages that contain more than one statement per line of code are discouraged). In some implementations, the syntax for the language is divided between structural statements and substructural statements. In some implementations, the distinction between structural and substructural statements is noted in the syntax file by level statements. For example, level 1 includes structural statements, and level 2 includes substructural statements. In some implementations, additional levels are addable. In some implementations, each statement must match a single structural statement, expressed as a production rule.

In some implementations, the production rules conform to the following specifications: (1) Each production rule begins with the name of the rule followed by a colon. (2) Each rule includes token names and production names. (3) The production rules use the following regular expression-style elements: (i) Parentheses group elements together and a group must be followed by a wildcard. (ii) Wildcards include '?' (meaning the element is optional), '*', and '+' (iii) The '?' wildcard can be appended to any token or production name. (iv) The '|' wildcard expresses logical OR, but it may not be used inside group elements.

In some implementations, any token or production name may be followed immediately by a minus, '−', which indicates that the element is superfluous. Accordingly, syntax that is necessary for parsing but which adds little value.

Example Grammar: Sandy Language

The following rules express the syntax for an example language named Sandy, which demonstrates the use of tokens and production rules using by the Multiplier toolset.

```
// structural statement specifications and sub-statement
    component
// specifications for Sandy
1. // structural statements
class_start_stmt: TOK_CLASS TOK_ID (TOK_FROM
    TOK_ID)?
(TOK_DOES
  TOK_ID (TOK_COMMA TOK_ID)*)?
class_end_stmt: TOK_END_CLASS
struct_start_stmt: TOK_STRUCT TOK_ID
struct_end_stmt: TOK_END_STRUCT
interface_start_stmt: TOK_INTERFACE TOK_ID
interface_end_stmt: TOK_END_INTERFACE
member_inheritance_stmt: TOK_RESTRICT TOK_CO-
    LON
instance_members_stmt:   TOK_ID(TOK_LBRACKET
    TOK_INT TOK_RBRACKET)?
  (TOK_COMMA       TOK_ID(TOK_LBRACKET
    TOK_INT TOK_RBRACKET)?)*TOK_COLON
TOK_ID // is also a lone statement
``` class_members_stmt: instance_members_stmt TOK_CLASS //trailing
// 'class' indicates variables belong to class, not objects
method_prototype_stmt: TOK_ID TOK_LPAREN-parameter_list?TOK_RPAREN—
TOK_PRODUCES TOK_ID? TOK_CLASS?
loop_start_stmt: TOK_LOOP|TOK_FOREACH TOK_ID TOK IN TOK_ID
if_else_stmt: TOK_IF non_text_expr|TOK_ELSEIF non_text_expr|TOK_ELSE
switch_stmt: TOK_SWITCH TOK_ID|TOK_SWITCH_TEXT TOK_ID
case_stmt: TOK_CASE TOK_INT|TOK_CASE text-|TOK_ELSE
contingent_function_call_stmt: function_outcome function_call
(TOK_PRODUCES TOK_ID(TOK_COMMA TOK_ID)*)?
assignment_stmt: TOK_ID TOK_ASSIGN expr
non_assignment_stmt: function_call|expr_operand
postfix_operator|prefix_operator expr_operand
loop_flow_stmt: TOK_END_LOOP|TOK_TOP_LOOP
switch_flow_stmt: TOK_END_SWITCH
return_stmt: TOK_RETURN expr
fail_stmt: TOK_FAIL
2. // sub-statement components
parameter_list: parameter (TOK_COMMA-parameter)*
parameter: TOK_ID(TOK_LBRACKET TOK_INT TOK_RBRACKET)?
TOK_COLON—
TOK_ID
function call: owner_object? TOK_ID TOK_LPAREN—
(expr
(TOK_COMMA
expr)*)? TOK_RPAREN—
expr: non_text_expr|text|string_chain_expr
non_text_expr: expr_operand|expr_operand bin_operator expr_operand|
plus_chain_expr|times_chain_expr|AND_chain_expr|OR_chain_expr
expr_operand: expr_primitive|TOK_LPAREN operator_expr
TOK_RPAREN|
TOK_LPAREN plus_chain_expr TOK_RPAREN-|TOK_LPAREN
times_chain_expr
TOK_RPAREN|TOK_LPAREN AND_chain_expr TOK_RPAREN|TOK_LPAREN
OR_chain_expr TOK_RPAREN
plus_chain_expr: expr_operand TOK_PLUS expr_operand (TOK_PLUS
expr_operand)+
string_chain_expr: string_chain_operand (TOK_PLUS string_chain_operand)+
string_chain_operand: function_call|TOK_ID|text
times_chain_expr: expr_operand TOK_STAR expr_operand
(TOK_STAR
expr_operand)+
AND_chain_expr: expr_operand TOK_AND expr_operand (TOK_AND
expr_operand)+
OR_chain_expr: expr_operand TOK_OR expr_operand (TOK_OR expr_operand)
+
expr_primitive: function_call|owner_object
TOK_ID|TOK_ID|number owner_object:(TOK_ID TOK_DOT)+
bin_operator: math_operator|bin_bit_operator| logical_operator|relational_operator
math_operator: TOK_PLUS|TOK_STAR|TOK_MINUS-|TOK_DIVIDE|TOK_MOD
bin_bit_operator:
TOK_BIT_OR|TOK_BIT_AND|TOK_BIT_XOR| TOK_SHIFT_LEFT|TOK_SHIFT_RIGHT
logical_operator: TOK_AND|TOK_OR
relational_operator: TOK_EQ|TOK_NE|TOK_LT-|TOK_GT|TOK_LE|TOK_GE
prefix_operator: TOK_BIT_NOT|TOK_LOGICAL_NOT
postfix_operator: TOK_INC|TOK_DEC
number: TOK_INT|TOK_REAL|TOK_MINUS TOK_INT|TOK_MINUS TOK_REAL
text: TOK_DQUOTE_TEXT|TOK_SQUOTE_TEXT
function_outcome: TOK_IF_FAIL|TOK_IF_SUCCEED As an example walkthrough, the following describes parsing source text, creating a map file, modifying the AST of source text using an AST map file, and storing syntax for transmission. In some implementations, the source text is parsed using the gen-parser-text tool. For example, with this command: (./gen-parser-text sandy-lang.tok sandy-lang.rules code.sandy code.ast). In some implementations, the raw AST is viewed using spf-text-dump and spf-hex-dump commands. For example: with this command: (./spf-text-dump code.ast).

In some implementations, a map file of the syntax is created for transposing source. In some implementations, the create-base-map-rules tool transforms any production rules file into a map file. For example: with the command: (./create-base-map-rules sandy-lang.tok sandy-lang.rules>sandy-lang.map). In some implementations, the map file is required to be revised manually. For example, elements that have a trailing minus in the underlying production rules file must be replaced or eliminated. In some implementations, after the map file is revised, it can be parsed using the gen-parser-rules tool in order to create an AST of the map. For example, with the command: (./gen-parser-rules transpose-map.tok transpose-map.rules sandy-lang-transpose.map sandy-lang-map-raw.ast). In some implementations, the AST file is required to be modified so that the rules can be regenerated using the MapRule::createRules static function. For example, with the command: (./map-rules-transposer-basic transpose-map.tok sandy-lang.tok sandy-lang-map-raw.ast sandy-lang-map-transposed.ast).

In some implementations, an AST file of source text is modified by the mapping rules. For example, with the command: (./source-transposer transpose-map.tok code.ast sandy-lang-map-transposed.ast code-transposed.ast). In some implementations, the default tool for modification is a source-transposer tool (although Multipiler modules support the creation of custom modification tools). In some implementations, the resulting modified text, contained within the AST, is output. In some implementations, an outputting tool, print-source, is included in the Multipiler toolset. For example, for use with the command: (./print-source code-transposed.ast).

Transmitting plain text poses a security risk because plain text is vulnerable to injection attacks. In some implementations, using the SPF format, the Multipiler tools stores the plain text data of token and rules files in a binary format (e.g., that prevents injection attacks). In some implementations, the gen-parser-rules tool is configured to parse production rule files and create an AST from their text. For example, with the command: (./gen-parser-rules production-rules.tok production-rules.rules sandy-lang.rules sandy-lang-raw.ast). The resulting file is a raw parsed rule file. In some implementations, the raw rules file is transposed into useful rules with a lang-rules-transposer-basic tool. For example, with the command (./lang-rules-transposer-basic sandy-lang.tok sandy-lang-raw.ast sandy-lang.ast). In some implementations, the transposed AST file accurately reflects the rules of the Sandy language and thus can be transmitted. In some implementations, the AST is digitally signed (e.g., to guarantee the integrity of the file against replacement attacks).

In some implementations, the Multipiler toolset is used to disable malware by using its transformation features to conform arbitrary executable code to the specifications described herein (e.g., the constraints 1-26 described previously). In some implementations, any executable code may be disassembled using an ordinary decompiler. In some implementations, the resulting output is text that can be parsed by the Multipiler general parser and converted into AST format. In some implementations, the AST is transformed into an AST of valid Assembly. In some implementations, the valid Assembly is transformed by replacing all system calls to open files or sockets to the system functions described previously (e.g., with respect to FIGS. 1-68). In some implementations, the Assembly text of the transformed AST is output to files that can then be re-assembled using the Assembler. In some implementations, the resulting object files are linked back into an executable file. In this way, the resulting executable obeys the constraints described herein.

In light of these examples and principles explained herein, we now turn to certain implementations.

(A1) In one aspect, some implementations include a method (e.g., the method 6900) of preventing unauthorized access to data files. The method is performed at a computing device (e.g., the computing device 4300) having one or more processors and memory storing one or more programs configured for execution by the one or more processors. The method includes: (i) installing a first application (e.g., a first application 4332) at the computing device, the first application designated as writing to user files, where installing the first application includes: (a) storing application data files for the first application within a first portion of the memory, where files stored in the first portion are designated as read-only for the first application (e.g., the read-only files portion 612); and (b) allocating a second portion of the memory for user data files to be used by the first application (e.g., the user files portion 712); and (ii) installing a second application (e.g., a second application 4332) at the computing device, the second application designated as writing to application data files, where installing the second application includes: (a) allocating a third portion of the memory for prototype writable application data files (e.g., the prototype writable application data files portion 614); and (b) allocating a fourth portion of the memory for network-based data access (e.g., the server1.com portion 720).

(A2) In some implementations of A1, the method further includes: (i) linking the first application to a first system library for managing user files (e.g., the library 106); and (ii) linking the second application to a second system library (e.g., the library 202) for managing application data files.

(A3) In some implementations of A2, the first application is configured to open user data files using a function in the first system library (e.g., the open_user_file( ) function 108).

(A4) In some implementations of A2 or A3, the method further includes linking the first and second applications to a third system library for file handling (e.g., the library 302).

(A5) In some implementations of any of A1-A4, the method further includes: (i) detecting the second application communicatively coupling to a first domain (e.g., via the get_domain_name( ) function 206); and (ii) allocating a fifth portion of the memory for application data files accessible only while the computing device is communicatively coupled to the first domain (e.g., the server2.com portion 722).

(A6) In some implementations of A5, the method further includes copying one or more files from the third portion to the fifth portion. For example, application data files are copied from the prototype writable application data files portion 614 to the server2.com portion 722).

(A7) In some implementations of A5 or A6, the method further includes: (i) while the second application is executing, obtaining a request from the second application to perform a file open operation (e.g., via the open_app_data_file( ) function 204); (ii) in response to the request, determining that the second application is communicatively coupled to the first domain (e.g., via the get_domain_name( ) function 206); and (iii) restricting the second application to accessing only the fifth portion of the memory in accordance with the determination (e.g., restricting the application 708 to the server2.com portion 722).

(A8) In some implementations of A7, the method further includes: (i) after restricting the second application, determining that the first application is no longer communicatively coupled to the first domain; and (ii) automatically closing any open files stored in the fifth portion of the memory. In some implementations, if the application closes the network connection, then the status changes automatically to offline, which automatically forces the closing of any application data files that were open for reading and writing during that particular network status.

(A9) In some implementations of any of A1-A8, the method further includes: (i) receiving a request from the first application to open a user data file; and (ii) in response to the request, presenting a user interface for a user of the computing device, the user interface including a listing of user data files from the second portion of the memory. For example, a file chooser dialog box is displayed as described previously with respect to FIG. 1.

(A10) In some implementations of any of A1-A9, the method further includes allocating a fifth portion of the memory for user transfer of files, the fifth portion of memory accessible via one or more system functions linked to the first application, the second application, and a file manager utility.

(A11) In some implementations of any of A1-A10, the method further includes allocating an additional portion of the memory for kernel storage, where system functions are stored in the kernel storage (e.g., the kernel storage 800), and the kernel storage is inaccessible by applications installed on the computing device.

(A12) In some implementations of any of A1-A11, the method further includes: (i) installing a shared library (e.g., the library 106 or the library 302) at the computing device, the shared library designated as writing to user files; and (ii) restricting access of the shared library to only applications designated as writing to user files (e.g., applications having an appropriate application type in the application types list 1700).

(B1) In another aspect, some implementations include a method of preventing unauthorized launching of applications (e.g., the method illustrated in FIG. 70A). The method is performed at a computing device (e.g., the computing device 4300) having one or more processors (e.g., the CPU(s) 4302) and memory (e.g., the memory 4314) storing one or more programs configured for execution by the one or more processors. The method includes: (i) receiving a request from an application (e.g., the application 112) to call an executable function (e.g., an exec( ) function 4408); (ii) in response to receiving the request, determining whether permission to call the executable function has previously been granted for the application (e.g., the application permission is listed in the permitted applications list 4402); and (iii) in accordance with a determination that permission to call the executable function has not previously been granted for the application: (a) presenting an option to a user of the computing device to permit the call to the executable function (e.g., the kuser_confirm( ) function 908 causes the dialog box 914 to be displayed); and (b) receiving, from the user, permission for the application to call the executable function.

(B2) In some implementations of B1, determining whether permission to call the executable function has previously been granted for the application includes querying a permitted application table (e.g., the permitted applications list 4402) for a user volition.

(B3) In some implementations of B1 or B2, presenting the option to the user comprises presenting a graphical user interface (e.g., the dialog box 7020) that includes an identifier for the application (e.g., "Application X") and an identifier for the executable function (e.g., "Application Y").

(B4) In some implementations of any of B1-B3, the option includes a first affordance to permit the call to the executable function (e.g., the affordance 7022) and a second affordance to store a permission for the application to call the executable function (e.g., the affordance 7026).

(B5) In some implementations of any of B1-B4, the method further includes, in accordance with determining that permission to call the executable function has previously been granted for the application: (i) forgoing presenting the option to the user; and (ii) permitting the application to call the executable function (e.g., the application is listed as permitted to call the executable function in the permitted applications list 4402).

(B6) In some implementations of any of B1-B5, the method further includes: (i) receiving a second request from the application, the second request being a request to call an internal executable function (e.g., to call an executable function 4412); (ii) in response to receiving the second request from the application, determining whether the application is a capable application (e.g., the application is listed as capable in the capabilities table 1008); and (iii) in accordance with determining that the application is a capable application, permitting the application to call the internal executable function.

(B7) In some implementations of B6, determining whether the application is a capable application includes querying a capabilities table of an operating system of the computing device (e.g., the capabilities table 1008).

(B8) In some implementations of any of B1-B7, the method further includes: (i) determining whether the executable function is assigned to a user-designated sandbox (e.g., by querying the sandbox list 3408); (ii) in accordance with a determination that the executable function is not assigned to the user-designated sandbox, preventing the application from calling the executable function; and (iii) in accordance with a determination that the executable function is assigned to the user-designated sandbox, permitting the application to call the executable function.

(B9) In some implementations of B8, the determining whether the executable function is assigned to the user-designated sandbox is performed in response to receiving, from the user, the permission for the application to call the executable function. For example, the sandbox list 3408 is queried in response to the user selecting the affordance 7022.

(C1) In another aspect, some implementations include a method of automated version control (e.g., the method 7100). The method is performed at a computing device (e.g., the computing device 4300) having one or more processors (e.g., the CPU(s) 4302) and memory (e.g., the memory 4314) storing one or more programs configured for execution by the one or more processors. The method includes: (i) creating a repository (e.g., the repository 4336) corresponding to one or more directories of a filesystem (e.g., the filesystem 4802) of the computing device; (ii) receiving a request from an application (e.g., the application 112) to close a file (e.g., via the close( ) function 4806), where the file is stored in the one or more directories; and (iii) in response to the request, executing a version commit function (e.g., the ver_commit( ) function 4804) to store changes to the file in the repository.

(C2) In some implementations of C1, the method further includes: (i) receiving a request from the application to revert the file to a previous version (e.g., via the ver_revert_file( ) function 4902); (ii) in response to the request to revert the file, determining whether the application is a capable application (e.g., by querying the capabilities table 1008); (iii) in accordance with a determination that the application is a capable application, permitting the application to revert the file; and (iv) in accordance with a determination that the application is not a capable application, preventing the application from reverting the file (e.g., as described above with respect to FIG. 49).

(C3) In some implementations of C1 or C2, the method further includes: (i) identifying a plurality of executables as composing the application; and (ii) clustering versions of the plurality of executables based on respective timestamps (e.g., as described above with respect to FIG. 52).

(C4) In some implementations of C3, the method further includes: (i) receiving a request to revert the application to a previous version (e.g., via the restore utility 5400); and (ii) in response to the request, reverting each executable of the plurality of executables in accordance with the clustering (e.g., as described above with respect to FIG. 54).

(C5) In some implementations of C4, the request to revert the application is received from a file manager, and the method further includes, prior to reverting each executable, verifying the file manager as a capable application.

(C6) In some implementations of any of C1-C5, the method further includes: (i) receiving a request from a user to restore a file deleted from the computing device, where the deleted file had previously been stored in the one or more directories; (ii) in response to the request to restore the deleted file, presenting to the user a list of deleted files; (iii) receiving from the user, a selection of the deleted file from the list of deleted files, the selection indicating version information for the deleted file; and (iv) restoring the deleted file to the one or more directories using the repository and the version information (e.g., as described previously with respect to FIG. 54).

(C7) In some implementations of any of C1-C6, the method further includes: (i) receiving a request from a user to delete a subdirectory of the one or more directories (e.g., via the rmdir( ) function 5300); and (ii) in response to the request to delete the subdirectory, reparenting a repository corresponding to the subdirectory to an obsolete repositories directory, wherein the obsolete repositories directory is a hidden directory (e.g., as described previously with respect to FIG. 53).

(C8) In some implementations of C7, the method further includes: (i) after reparenting the repository corresponding to the subdirectory, receiving a request from the user to restore the subdirectory (e.g., via the ver_restore_repo( ) function 5502); and (ii) in response to the request: (a) reparenting the repository in a non-hidden directory; and (b) using version information from the repository to restore the subdirectory (e.g., as described previously with respect to FIG. 55).

(D1) In another aspect, some implementations include a method of preventing unauthorized network access (e.g., the method 7200). The method is performed at a computing device (e.g., the computing device 4300) having one or more processors (e.g., the CPU(s) 4302) and memory (e.g., the memory 4314) storing one or more programs configured for execution by the one or more processors. The method including: (i) receiving a request from an application (e.g., the application 112) to establish a network connection with a domain (e.g., via the connect( ) function 5902); (ii) in response to receiving the request: (a) determining whether the application is subject to governed network activity (e.g., by querying the application governance list 1400); (b) in accordance with a determination that the application is subject to governed network activity: (1) accessing an operating system volition table (e.g., the socket volition table 5808) to determine whether network volition has been asserted, where network volition has been asserted when the volition table includes a record for a volition assertion for the domain by the application within a preceding predefined period of time; (2) in accordance with a determination that network volition has been asserted, permitting the application to establish the network connection; and (3) in accordance with a determination that network volition has not been asserted, displaying a user interface box prompting a user of the computing device to decide whether to permit the application to establish the network connection (e.g., the kuser_confirm( ) function 908 causes the dialog box 914 to be displayed to the user).

(E1) In another aspect, some implementations include a method of preventing unauthorized network transmissions (e.g., the method illustrated in FIG. 73A). The method is performed at a computing device (e.g., the computing device 4300) having one or more processors (e.g., the CPU(s) 4302) and memory (e.g., the memory 4314) storing one or more programs configured for execution by the one or more processors. The method includes: (i) receiving a request from an application to establish a network connection with a domain (e.g., the application 912 requests a network connection via the library 906); (ii) in response to receiving the request, determining whether a portion of the memory includes an association between the application and the domain (e.g., whether the association is stored in the permitted connections list 902); (iii) in accordance with determining that the portion of the memory does not include the association, presenting an option to a user of the computing device to permit the network connection (e.g., the kuser_confirm( ) function 904 causes the dialog box 914 to be displayed to the user); and (iv) receiving, from the user, permission for the application to establish the network connection (e.g., receiving a user selection of the "Yes" affordance 7322 in the dialog box 7320).

(E2) In some implementations of E1, the portion of the memory includes a table of permitted associations between applications and domains (e.g., the permitted connections list 902).

(E3) In some implementations of E1 or E2, the option presented to the user is a dialog box that includes information about the application and the domain. For example, the dialog box 7320 includes a reference to the "Application X" and the "domain Y".

(E4) In some implementations of E3, the dialog box includes a first affordance to permit the network connection (e.g., the affordance 7322) and a second affordance to store the association between the application and the domain in the portion of the memory. (e.g., the affordance 7326).

(E5) In some implementations of any of E1-E4, the method further includes, in accordance with determining that the table of associations includes the association: (i) forgoing presenting the option to the user; and (ii) permitting the network connection between the application and the domain. For example, the kuser_confirm( ) function 904 is only called if the association isn't found in the permitted connections 902.

(E6) In some implementations of any of E1-E5, the request from the application includes a request to establish a TCP connection (e.g., via the open_TCP_connection( ) function 908) or a UDP connection (e.g., via the open_UDP_connection( ) function 910).

(E7) In some implementations of any of E1-E6, the portion of the memory is restricted by an operating system of the computing device to prevent access by applications (e.g., the portion of the memory is in the kernel storage 800).

(E8) In some implementations of any of E1-E7, the portion of the memory is restricted by an operating system of the computing device to only allow access by applications listed in a capabilities table (e.g., the capabilities table 1008).

(E9) In some implementations of any of E1-E8, the method further includes: (i) receiving a request from the application for a uniform resource locator (URL) element (e.g., via the library 1100); (ii) in response to the request for the URL element, providing a graphical user interface element to the application (e.g., the GUI element 1106); (iii) receiving, at the graphical user interface element, a URL corresponding to a second domain from a user; and (iv) in response to receiving the URL, adding an association between the application and the second domain (e.g., as described previously with respect to FIG. 11).

(E10) In some implementations of any of E1-E9, the method further includes: (i) receiving a second request from the application to establish a secondary network connection (e.g., via the library 1200); (ii) in response to receiving the second request, determining whether the application has a primary connection to the domain; and (iii) in accordance with determining that the application has the primary connection to the domain, permitting the secondary network connection (e.g., as described previously with respect to FIG. 12).

(E11) In some implementations of E10, the method further includes: (i) prior to permitting the secondary network connection, determining whether the secondary network connection would meet one or more criteria; and (ii) permitting the secondary network connection in accordance with a determination that the secondary network connection would meet the one or more criteria, wherein the one or more criteria include a limit on a total number of secondary connections permitted for the primary connection. In some implementations, the system restricts the amount of data transmitted via the secondary connection. In some implementations, all transmissions of data to secondary servers are required to be completed before the application is permitted to receive any further user input. In some implementations, the data supplied to secondary servers is limited to that supplied by the webpage sent from the primary connection. In some implementations, the system uses state information to enforce the restrictions.

(F1) In another aspect, some implementations include a method of securing installation files (e.g., the method illustrated in FIG. 74A). The method is performed at a computing system having one or more processors (e.g., the CPU(s) 4302) and memory (e.g., the memory 4314) storing one or more programs configured for execution by the one or more processors. In some implementations, the computing system includes a user device (e.g., the computing device 4300) and a server device (e.g., the installation distribution server 2710). The method includes: (i) receiving, from a remote device, a request to download installation files for an application (e.g., receiving the request at the installation distribution server 2710); (ii) in response to the request, obtaining the installation files from a first device (e.g., from the installation files staging server 2704) and obtaining a digital signature from a second device (e.g., from the digital signatures staging server 2706); (iii) applying the digital signature to the installation files to obtain signed installation files (e.g., signing the installation files using the digital signature); and (iv) transmitting the signed installation files to the remote device (e.g., transmitting the signed installation files via the internet gateway 2712 to the computing device 4300).

(F2) In some implementations of F1, the method further includes: (i) receiving an encrypted symmetric key (e.g., the encrypted symmetric key 2810) and a public key (e.g., from the public/private key pair 2806) from the remote device; (ii) obtaining a symmetric key by decrypting the encrypted symmetric key using the public key; (iii) generating encrypted installation files by applying the symmetric key to the signed installation files, where transmitting the signed installation files includes transmitting the encrypted installation files; (iv) in accordance with generating the encrypted installation files, discarding the symmetric key and the public key; and (v) storing the encrypted symmetric key (e.g., as described previously with respect to FIG. 29).

(F3) In some implementations of F2, the method further includes: (i) receiving, from the remote device, a request to download update files for the application, the request including the public key; (ii) obtaining the symmetric key by decrypting the stored encrypted symmetric key using the public key included in the request to download the update files; (iii) generating encrypted update files by applying the symmetric key to the update files; and (iv) transmitting the encrypted update files to the remote device (e.g., as described previously with respect to FIG. 32).

(G1) In another aspect, some implementations include a method of preventing unauthorized access to user data files (e.g., the method illustrated in FIG. 42B). The method is performed at a computing device (e.g., the computing device 4300) having one or more processors (e.g., the CPU(s) 4302) and memory (e.g., the memory 4314) storing one or more programs configured for execution by the one or more processors. The method includes: (i) receiving a request from an application to open a data file (e.g., via the open( ) function 3900), the request including a name of the data file and a path to the data file; (ii) in response to receiving the request: (a) determining whether the path corresponds to a designated storage location for user data files (e.g., path in the user root paths 3402); (b) determining whether access to the data file has previously been granted for the application (e.g., the application is included in the files permitted list 3406); (c) in accordance with a determination that (i) the path corresponds to a designated storage location for user data files and (ii) access to the data file has not previously been granted for the application: (1) accessing an operating system volition table (e.g., the GUI Open File Volitions 3404) to determine whether access volition has been asserted, where access volition has been asserted when the volition table includes a record for a volition assertion for the data file by the application within a preceding predefined period of time; (2) in accordance with a determination that access volition has been asserted, permitting the application to access the data file; and (3) in accordance with a determination that access volition has not been asserted, displaying a user interface box (e.g., the dialog box 3904) prompting a user of the computing device to decide whether or not to grant the application access to the data file.

(G2) In some implementations of G1, the method further includes, prior to receiving the request from the application to open the data file, receiving a volition request, including the name of the data file and the path to the data file; and in response to the volition request and a determination that the application has permission to make volition requests, storing a record in the volition table, the record including (i) the name of the data file, (ii) the path to the data file, (iii) an identifier of the application, and (iv) a current operating system timestamp.

(G3) In some implementations of G1 or G2, access volition has been asserted when the volition table includes a record (i) whose data file name, path, and application match the data file name, path, and application specified in the request and (ii) whose timestamp $T_S$ satisfies $T_C-T_S<\Delta t$, where $T_C$ is a current timestamp at the computing device and $\Delta t$ is the predefined period of time.

(G4) In some implementations of any of G1-G3, determining whether access to the data file has previously been granted for the application comprises searching for a record in a permitted files table that matches the name of the data file, the path of the data file, and an identifier of the application.

(G5) In some implementations of G4, the method further includes, in accordance with a determination that access volition has been asserted, storing a new record in the permitted files table, the new record including the name of the data file, the path of the data file, and an identifier of the application.

(G6) In some implementations of any of G1-G5, the method further includes, after displaying the user interface box: (i) receiving input, from a user of the computing device, granting permission to access the data file; and (ii) in response to receiving the user input: (a) opening the data file; and (b) storing a new record in a permitted files table, the new record including the name of the data file, the path of the data file, and an identifier of the application.

(G7) In some implementations of any of G1-G6, the method further includes, after displaying the user interface box: (i) receiving input, from a user of the computing device, denying permission to access the data file; and (ii) in response to receiving the user input: (a) not opening the data file; and (b) storing a new record in a permitted files table, the new record including the name of the data file, the path of the data file, an identifier of the application, and an access flag indicating access is denied.

(G8) In some implementations of any of G1-G7, the method further includes, in response to the request, determining whether access to the data file has previously been denied for the application.

(G9) In some implementations of G8, (i) determining whether access to the data file has previously been granted for the application and (ii) determining whether access to the data file has previously been denied for the application are performed simultaneously by looking up a record in a permitted files table and, if found, reading an access flag on the record that specifies whether access is granted or denied.

(G10) In some implementations of G8 or G9, determining that access to the data file has not previously been granted for the application includes determining that access to the data file has not previously been denied to the application.

In another aspect, some implementations include a computing system including one or more processors and memory coupled to the one or more processors, the memory storing one or more programs configured to be executed by the one or more processors, the one or more programs including instructions for performing any of the methods described herein (e.g., A1-A12, B1-B9, C1-C8, D1, E1-E11, F1-F3, and G1-10 above).

In yet another aspect, some implementations include a non-transitory computer-readable storage medium storing one or more programs for execution by one or more processors of a computing system, the one or more programs including instructions for performing any of the methods described herein (e.g., A1-A12, B1-B9, C1-C8, D1, E1-E11, F1-F3, and G1-10 above).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of securing executable files, performed at a computing device having one or more processors and memory storing one or more programs configured for execution by the one or more processors, the method comprising:
   receiving an executable file;
   disassembling the executable file to form source text;
   identifying syntax of the source text by performing a recursive descent parsing of the source text, including matching grammar rules to the source text;
   generating an abstract syntax tree (AST) for the source text based on the identified syntax;
   generating a transformed AST from the generated AST by replacing each of one or more calls to kernel system functions with a respective call to a respective protected system function that performs security checks and calls the respective kernel system function when the security checks are passed; and
   generating a secured executable file by assembling the transformed AST.

2. The method of claim 1, wherein identifying the syntax of the source text further comprises:
   recognizing a plurality of language tokens in the source text; and
   recognizing corresponding identifier strings for the plurality of language tokens, wherein the syntax of the source text is identified based on the plurality of language tokens and the corresponding identifier strings.

3. The method of claim 1, further comprising storing the AST to a file having a secure protocol format.

4. The method of claim 3, further comprising:
   reconstructing the AST in memory from the file having the secure protocol format.

5. The method of claim 3, wherein the file is a binary file.

6. The method of claim 1, wherein identifying the syntax of the source text further comprises identifying one or more structural statements and one or more substructural statements in the source text.

7. The method of claim 6, wherein generating the AST comprises identifying a respective production rule for each of one or more structural statements.

8. The method of claim 1, wherein the transformed AST is digitally signed prior to assembly.

9. The method of claim 1, wherein the one or more calls to kernel system functions comprise a first call to a file and a second call to a socket.

10. A computing device, comprising:
    one or more processors;
    memory; and
    one or more programs stored in the memory and configured for execution by the one or more processors, the one or more programs comprising instructions for:
    receiving an executable file;
    disassembling the executable file to form source text;
    identifying syntax of the source text by performing a recursive descent parsing of the source text, including matching grammar rules to the source text;
    generating an abstract syntax tree (AST) for the source text based on the identified syntax;
    generating a transformed AST from the generated AST by replacing each of one or more calls to kernel system functions with a respective call to a respective protected system function that performs security checks and calls the respective kernel system function when the security checks are passed; and
    generating a secured executable file by assembling the transformed AST.

11. The computing device of claim 10, wherein identifying the syntax of the source text further comprises:
    recognizing a plurality of language tokens in the source text; and
    recognizing corresponding identifier strings for the plurality of language tokens, wherein the syntax of the source text is identified based on the plurality of language tokens and the corresponding identifier strings.

12. The computing device of claim 10, wherein the one or more programs further comprise instructions for storing the AST to a file having a secure protocol format.

13. The computing device of claim 10, wherein identifying the syntax of the source text further comprises identifying one or more structural statements and one or more substructural statements in the source text.

14. The computing device of claim 13, wherein generating the AST comprises identifying a respective production rule for each of one or more structural statements.

15. The computing device of claim 10, wherein the transformed AST is digitally signed prior to assembly.

16. A non-transitory computer-readable storage medium storing one or more programs configured for execution by a computing device having one or more processors and memory, the one or more programs comprising instructions for:
   receiving an executable file;
   disassembling the executable file to form source text;
   identifying syntax of the source text by performing a recursive descent parsing of the source text, including matching grammar rules to the source text;
   generating an abstract syntax tree (AST) for the source text based on the identified syntax;
   generating a transformed AST from the generated AST by replacing each of one or more calls to kernel system functions with a respective call to a respective protected system function that performs security checks and calls the respective kernel system function when the security checks are passed; and
   generating a secured executable file by assembling the transformed AST.

17. The non-transitory computer-readable storage medium of claim 16, wherein identifying the syntax of the source text further comprises:
   recognizing a plurality of language tokens in the source text; and
   recognizing corresponding identifier strings for the plurality of language tokens, wherein the syntax of the source text is identified based on the plurality of language tokens and the corresponding identifier strings.

18. The non-transitory computer-readable storage medium of claim 16, wherein the one or more programs further comprise instructions for storing the AST to a file having a secure protocol format.

19. The non-transitory computer-readable storage medium of claim 16, wherein identifying the syntax of the source text further comprises identifying one or more structural statements and one or more substructural statements in the source text.

20. The non-transitory computer-readable storage medium of claim 19, wherein generating the AST comprises identifying a respective production rule for each of one or more structural statements.

* * * * *